United States Patent
Ogihara et al.

(10) Patent No.: US 6,226,634 B1
(45) Date of Patent: *May 1, 2001

(54) ASSOCIATION RULE GENERATION AND GROUP-BY PROCESSING SYSTEM

(75) Inventors: Kazutaka Ogihara; Riichiro Take; Naoki Akaboshi; Lilian Harada, all of Kawasaki (JP)

(73) Assignee: Fujitsu Limited, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/049,091

(22) Filed: Mar. 27, 1998

(30) Foreign Application Priority Data

Apr. 18, 1997 (JP) .................................................. 9-100696
Jun. 10, 1997 (JP) .................................................. 9-152171

(51) Int. Cl.$^7$ .................................................. G06F 17/00
(52) U.S. Cl. ........................ 707/4; 707/3; 707/6; 707/101
(58) Field of Search ........................................ 707/1–206

(56) References Cited

U.S. PATENT DOCUMENTS

| | | | |
|---|---|---|---|
| 5,511,190 | 4/1996 | Sharma et al. ............................ | 707/1 |
| 5,852,822 | * 12/1998 | Srinavasan et al. ...................... | 707/4 |
| 5,918,231 | * 6/1999 | Yasumura .............................. | 707/103 |
| 5,926,807 | * 7/1999 | Peltonen et al. ......................... | 707/3 |

(List continued on next page.)

FOREIGN PATENT DOCUMENTS

| | | |
|---|---|---|
| 64-7230 | 1/1989 | (JP) . |
| 2-231675 | 9/1990 | (JP) . |
| 8-161287 | 6/1996 | (JP) . |

(List continued on next page.)

OTHER PUBLICATIONS

M. Houtsma, et al., "Oriented Mining for Association Rules in Relational Databases"; pp. 25–33, no date.
R. Agrawal, et al., "Mining Association Rules Between Sets of Items in Large Databases"; pp. 207–216, no date.
R. Argawal, et al., "Fast Algorithms for Mining Association Rules", pp. 487–499, no date.
M. Houtsma, et al., "Set–Oriented Mining for Association Rules in Relational Databases"; pp. 25–33, IEEE 1995.

(List continued on next page.)

Primary Examiner—Thomas G. Black
Assistant Examiner—David Y. Jung
(74) Attorney, Agent, or Firm—Staas & Halsey LLP

(57) ABSTRACT

A group-by processing system performs a specified operation computing average value, etc. on a group of records having the same key value, efficiently accesses a secondary storage device, and realizes a high speed process. The group-by processing system includes a unit for storing records; a unit for storing pointers to the records in the unit for storing records at positions, each of which corresponds to a hash function value calculated using the key value of the pointed record; a unit for outputting the records pointed to by the pointers in the unit for storing pointers to secondary storage device, given the hash function values; and a unit for reading a list of output hashed records, sorting the records by key value, and performing a group-by operation on the sorted records. The system also includes a combination generation unit for outputting a combination of two or more items satisfying a combination generation restriction condition; an occurrence count unit for counting occurrences of the combinations; a combination selection unit for selecting the combination which satisfies the given condition of the number of occurrences; and a restriction condition generation unit for assigning the restriction condition to the combination generation unit according to the selection result. The combinations of items can be counted efficiently by performing a high-speed group-by operation.

55 Claims, 173 Drawing Sheets

U.S. PATENT DOCUMENTS

| | | | | |
|---|---|---|---|---|
| 5,960,434 | * | 9/1999 | Schimmel | 707/100 |
| 5,970,490 | * | 10/1999 | Morgenstern | 707/10 |

FOREIGN PATENT DOCUMENTS

| | | |
|---|---|---|
| 3-257549 | 11/1991 | (JP) . |
| 8-77010 | 3/1996 | (JP) . |

OTHER PUBLICATIONS

Costa et al., "Logical Animation", Proceedings of the twelfth international conference on Software engineering, Mar. 1990, pp. 144–149.*

Sears et al., "Touchscreen field specification for public access database queries: let your fingers do the walking", Procedding sof the 1990 ACM computer computer science conference on Cooperation, Feb. 1990, pp. 1–7.*

Shin, "Semantics modeling issues for processing natural language database queries", Proceedings of the 1990 ACM computer science conference on Cooperation, Feb. 1990, pp. 8–14.*

R. Agrawal et al., "Fast Algorithms For Mining Association Rules", pp. 487–499, IBM Almaden Research Center, 1994.

J. Park, et al., "Mining Association Rules with Adjustable Accuracy" pp. 151–160, 1997.

J. Gray, "Data Cube: A Relational Aggregation operator Generalizing Group–By, Cross–Tab, and Sub Totals", pp. 152–159, 1996.

* cited by examiner

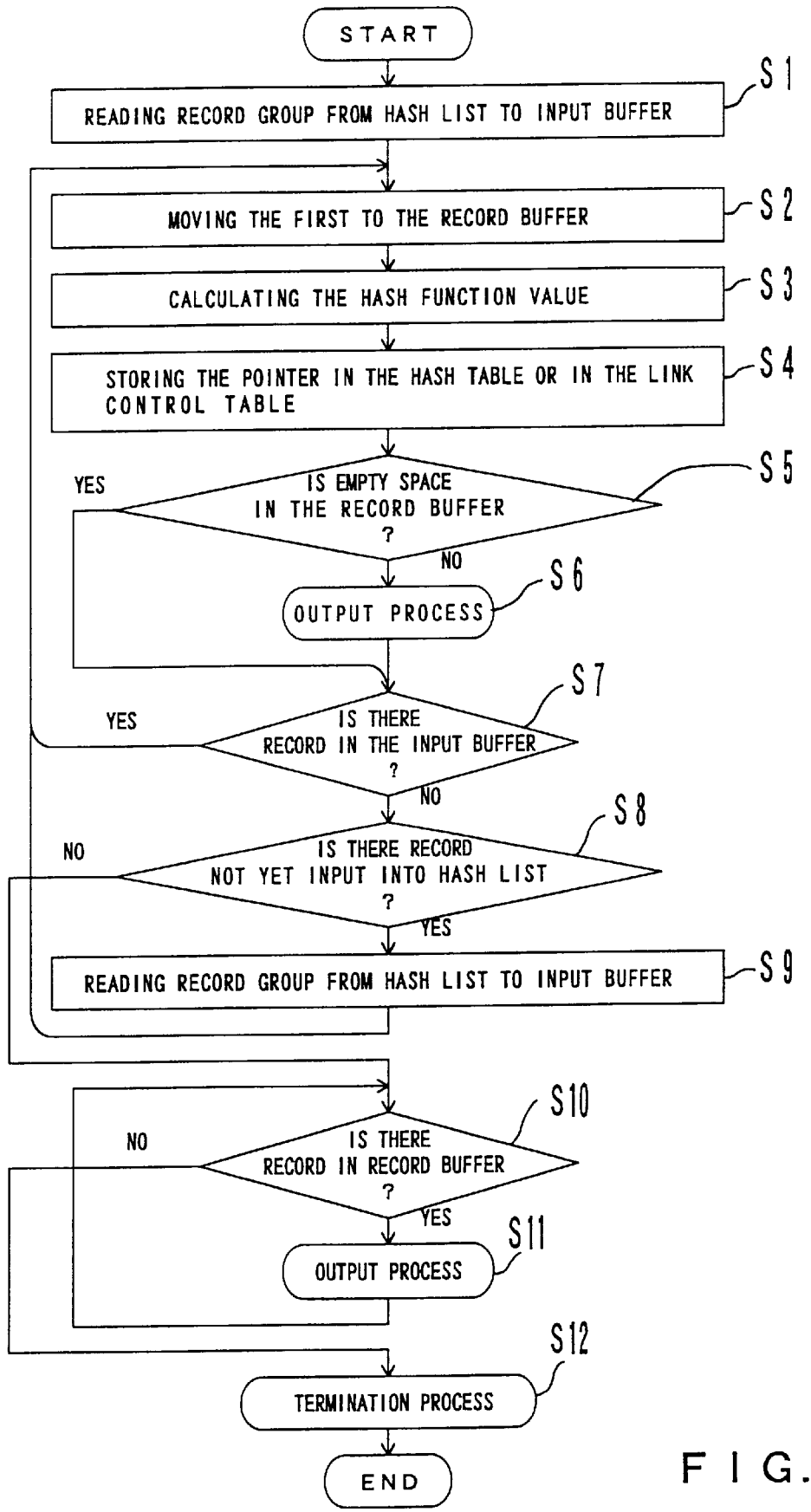
F I G. 4

GROUP-BY TARGET
RECORD GROUP

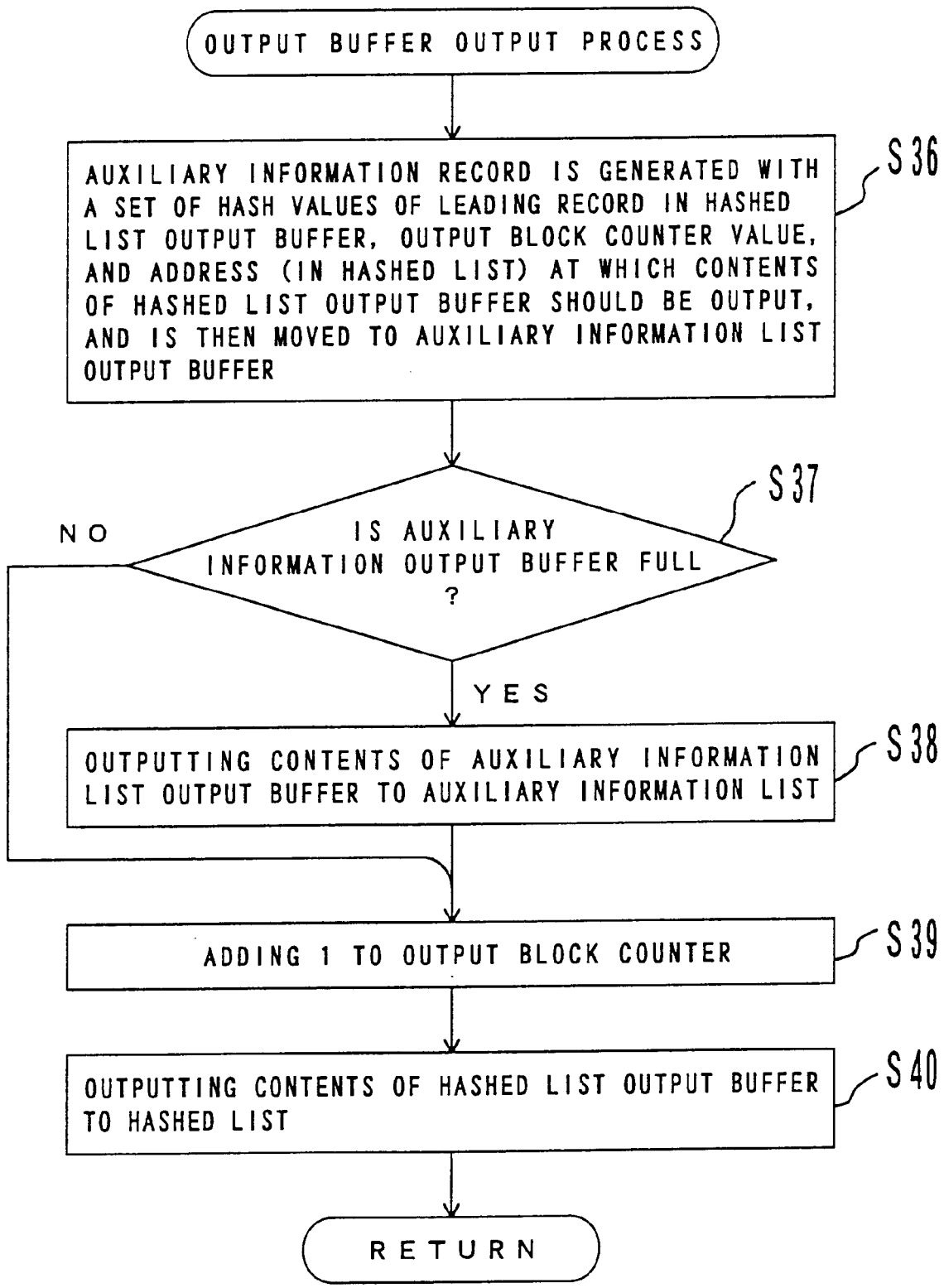
F I G. 1 1

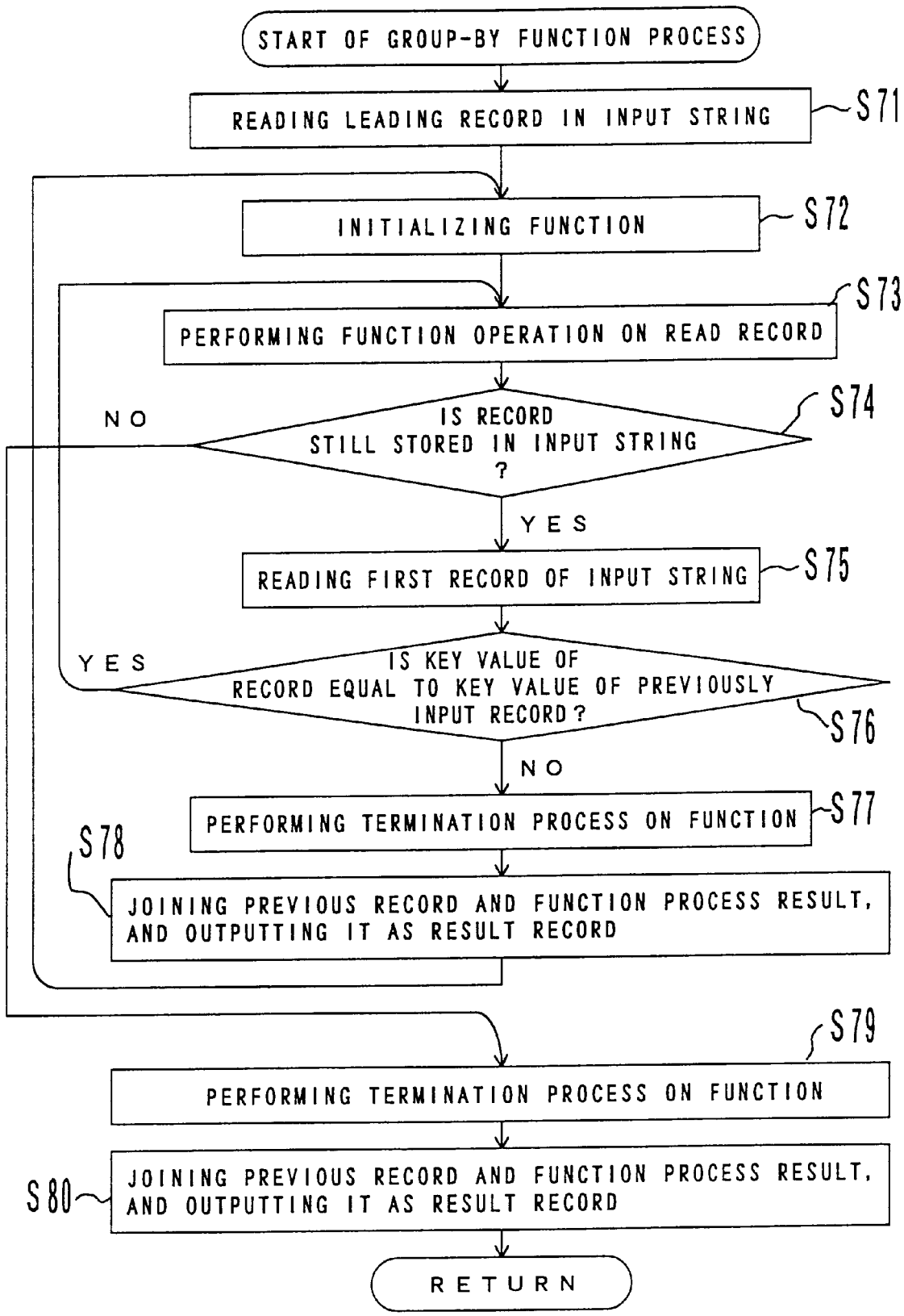
F I G. 2 0

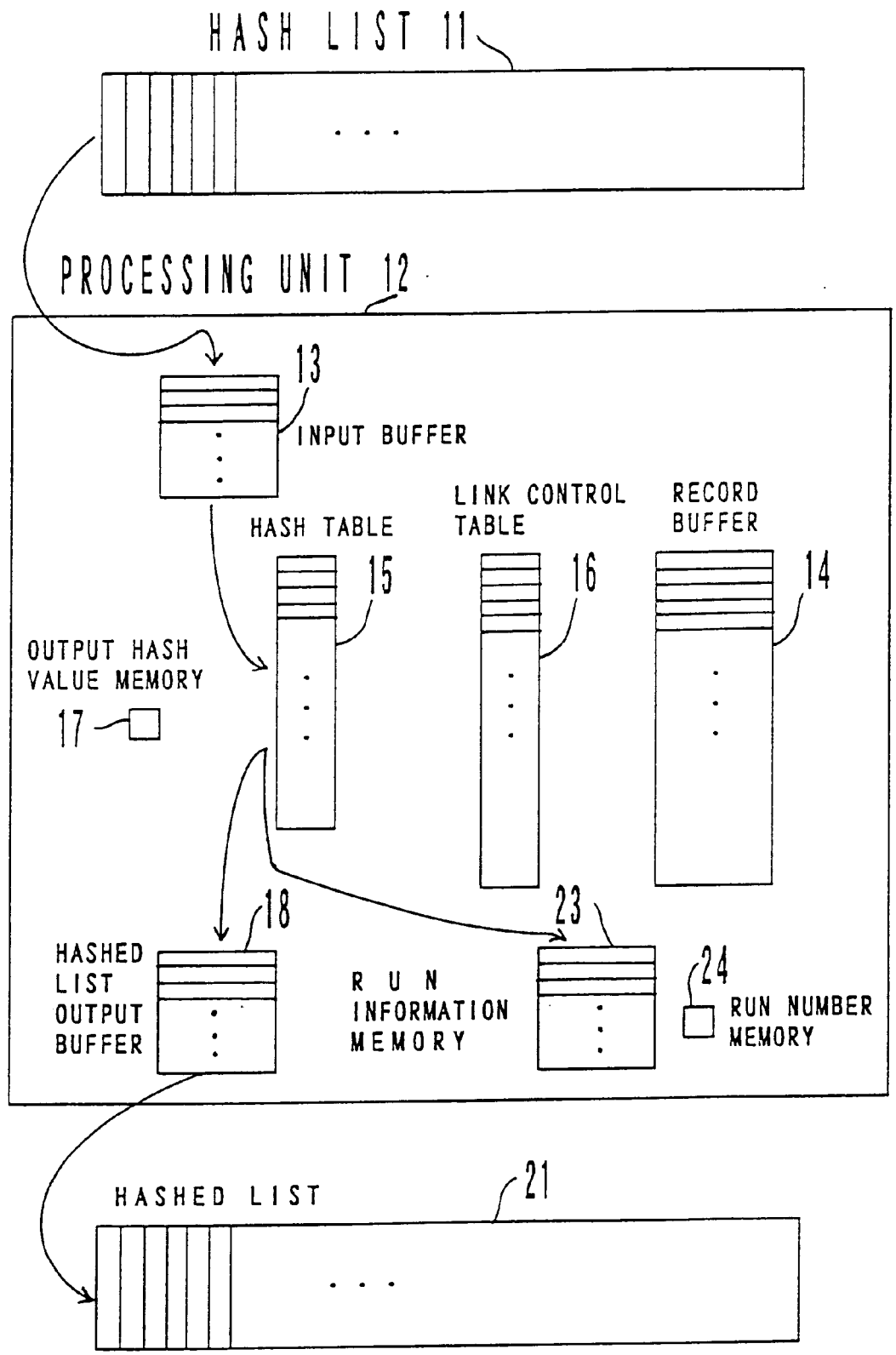
F I G. 2 5

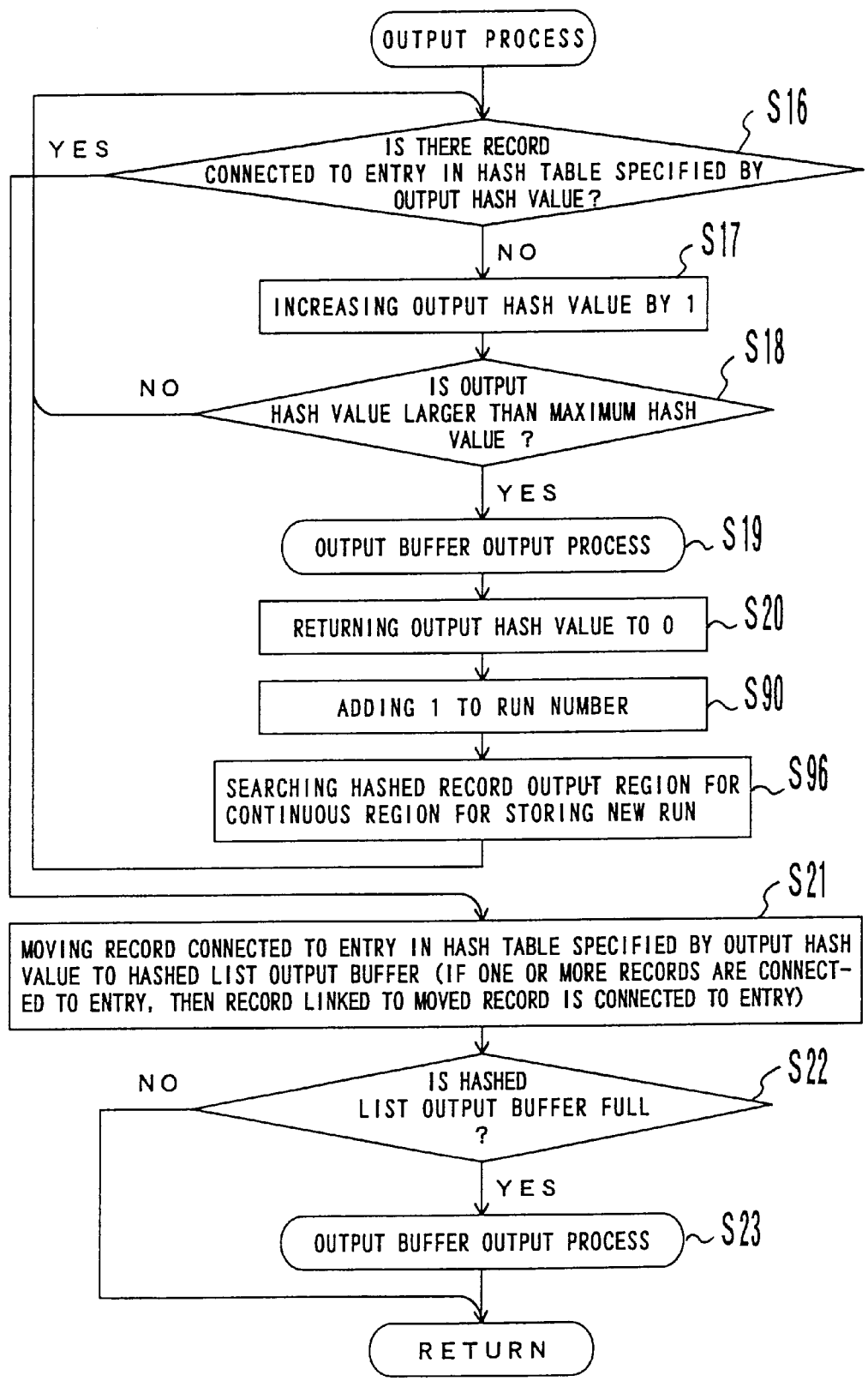
F I G. 2 9

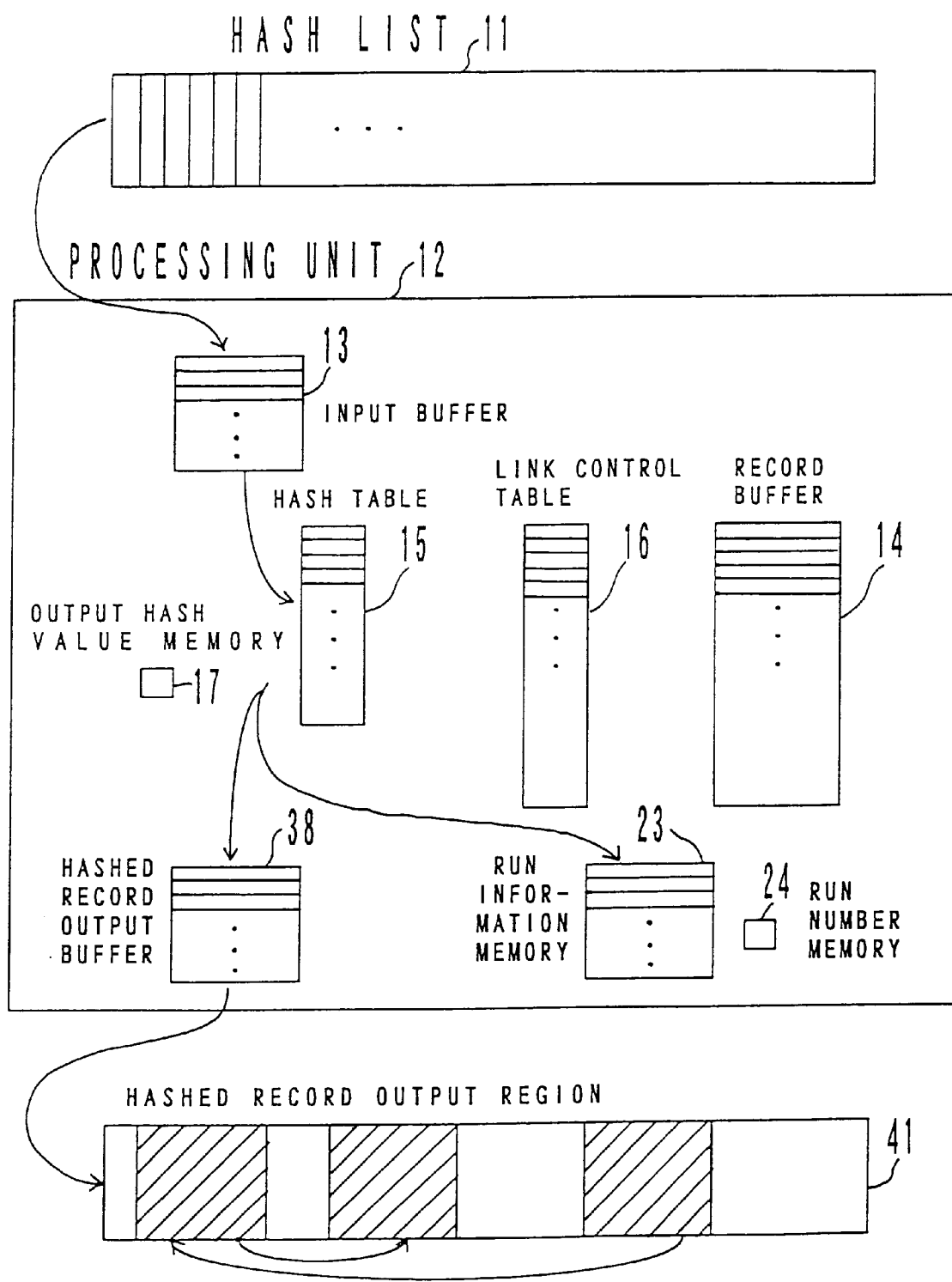
F I G. 3 3

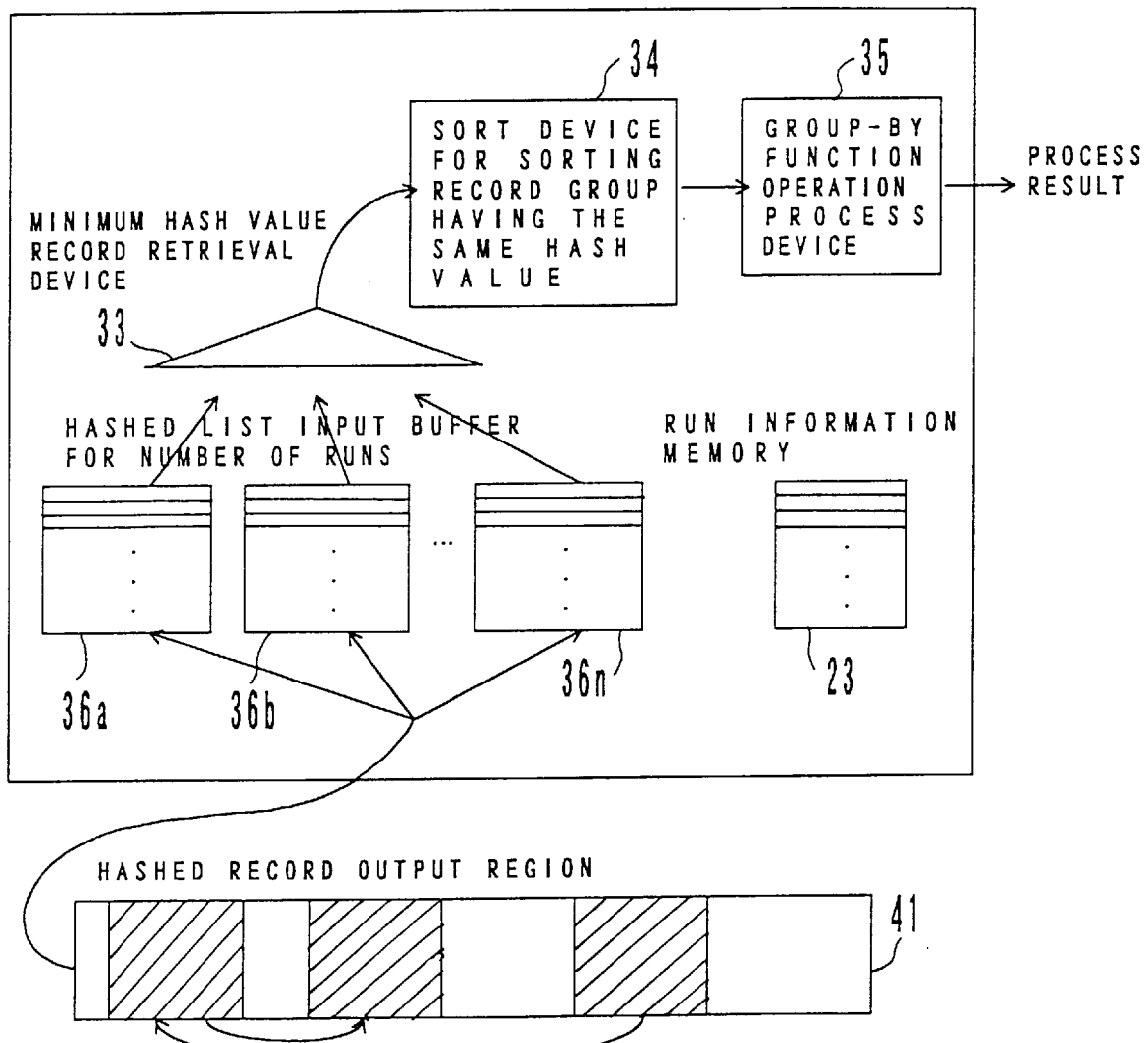
F I G. 3 5

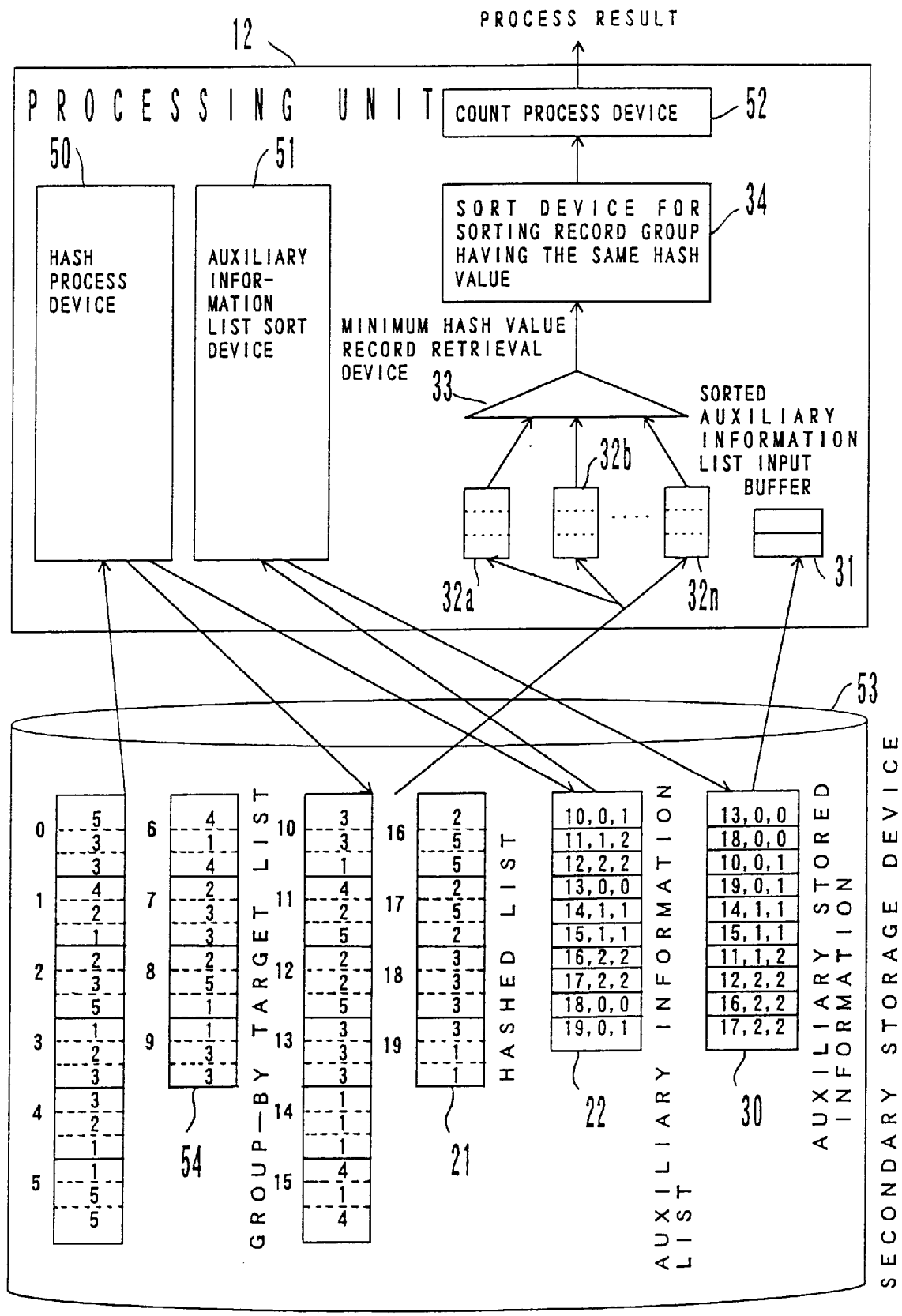
F I G. 3 7

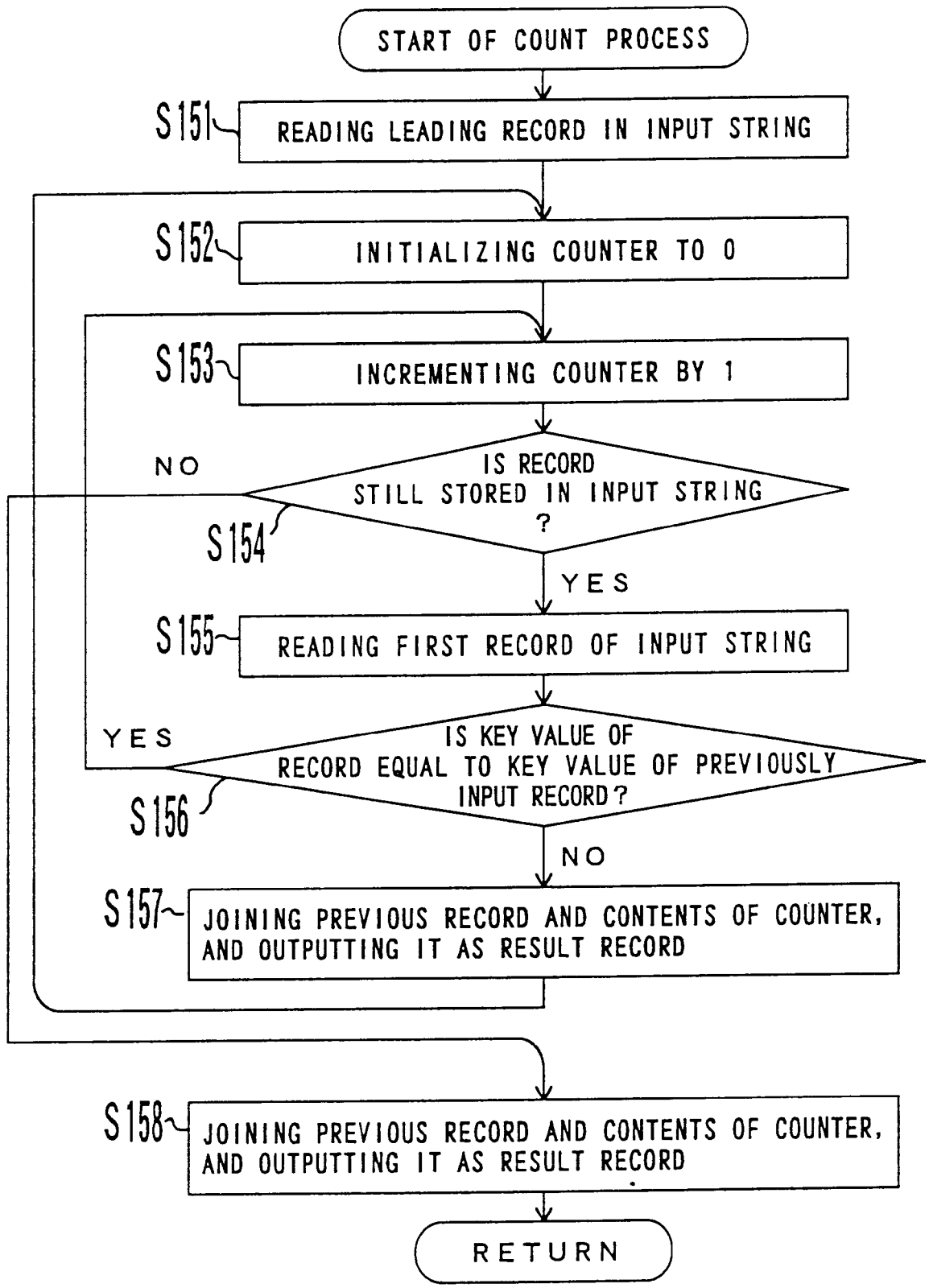
F I G. 4 2

[1 4,3]
[2 4,2]
[2 6,1]
[1 5,2]
[1 6,1]
[4 5,2]
[4 6,1]
[5 6,1]
[2 5,1]

[2 4,2]
[2 6,1]
[1 5,2]
[1 6,1]
[4 5,2]
[4 6,1]
[5 6,1]
[2 5,1]
L(2)
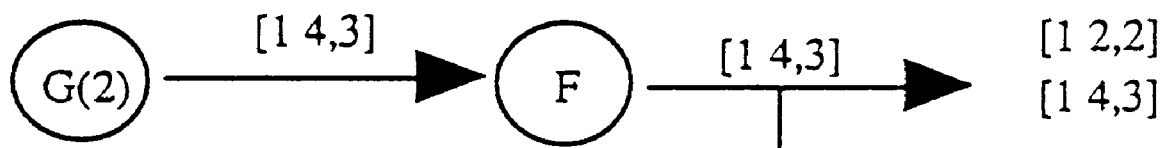
[1 2,2]
[1 4,3]
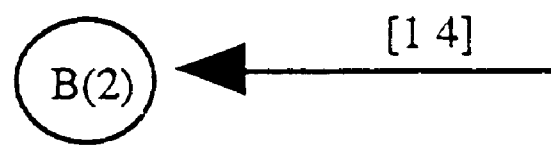
FIG. 64

[1 5,2]
[1 6,1]
[4 5,2]                                              L(2)
[4 6,1]
[5 6,1]                                              [1 2,2]
[2 5,1]                                              [1 4,3]
                                                     [2 4,2]
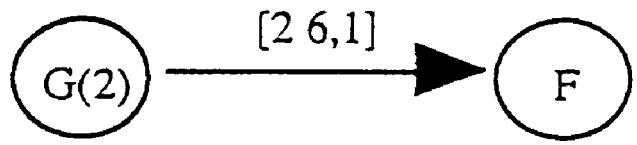
b1 | 0 |    b2 | 1 |
   | 1 |       | 1 |
   | 1 |       | 0 |
   | 0 |       | 1 |
   | 1 |       | 0 |
   | 0 |
FIG. 66

[1 6,1]
[4 5,2]
[4 6,1]
[5 6,1]
[2 5,1]
L(2)
[1 2,2]
[1 4,3]
[2 4,2]
[1 5,2]
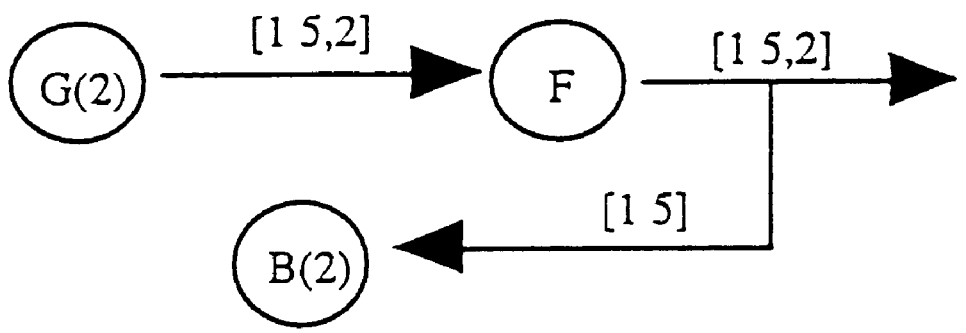
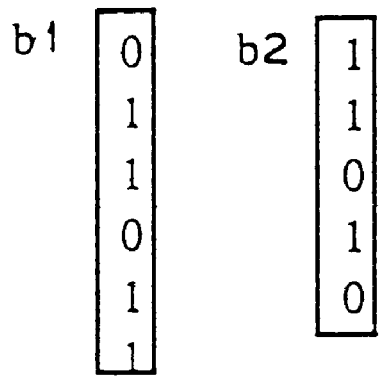
FIG. 67

[2 5,1]

[5 6,1]

L(2)

[1 2,2]
[1 4,3]
[2 4,2]
[1 5,2]
[4 5,2]

B(2)

b1 [0 1 1 0 1 1]
b2 [1 1 0 1 1 1]

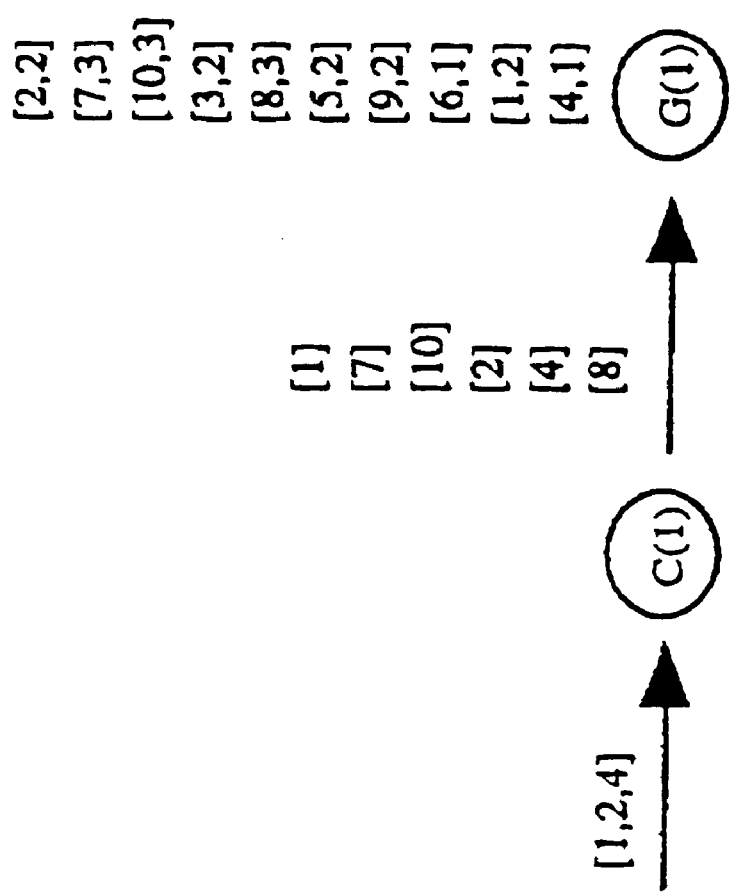
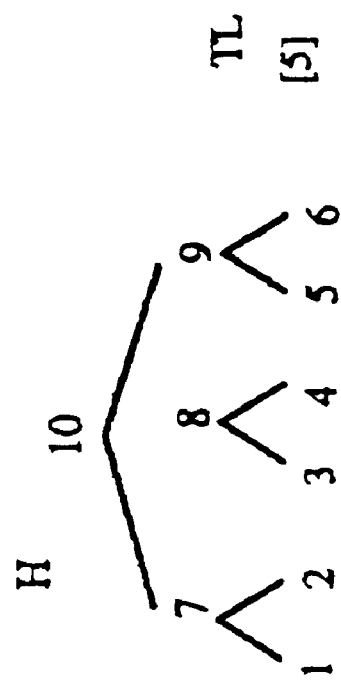
FIG. 83

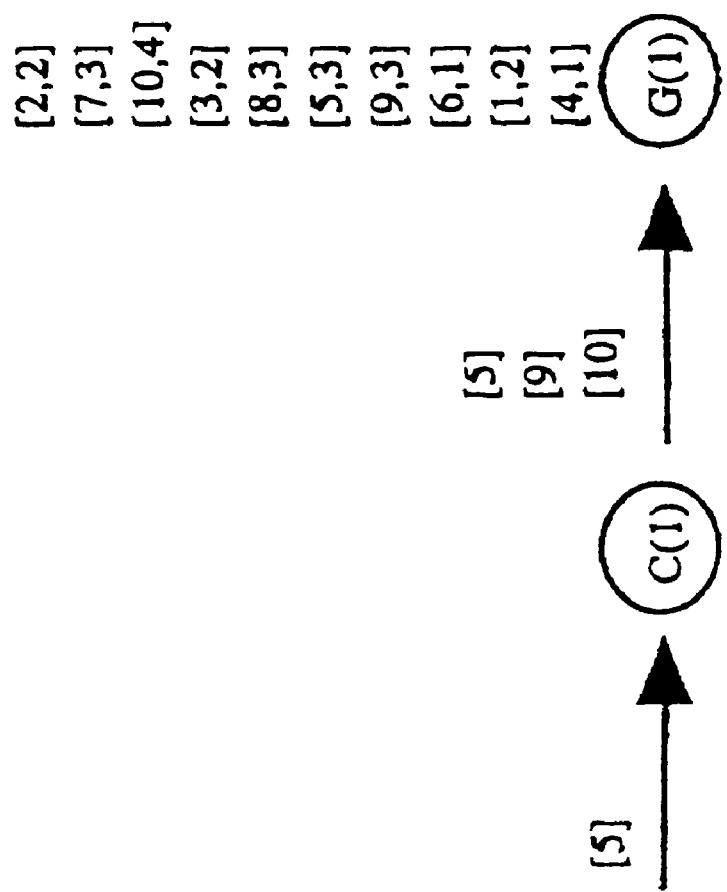
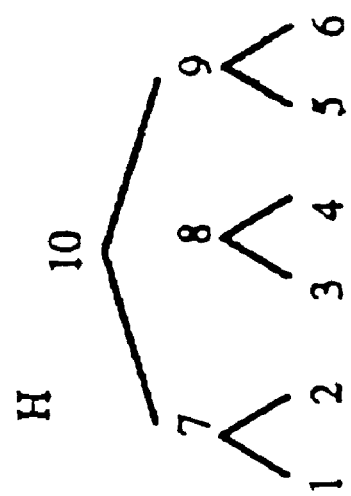
FIG. 84

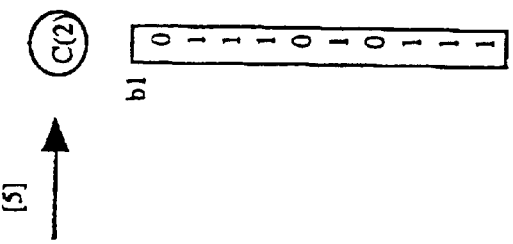
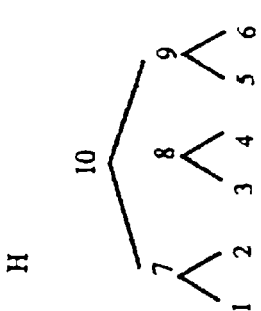
FIG. 98

[2 8,2]
[3 7,2]
[3 9,2]   [7 8,3]
[5 8,2]   [2 5,1]
[8 9,2]   [2 9,1]
[1 3,1]   [5 7,2]
[1 8,2]   [7 9,2]
[1 5,1]   [3 5,2]
[1 9,1]                [2 3,1]
[1 2,1]   G(2) ──────────────▶ F                    L(2)

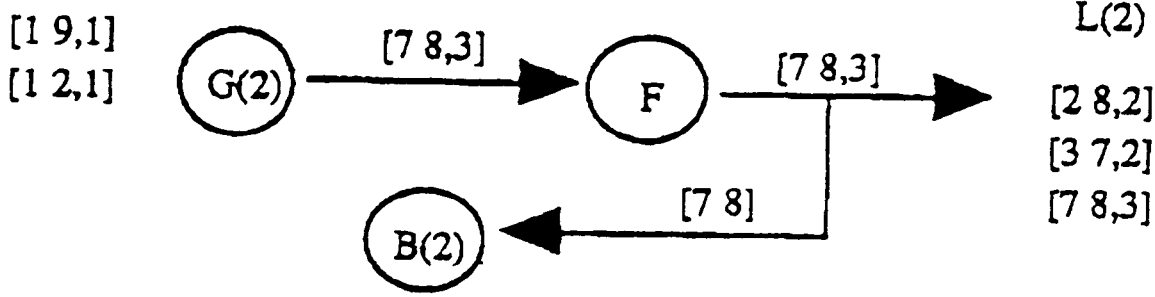
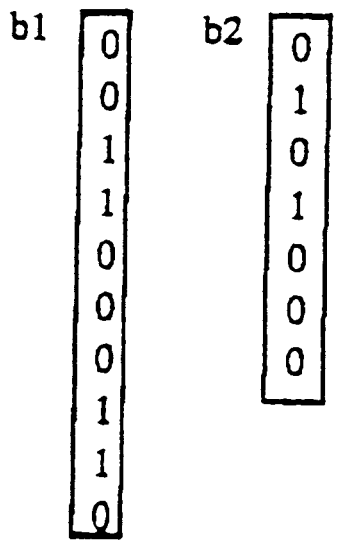
FIG. 102

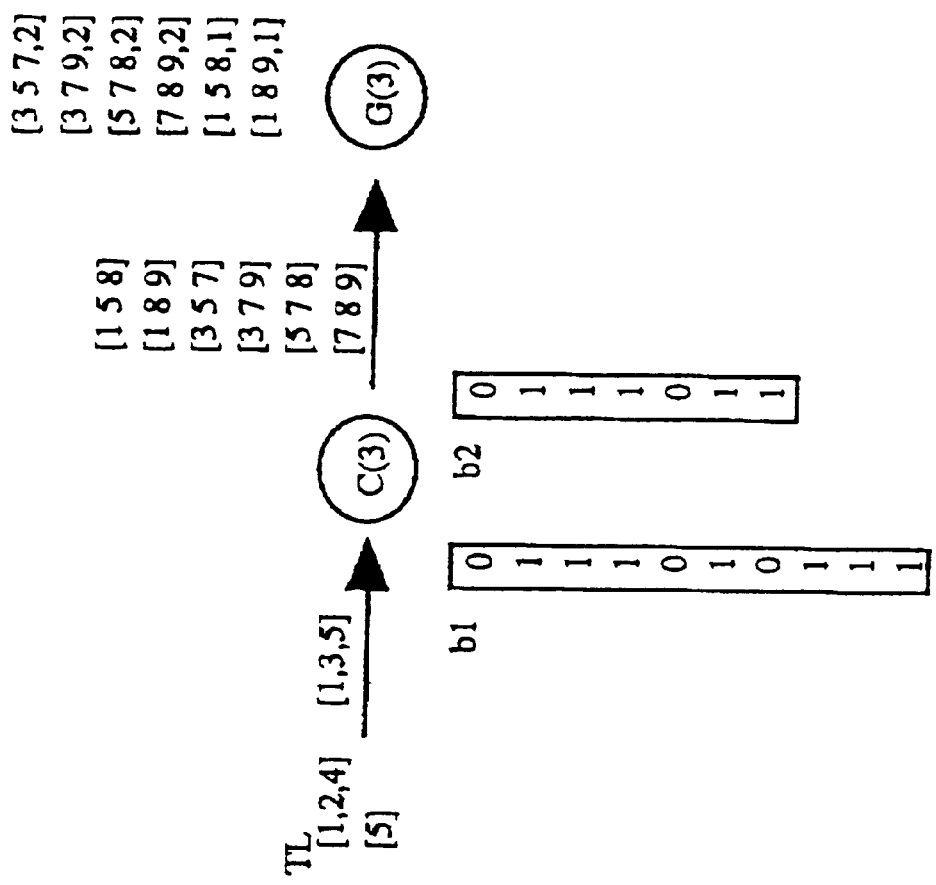
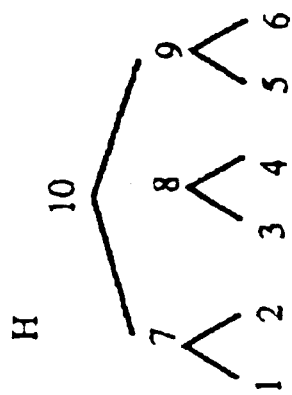
FIG. 111

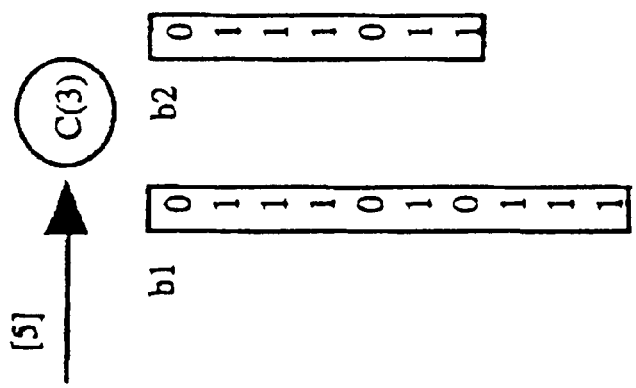
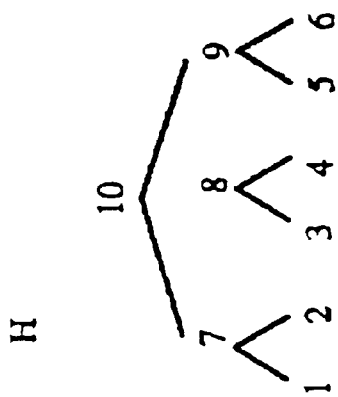
FIG. 113

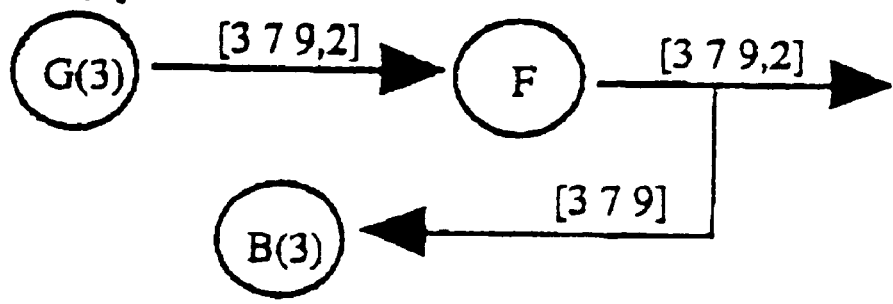
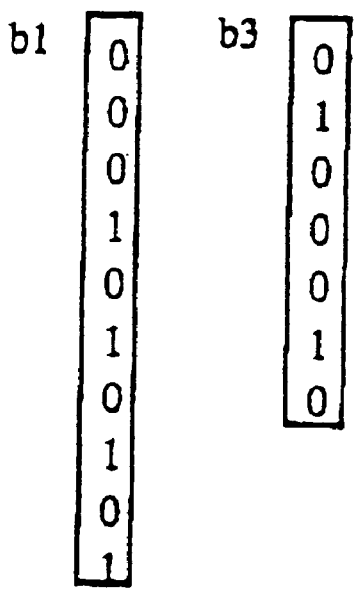
FIG. 115

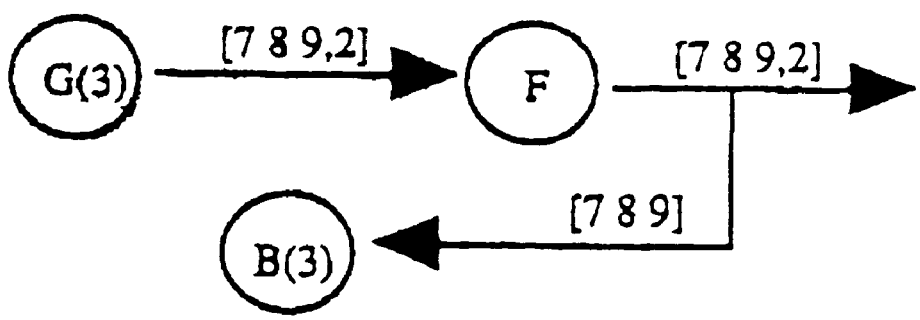
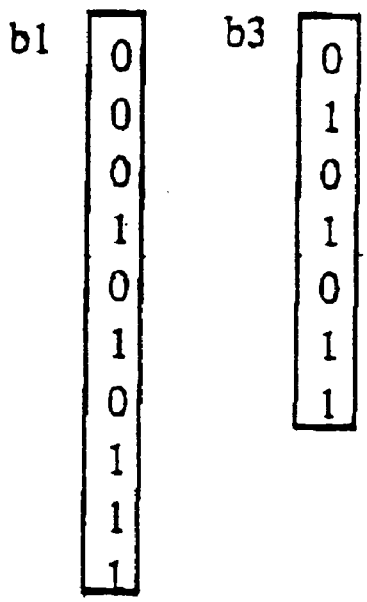
FIG. 117

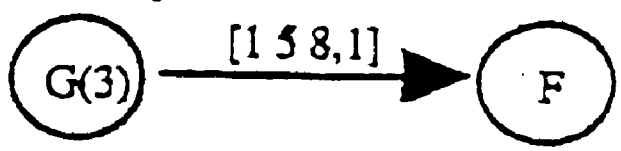
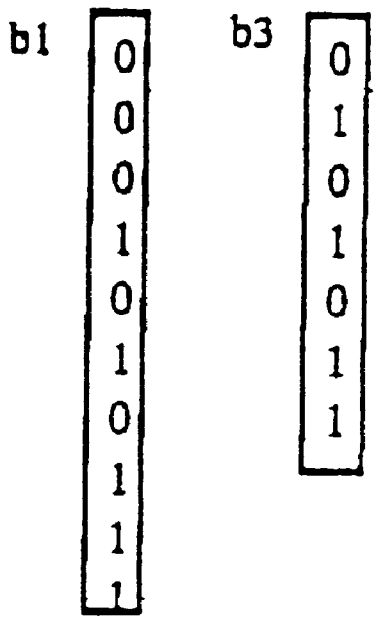
FIG. 118

<<(3) (8) (3,8)>>
<<(3) (4,6,7) (1,2)>>
<<(3,5,7)>>
<<(3) (4,7) (8)>>
<<(8)>>

(a) SEQUENCE LIST (SL)

<<(3) (8) (3,8)>> CONTAINS 3 ELEMENTS (3), (8), AND (3,8).
INTERNAL REPRESENTATION OF <<(3) (8) (3,8)>> IS [3,8,3,8,3,8,1,1,0];
3,8,3,8 INDICATES 4 ITEMS OF SEQUENCE;
AND 1,1,0 INDICATES SEPARATOR

③ → 3 AND 8 BELONG TO THE SAME ELEMENT.
④ → 8 AND 3 BELONG TO DIFFERENT ELEMENTS.
⑤ → 3 AND 8 BELONG TO DIFFERENT ELEMENTS.

(b) EXPLANATION OF EXAMPLE OF SEQUENCE

F I G . 1 2 4

[<(2)>,1]
[<(5)>,1]

L(1)

[<(3)>,4]
[<(8)>,3]
[<(4)>,2]
[<(7)>,3]

B(1)

b1 | 1 0 0 1 1 0 0 1 |

[<(5)>,1]

L(1)

[<(3)>,4]
[<(8)>,3]
[<(4)>,2]
[<(7)>,3]

B(1)

b1
1
0
0
1
1
0
0
1

[<(3) (3)>, 1]
[<(8) (3)>, 1]
[<(8) (8)>, 1]
[<(3, 8)>, 1]
[<(3) (4)>, 2]
[<(3) (7)>, 2]
[<(4, 7)>, 2]
[<(3, 7)>, 1]
[<(4) (8)>, 1]
[<(7) (8)>, 1]

$H1((3)) = 3 \bmod 8 = 3$
$H1((8)) = 8 \bmod 8 = 0$
$H2((3)(8)) = (3+8+1) \bmod 7 = 5$

[<(8) (3)>, 1]
[<(8) (8)>, 1]
[<(3, 8)>, 1]
[<(3) (4)>, 2]
[<(3) (7)>, 2]
[<(4, 7)>, 2]
[<(3, 7)>, 1]
[<(4) (8)>, 1]
[<(7) (8)>, 1]
L(2)
[<(3) (8)>, 2]
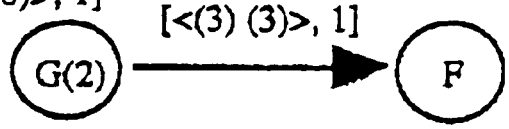
FIG. 144

[<(8) (8)>, 1]
[<(3, 8)>, 1]
[<(3) (4)>, 2]
[<(3) (7)>, 2]
[<(4, 7)>, 2]
[<(3, 7)>, 1]
[<(4) (8)>, 1]
[<(7) (8)>, 1]
L(2)
[<(3) (8)>, 2]
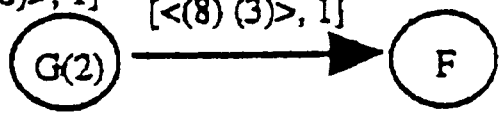
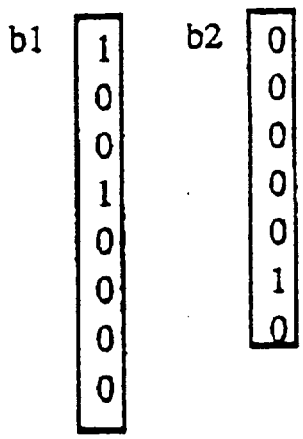
FIG. 145

[<(3, 8)>, 1]
[<(3) (4)>, 2]
[<(3) (7)>, 2]
[<(4, 7)>, 2]
[<(3, 7)>, 1]
[<(4) (8)>, 1]
[<(7) (8)>, 1]

L(2)

[<(3) (8)>, 2]

[<(3) (7)>, 2]
[<(4, 7)>, 2]
[<(3, 7)>, 1]
[<(4) (8)>, 1]
[<(7) (8)>, 1]

L(2)

[<(3) (8)>, 2]
[<(3) (4)>, 2]

$H1((3)) = 3 \bmod 8 = 3$
$H1((4)) = 4 \bmod 8 = 4$
$H2((3)(4)) = (3+4+1) \bmod 7 = 1$

L(2)

[<(3) (8)>, 2]
[<(3) (4)>, 2]
[<(3) (7)>, 2]
[<(4, 7)>, 2]

$H2((3)(4))=(3+4+1)\bmod 7=1;$    $b2[1]=1$
$H2((3)(7))=(3+7+1)\bmod 7=4;$    $b2[4]=1$
$H2((4,7))=(4+7+0)\bmod 7=4;$    $b2[4]=1$
$H2((3)(8))=(3+8+1)\bmod 7=5;$    $b2[5]=1$
$H2((4)(8))=(4+8+1)\bmod 7=6;$    $b2[6]=0$
$H2((7)(8))=(7+8+1)\bmod 7=2;$    $b2[2]=0$

| GROUP-BY TARGET RECORD GROUP | | SORTED RECORD GROUP | |
|---|---|---|---|
| 5 | | 1 | |
| 3 | CURRENT RECORD □ | 1 | CURRENT RECORD □ |
| 3 | | 2 | |
| 4 | PREVIOUS RECORD □ | 2 | PREVIOUS RECORD □ |
| 2 | | 3 | |
| 1 | | 3 | |
| 2 | COUNTER □ | 4 | COUNTER □ |
| 5 | | 5 | |
| 1 | | 5 | |

FIG. 165A      FIG. 165B

| SORTED RECORD GROUP | | SORTED RECORD GROUP | |
|---|---|---|---|
| 1 | CURRENT RECORD [1] | 1 | CURRENT RECORD [1] |
| 2 | | 2 | |
| 2 | PREVIOUS RECORD □ | 2 | PREVIOUS RECORD □ |
| 3 | | 3 | |
| 3 | | 3 | |
| 3 | COUNTER [0] | 3 | COUNTER [1] |
| 4 | | 4 | |
| 5 | | 5 | |
| 5 | | 5 | |

FIG. 165C      FIG. 165D

| SORTED RECORD GROUP | | SORTED RECORD GROUP | | OUTPUT |
|---|---|---|---|---|
| | CURRENT RECORD [1] | | CURRENT RECORD [2] | 1, 2 |
| 2 | | 2 | | |
| 2 | PREVIOUS RECORD [1] | 3 | PREVIOUS RECORD [1] | |
| 3 | | 3 | | |
| 3 | | 3 | | |
| 3 | COUNTER [2] | 3 | COUNTER [2] | |
| 4 | | 4 | | |
| 5 | | 5 | | |
| 5 | | 5 | | |

FIG. 165E      FIG. 165F

GROUP-BY TARGET RECORD GROUP 5
3
3
4
2
1
2
3
5
1

CURRENT RECORD
☐

PREVIOUS RECORD
☐

COUNTER
☐

FIG. 167A

HASHED RECORD GROUP 0  3
   3
   3
1  4
   1
   1
2  5
   2
   2
   5

CURRENT RECORD
☐

PREVIOUS RECORD
☐

COUNTER
☐

FIG. 167B

SORTED RECORD GROUP FOR EACH HASH BUCKET 0  3
   3
   3
1  1
   1
   4
2  2
   2
   5
   5

CURRENT RECORD
☐

PREVIOUS RECORD
☐

COUNTER
☐

FIG. 167C

RECORD GROUP AS ONE STRING OF ALL BUCKETS 3
3
3
1
1
4
2
2
5
5

CURRENT RECORD
☐

PREVIOUS RECORD
☐

COUNTER
☐

FIG. 167D

RECORD GROUP AS ONE STRING OF ALL BUCKETS 3
3
1
1
4
2
2
5
5

CURRENT RECORD
[3]

PREVIOUS RECORD
☐

COUNTER
[0]

FIG. 167E

RECORD GROUP AS ONE STRING OF ALL BUCKETS 3
3
1
1
4
2
2
5
5

CURRENT RECORD
[3]

PREVIOUS RECORD
☐

COUNTER
[1]

FIG. 167F

R1' is given in ascending order of (t_x, item1)

GB(i)  INSERT INTO $L_i$
    SELECT     $p.item_1, ..., p.item_i$, COUNT(*)
    FROM       $R_i'$ p
    GROUP BY  $p.item_1, ..., p.item_i$
    HAVING COUNT(*) >= min_count J(i)  INSERT INTO $R_i$
    SELECT     $p.t\_x, p.item_1, ..., p.item_i$
    FROM       $R_i'$ p, $L_i$ q
    WHERE      $q.item_1 = p.item_1$      AND
                 .
                 .
                 .
             $q.item_i = p.item_i$
    ORDER BY  $p.t\_x, p.item_1, ..., p.item_i$ SJ(i)  INSERT INTO $R_k'$
    SELECT     $p.t\_x, p.item_1, ..., p.item_{i-1}, q.item_{i-1}$
    FROM       $R_{i-1}$ p, $R_{i-1}$ q
    WHERE      $q.t\_x = ... = p.t\_x$    AND
                 $q.item_1 = p.item_1$      AND
                 .
                 .
                 .
             $q.item_{i-2} = p.item_{i-2}$    AND
             $q.item_{i-1} > p.item_{i-1}$

FIG. 169

Subset(i):
  $i = 1$: Compute number of occurrences of items in the transactions
  $i > 1$: Compute number of occurrences of candidate i-itemsets $C_i$ in the transactions

F:  Receives output of Subset(i) and output i-itemsets satisfying condition on the number of occurrences as large i-itemsets $L_i$

AG(i) (AprioriGen(i)):
Receives output of F and output candidate $(i+1)$-itemsets $C_{i+1}$ that are generated as follows.
  $i = 1$: *join step only*
        insert into $C_2$
        select $p.item_1$, $q.item_1$
        from $L_1$ p, $L_1$ q
        where $p.item_1 < q.item_1$ $i > 1$: *join step*
        insert into $C_{i+1}$
        select $p.item_1, p.item_2, ..., p.item_i, q.item_i$
        from $L_i$ p, $L_i$ q
        where $p.item1 = q.item_1, ..., p.item_{i-1} = q.item_{i-1}, p.item_i < q.item_i$
      if Li fits in memory then *prune step*
        forall itemsets c in $C_{i+1}$ do
          forall i-subsets s of c do
            if (s not in $L_i$) then
              delete c from $C_k$

FIG. 171

ASSOCIATION RULE GENERATION AND GROUP-BY PROCESSING SYSTEM

BACKGROUND OF THE INVENTION

1. Field of the Invention

The present invention relates to processing of a large amount of data normally stored in a database. Specifically, it relates first to a group-by process, and second to a database mining process.

The present invention relates to a process of classifying a large amount of records depending on a key value of each record and performing a specified operation on a group of records having the same key value, such as, for example, obtaining an average value. Such a process is referred to as a group-by process. The present invention relates more specifically to a group-by processing system based on a hash process, that is, a system of hashing a large volume of records according to a hash function value obtained by applying an appropriate hash function to a key value, generating a list of the hashed records, sorting the hashed records in the list according to the key value, and performing a group-by process on the sorted records of the resultant list.

The present invention also relates to a database mining process for obtaining a rule of the relationship among data stored in a database, and more specifically to a system of counting occurrences of a combination of related data in a large volume of data in the database. According to a count result of the system, a process of generating an association rule is performed as one of the data mining methods using a combination which meets a given condition and the number of occurrences of the combination. The association analysis based on the association rule is carefully considered in the U.S. and many other nations.

2. Description of the Related Art

Normally, an operation in the group-by process, that is, an operation on a group of records having the same key value, for example, the same item number, can be a count process for counting records such as item sets, an operation for computing a total or average of specific field values of the group of records, etc. These group-by processes are frequently performed in a relational database process, a statistical process, etc.

A group-by processing system can be based on a sort process or a hash process. A system based on the sort process is performed by continuously accessing records having the same key value by sorting a group of records according to the key values. That is, the group of records are first sorted according to the key values, and a list of resultant sorted records is searched from the beginning. A specified operation is repeated for the records having the same key value. When the key value changes, the operation is initialized.

In a hash process, a group of records are read into an input buffer, and hash function values, which respectively correspond to key values of the records to be hashed, are calculated by using a hash function. Then, each of the records in the input buffer is stored in one of record buffers according to the hash function value of the record. If a record buffer, which corresponds to one of the hash function values, is filled with records, the records in the record buffer are output into one of the hashed lists, which respectively correspond to a record buffer, in a secondary storage.

FIG. 164 is a flowchart showing an example of a conventional group-by processing system based on the sort process. When the process starts as shown in FIG. 164, a group of records to be processed in a group-by process is sorted according to key values in step S201. In step S202, the leading record in the group of records is read. In step S203, a function is initialized. In step S204, an operation of the function is performed on the read record. In step S205, it is determined whether or not any record still exists in the group of the sorted records.

When a record exists, the leading record in the group of the sorted records is read in step S206. In step S207, it is determined whether or not the key value of the record is equal to the key value of the previously read record. When the key values are equal to each other, the processes in and after steps S204 are repeated.

When the key value of a record is not equal to that of the previous record, a termination process is performed on the function in step S208. In step S209, the result of the function process and the record are output as a resultant record, and the processes in and after step S203 are repeated.

If it is determined in step S205 that the group of the sorted records have been read, then the termination process is performed on the function in step S210, and the result of the function process performed on the previous record and the record are output as a resultant record in step S211, and the process terminates.

FIGS. 165A through 165F are practical examples showing the proceedings of the group-by process performed according to the flowchart shown in FIG. 164. As shown in FIG. 165A, a group of records to be processed in a group-by process contains 10 records, and each record comprises only a key value, for example, an item number for simple representation. When the process in step S201 is completed, the state shown in FIG. 165B is realized.

In this example, the operation in the group-by process is a count process for obtaining the number of records having the same key value. When the processes in steps S202 and S203 terminate, the state shown in FIG. 165C is entered. That is, in the initialization of the function shown in step S203, the count value is set to 0.

In step S204, a count value is incremented only by 1 to enter the state shown in FIG. 165D. The determination in step S205 is YES, and in step S206, it is determined that the current record '1' is equal to the previous record, and the new record '1' becomes a current record. The determination in step S207 is YES, the count value is incremented in step S204, and the state shown in FIG. 165E is entered.

The determination in step S205 is YES again, and a new record is read in step S206. The value of the key of the record is 2, and the value is different from the value of the previous record, which is 1. Therefore, the termination process is performed on a function in step S208. When a counting operation is performed, the termination process is only to fix the current count value, and the fixed value indicates the result of the process of the function and is added to the previous record, that is, '1' in this example, to be output as a resultant record in step S209. That is, the output resultant record is '1, 2'. FIG. 165F shows the result.

By repeatedly performing the processes, the following group of records can be finally obtained as a process result.

1, 2
2, 2
3, 3
4, 1
5, 2

The result indicates that the group of records to be processed in the group-by process contains two records having the key value of 1, two records having the key value of 2, three records having the key value of 3, one record having the key value of 4, and two records having the key value of 5.

FIG. 166 shows an example of a conventional group-by processing system based on the hash process. When FIG. 166 is compared with the flowchart based on the sort process shown in FIG. 164, the group of records to be processed in the group-by process are stored in one of record buffers according to the hash function values in step S221. Then, records in each record buffer are sorted according to key values in step S222, all sorted contents in the record buffers are connected to form a string, and the processes almost the same as the processes in and after step S202 shown in FIG. 164 are performed in steps S223 through S232.

FIGS. 167A through 167F show a practical example of the proceedings of the process performed according to the flowchart shown in FIG. 166. The group of records to be processed in the group-by process are the same as those shown in FIGS. 165A through 165F. When the process is based on the hash process, the group of records to be processed in the group-by process are hashed using an appropriate hash function. In this example, mod 3 is used as a hash function. That is, the value of the key is divided by 3, and the record is distributed to a hash bucket depending on the value of the remainder. If the remainder is i, a hash bucket i stores the record. In this example, the value of the remainder can be 0, 1, or 2, and there can be three hash buckets.

The state shown in FIG. 167B shows the state after the process in step S221 shown in FIG. 166 and the end of hash. FIG. 167C shows the result of sorting a group of records in each hash bucket according to key values. FIG. 167D shows the result of integrating the contents of all hash buckets into a string. Thus, the processes up to step S222 terminate. The subsequent processes are performed in the same manner as the sort process. Finally, the following records are obtained as a resultant group of records.

3, 3
1, 2
4, 1
2, 2
5, 2

Although the order of the records is different from the order shown in FIGS. 165A through 165F, the entire group outputs the same result as the case based on the sort process.

Since the operation of counting the combinations of data is part of the association rule generation process in the above described database mining, the association rule is first described. The group-by processing system according to the present invention is used as part of the process of counting the combinations of data as described later.

For example, let's suppose that according to 100 customers' receipts collected through POS (point-of-sales) at a retail shop, 20 customers bought product A, and 12 customers bought both products A and B. One product is called an item, and a receipt slip is called a transaction. One transaction normally contains many items. Based on the following definition, the support of the product A is 20%, and the support of the products A and B is 12%.

Support of items=number of transactions containing items/total number of transactions Furthermore, based on a simple conditional probability computation, the conclusion that '60% (12%/20%) of the customers who buy the product A buy also the product B' can be obtained. This is represented by 'A->B, confidence of 60%, and support of 12%'. It is defined as an association rule. The confidence of the association rule 'A->B' is computed by:

Confidence of 'A->B'=support of A∧B (both A and B are bought)/support of A

Furthermore, in addition to the simple rule such as 'A->B', etc., a complicated rule such as 'A∧B->C∧D∧E' (a customer who buys A and B also buys C, D, and E), etc. can be applied. The confidence in this example can be computed as follows.

Confidence of 'A∧B->C∧D∧E'=support of A∧B∧C∧D∧E / support of A∧B

The association rule can be applied, for example, to the evaluation of the contribution of a special service product, the optimization of store shelves (arranging products for good combinations), the improvement of a hit ratio of direct mail from the data of credit cards, etc.

The association rule generating process includes the steps of: (1) counting the occurrences of combinations of items which satisfy the condition of a given support in the transactions; and (2) computing the rule, support, and confidence based on the combinations and their number of occurrences obtained in step (1). The present invention is designed to improve the counting process in step (1).

In what follows, a combination of items is referred to as 'itemset', and a combination of items which satisfy the condition of the given support and is found in step (1) is referred to as a 'large itemset'. The condition of the support is in the range from the minimum value (0% [=counting any itemset purchased in a transaction] through 100% [=counting itemsets purchased in all transactions]) to the maximum value (minimum value<=maximum value <=100%). Conventionally, the maximum value is fixed to 100% in many cases.

Since the process of counting a large itemset takes a long time, various processing methods have been proposed. Especially, the SETM algorithm based on the SQL, and the Apriori algorithm which is one of the algorithms suggested by IBM, are known as typical algorithms. The SETM algorithm and the Apriori algorithm are described in the following documents 1 and 2.

document 1: Maurice Houtsma and Arun Swami. Set-Oriented Mining for Association Rules in Relational Databases. In Proceedings of the IEEE Data Engineering Conference, pages 25–33, 1995.

document 2: Rakesh Agrawal and Ramakrishnan Srikant. Fast Algorithms for Mining Association Rules. In Proceedings of the 20th VLDB Conference, pages 487–499, Santiago, Chile, 1994.

The association rule generation according to the SETM algorithm is based on the SQL language which is a relational database query language, and can be easily implemented. In this process, an SQL join operation and a group-by operation are performed. A self-join operation is performed using a table of transactions containing the large itemsets of length k-1 (the large (k–1)-itemsets) in order to generate potential candidates of large k-itemsets (the candidate k-itemsets). Then, these candidate k-itemsets are counted in a group-by operation, and those satisfying the minimum support condition form the large k-itemsets. Furthermore, the transactions which contain large k-itemsets are generated in a join operation, and are used in generating the candidate (k+1)-itemsets.

FIG. 168 shows an illustrative example of SETM. FIG. 169 shows the contents of each function block in the SETM algorithm Using these figures, the SETM algorithm is described in details in what follows.

In FIG. 168, a table R1' shows the items contained in each transaction t_x. For example, transaction t_x 1 contains items 1, 2, and 3. A GB(1) performs the counting (a group-by operation) of the occurrences of each item. A table L1 contains the items and their number of occurrences in the transactions for the case that the minimum support value is 20% and maximum support value is 100%. Thus, all items which appear in two or more transactions are contained in L1.

A table R1 shows the result obtained in the join process J(1) by extracting from R1' the transactions whose items appear in table L1.

An SJ(1) does the self-join of table R1. As a result of the operation, possible 2-itemsets can be generated for each transaction and inserted in table R2'.

In the group-by process GB(2) on R2', the occurrences of 2-itemsets are counted. Those whose counts are equal to or larger than 2 compose the large 2-itemsets and are inserted in table L2.

Similarly, a table L3 for large 3-itemsets and a table L4 for large 4-itemsets are generated. However, the table L4 is empty.

In the Apriori algorithm, a candidate k-itemset is generated using the set of large (k−1)-itemsets. When the whole set of large (k−1)-itemsets are completely stored in memory, candidate k-itemsets are generated by first joining large (k−1)-itemsets. For each k-itemset resultant from this join, all (k−1) subsets are generated and checked against the large (k−1)-itemsets. Only when all the subsets are large (k−1)-itemsets, it is assumed that the join result of length k is a candidate k-itemset. Thus, in Apriori, large k-itemsets are stored in a hash-table in memory and can be used to efficiently prune the unnecessary candidates. Furthermore, the candidate k-itemsets are stored in a hash-tree in memory, and by scanning the transactions, the k-itemsets within the transactions and that are found in the hash-tree have their counter incremented. Unnecessary k-itemsets contained in the transactions are not counted by only counting those found in the hash-tree.

FIG. 170 shows an illustrative example of the Apriori algorithm. FIG. 171 shows the contents of each function block in the processing of the Apriori algorithm.

In FIG. 170, the contents of a list TL containing 8 transactions are actually the same as those shown in FIG. 168. First, each of the items contained in these transactions is input in Subset (1), and the occurrences of each item are counted and inserted in C1. The count result is input into F, and the items having the number of occurrences equal to or larger than 2 are selected through a filtering operation, and generate the set of large 1-itemsets L1, that are organized in a hash-table.

A self-join of all items in L1 is executed by AG(1), and the result is the set of candidate 2-itemsets C2, that is organized in a hash-tree. If a transaction list TL contains a 2-itemset that is stored in the hash-tree as a candidate itemset, the counter of that candidate itemset is incremented by Subset (2). By filtering the result through F, the candidate 2-itemsets having the occurrence number equal to or larger than 2 are in fact large itemsets L2 that are stored in a hash-table.

By performing similar processes, 3-itemsets having the occurrence numbers equal to or larger than 2 are obtained as large 3-itemsets L3. The process terminates when, as shown in FIG. 170, it is determined that no 4-itemsets having the occurrence number equal to or larger than 2 exist.

First, the problems with the conventional technology relating to the group-by processing system are described. As described above, the group-by processing system can be based on either the sorting process or the hash process. In the sorting process, the entire group of records should be simultaneously sorted, thereby requiring a long time and a high cost.

On the other hand, in the hash process, a lower cost is required than in the sorting process because the sorting operation is performed in the hash process only on a group of records contained in each record buffer. However, if the entire group of records to be processed in the group-by processing system is too large to be stored in the main memory, then the records in the record buffer should be written to the secondary storage device and the records should be read from the secondary storage device into the record buffer, and the access to the secondary storage device is costly.

That is, in the conventional hash processing system, record buffers are provided in the main memory, and a record is stored in the record buffer corresponding to the hash function value for the record. When a record buffer is full, the records in the record buffer are output to one of the hashed lists. Each hashed list corresponds to a record buffer, and is provided in the secondary storage device.

In the processes described above, each of the output processes is performed individually, and the records stored in one of the record buffers are sequentially output to the corresponding one of the hashed list in the secondary storage device. Therefore, in each of the hashed lists, each record is stored in a region next to a region in which the previous record is stored.

However, from the viewpoint of a memory region of the secondary storage device in which all of the hashed lists are included, the record output processes are non-sequentially performed, and the records output from each of the record buffers are discontinuously stored in the memory region.

Therefore, according to the conventional hash processing system, many empty regions are formed in the memory region of the secondary storage device, and this reduces the available storage capacity of the secondary storage device and the operating performance of the computer system.

Described below are some problems with the SETM algorithm and the Apriori algorithm for finding large itemsets in the generation of association rules. Concerning the SETM algorithm, since there are no means for pruning unnecessary combinations in the self-join operation SJ(k−1), Rk' becomes too large and thus, the subsequent group-by process GB(k) becomes too heavy.

The Apriori algorithm solves this problem of SETM algorithm. Apriori generates the candidate k-itemsets Ck to be counted in a pass k by joining the large (k−1)-itemsets L(k−1), and pruning those k-itemsets that contain any subset that is not a large (k−1)-itemset. This procedure results in the generation of a much smaller number of candidate itemsets Ck than in SETM. However, this pruning of k-itemsets requires that all the large (k−1)-itemsets are maintained in memory. If they can not fit in memory, the pruning can no longer be done. But, for AG(1) in Apriori, the join operation is almost a Cartesian Product of items in L1 and thus, the generation of C2 is a very heavy process. As illustrated in FIGS. 168 and 170, the number of 2-itemsets in C2 is even greater than the number of 2-itemsets in R2' for SETM, since for the generation of C2 in Apriori there is no restriction that the 2 items should belong to the same transaction.

Furthermore, in the Apriori algorithm, the k-itemsets in the transaction are counted based on the candidate k-itemsets that are stored in a hash-tree. Therefore, if all k-itemsets in the hash-tree can not be stored in the memory, they are partitioned so that each partition can fit in the available memory space. For each such partition, the transactions have to be scanned once. This is a problem when the set of transactions is too huge and its reading requires a large amount of time.

SUMMARY OF THE INVENTION

The first subject of the present invention is to perform a hash process at high-speed by sequentially reading and writing data in relatively large blocks to gain the efficient access to a secondary storage device like the completely sequential access, and to perform group-by operation at high-speed by using a result of the hash process.

The second subject of the present invention is to efficiently prune the number of itemsets to count which, in the Apriori algorithm, can not be done when the whole set of candidate itemsets doesn't fit in the available memory. Instead of holding all the candidate itemsets themselves, our invention uses a bit map capable of constantly fitting an available memory capacity. Thus, it can adjust the bit map size and thus the pruning capability so that unnecessary itemsets can be pruned, and the group-by process for counting itemsets is performed at a higher speed than in the conventional technology, thereby efficiently counting the combinations of related data.

A feature of the present invention belong to a group-by processing system for performing a group-by operation based on a hash method. The group-by processing system includes a record storing unit for temporarily storing records; a pointer storing unit for storing pointers to the records in the record storing unit at positions each of which corresponds to a hash function value calculated using the key value of the pointed record; a output unit for outputting the records pointed to by the pointers stored in the pointer storing unit to the storage device, given the hash function values for storage positions of the pointers; and a group-by operation execution unit for reading a list of hashed records output to the storage device by the output unit, sorting the hashed records in the list according to the key value, and performing the group-by operation on the list of the sorted records.

Another feature of the present invention resides in a related data combination count system for obtaining individual items or a combination of two or more items in a number of transactions containing one or more items as data, and a number of occurrences of individual items or the combination of two or more items when the individual items or the combination of two or more items satisfy a given condition of the number of occurrences in the transactions. The system includes a combination generation unit for outputting an item in each transaction when the individual items is to be obtained, and generating and outputting a combination of two or more items in each transaction satisfying a combination generation restriction condition on subsets of the combinations of items when the combination of two or more items is to be obtained; an occurrence count unit for counting occurrences, in all transactions, of the individual items or the combinations of two or more items output by the combination generation unit; a combination selection unit for selecting the individual items or the combinations of two or more items which is output by the occurrence count unit and satisfy the given condition of the number of occurrences; and a restriction condition generation unit for assigning the combination generation restriction condition to the combination generation unit according to the selection result of the combination selection unit.

Thus, group-by operation can be realized at high-speed according to the present invention by sequentially reading and writing data in relatively large blocks in order to gain the efficient access to a secondary storage device like the completely sequential access. As a result, the group-by operation is performed at high-speed based on the result of the hash process. Next, with the introduction of the data combination count system according to the present invention, the pruning of unnecessary combinations of items can be efficiently performed even if the available memory capacity is small by using a bit map which fits an available memory capacity. Furthermore, the process of counting combinations of items can be performed efficiently by performing a high-speed group-by process in which itemsets are counted.

BRIEF DESCRIPTION OF THE DRAWINGS

The present invention will be more apparent from the following detailed description, when taken in conjunction with the accompanying drawings, in which:

FIG. 4 is a flowchart showing the entire hash process according to the first embodiment of the group-by processing system;

FIG. 11 shows a flowchart showing the output buffer output process according to the second embodiment of the group-by processing system;

FIG. 20 is a flowchart showing the group-by function operation process;

FIG. 25 shows the hash process according to the fourth embodiment of the group-by processing system;

FIG. 29 is a flowchart showing the output process when the hashed record output region is non-sequential in the fourth embodiment of the group-by processing system;

FIG. 33 shows the hash process according to the fifth embodiment of the group-by processing system;

FIG. 35 shows the entire group-by function process according to the fifth embodiment of the group-by processing system;

FIG. 37 shows the entire embodiment of the group-by processing system according to the present invention using practical data;

FIG. 42 is a flowchart showing the count process shown in FIG. 41;

FIG. 64 is a chart (2) showing the selection of the large 2-itemset L(2);

FIG. 66 is a chart (4) showing the selection of the large 2-itemset L(2);

FIG. 67 is a chart (5) showing the selection of the large 2-itemset L(2);

FIG. 83 is a chart (3) showing the processes up to the process G(1) in the hierarchical association analysis;

FIG. 84 is a chart (4) showing the processes up to the process G(1) in the hierarchical association analysis;

FIG. 87 is a chart (3) showing the selection of L(1) in the hierarchical association analysis;

FIG. 98 is a chart (4) showing the processes up to the process G(2) in the hierarchical association analysis;

FIG. 102 is a chart (4) showing the selection of L(2) in the hierarchical association analysis;

FIG. 105 is a chart (8) showing the selection of L(2) in the hierarchical association analysis;

FIG. 111 is a chart (2) showing the processes up to the process G(3) in the hierarchical association analysis;

FIG. 113 is a chart (4) showing the processes up to the process G(3) in the hierarchical association analysis;

FIG. 115 is a chart (2) showing the selection of L(3) in the hierarchical association analysis.

FIG. 117 is a chart (4) showing the selection of L(3) in the hierarchical association analysis.

FIG. 118 is a chart (5) showing the selection of L(3) in the hierarchical association analysis.

FIG. 119 is a chart (6) showing the selection of L(3) in the hierarchical association analysis.

FIG. 120 is a chart (1) showing the processes up to the process G(4) in the hierarchical association analysis;

FIG. 121 is a chart (2) showing the processes up to the process G(4) in the hierarchical association analysis;

FIG. 122 is a chart (3) showing the processes up to the process G(4) in the hierarchical association analysis;

FIG. 123 is a chart (4) showing the processes up to the process G(4) in the hierarchical association analysis;

FIG. 124 shows an example of a sequence list in a time-series analysis;

FIG. 125 is a chart (1) showing the processes up to the process G(1) in the time-series analysis;

FIG. 126 is a chart (2) showing the processes up to the process G(1) in the time-series analysis;

FIG. 127 is a chart (3) showing the processes up to the process G(1) in the time-series analysis;

FIG. 128 is a chart (4) showing the processes up to the process G(1) in the time-series analysis;

FIG. 129 is a chart (5) showing the processes up to the process G(1) in the time-series analysis;

Figure 130:
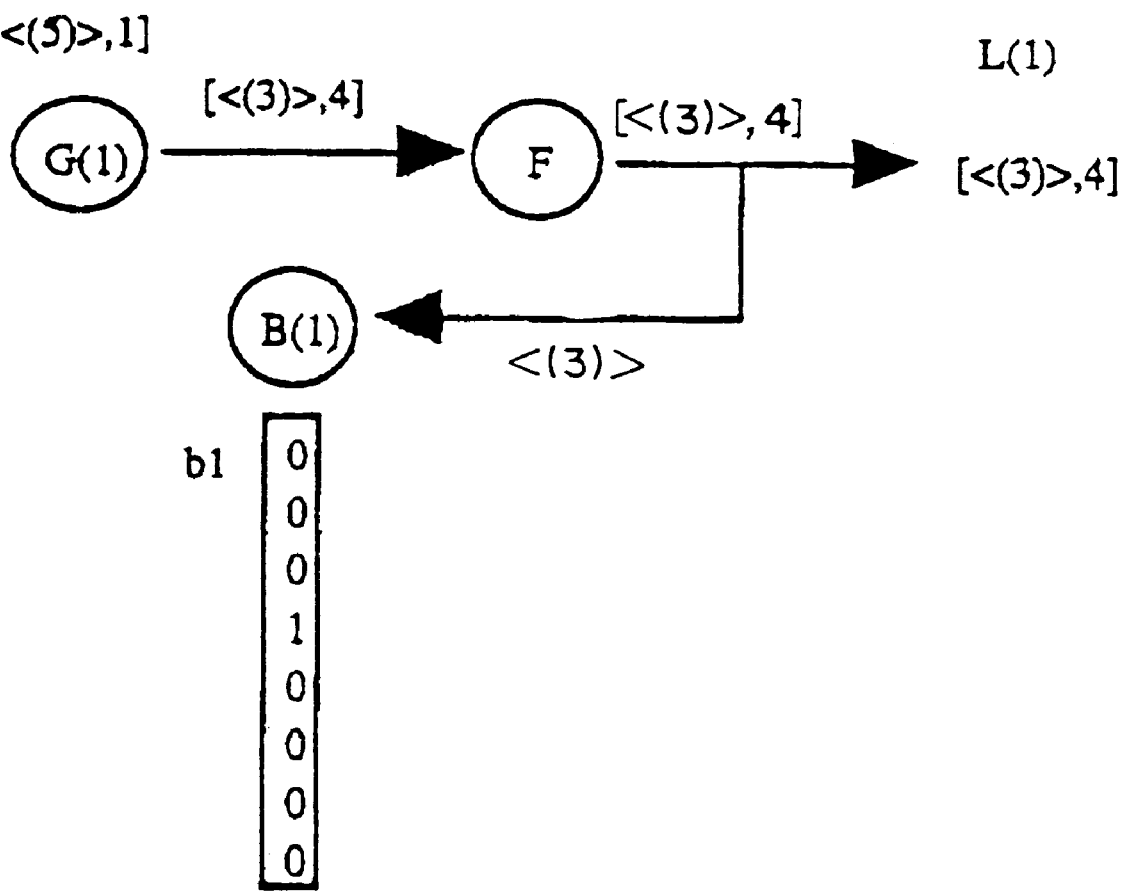
Figure 131:
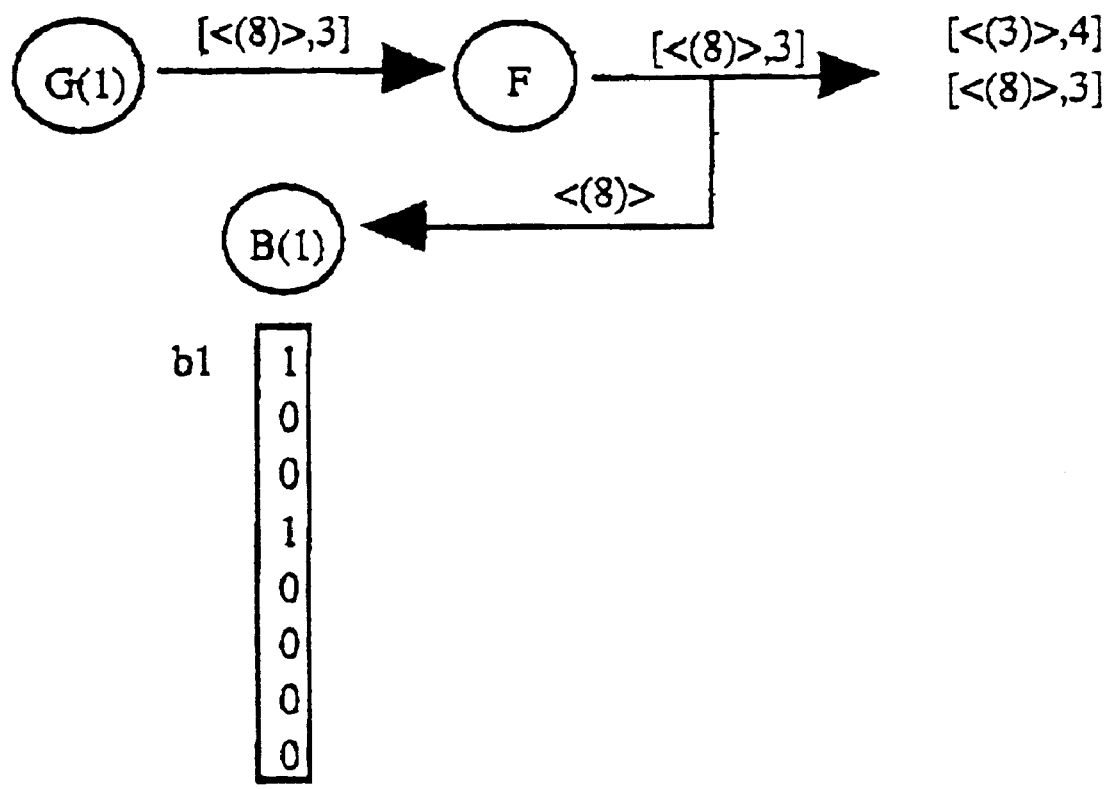
Figure 132:
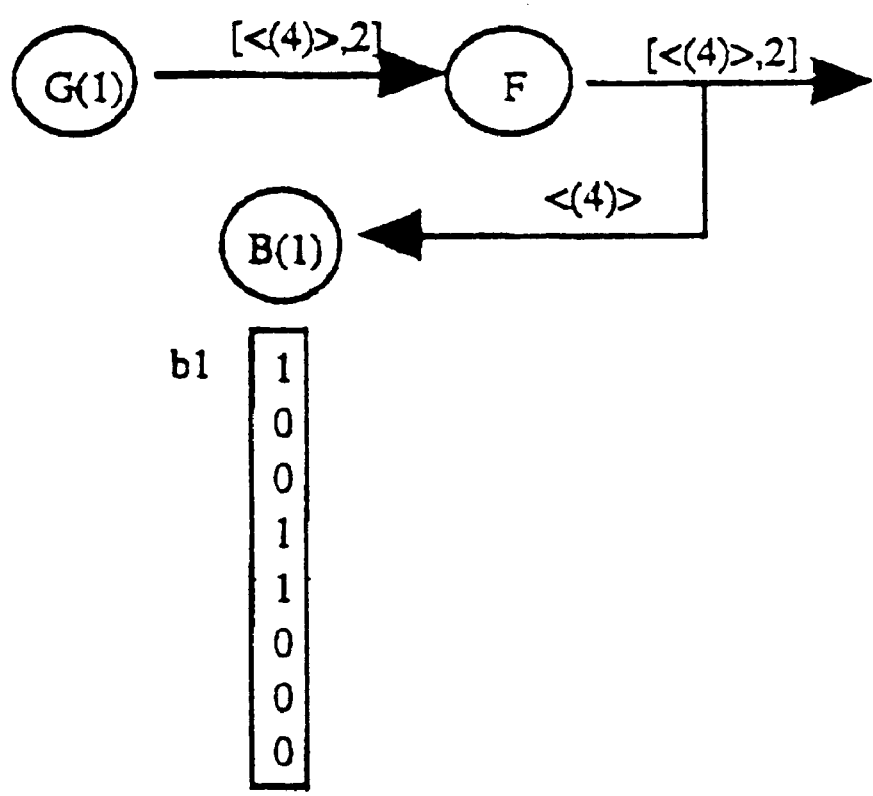
Figure 133:
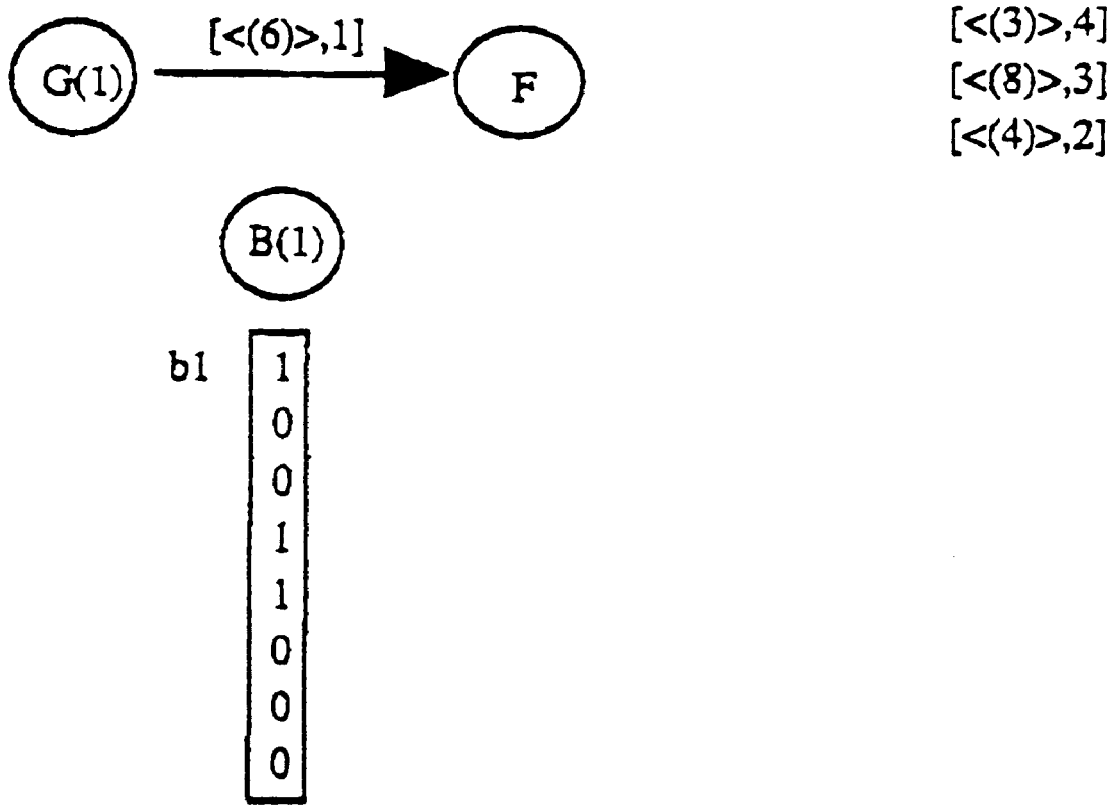
Figure 134:
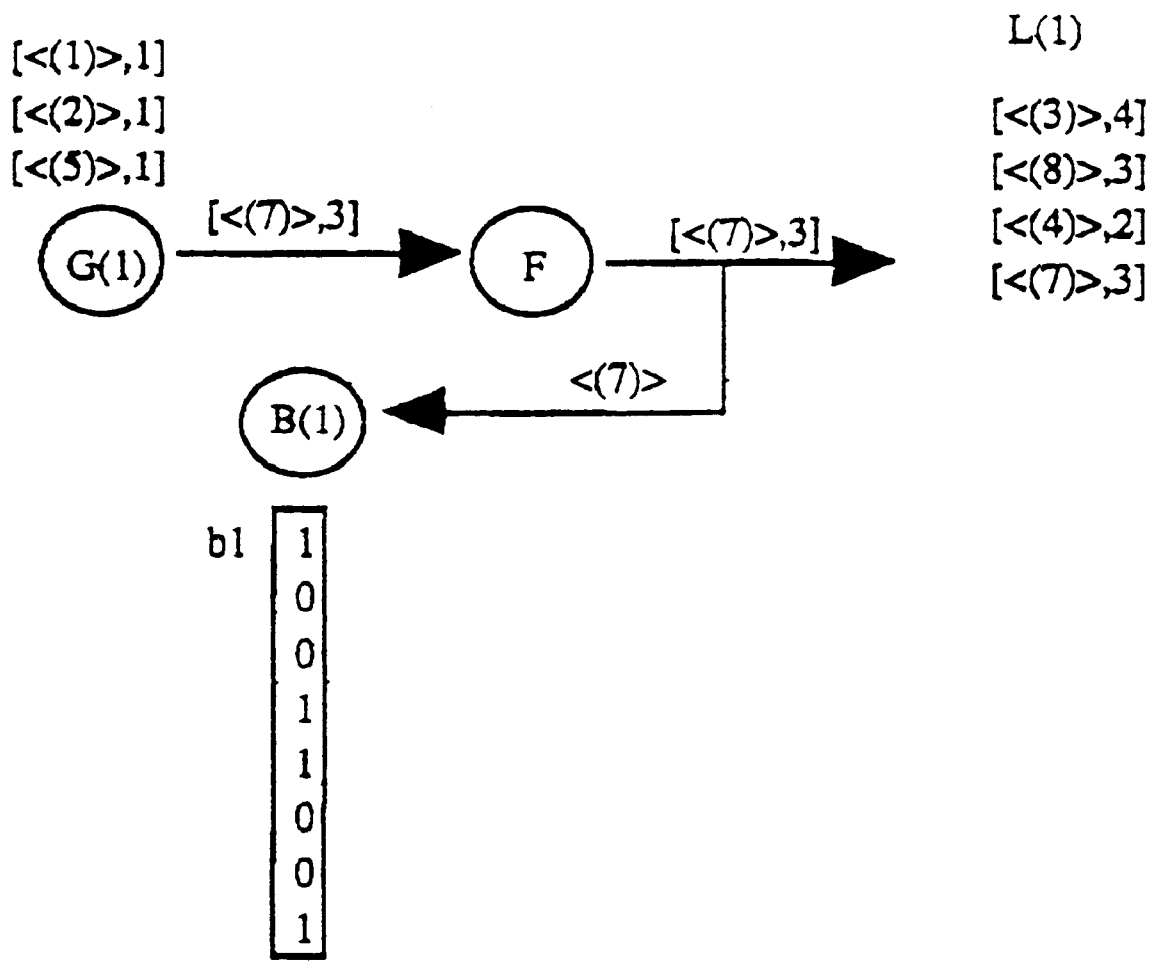
Figure 135:
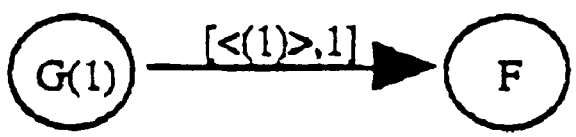
Figure 136:
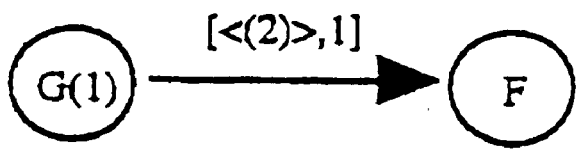
Figure 137:
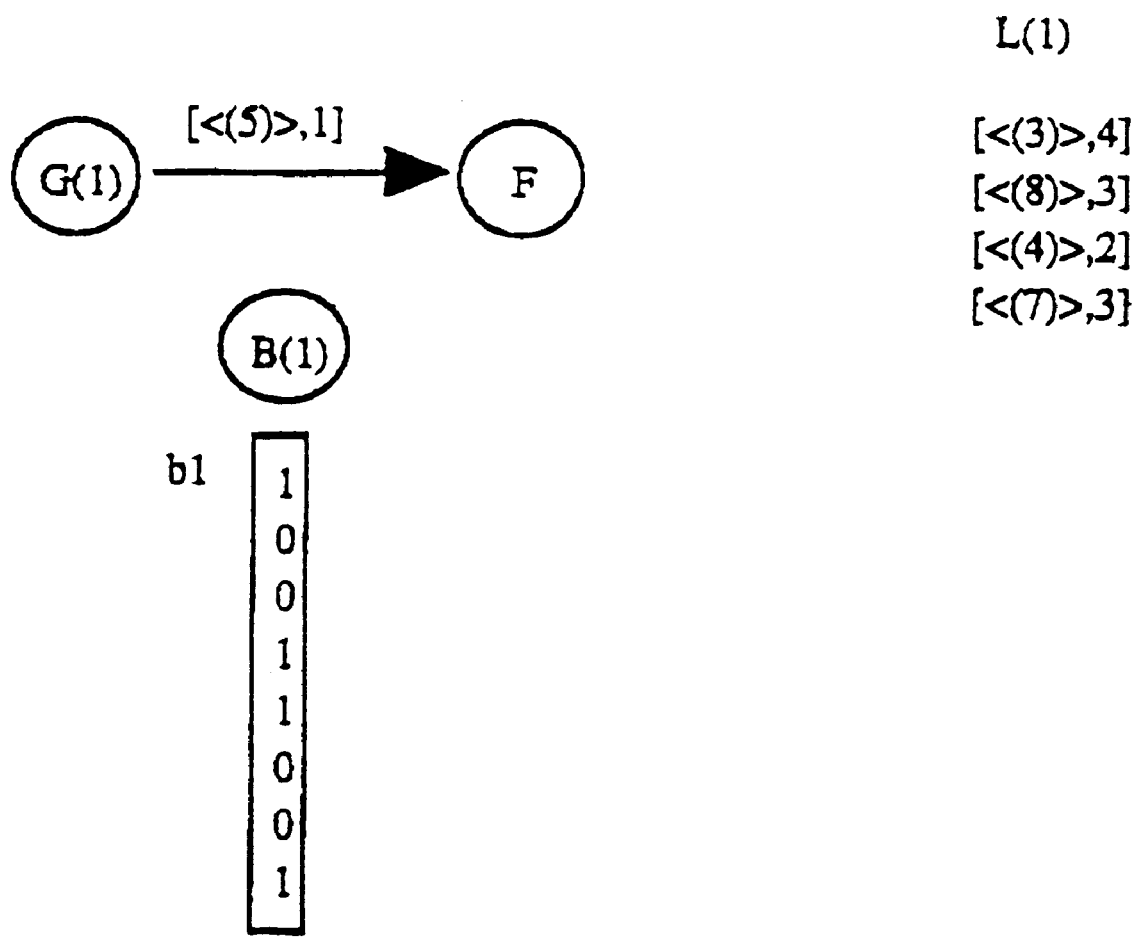
Figure 138:
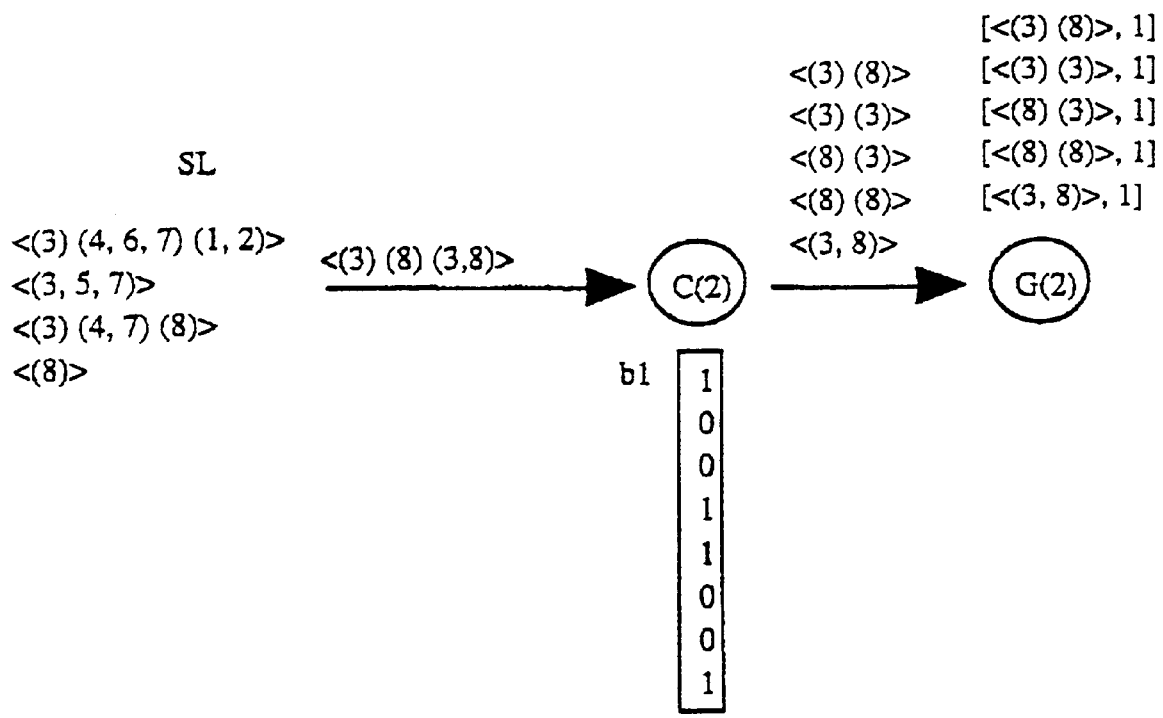
Figure 139:
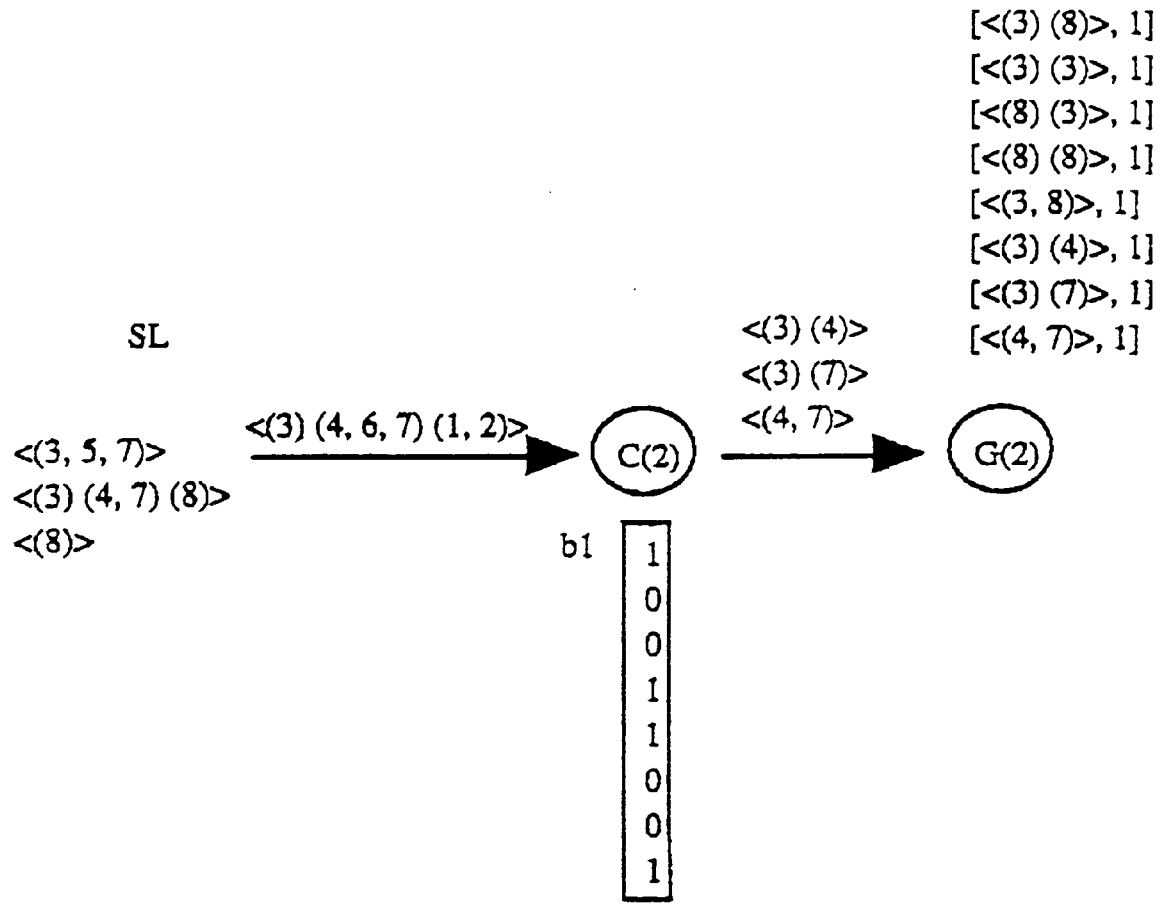
Figure 140:
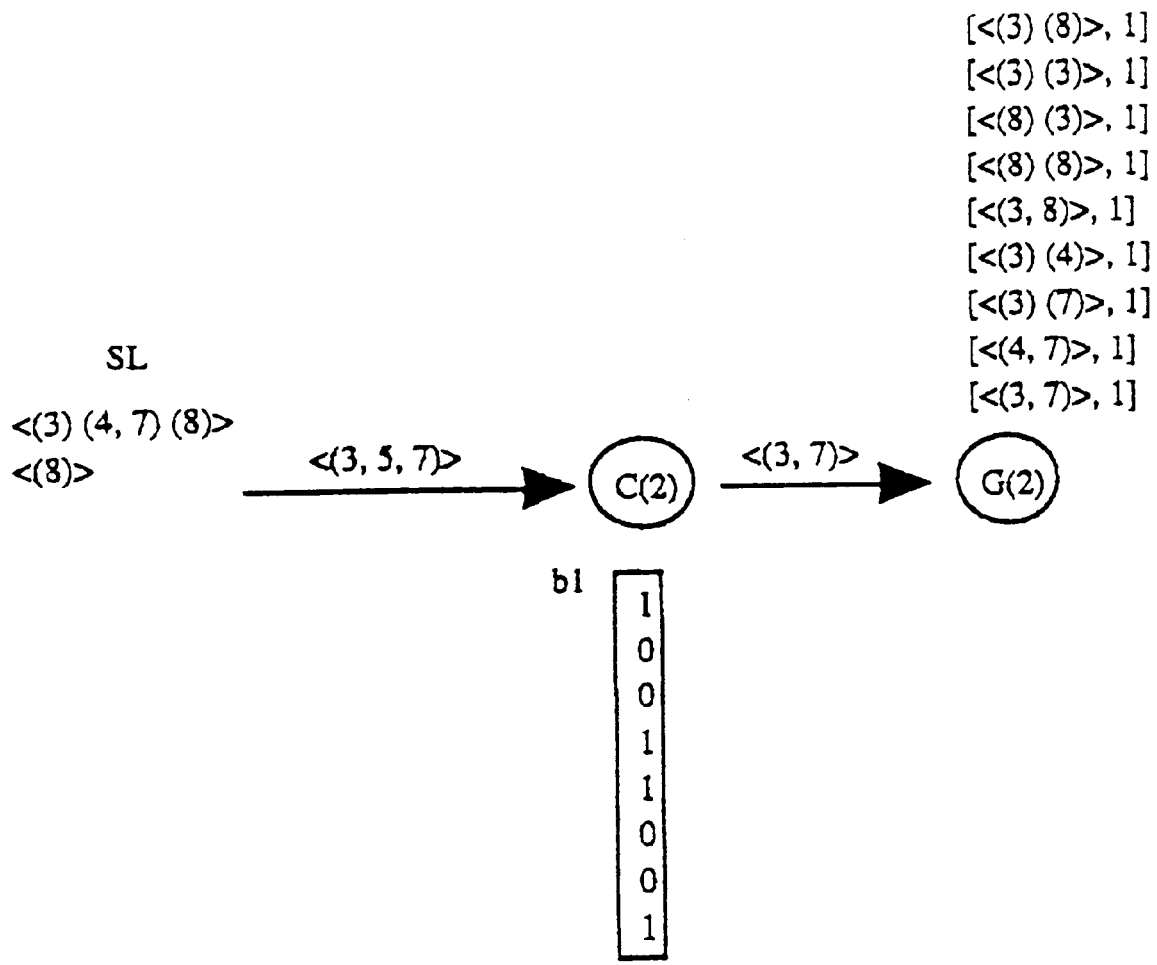
Figure 141:
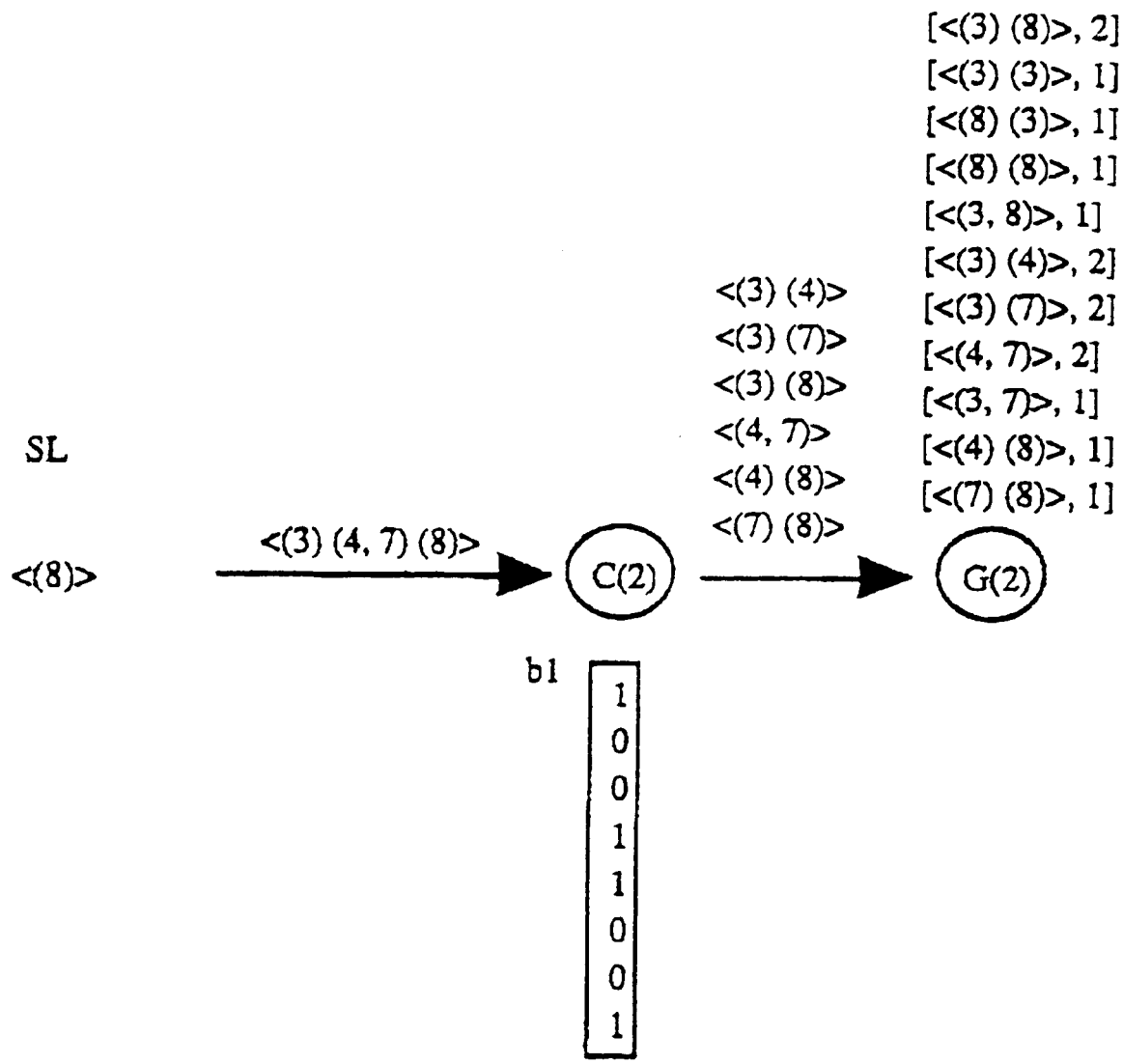
Figure 142:
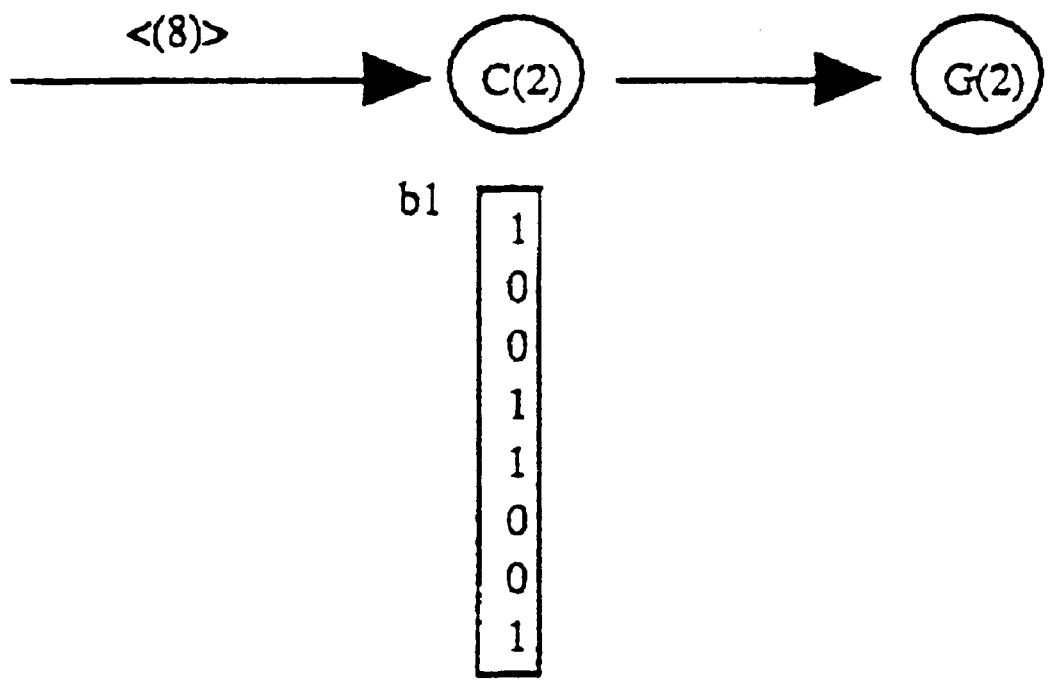
Figure 143:
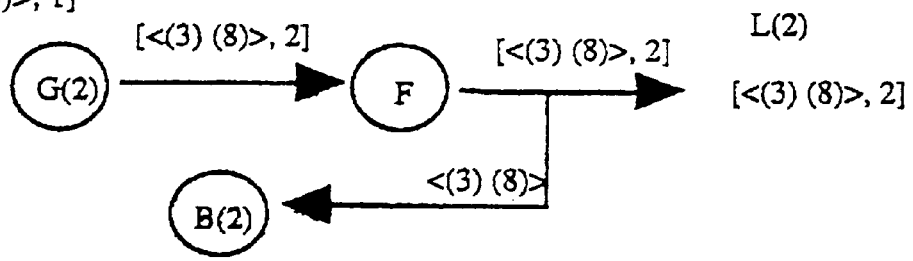
Figure 146:
Figure 147:
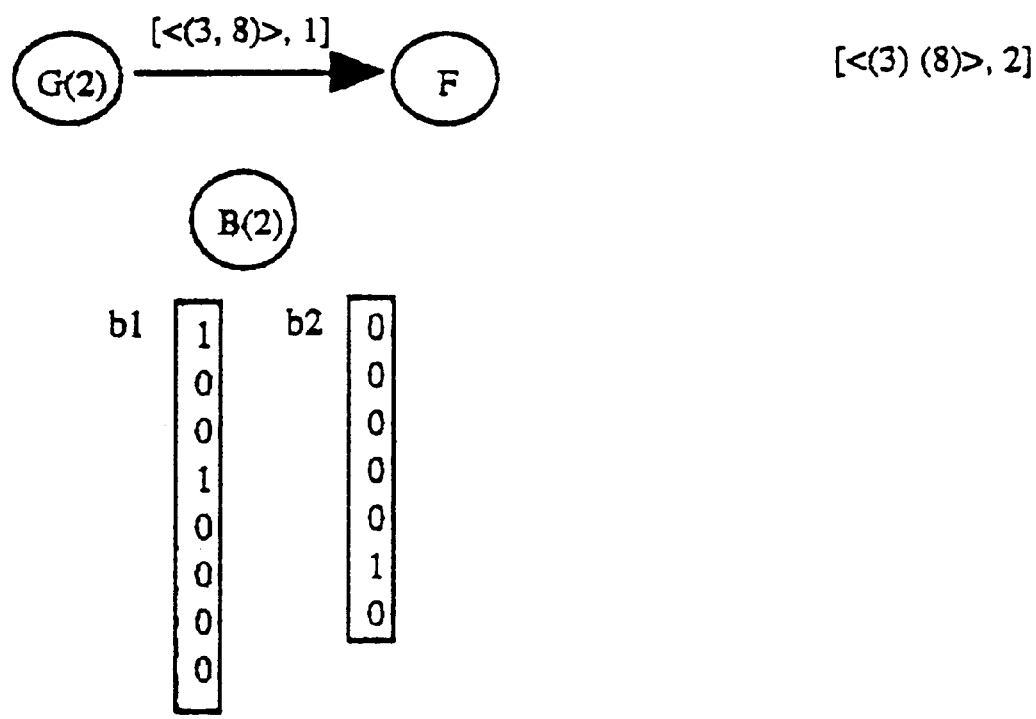
Figure 148:
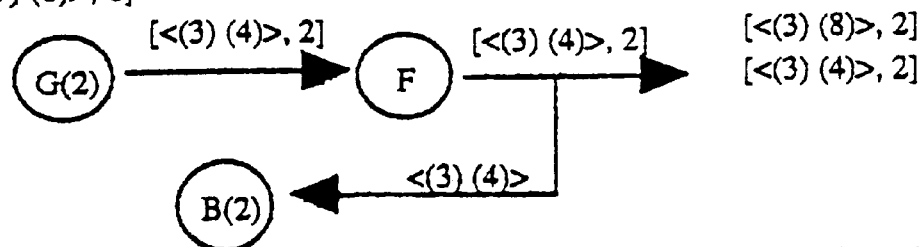
Figure 149:
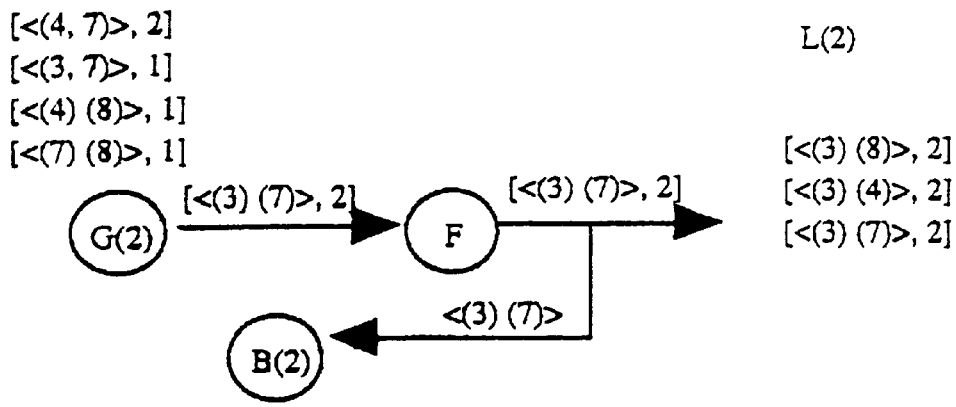
Figure 150:
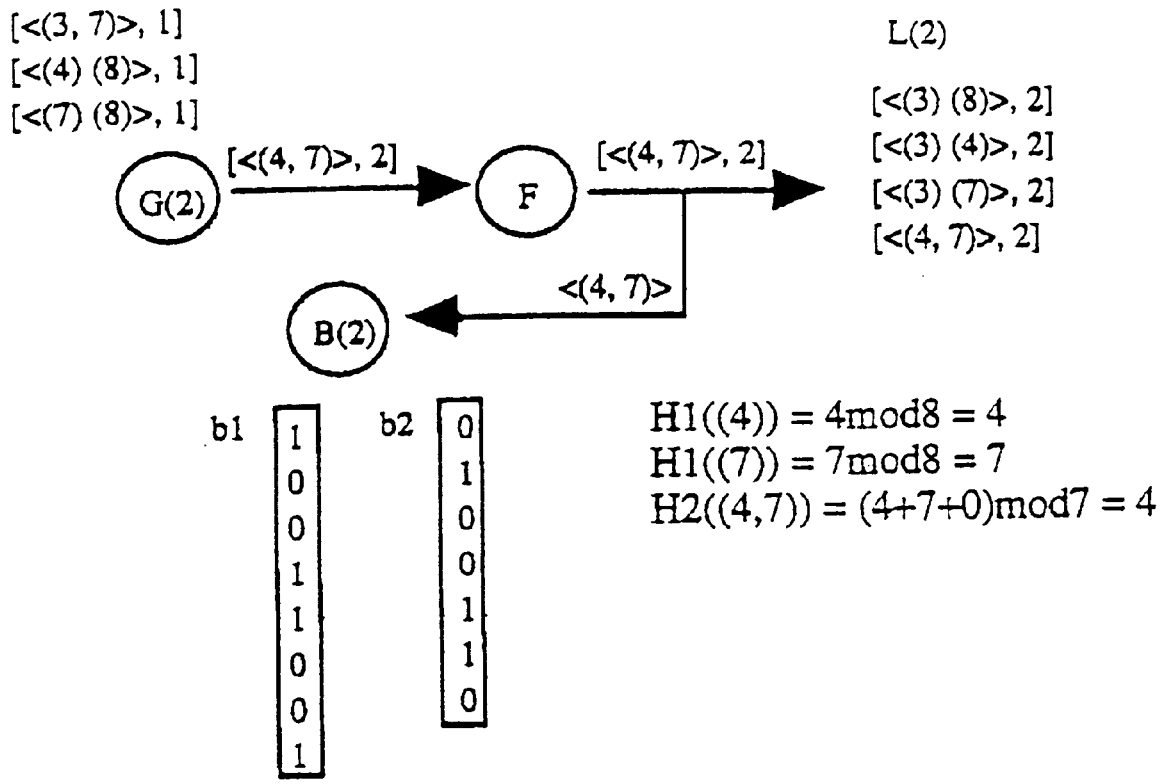
Figure 151:
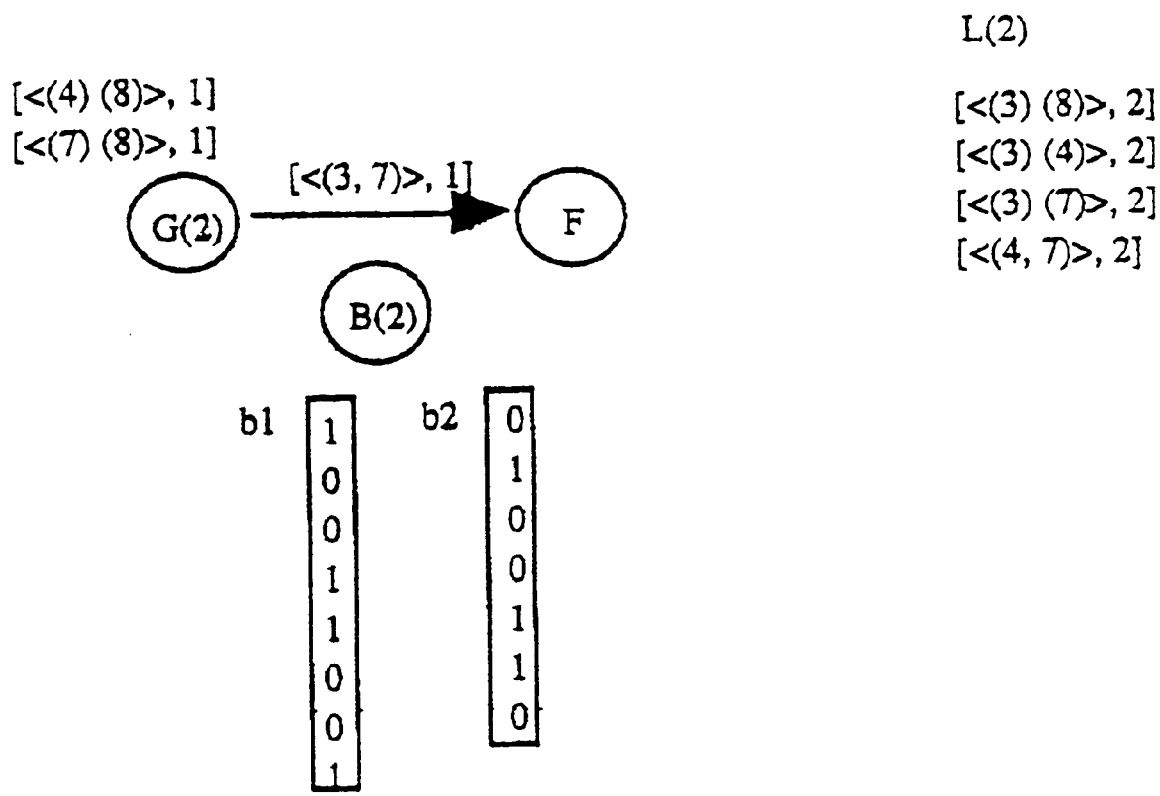
Figure 152:
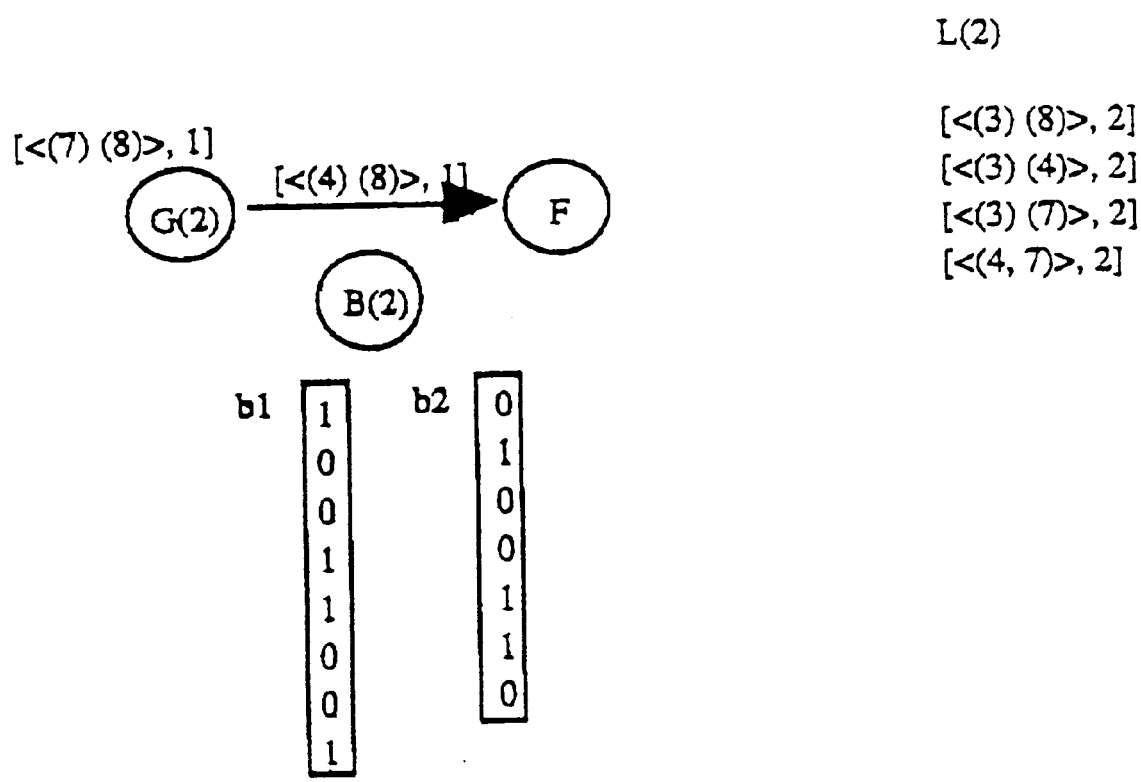
Figure 153:
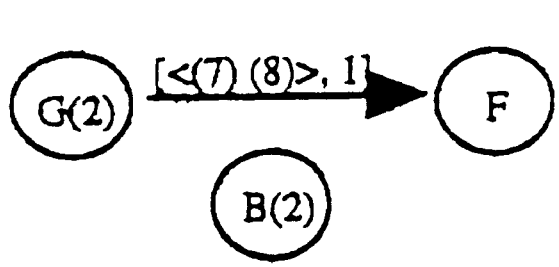
Figure 154:
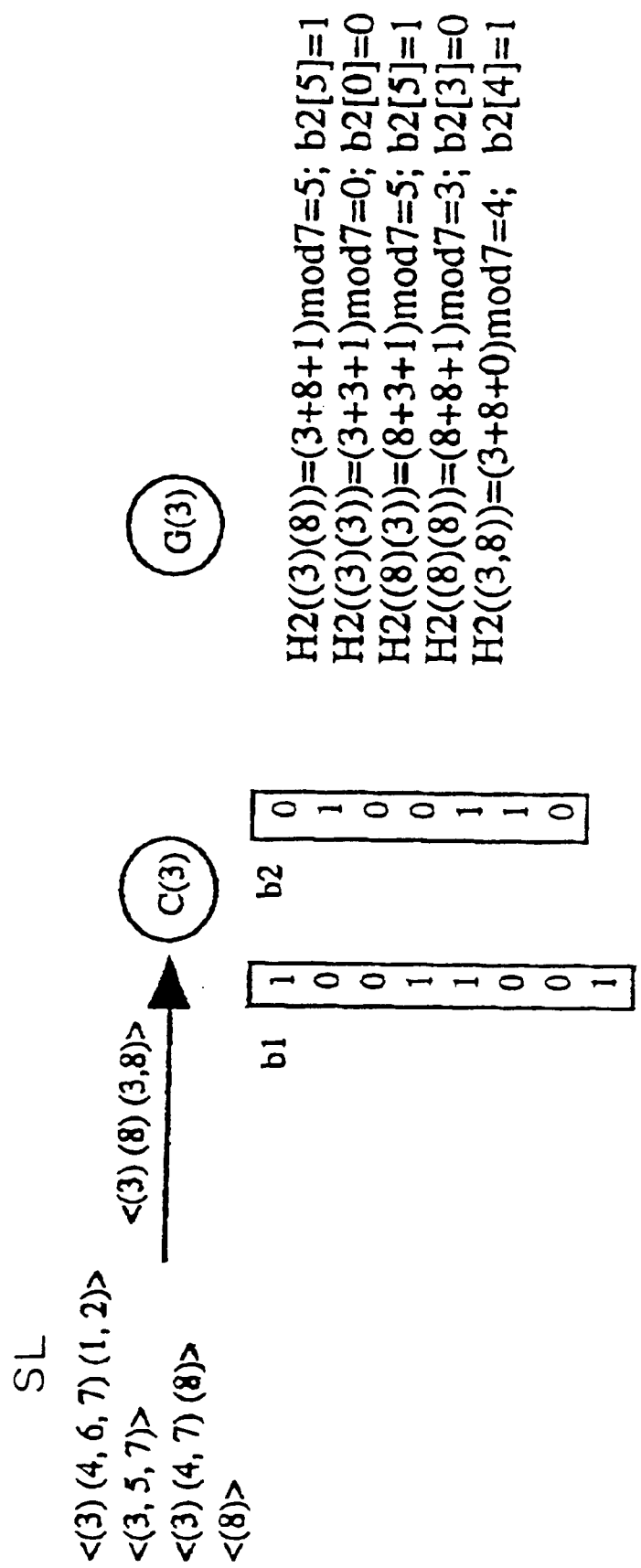
Figure 155:
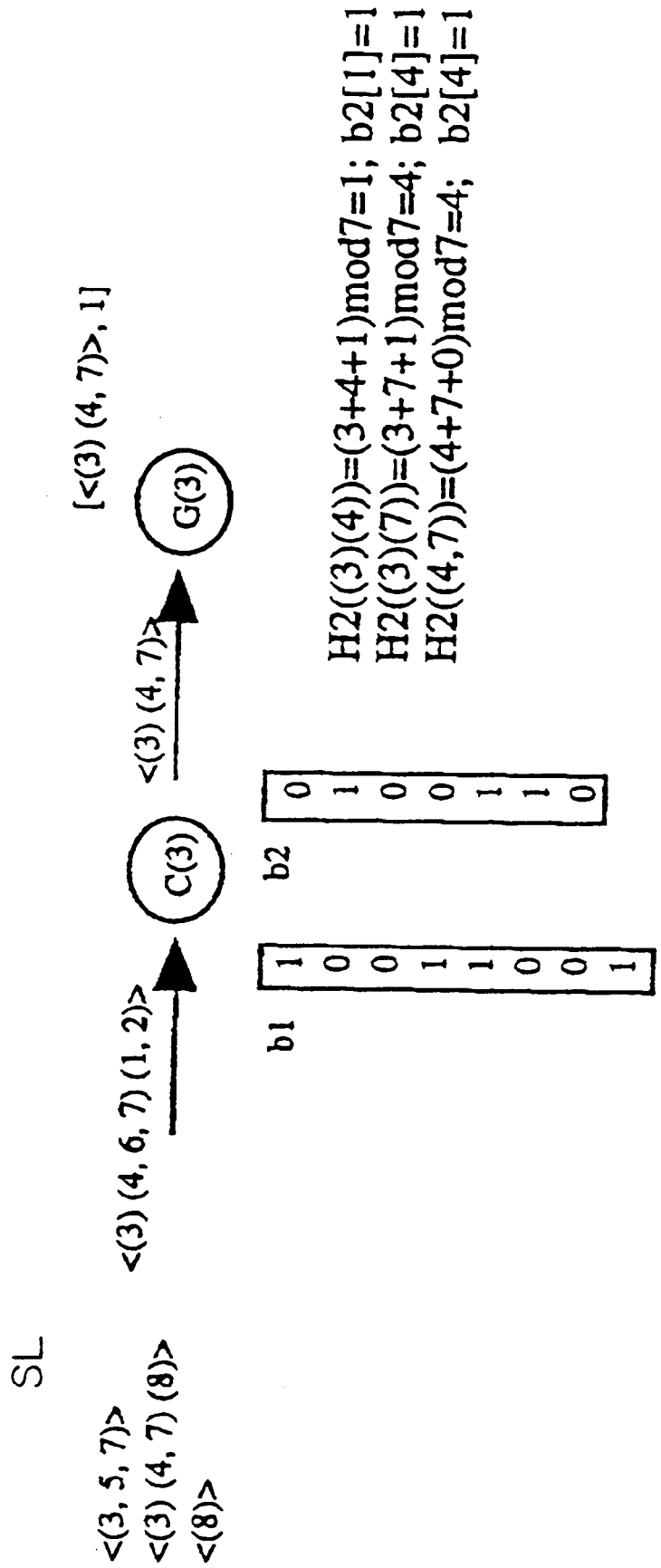
Figure 156:
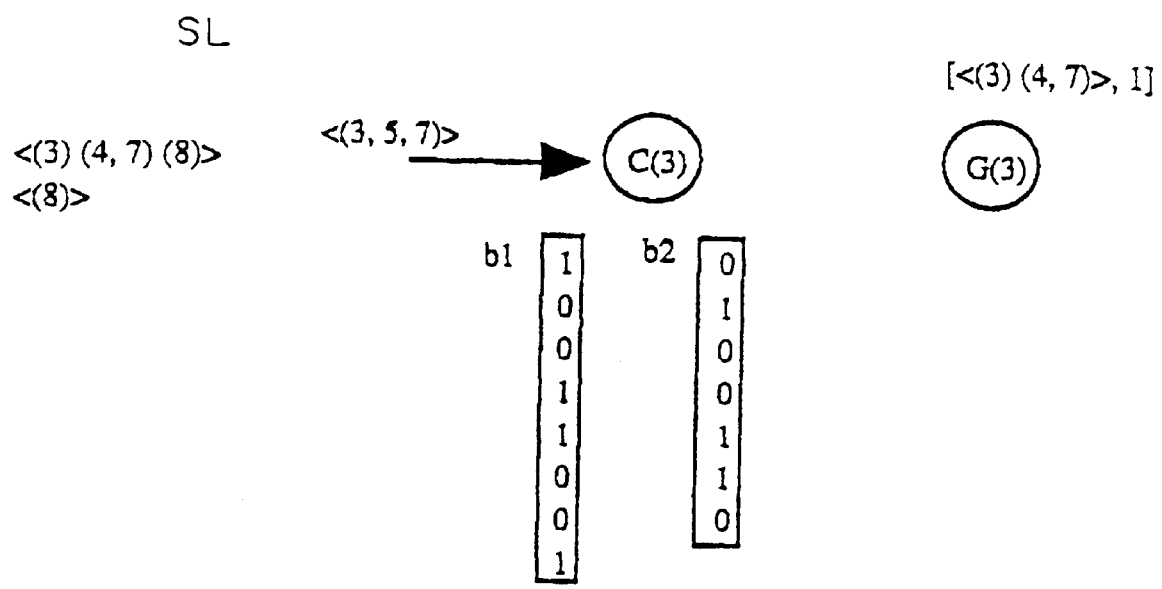
Figure 159:
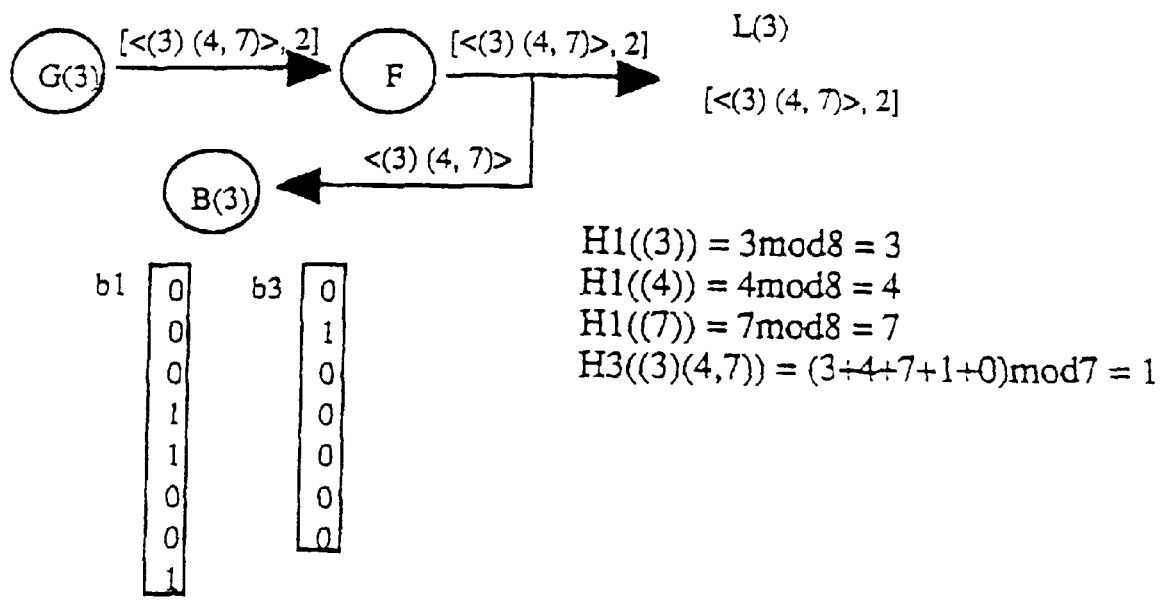
Figure 160:
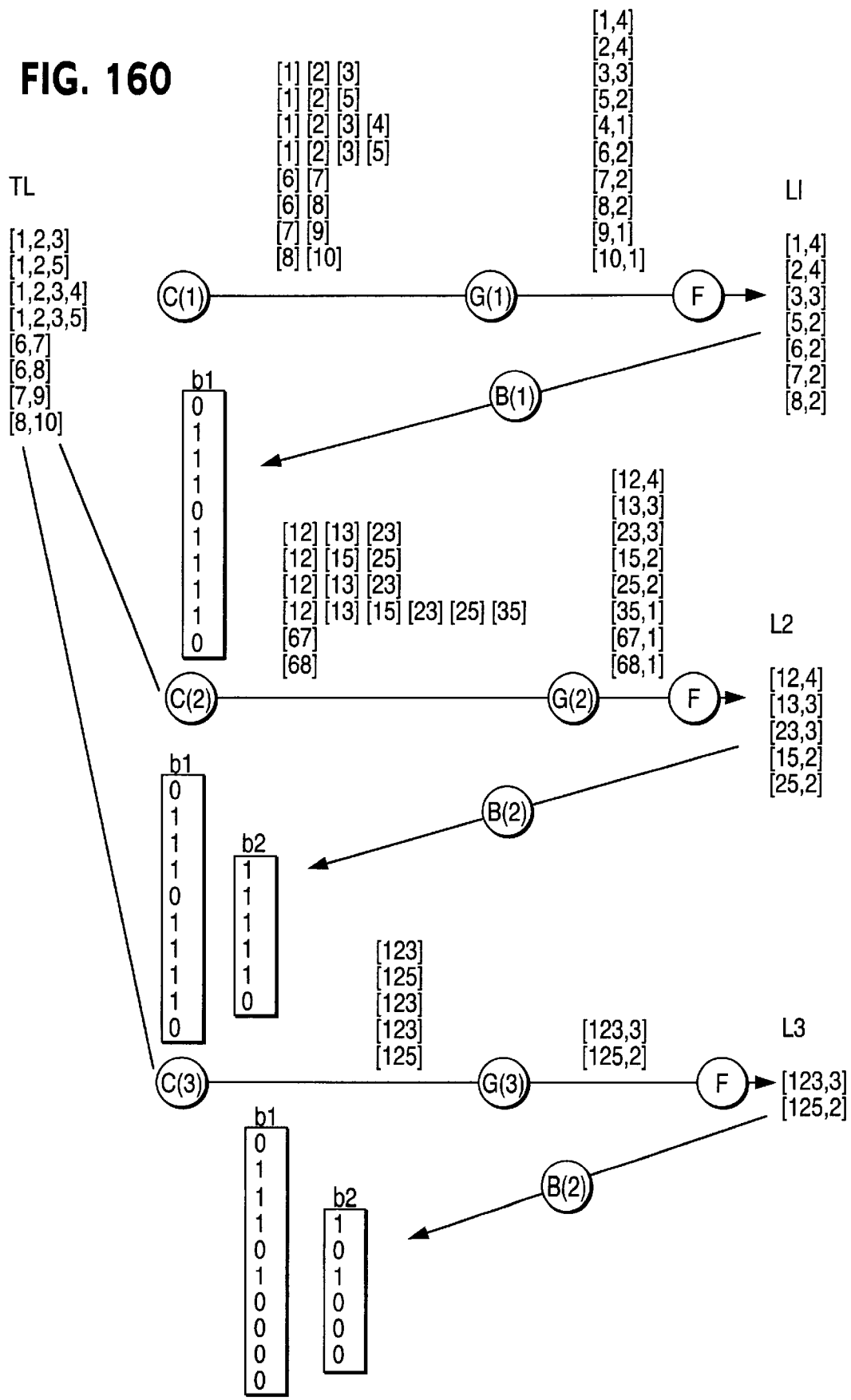
Figure 161:
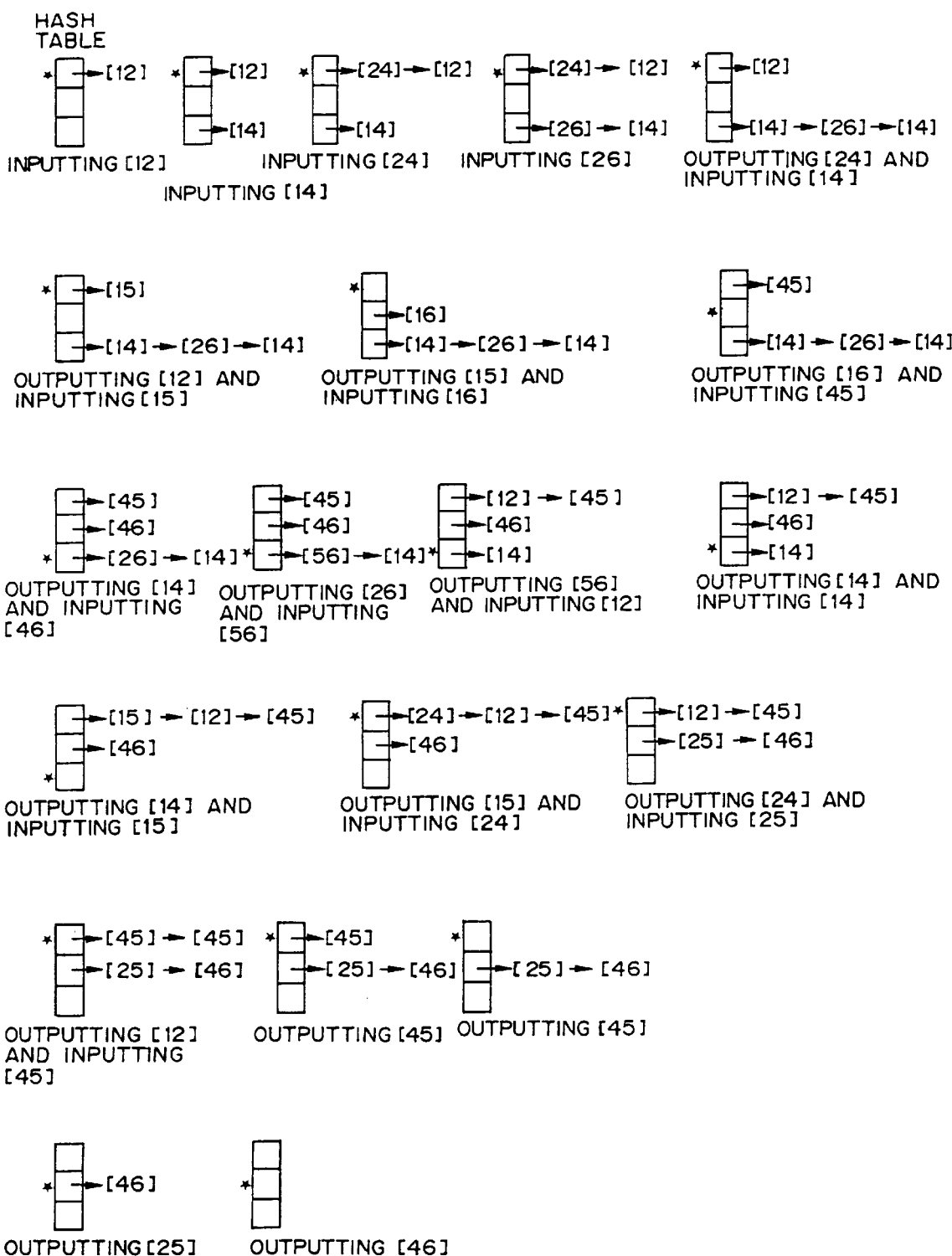
Figure 162:
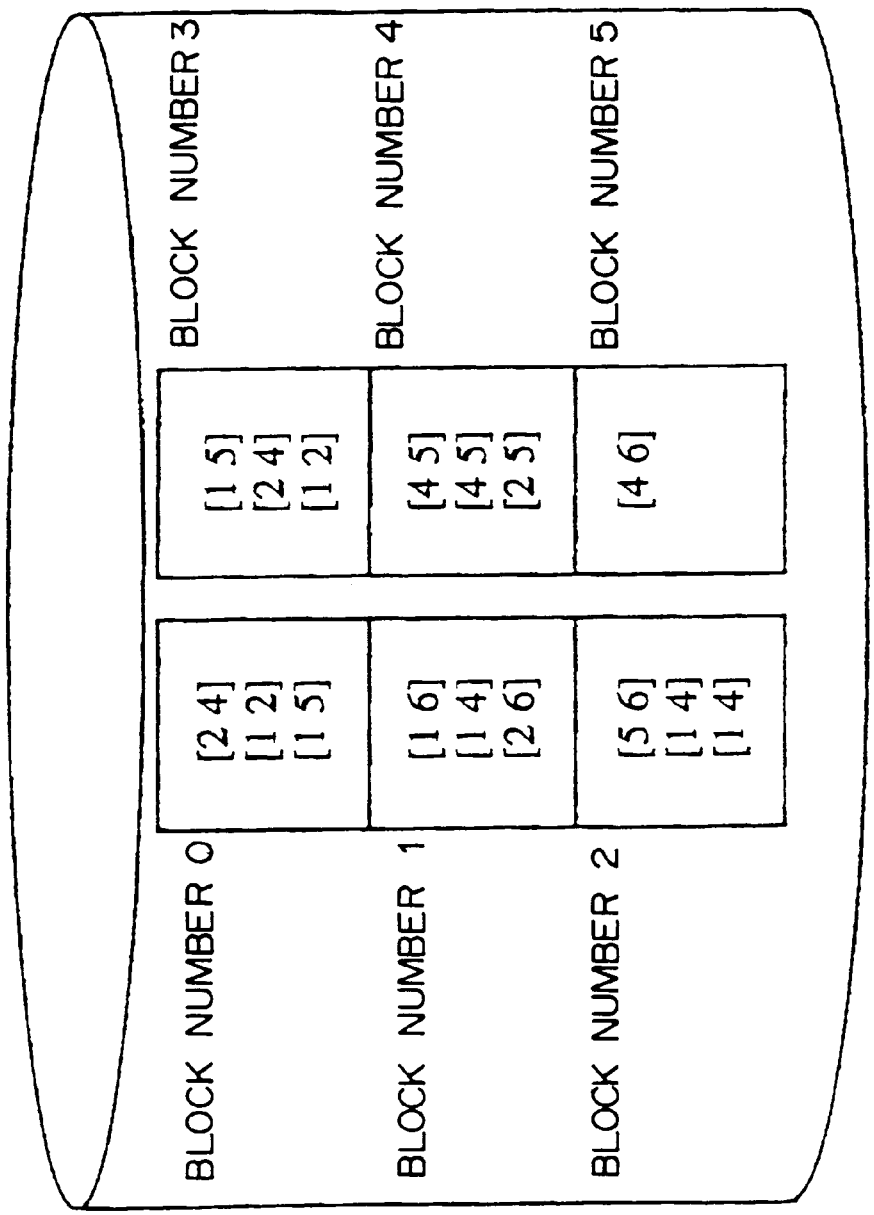
Figure 163A:
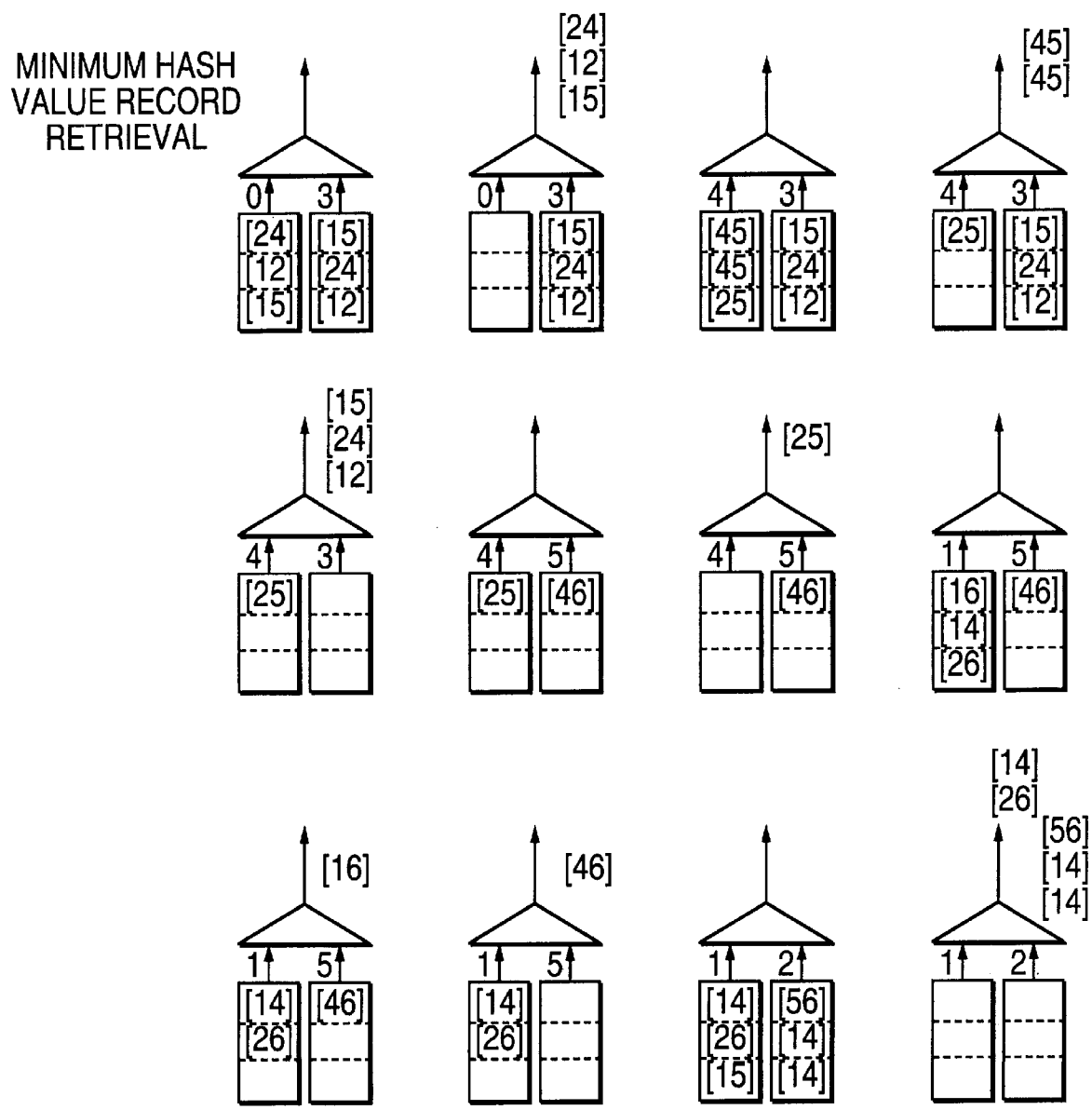
Figure 163B:
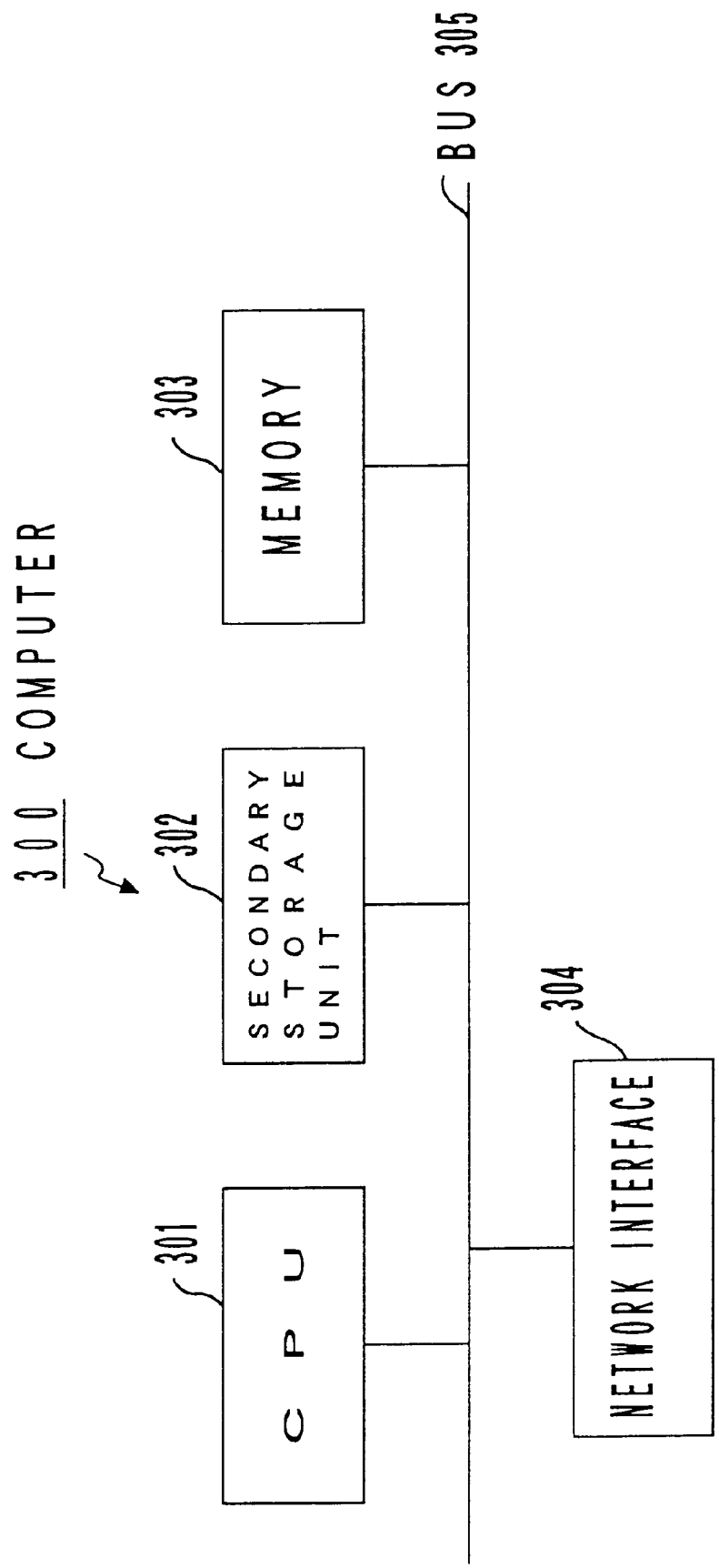

FIG. 130 is a chart (1) showing the selection of L(1) in the time-series analysis;

FIG. 131 is a chart (2) showing the selection of L(1) in the time-series analysis;

FIG. 132 is a chart (3) showing the selection of L(1) in the time-series analysis;

FIG. 133 is a chart (4) showing the selection of L(1) in the time-series analysis;

FIG. 134 is a chart (5) showing the selection of L(1) in the time-series analysis;

FIG. 135 is a chart (6) showing the selection of L(1) in the time-series analysis;

FIG. 136 is a chart (7) showing the selection of L(1) in the time-series analysis;

FIG. 137 is a chart (8) showing the selection of L(1) in the time-series analysis;

FIG. 138 is a chart (1) showing the processes up to the process G(2) in the time-series analysis;

FIG. 139 is a chart (2) showing the processes up to the process G(2) in the time-series analysis;

FIG. 140 is a chart (3) showing the processes up to the process G(2) in the time-series analysis;

FIG. 141 is a chart (4) showing the processes up to the process G(2) in the time-series analysis;

FIG. 142 is a chart (5) showing the processes up to the process G(2) in the time-series analysis;

FIG. 143 is a chart (1) showing the selection of L(2) in the time-series analysis;

FIG. 144 is a chart (2) showing the selection of L(2) in the time-series analysis;

FIG. 145 is a chart (3) showing the selection of L(2) in the time-series analysis;

FIG. 146 is a chart (4) showing the selection of L(2) in the time-series analysis;

FIG. 147 is a chart (5) showing the selection of L(2) in the time-series analysis;

FIG. 148 is a chart (6) showing the selection of L(2) in the time-series analysis;

FIG. 149 is a chart (7) showing the selection of L(2) in the time-series analysis;

FIG. 150 is a chart (8) showing the selection of L(2) in the time-series analysis;

FIG. 151 is a chart (9) showing the selection of L(2) in the time-series analysis;

FIG. 152 is a chart (10) showing the selection of L(2) in the time-series analysis;

FIG. 153 is a chart (11) showing the selection of L(2) in the time-series analysis;

FIG. 154 is a chart (1) showing the processes up to the process G(3) in the time-series analysis;

FIG. 155 is a chart (2) showing the processes up to the process G(3) in the time-series analysis;

FIG. 156 is a chart (3) showing the processes up to the process G(3) in the time-series analysis;

FIG. 157 is a chart (4) showing the processes up to the process G(3) in the time-series analysis;

Figure 158:
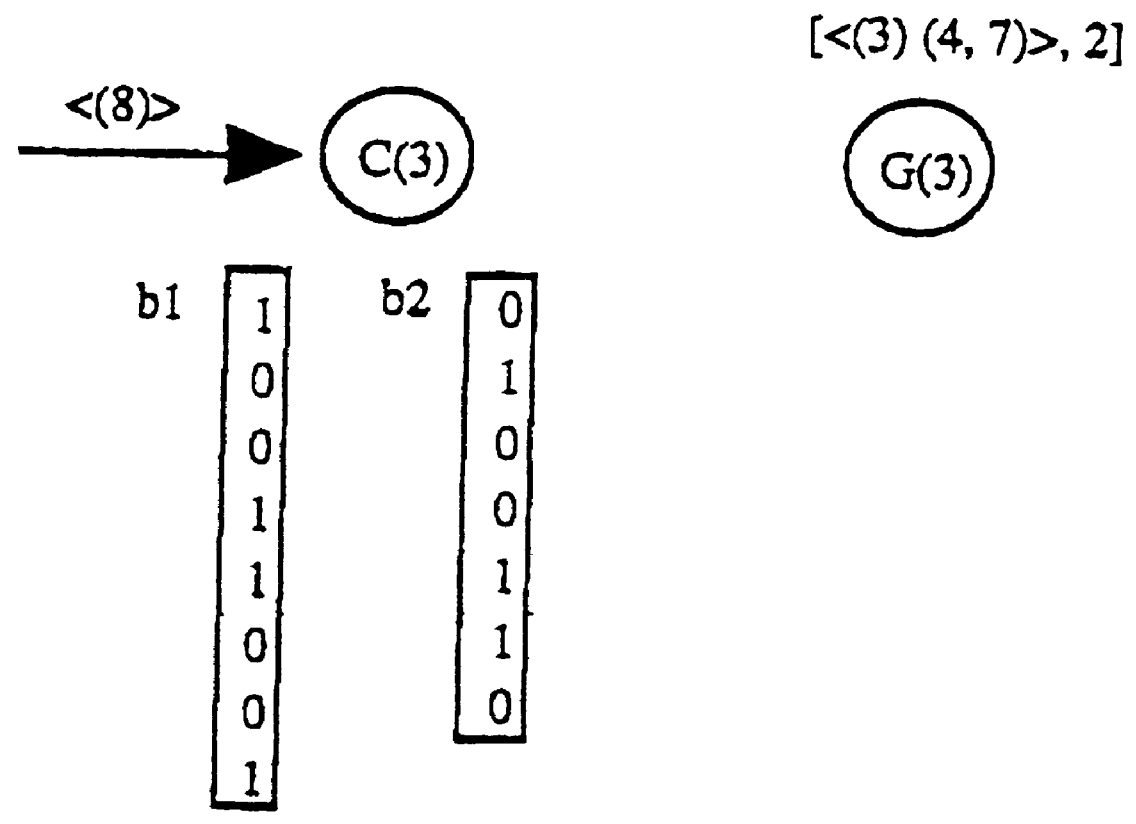

FIG. 158 is a chart (5) showing the processes up to the process G(3) in the time-series analysis;

FIG. 159 is a chart showing the selection of L(3) in the time-series analysis;

FIG. 160 shows the flow of the process according to the present invention in the basic association analysis;

FIG. 161 shows the proceedings of the hashed list generation process in the item combination count process;

FIG. 162 shows the hashed list as a result of the process shown in FIG. 161;

FIG. 163A shows the proceedings of the minimum hash function value record retrieval process for the hashed list shown in FIG. 162;

FIG. 163B shows the configuration of the computer embodying the group-by processing system according to the present invention.

Figure 164:
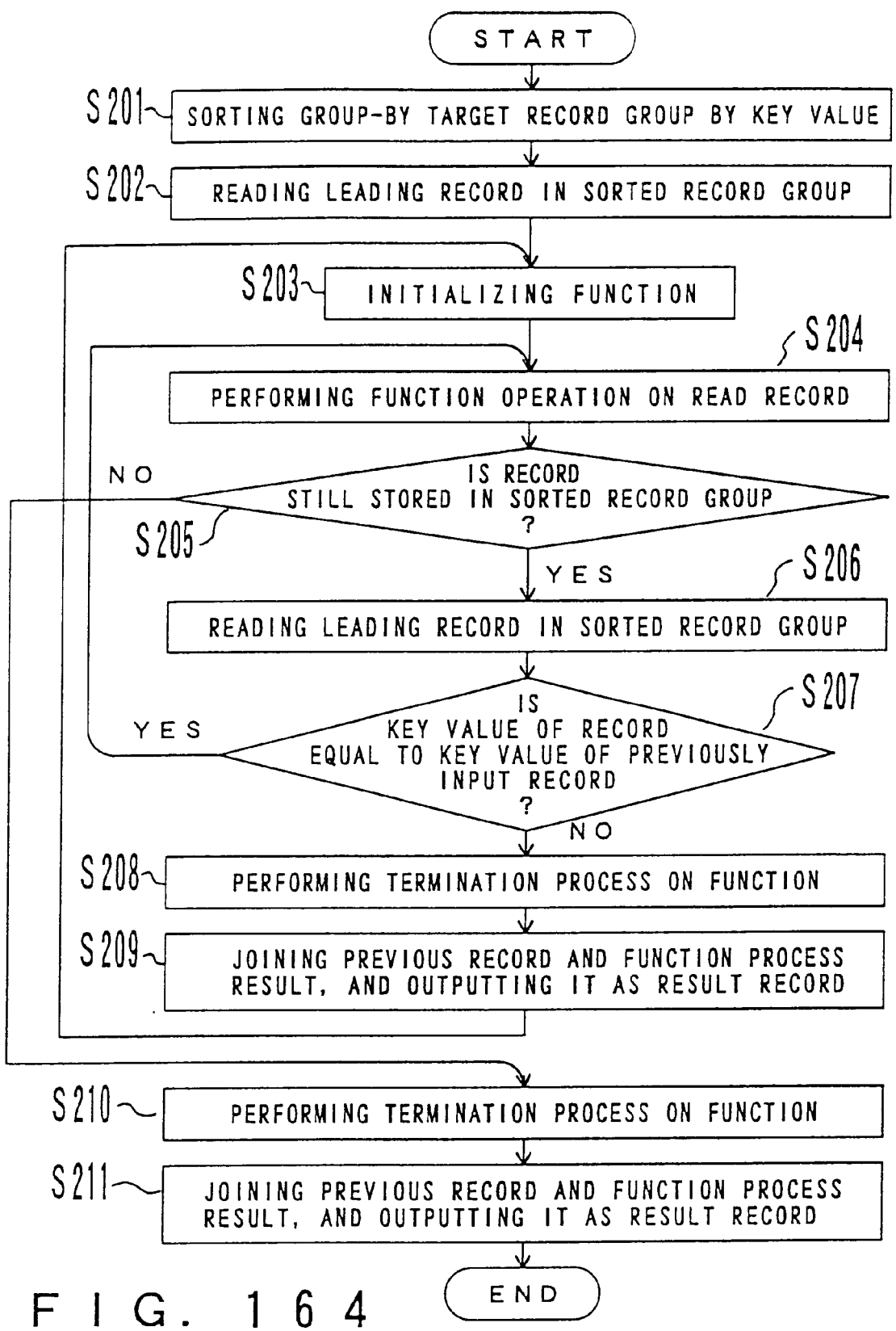
Figure 166:
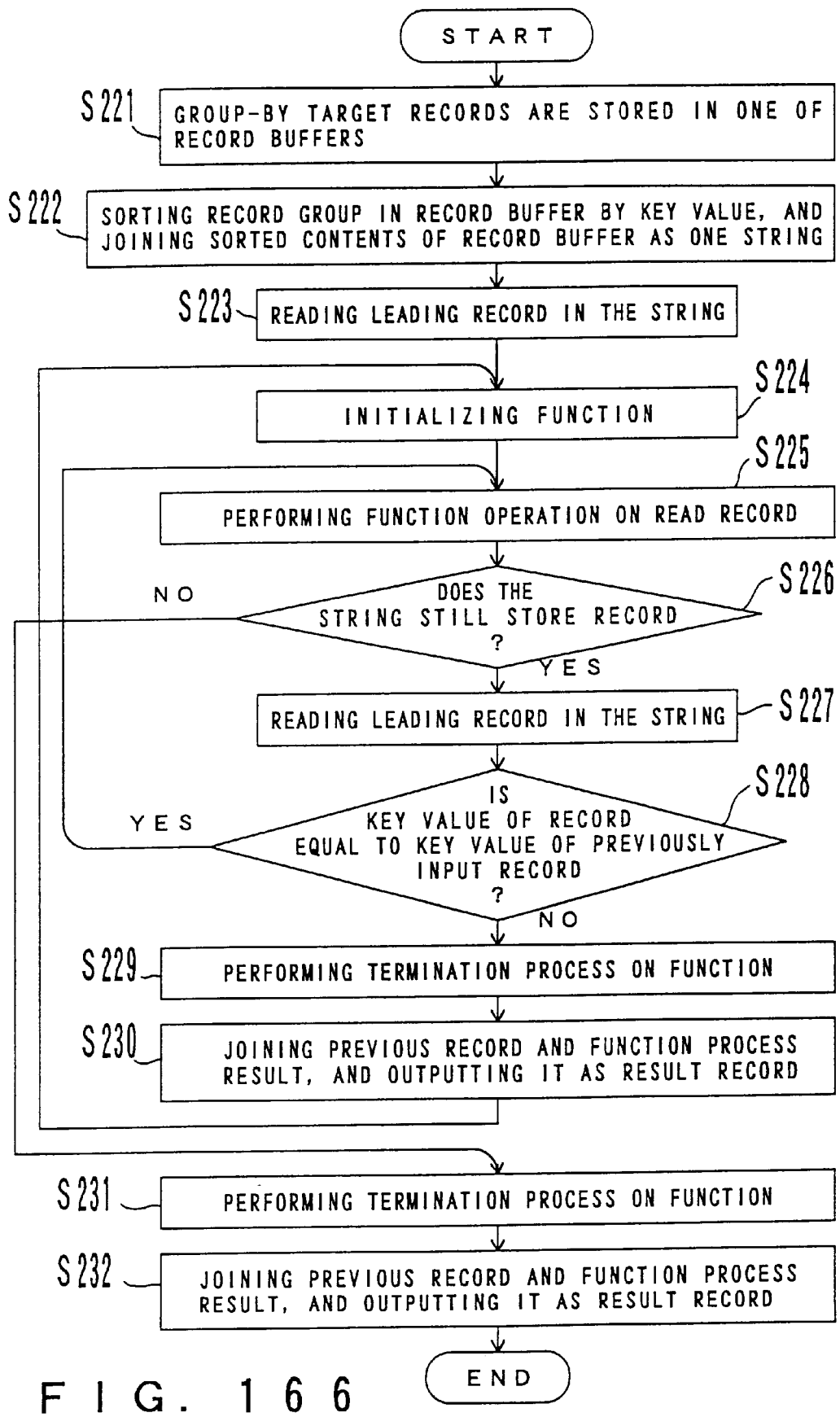
Figure 168:
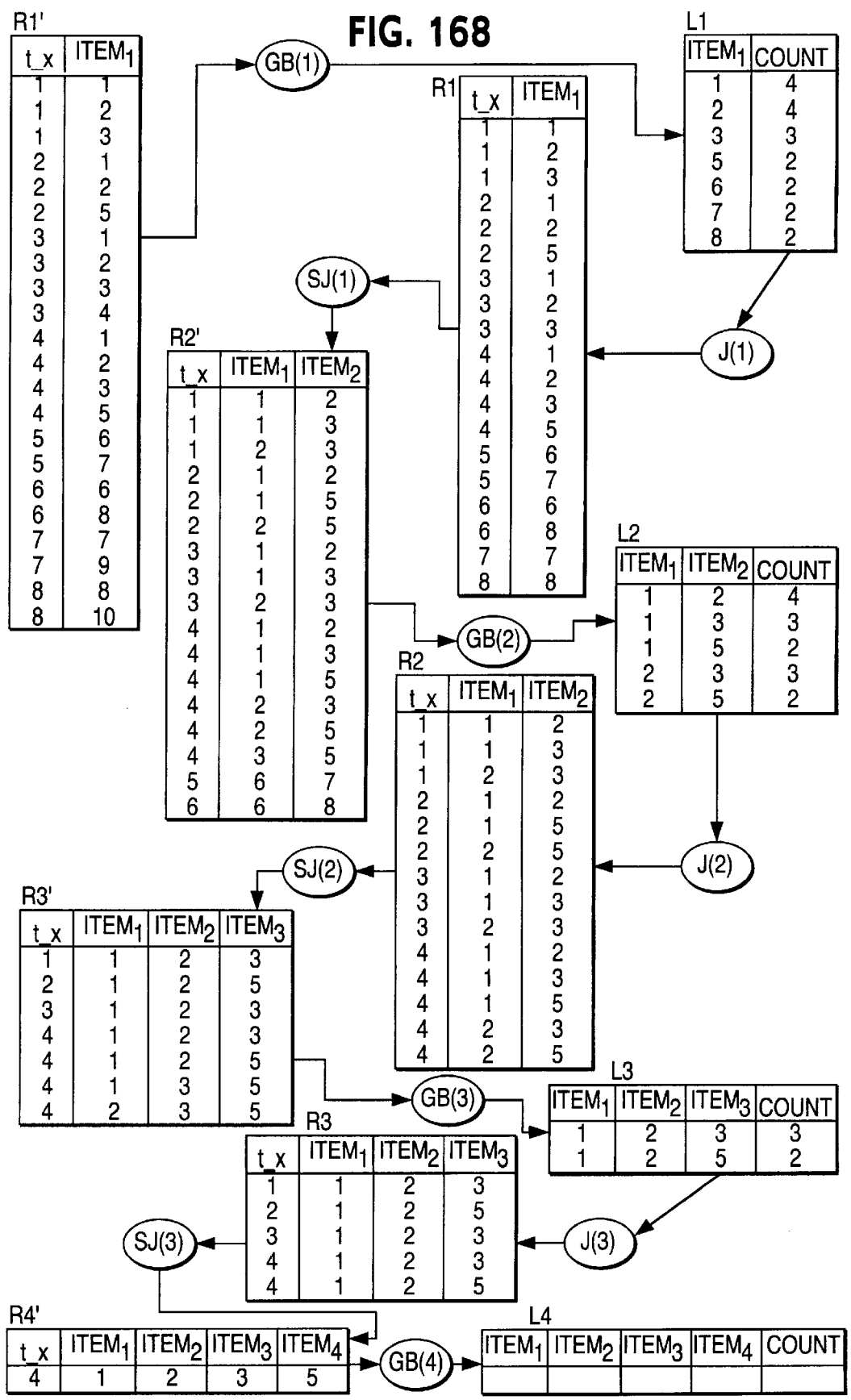
Figure 170:
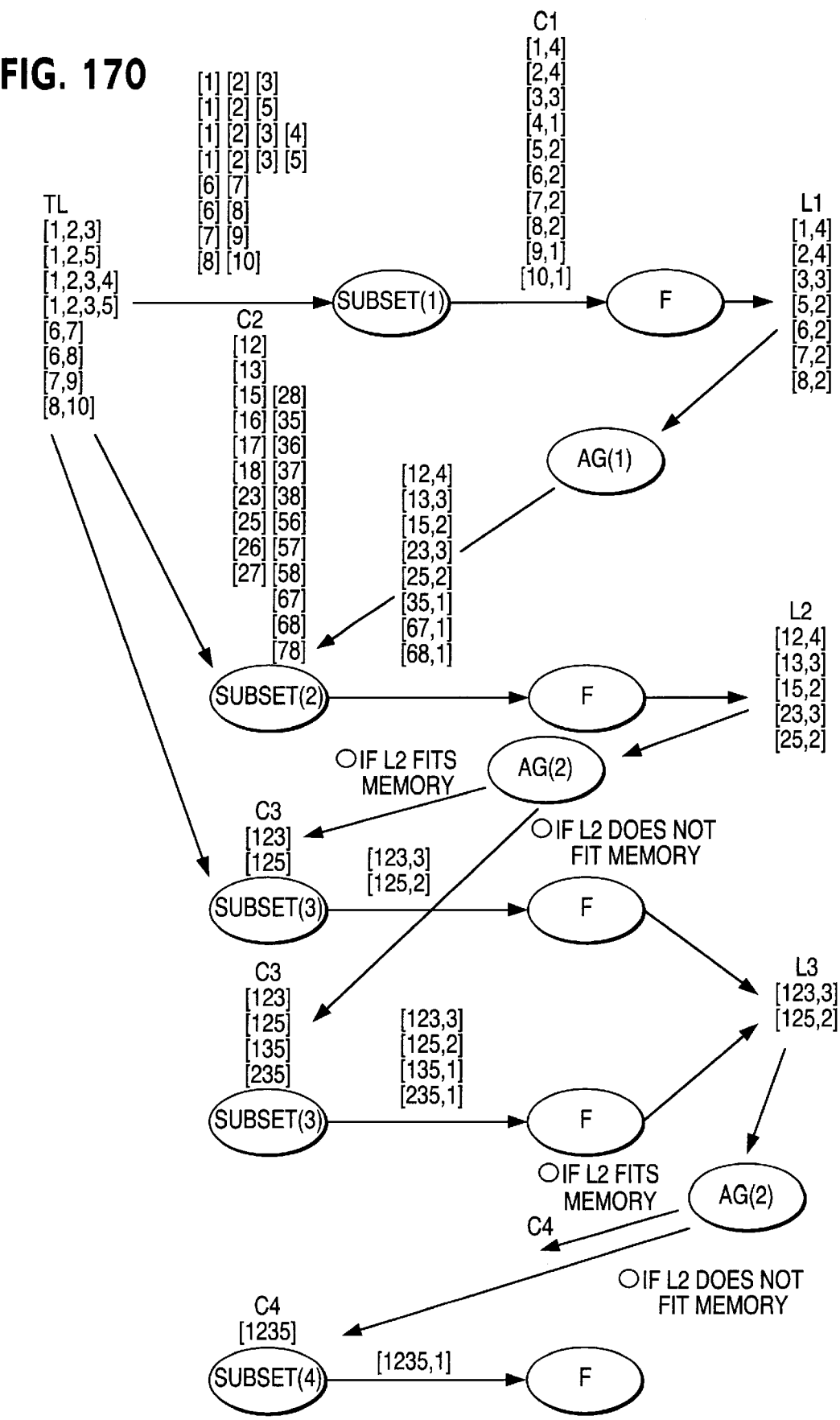

FIG. 164 is a flowchart showing an example of the conventional technology of the group-by process based on the sort process;

FIGS. 165A through 165F show the proceedings of the practical process using the flowchart shown in FIG. 164;

FIG. 166 is a flowchart showing an example of the conventional technology of the group-by process based on the hash process;

FIGS. 167A through 167F show the proceedings of the practical process using the flowchart shown in FIG. 166;

FIG. 168 shows the flow of the practical process in the SETM algorithm;

FIG. 169 shows the contents of each function block process in the SETM algorithm;

FIG. 170 shows the flow of the practical process in the Apriori algorithm; and

FIG. 171 shows the contents of each function block in the Apriori algorithm.

DETAILED DESCRIPTION OF THE EMBODIMENTS

Figure 1A:
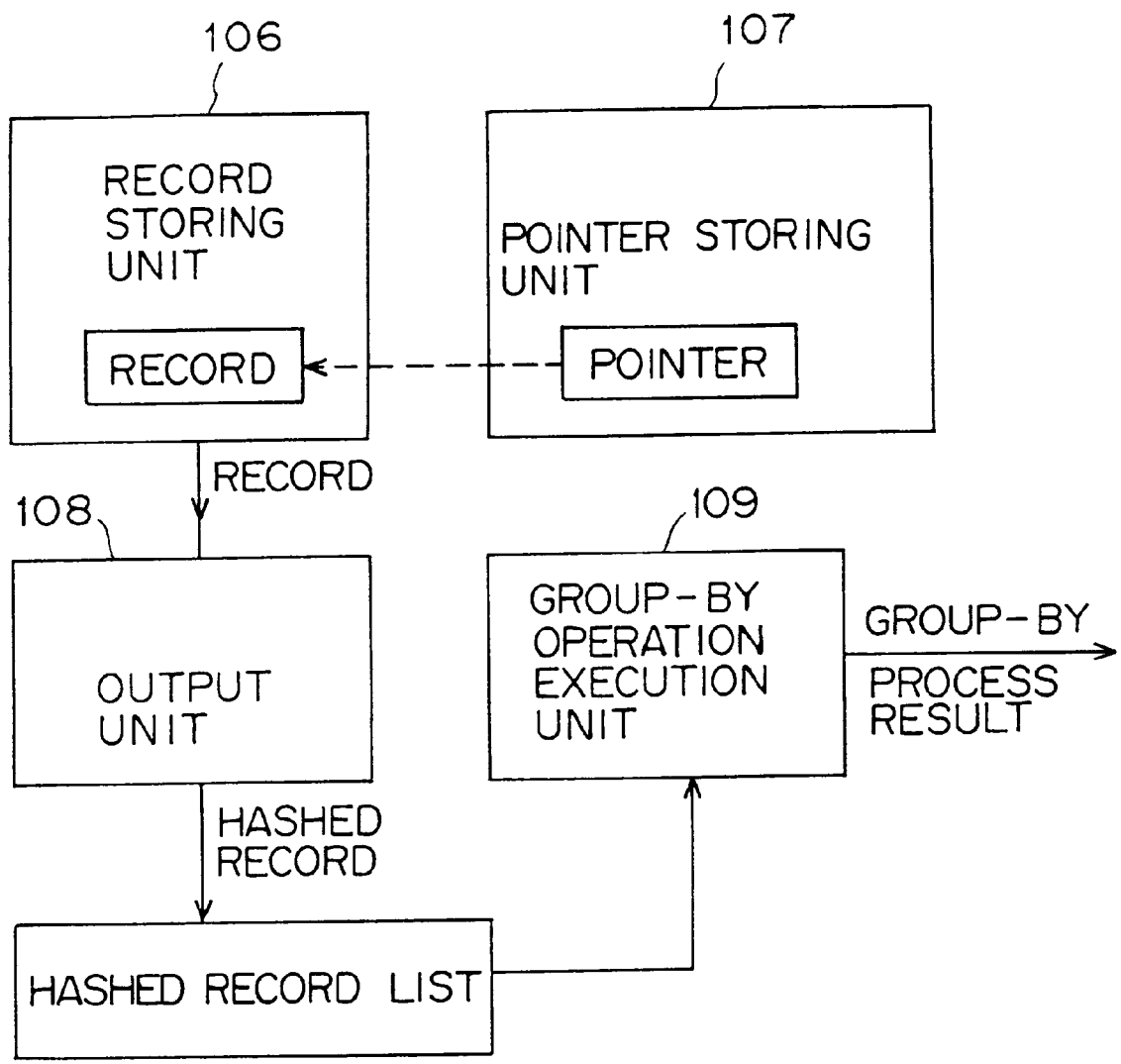
FIG. 1A is a block diagram showing the configuration according to the principle of the group-by processing system of the present invention.

FIG. 1A is a block diagram showing the configuration according to the principle of the group-by processing system of the present invention. The group-by processing system shown in FIG. 1A performs a group-by operation for transforming a group of records to be hashed stored in a storage unit into a referenceable storage form using hash function values, each of which corresponds to the key value of the record.

In FIG. 1A, a record storing unit 106 is, for example, a record buffer for temporarily storing a group of records to be processed in a group-by process. A pointer storing unit 107 is, for example, a hash table for storing pointers to the records stored in the record storing unit 106 at positions, each of which corresponds to a hash function value calculated from the key value of the record.

A output unit 108 outputs the records pointed to by the pointers stored in the pointer storing unit 107 to storage, given hash function values for the storage positions of the pointers.

A group-by operation execution unit 109 reads a list of hashed records output to the storage device by the output unit 108, sorts the list of the records by its key value, and performs a group-by operation on the list of the sorted records.

The group-by processing system according to the present invention can include, for example, an auxiliary information list storage unit in addition to the components shown in FIG. 1A. When the output unit 108 outputs the records to the storage device as a set of blocks, the auxiliary information list stores a list of auxiliary information for use in retrieving the records in the block according to the hash function value.

In this case, the group-by operation execution unit 109 performs a group-by operation using a hashed list, which includes the records each corresponding to the hash function value, obtained by hash process, and an auxiliary information list for use in retrieving the records in the block according to the hash function value.

In the group-by processing system according to the present invention, a run information storage unit can replace the above described auxiliary information list storage unit. When the output unit 108 outputs to the storage device a record output from the record storing unit 106 according to the hash function value, the run information storage unit stores run information. The run information includes an identifier for indicating a group of records output while the hash function value is continuously changed from the minimum value to the maximum value.

In this case, the group-by operation execution unit 109 performs a group-by operation using the records stored in the hashed list, and the run information stored in the run information storage unit.

According to the present invention, using either the auxiliary information list storage unit or the run information storage unit, the records are stored in the hashed list when the output unit 108 repeats an operation of continuously outputting the records as a block to continuous regions in the storage device with the hash function value continuously changed, for example, from the minimum value to the maximum value. The output operation is repeated until there are no records to be processed in the group-by process.

In the group-by processing system according to the present invention, the process of accessing a storage device can be performed at high speed by continuously outputting the records output corresponding to the hash function values in the block to a secondary storage device such as a hard disk, etc.

Figure 1B:
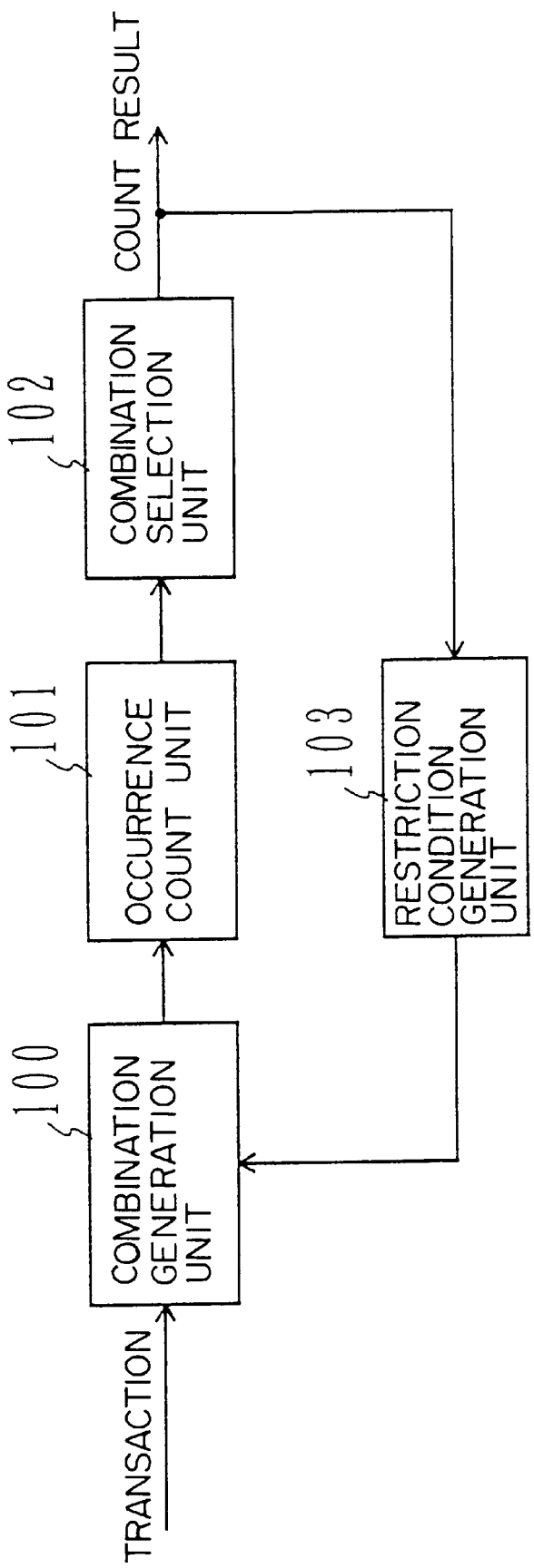
FIG. 1B is a block diagram showing the configuration according to the principle of the related data combination counting system of the present invention.

FIG. 1B is the block diagram showing the combination count system according to the present invention. In FIG. 1B, the combination count system obtains individual items or combinations of two or more items in a number of transactions containing one or more items, and a number of occurrences of individual items or the combinations of two or more items when the individual items or the combinations of two or more items satisfy a given condition of the number of occurrences in the transactions.

In FIG. 1B, a combination generation unit 100 outputs an item in each transaction when the individual item is to be obtained, and generates and outputs a combination of items satisfying a combination generation restriction condition when the combination of two or more items is obtained. The generation restriction condition is concerned to the number of occurrences of each item and/or subsets of items in the combination of two or more items, which should meet the given condition of the number of occurrences in the transactions.

An occurrence count unit 101 counts the occurrences, in all transactions, of the individual item or the combination of two or more items output by the combination generation unit 100 in, for example, a group-by process.

A combination selection unit 102 selects the individual item or the combination of two or more items which is output by the occurrence count unit 101 and satisfies the given condition of the number of occurrences, for example, more than or equal to a specified number of times.

A restriction condition generation unit 103 assigns the combination generation restriction condition to the combination generation unit 100 according to the selection result of the combination selection unit 102. The combination generation restriction condition can be represented by a bit map having '1' at a bit position corresponding to the item or combination of items appearing in the selection result of the combination selection unit 102.

In the count system according to the present invention, the combination generation and counting are processed in multiple steps. In the first step, individual items are generated and counted. In each subsequent step, one item longer combinations are generated and counted.

In the first processing step, the combination generation unit 100 retrieves each item from each transaction. The occurrences of each item are counted by the occurrence count unit 101. At this time, the combination generation restriction condition can not be applied since no combination generation restriction condition is given yet. All items in the transactions are output one by one from the combination generation unit 100, and the occurrences are counted.

The output of the occurrence count unit 101, that is, the count result of the number of occurrences of each item in the transactions is provided to the combination selection unit 102. The combination selection unit 102 selects, for example, the items whose number of occurrences is equal to or larger than a predetermined value.

The output result is provided to the restriction condition generation unit 103. The bit corresponding to an item contained in the output of the combination selection unit 102 is set to '1' in a bit map. The bit corresponding to an item that is not contained in the output remains set to '0'. Thus, the bit map is generated and is provided to the combination generation unit 100 as a generation restriction condition for the generation of combinations of two items in the next processing step.

In the second processing step, for each transaction, the combination generation unit 100 generates combinations of two items that satisfy the combination generation restriction condition. In this case, the restriction condition is that each item has the corresponding bit set to '1' in the bit map. These combinations of two items are output to the occurrence count unit 101. The occurrence count unit 101 counts the occurrences of the combinations of two items, and provides the result to the combination selection unit 102. The combination selection unit 102 selects and outputs combinations of two items meeting a given condition of the number of occurrences. The output result is provided to the restriction condition generation unit 103. The bits corresponding to each item and/or combination of two items contained in the output of the combination selection unit 102 are set to '1' in the bitmap which represents the combination generation restriction condition for the generation of the combination of three items in the next processing step.

For the processing of combinations of three items, first the combination generation unit 100 generates combinations of three items whose bits corresponding to each items and/or corresponding to each subset of two items are set to '1' in the bitmap which represents the restriction condition generated by unit 103. The generated combinations of three items are output and counted in the occurrence count unit 101. The output of the occurrence count unit 101 is provided to the combination selection unit 102, which only outputs those combinations of three items whose number of occurrences satisfies the specified number of occurrences.

By repeating similar processing steps, combinations of one item longer are generated, as in the examples shown in FIGS. 168 and 170 for the conventional SETM and Apriori algorithms. The process of the combination count system terminates when no combination of items is output from the combination selection unit 102.

The present invention shown in FIGS. 1A and 1B is summarized as follows. A group-by operation performs a specified operation, for example, average value computation, on records having the same key value of the record, efficiently accesses a secondary storage device, aims at performing the process at high-speed, and includes record storing unit 106 for temporarily storing the records; pointer storing unit 107 for storing pointers to the records stored in the record storing unit 106 at positions, each of which corresponds to a hash function value computed from the key value of the record; output unit 108 for outputting to the secondary storage device the records specified by the pointers in the pointer storing unit 107 corresponding to the hash function values; and group-by operation execution unit 109 for reading a list of output and hashed records, sorting the records by the key values of the records, and performing a group-by operation on the sorted records.

Concerning the combination generation and counting, the hash-table used in the conventional Apriori technology requires a memory capacity proportional to the number of individual items or combinations of items in a large itemset, and there is no way to prune unnecessary itemsets by only using a portion of the large itemsets that can be stored in a hash-table in the available memory. The only way to perform the efficient pruning of unnecessary candidate itemsets is to hold the whole set of large itemsets in a hash-table in memory. Therefore, in the conventional technology, when the volume of data to be processed is large, the large itemset is also large and the hash-table possibly exceeds the available memory capacity and thus, the pruning process cannot be performed. The pruning process according to the present invention is performed using one or more bit maps which represent an individual item or a combination of two or more items that exists in a large itemset. Since the bit map can represent items or a combination of two or more items using a single bit, it can improve the pruning effectiveness by enlarging the bit map size, or this size can be reduced in order to reduce the memory requirements. Thus the present invention can solve the above described problem of no pruning at all unless the whole set of large itemsets fits in an available memory.

Figure 2:
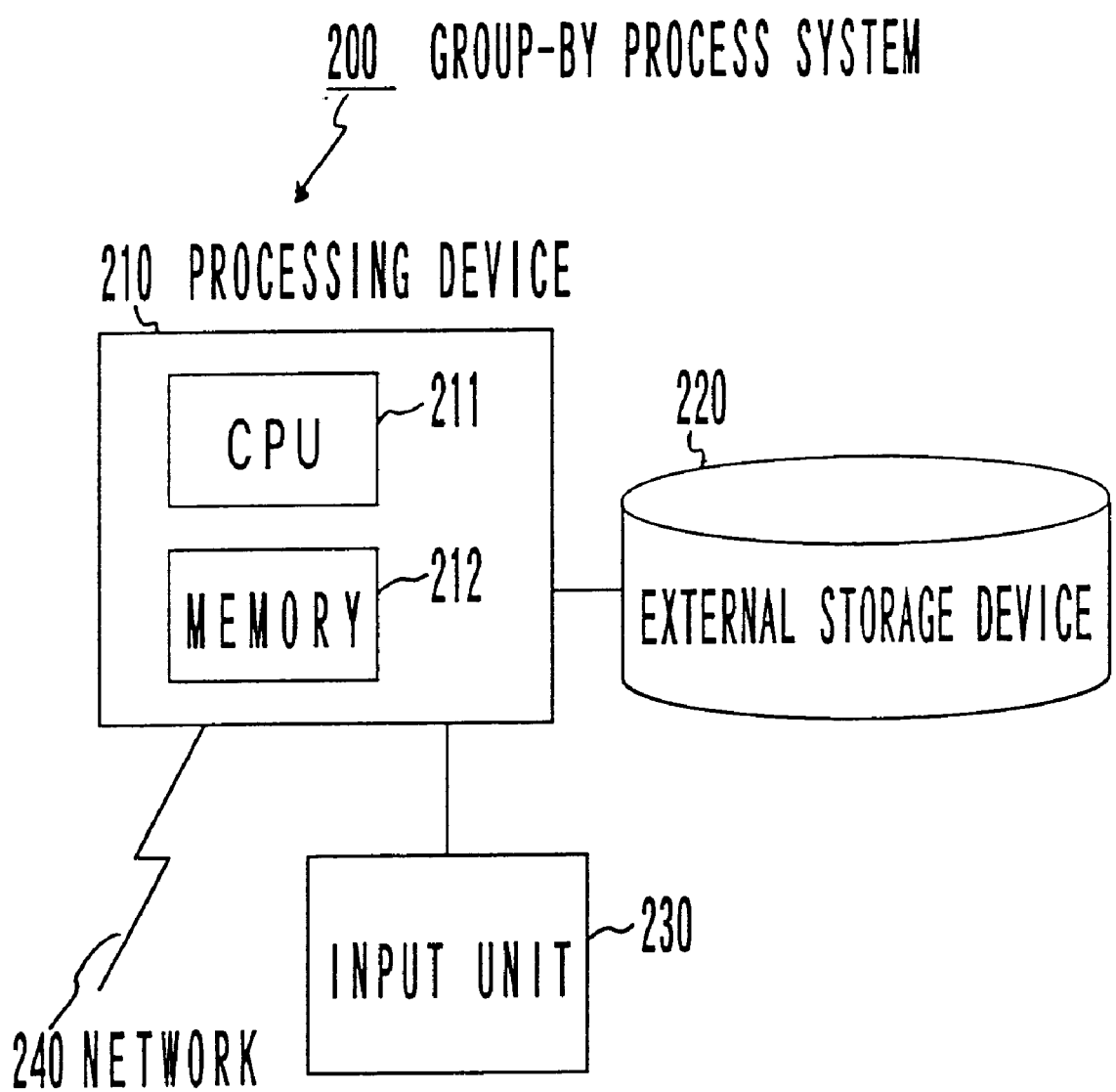
FIG. 2 shows a computer embodying the group-by processing system according to the present invention.

FIG. 2 shows the group-by processing system 200 for embodying the group-by processing system according to the present invention. An example of the group-by processing system comprises a processing device 210, an external storage device 220, an input unit 230, and a network 240.

The processing device 210 comprises a CPU 211 and memory 212. The CPU 211 performs a group-by operation. The memory 212 temporarily stores records to be processed in the group-by operation, and other necessary data. Furthermore, the memory 212 is loaded with a program for executing the group-by operation, and other programs such as an OS, etc.

The external (secondary) storage device 220 can be typically a hard disk, a floppy disk, an optical disk, etc., and stores records processed and to be processed in the group-by operation, etc. Furthermore, the external storage device 220 stores a program for executing the group-by operation, and other programs such as an OS, etc.

The input unit 230 is not required in the present invention, but can be used as necessary when an instruction involved in the group-by operation and a record to be processed are input.

The network 240 connects the group-by processing system 200 to another computer or network to transmit and receive necessary data, signals, etc.

The group-by processing system according to the present invention performs a group-by operation based on the result of a hash process. Described below is an embodiment of the group-by processing system according to the present invention by explaining a hash processing system and a group-by processing system.

Figure 3:
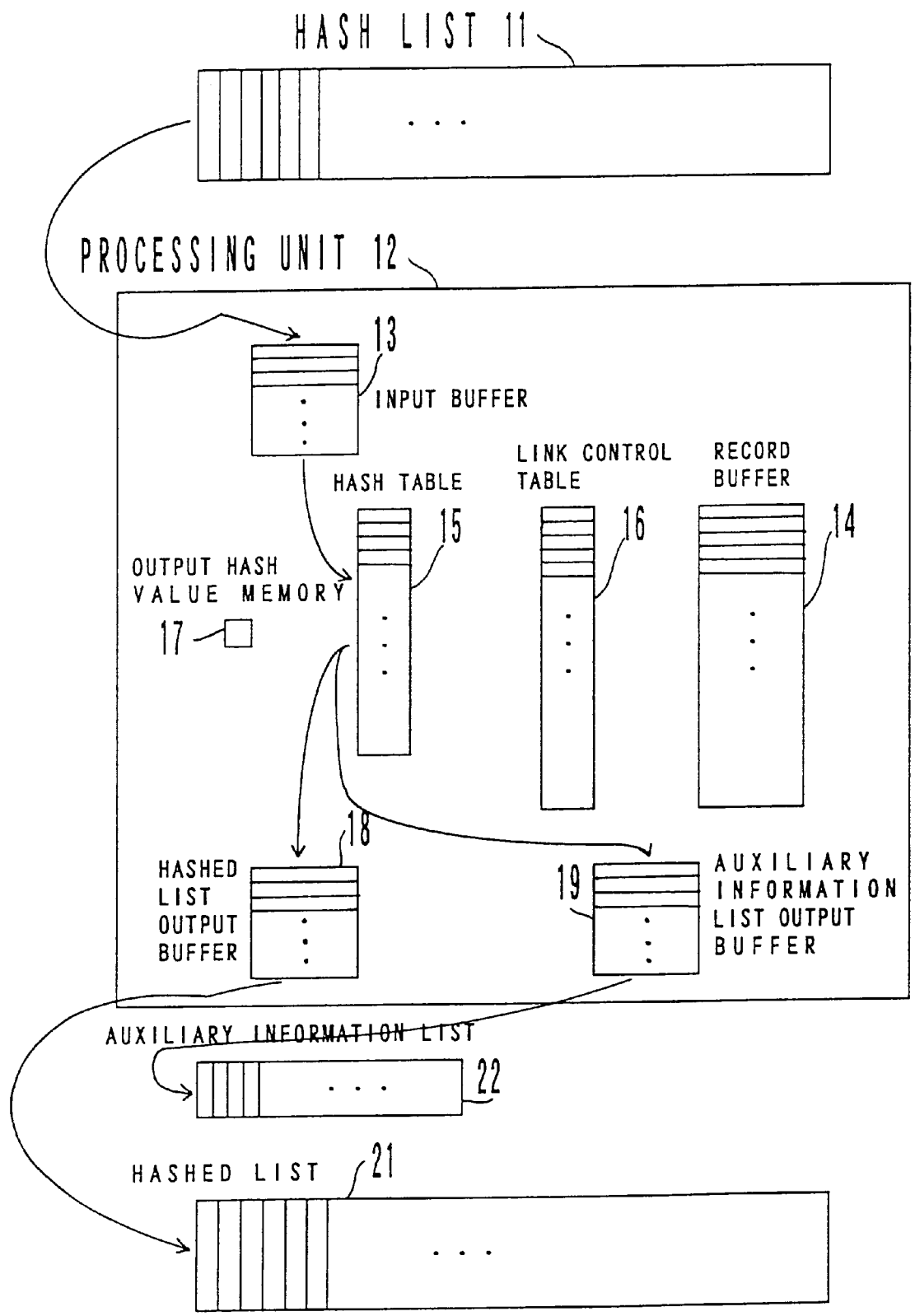
FIG. 3 shows the hash process according to the first embodiment of the group-by processing system.

FIG. 3 shows the hash system according to the first embodiment of the group-by processing system according to the present invention. The hash system comprises an input buffer 13, a record buffer 14, a hash table 15, a link control table 16, an output hash value memory 17, a hashed list output buffer 18, and an auxiliary information output buffer 19, as shown in FIG. 3.

The records to be hashed in the hash list 11 are read into the input buffer 13, and then stored in the record buffer 14.

Pointers each indicating the storing position of a record in the record buffer 14 are stored in the hash table 15 in association with a hash function value obtained by a calculation of the key value of the corresponding record. The link control table 16 is for controlling a link between records in the record buffer 14 having the same hash function value.

If the record buffer 14 becomes full, a record in the record buffer 14 is indicated by one of the pointers stored in the hash table 15 and is output to the hashed list output buffer 18. The pointer used in the output of the record is designated by an output hash function value which is determined from the output hash value memory 17. Every time a record is output to the hashed list output buffer 18 from the record buffer 14, another record stored in the input buffer 13 is read into the record buffer 14 from the input buffer 13.

After the record is output to the hashed list output buffer 18, another record in the record buffer 14 is indicated by a pointer designated by the next output hash value in the output hash value memory 17 and is stored in the hashed list output buffer 18.

When the hashed list output buffer 18 becomes full, all of the records stored in the output buffer 18 are output to the hashed list 21 as a block. Then, the start address of the block, which corresponds to a block number in the storing region of the secondary storage, and the minimum value and the maximum value of the hash function values corresponding to the records in the block, are stored in the auxiliary information output buffer 19 as an auxiliary information record. The contents of the auxiliary information output buffer 19 are output to the auxiliary information list 22.

Each time a record is output from the record buffer 14 to the hashed list output buffer 18, a record in the input buffer 13 is stored in the record buffer 14, and the operations described above are performed.

FIGS. 4 through 7 are flowcharts showing the hash process according to the first embodiment of the group-by processing system according to the present invention. In this example, when the record buffer 14 shown in FIG. 3 becomes full, a record is moved to the hashed list output buffer 18, and an empty region of the record buffer 14 is immediately filled with records from the input buffer 13. When the hashed list output buffer 18 becomes full, its contents are output to the hashed list 21 as data in one block, and auxiliary information is stored in the auxiliary information list output buffer 19. And the auxiliary information list output buffer 19 becomes full, its contents are output to the auxiliary information list 22.

When the process starts as shown in FIG. 4, a group of records are read from the hash list 11 to the input buffer 13 in step S1. In step S2, the leading record in the input buffer 13 is moved to an empty region in the record buffer 14. In step S3, a hash function value for a key value of the record is calculated. In step S4, the pointer of the record is stored in an entry of the hash table 15 which corresponds to the hash function value of the record. If a record having the same hash function value is already stored in the record buffer 14 and a pointer indicating the record is already stored in the hash table 15, the pointer indicating the newly entered record is stored in the entry of the hash table 15, and the pointer previously stored in the entry of the hash table 15 is moved into the entry of the link control table 16 corresponding to the entry in which the newly entered record is stored, thereby realizing the link to the newly entered record from the record already stored.

Then, it is determined in step S5 whether or not there is an empty region in the record buffer 14. If there is an empty region, it is determined in step S7 whether or not there is a record in the input buffer 13. If yes, the process goes back to step S2.

If it is determined in step S5 that there is no empty region in the record buffer, then an output process for moving the record in the record buffer 14 to the hashed list output buffer 18 is performed in step S6. After the output process has been completed, control is passed to the process in step S7. The details of the output process are explained by referring to FIG. 5. If it is determined in step S7 that there are no records in the input buffer 13, then it is determined in step S8 whether or not there is a record in the hash list 11. If yes, a group of records are read from the hash list 11 to the input buffer 13 in step S9, and the process goes back to step S2.

If it is determined in step S8 that there are no records in the hash list 11, then it is determined in step S10 whether or not there are any records remaining in the record buffer 14. If yes, the process goes back to step S10 after the output process in step S11 is performed. If it is determined in step S10 that there are no records in the record buffer 14, then the process terminates after the terminating process in step S12 is performed. The details of the terminating process are described by referring to FIG. 6.

Figure 5:
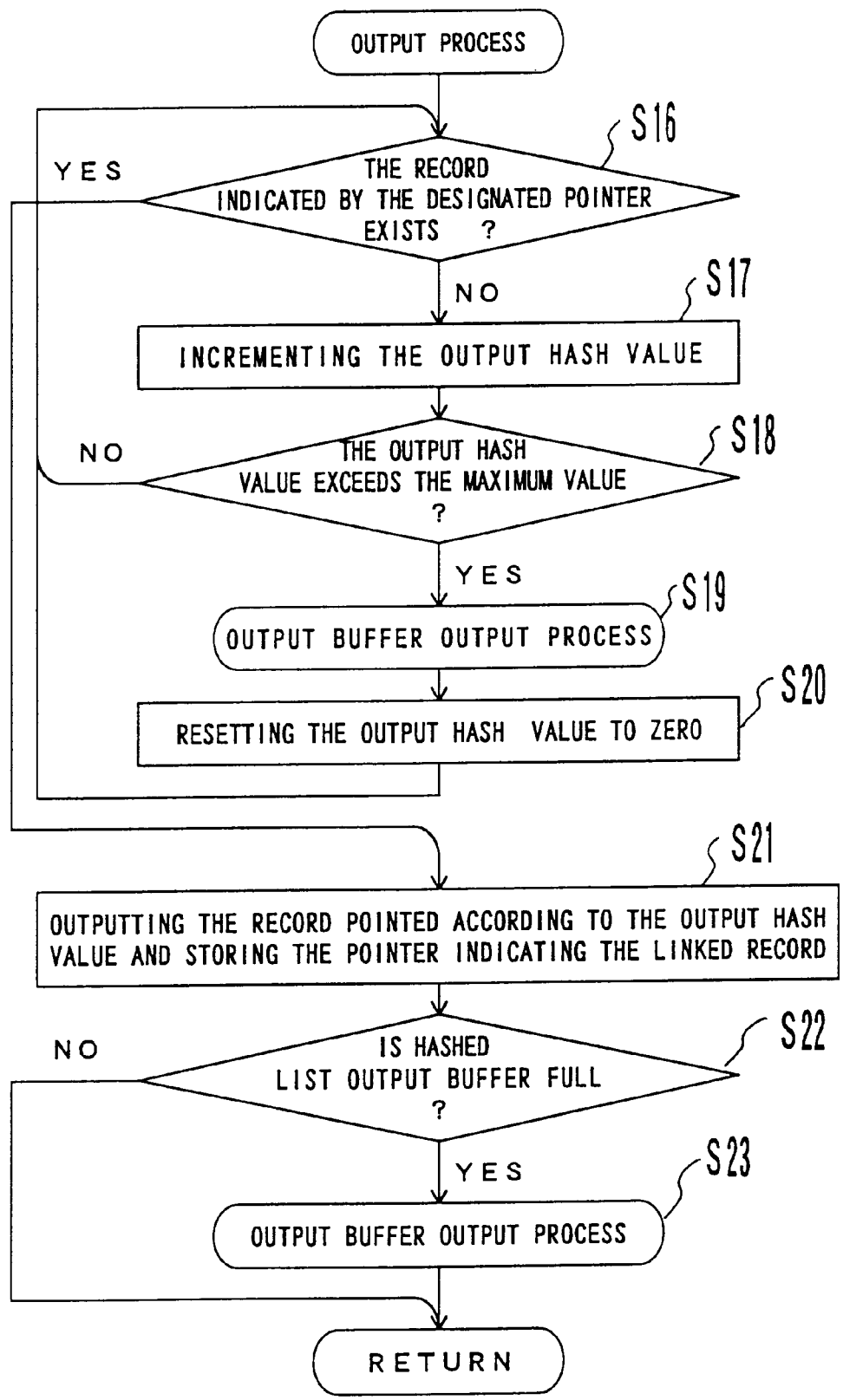
FIG. 5 is a flowchart showing the output process shown in FIG. 4.

FIG. 5 is a flowchart showing the output process in steps S6 and S11 shown in FIG. 4. As shown in FIG. 5, after starting the output process, in step S16, whether or not a record indicated by the pointer stored in the entry of the hash table 15 designated by the output hash value memory 17 exists in the record buffer 14 is determined. If there is no record indicated in the record buffer 14, in step S17, the output hash function value in the output hash value memory 17 is incremented. Then, whether or not the output hash function value exceeds the maximum value of the hash function value is determined in step S18, and the process goes back to step S16 if the output hash function value does not exceed the maximum value. For example, when the hash function value is set to be the remainder from the division of the key value of the record by twenty (20), the maximum value is nineteen (19), and whether the output hash function value exceeds nineteen is determined in step S18.

If the output hash function value exceeds the maximum value of the hash function value in step S18, an output buffer output process, in which all of the records stored in the hashed list output buffer 18 are output to the hashed list 21 as a block in step S19, in order to maintain the order of the records in the block according to the hash function value, is performed. Then, the output hash function value is reset to zero in step S20 and the process goes back to step S16. The output buffer output process of step S19 will be described in detail referring to FIG. 7.

If it is determined that the record indicated by the pointer which is in the entry designated by the output hash function value, exists in the record buffer 14 in step S16, the record is moved into the hash list output buffer 18 from the record buffer 14 in step S21. If a record linked to the record moved into the hashed list output buffer 18 exists in the record buffer 14, the pointer indicating the record linked to the output record is stored in the entry corresponding to the present hash function value using the link control table 16. After that, whether or not the hashed list output buffer 18 is full is determined in step S22. If the hashed list output buffer 18 is not full in step S22, the process goes to step S7 or S10 shown in FIG. 4. If the hashed list output buffer 18 is full, after the output buffer process of step S23, the process also goes to step S7 or S10 shown in FIG. 4.

Figure 6:
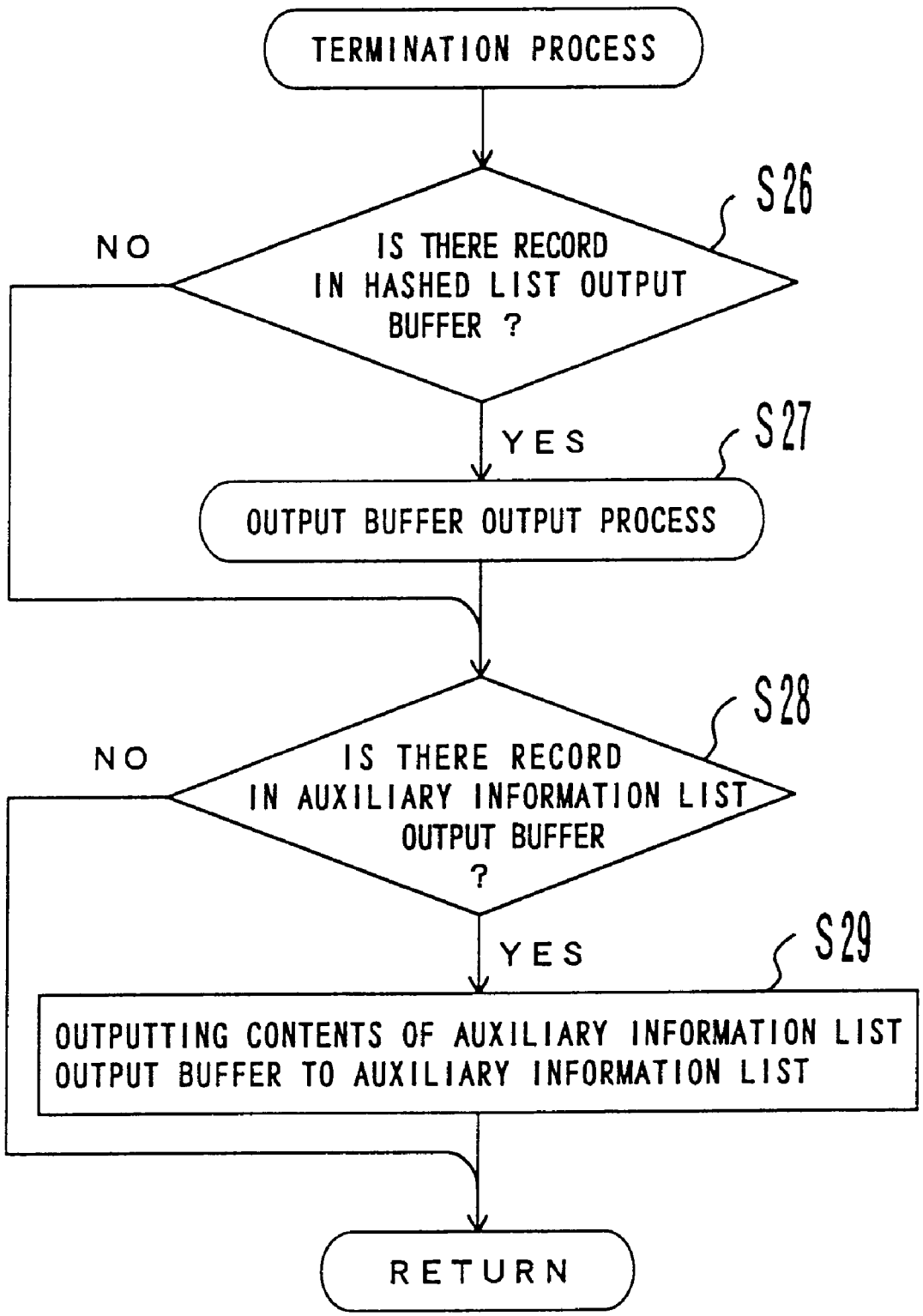
FIG. 6 is a flowchart showing the termination process shown in FIG. 4.

FIG. 6 is a flowchart showing the process in step S12 shown in FIG. 4, that is, the terminating process. When the process starts as shown in FIG. 6, it is first determined in step S26 whether or not there is a record in the hashed list output buffer 18. If there is a record, an output buffer output process for outputting the record to the hashed list 21 in step S27 is performed, and then the process in step S28 is performed. If there are no records remaining in the hashed list output buffer 18, control is immediately passed to step S28. In step S28, it is determined whether or not there is a record remaining in the auxiliary information list output buffer 19. If yes, the contents are output to the auxiliary information list 22 in step S29, and control is returned to the process shown in FIG. 4. If not, control is immediately returned to the processes shown in FIG. 4.

Figure 7:
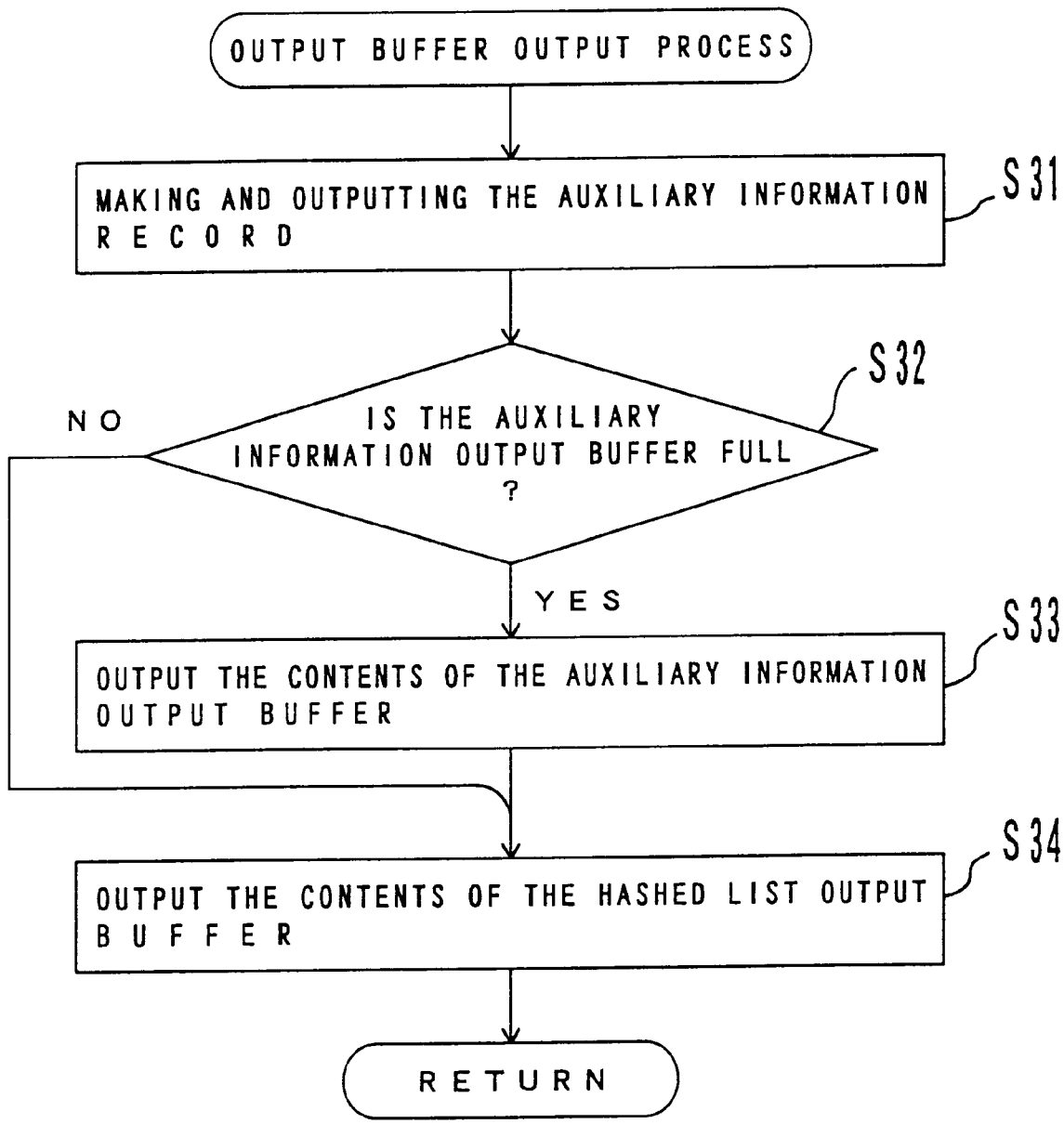
FIG. 7 is a flowchart showing the output buffer output process shown in FIGS. 5 and 6.

FIG. 7 shows the output buffer output process of step S19, step S23 and step S27. After starting the output buffer output process, the auxiliary information record is made and stored in the auxiliary information output buffer 19 in step S31. The auxiliary information record includes the start address of a block in the hashed list 21 in which the records output from the hashed list output buffer 18 are stored, and the minimum value and maximum value of the hash function values of the records in the block. The minimum value and the maximum value correspond to the hash function values of the first record and the last record in the block, respectively. Next, whether or not the auxiliary information output buffer 19 is full is determined in step S32. If the auxiliary information output buffer 19 is full in step S32, all of the auxiliary information records in the auxiliary information output buffer 19 are output to the auxiliary information list 22 (step S33), and the process goes to step S34. If the auxiliary information output buffer 19 is not full in step S32, the process directly goes to step S34, in which the contents of the hashed list output buffer 18 are output to the hashed list 21. After the step S34, the process returns to one of the steps of step S20 shown in FIG. 5, steps S7 or S10 shown in FIG. 4, or step S28 shown in FIG. 6.

Figure 8A:
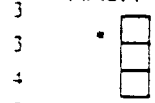
FIGS. 8A through 8O show the proceedings of the hash process according to the first embodiment of the group-by processing system.
Figure 8B:
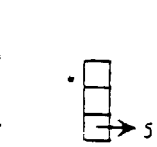
Figure 8C:
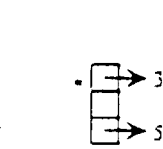
Figure 8D:
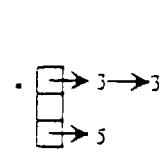
Figure 8E:
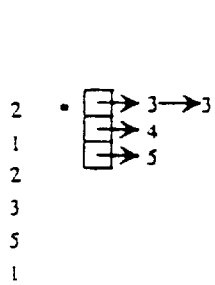
Figure 8F:
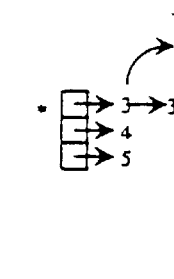
Figure 8G:
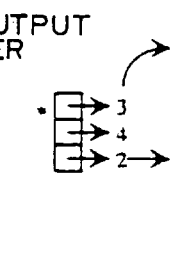
Figure 8H:
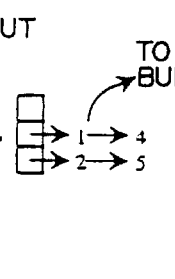
Figure 8I:
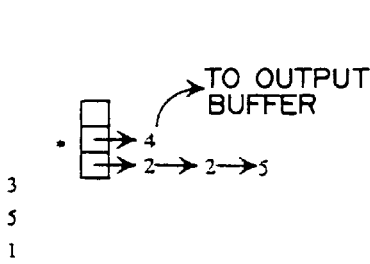
Figure 8J:
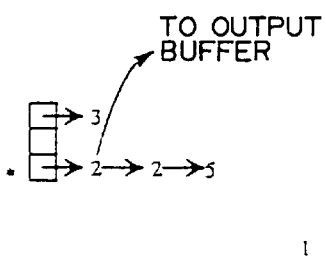
Figure 8K:
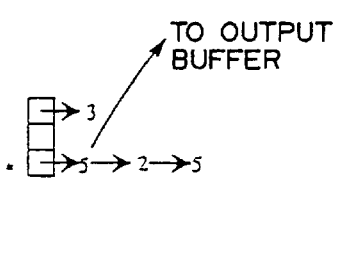
Figure 8L:
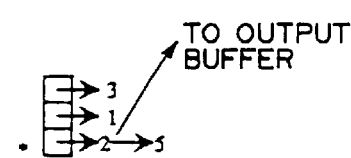
Figure 8M:
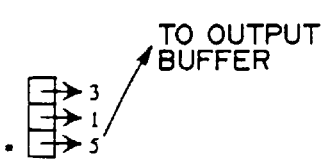
Figure 8N:
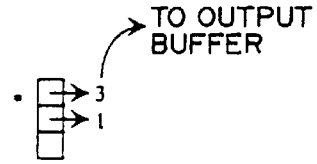
Figure 8O:
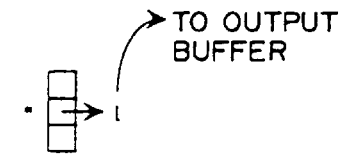

FIGS. 8A through 8O show the steps of the hash process according to the flowcharts shown in FIGS. 4 through 7 performed on a group of records to be processed in a group-by operation described by referring to FIGS. 165A through 165F. In FIG. 8, the hash table shows the hash function values 0, 1, and 2 sequentially from the top. The mark * on the left indicates the contents (which hash function value) of the output hash value memory 17 shown in FIG. 3.

FIG. 8B shows the first record which is in the group of records to be processed in a group-by operation shown in FIG. 8A and is stored in the record buffer 14. That is, the hash function value for the first record of 5 is 2, and a pointer pointing to the record '5' stored in the record buffer 14 from the entry of 2 in the hash table is connected.

FIG. 8C shows the state in which the next record '3' is connected to the entry of the value 0 of the hash function. FIG. 8D shows the state in which the next record '3' is further connected to the entry of the hash function value 0 in the hash table. Thus, if there are a plurality of records pointed to from one entry of a hash table, the link among the plurality of records can be managed by the link control table 16 shown in FIG. 3. The details are described in a previous patent application by the Applicant as follows.

Japanese Laid open Patent Publication Hei 8129551 (published on May 21, 1996)

Title of the Invention: Hash System

FIG. 8E shows the state in which the next record '4' is pointed to from the entry having the hash function value of 1 in the hash table. As described above, if the record buffer 14 has the capacity for four records, then the record buffer is full at this point.

As shown in FIG. 8F, one record, that is, 3 in this example, is output from the record buffer 14 to the hashed list output buffer 18. The record output at this point has a hash function value, that is, 0 in this example, as the contents of the output hash value memory 17.

FIG. 8G shows the state in which the next record '2' is connected to the entry of 2 in the hash table. Since the record buffer 14 is full and the value of the output hash value memory 17 is 0 at this point, the record '3' connected to the entry of 0 in this example is output to the hashed list output buffer 18.

FIG. 8H shows the state in which the next record '1' is connected to the entry of 1 in the hash table. At this time, a record to be output to the hashed list output buffer 18 is a record pointed to from the entry of 1 in the hash table, that is, the record '1' which has just been stored in the record buffer 14 from the input buffer 13. This is caused by incrementing the contents of the output hash value memory 17 because no records are connected to the entry of the value of the output hash value memory 17, that is 0, after the record '3' connected to the entry is output at the point shown FIG. 8G.

Figure 9:
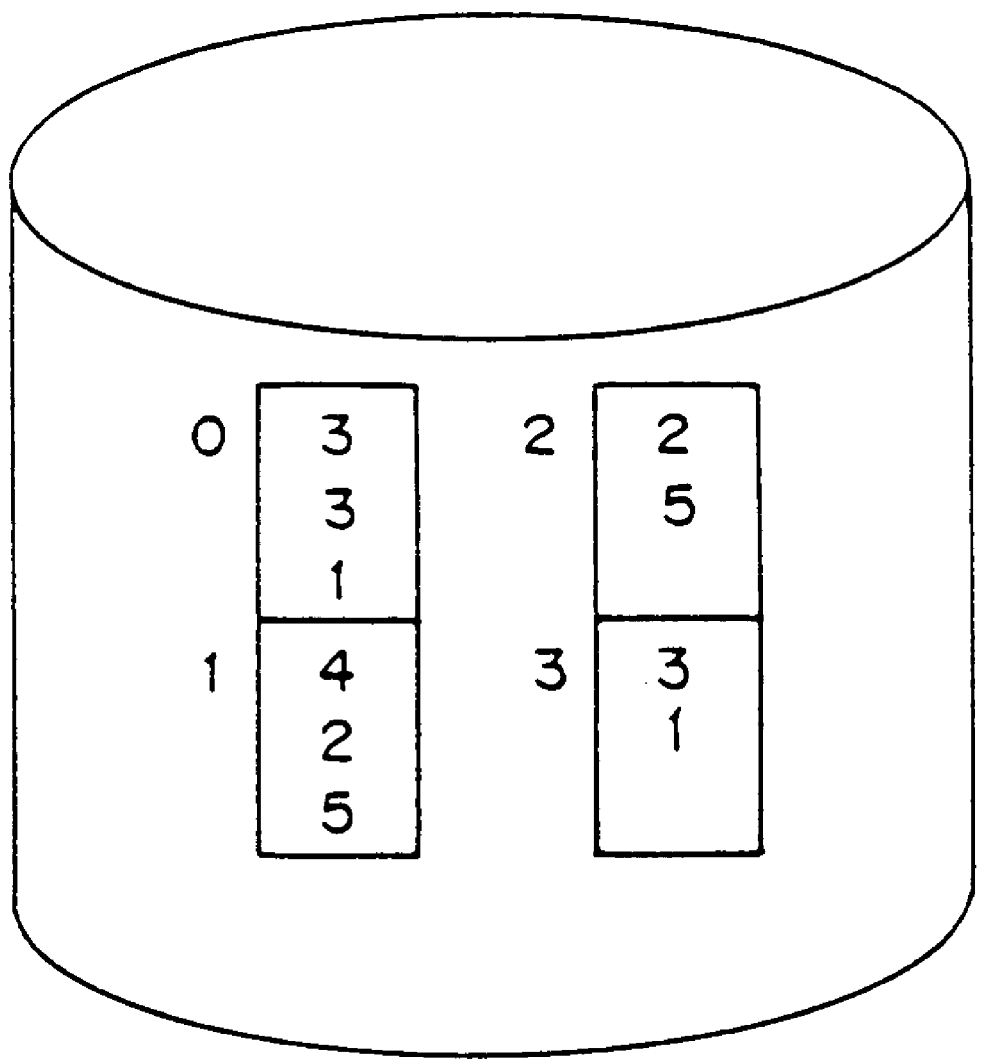
FIG. 9 shows the hashed list obtained as a result of the hash process according to the first embodiment of the group-by processing system.

The subsequent processes are similarly performed. Each time the hashed list output buffer 18 shown in FIG. 3 becomes full, the contents are output to the hashed list 21 in the secondary storage device. FIG. 9 shows the contents of the hashed list finally generated in the secondary storage device. Two records are stored for block number 2 because the output buffer output process, that is, the process in step S19 is performed when it is determined in step S18 shown FIG. 5 that the output hash value has exceeded the maximum hash function value. The auxiliary information list corresponding to FIG. 9 indicates [0,0,1], [1,1,2], [2,2,2], and [3,0,1].

Figure 10:
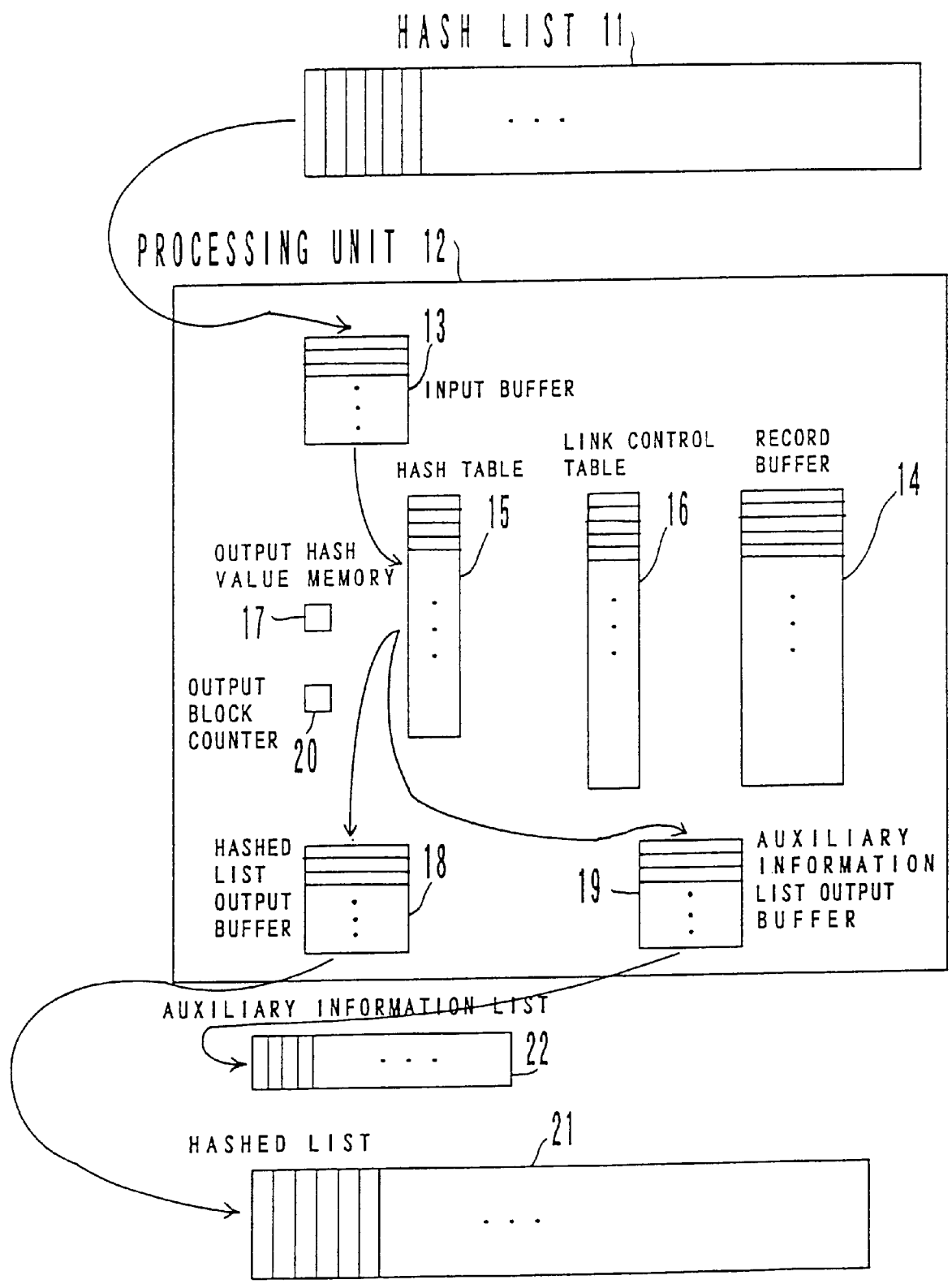
FIG. 10 shows the hash process according to the second embodiment of the group-by processing system.

The hash process according to the second embodiment of the group-by processing system is described above by explaining the last half of the process according to the first embodiment of the group-by processing system, that is, the group-by operation using a result of the hash process. FIG. 10 shows the hash process according to the second embodiment. When it is compared with FIG. 3 showing the first embodiment of the present invention, it is different in that an output block counter 20 is provided in the processing unit 12. In the first embodiment, an auxiliary information record includes a block number, a minimum hash function value and a maximum hash function value of a record in the block. In the second embodiment, an auxiliary information record includes a block number, a minimum hash function value of a record in the block, and a generation order number of the auxiliary information record, that is, a generation order number of an output block. The contents and the sorting of auxiliary information records are described later.

The flowchart of the hash process according to the second embodiment is almost the same as FIGS. 4 through 7, but a part of the output buffer output process in FIG. 7 is different as shown in FIG. 11. In FIG. 11, an auxiliary information record is generated in step S36 with a set of a hash function value of the leading record of the hashed list output buffer 18, a count value of the output block counter 20, and an address in the hashed list at which the contents of the hashed list output buffer 18 are to be output. The generated record is stored in the auxiliary information list output buffer 19. Then, when it is determined in step S37 that the auxiliary information list output buffer 19 is full, the contents are output to the auxiliary information list 22 in step S38. Then the count value of the output block counter 20 is incremented in step S39, the contents of the hashed list output buffer 18 are output to the hashed list 21 in step S40, and control is returned to the starting point. If the auxiliary information list output buffer 19 is not full, then the process in step S38 is not performed.

Before describing the last half process of the first and the second embodiments, that is, the group-by operation, the process of sorting records in an auxiliary information list is described first. In the first and second embodiments, the group-by operation is performed after sorting records in the auxiliary information list generated in the hash process.

Generally, in sorting technology, a stable sort refers to a sorting operation through which the order of data having the same key among input data is maintained even after the sorting operation. That is, in a stable sorting process, the relative order of the records having the same key remains unchanged before and after the sorting operation. The stable sort belongs to one category in the sorting technology, and not all sorting operations are stable.

When data in an auxiliary information list is sorted, an appropriate sorting process should be selected. To select an ordinary sorting process without being limited to a stable sort, the data of a block number and a minimum hash function value is not sufficient as the contents of an auxiliary information, but a maximum hash function value or the generation order number of the auxiliary information record are required as the third data as described above by referring to the first and second embodiments.

When a method of ensuring a stable sort can be used as a method of sorting data in an auxiliary information list, the information to be assigned to auxiliary information can be limited to two pieces of data, for example, a block number and a minimum hash function value. When such a stable sort is used, the size of an auxiliary information can be reduced, but the system of sorting data in auxiliary information list is limited to a stable sort only.

If a stable sort is used as a system of sorting data in an auxiliary information list and if the minimum hash function value in the auxiliary information record is used as a key to sort auxiliary information records, then the order in the auxiliary information list after the sorting operation can be kept the same as the order in the run before the sorting operation.

On the other hand, when an ordinary sorting method is used without limiting a system of sorting data in an auxiliary information list to a stable sort only, a maximum hash function value or a generation order number of an auxiliary information record is assigned as the third information in the auxiliary information. Thus, a minimum hash function value is used as the first key, and a maximum hash function value or a generation order number of an auxiliary information record is used as the second key when a sorting operation is performed. As a result, the order of data in the auxiliary information list after the sorting operation can be the same as the order in the run before the sorting operation. The maximum hash function value or the generation order number of an auxiliary information record as the third information can be assigned as auxiliary information without any problem for a stable sorting operation.

A sorting operation for an auxiliary information list can be performed by providing an auxiliary information list sort device in the processing unit 12 shown in FIG. 3. When a stable sort is ensured, the contents of the auxiliary information are read in an auxiliary information list sort device, a start hash function value is used as a key when a sorting operation is performed, and the sort result is output as a sorted auxiliary information list.

The processes of an operation of sorting data in an auxiliary information list depend first on whether or not the auxiliary information list sort device ensures a stable sort, second on whether or not the auxiliary information list has already been output to a secondary storage device, and third on whether or not all the auxiliary information list output to the secondary storage device can be stored in the memory available by the auxiliary information list sort device. When the auxiliary information list has not been output to the secondary storage device, data can be sorted in the auxiliary information list output buffer 19, that is, in the main memory. The process of sorting data in an auxiliary information list can be performed according to any of the six process flowcharts shown in FIGS. 12 through 17.

Figure 12:
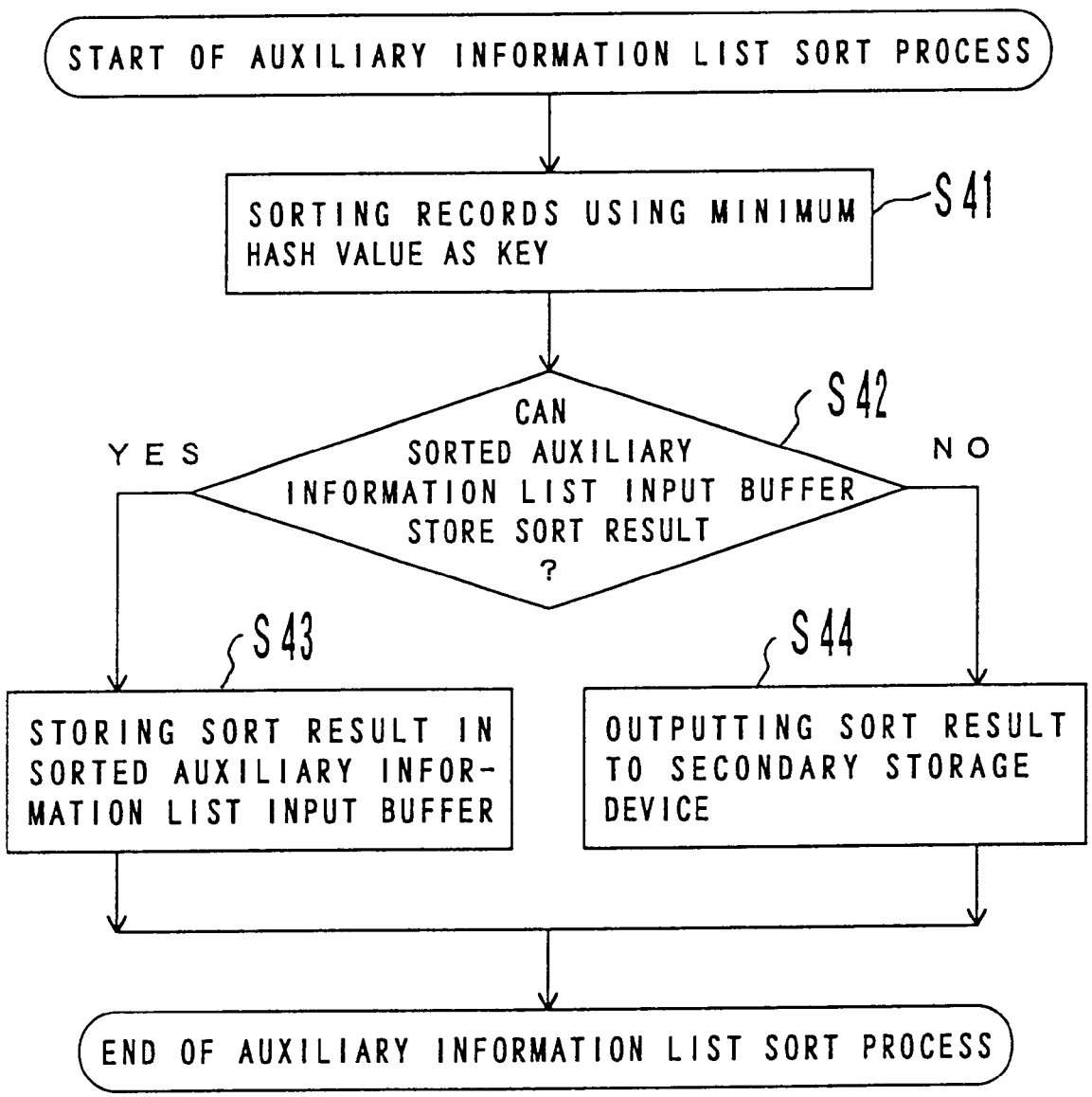
FIG. 12 is a flowchart showing the auxiliary information list sort process (first method)

FIG. 12 is a flowchart showing the process (first method) of sorting data in an auxiliary information list. The flowchart shows the case where a stable sort is ensured, and the auxiliary information list has not been output to a secondary storage device. In this case, the sorting operation is performed in step S41 using a reference hash function value as a key. In step S42, it is determined whether or not the result of the sorting process can be stored in the auxiliary information list input buffer. If yes, the sort result is stored in the input buffer in step S43. If not, the sort result is output to the secondary storage device in step S44, and the process terminates. The sorted auxiliary information list input buffer is provided in the processing unit 12 shown in FIG. 3, that is, the main memory. Since the capacity of the main memory is normally not so large, the determination is made in step S42.

Figure 13:
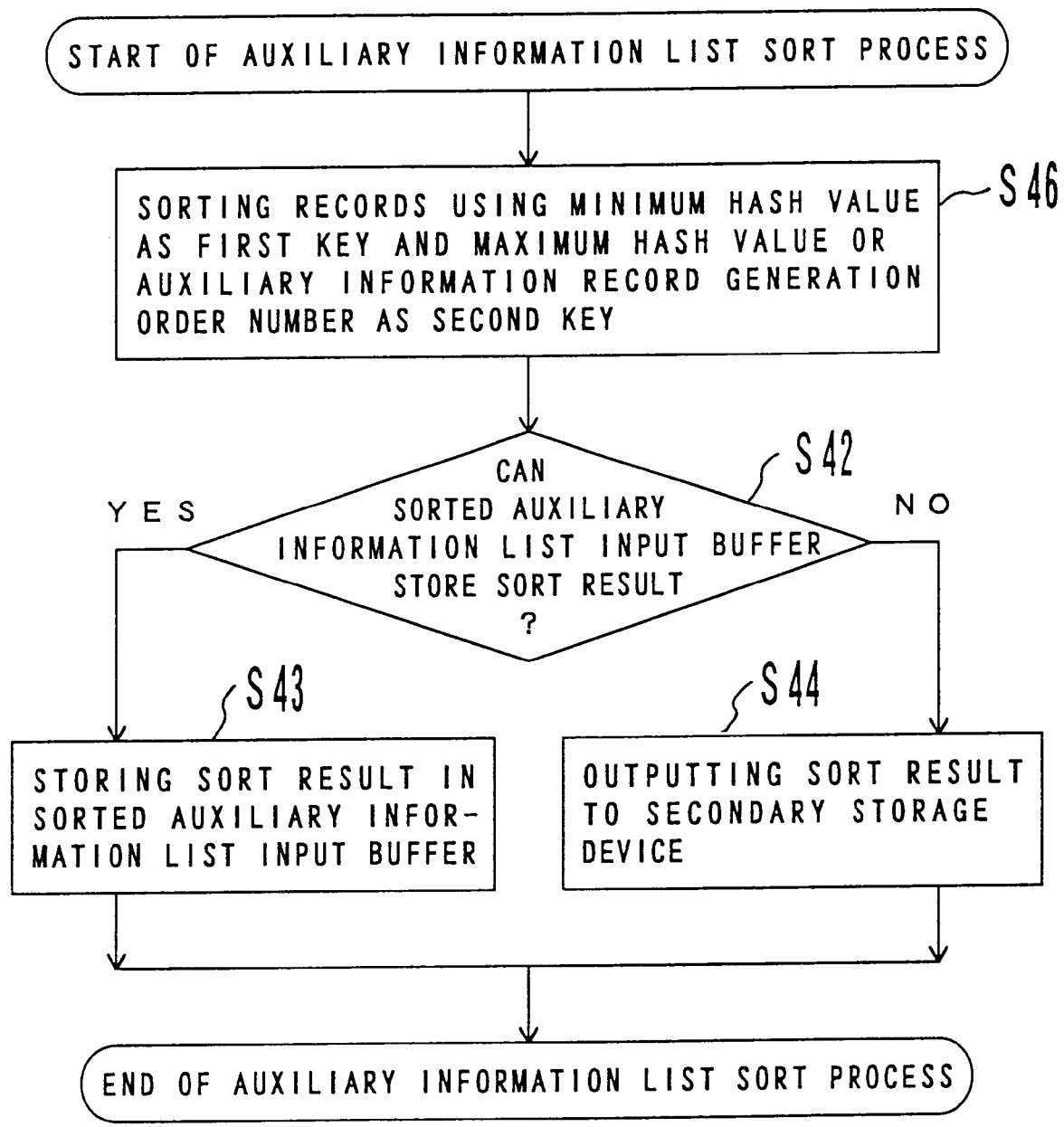
FIG. 13 is a flowchart showing the auxiliary information list sort process (second method)

FIG. 13 is a flowchart showing the process (second method) of sorting data in an auxiliary information list. The flowchart shows the case where a stable sort is not ensured, and the auxiliary information list has not been output to a secondary storage device. In this case, a minimum hash function value is used as the first key, and a maximum hash function value or a generation order number of an auxiliary information record is used as the second key when a sorting operation is performed in step S46. Then, as shown in FIG. 12, the processes in steps S42 through S44 are performed, and the entire process terminates.

Figure 14:
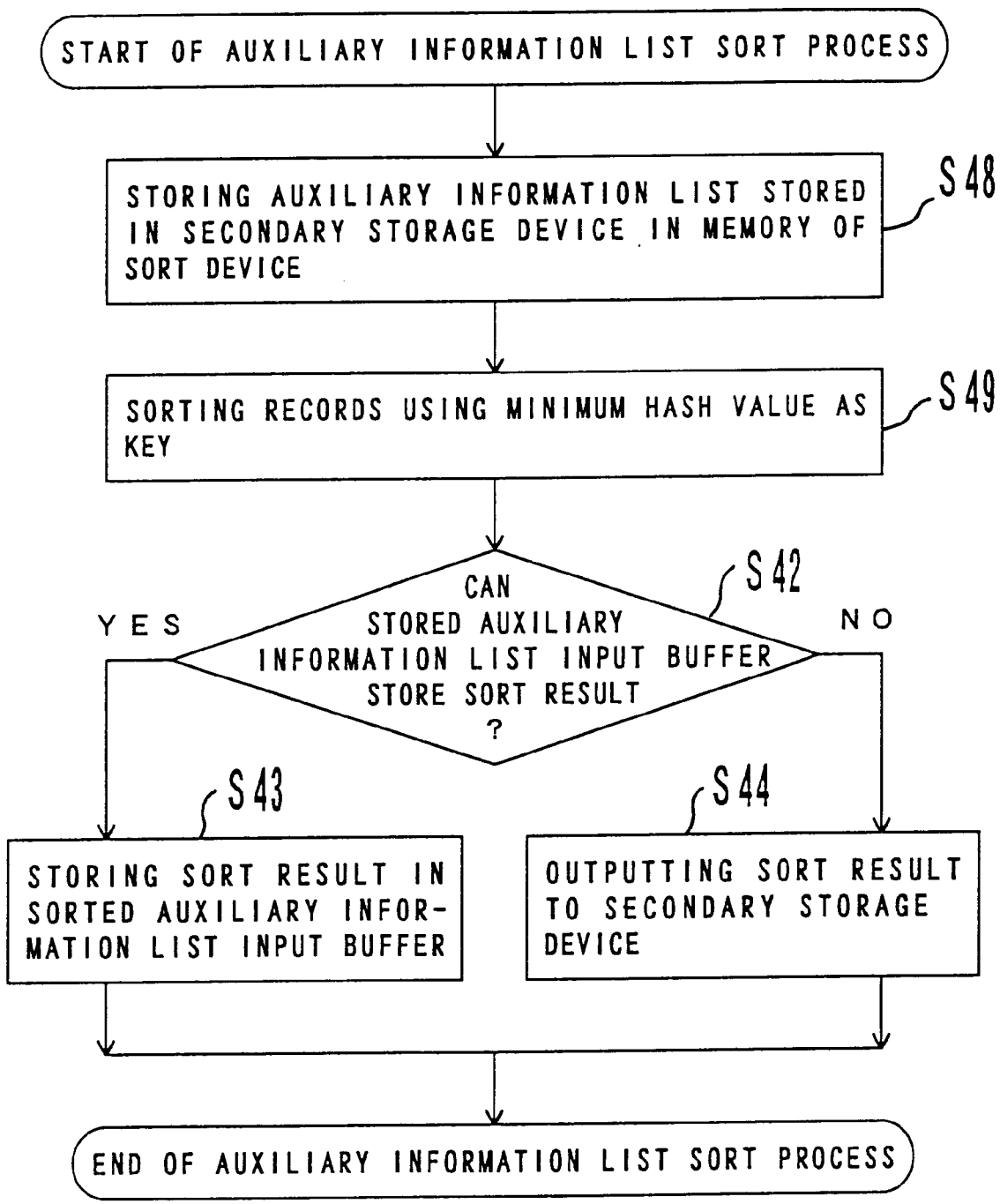
FIG. 14 is a flowchart showing the auxiliary information list sort process (third method)

FIG. 14 is a flowchart showing the process (third process) of sorting data in an auxiliary information list. FIG. 14 shows that a stable sort is ensured, an auxiliary information list has been output to a secondary storage device, and the output auxiliary information list can be all stored in the memory available by an auxiliary information list sort device. In this case, the auxiliary information list stored in the secondary storage device is loaded in the memory of the sort device in step S48, and a sorting operation is performed using a minimum hash function value as a key in step S49. Then, the processes in steps S42 through S44 are performed similarly as shown in FIG. 12, thereby terminating the entire process.

Figure 15:
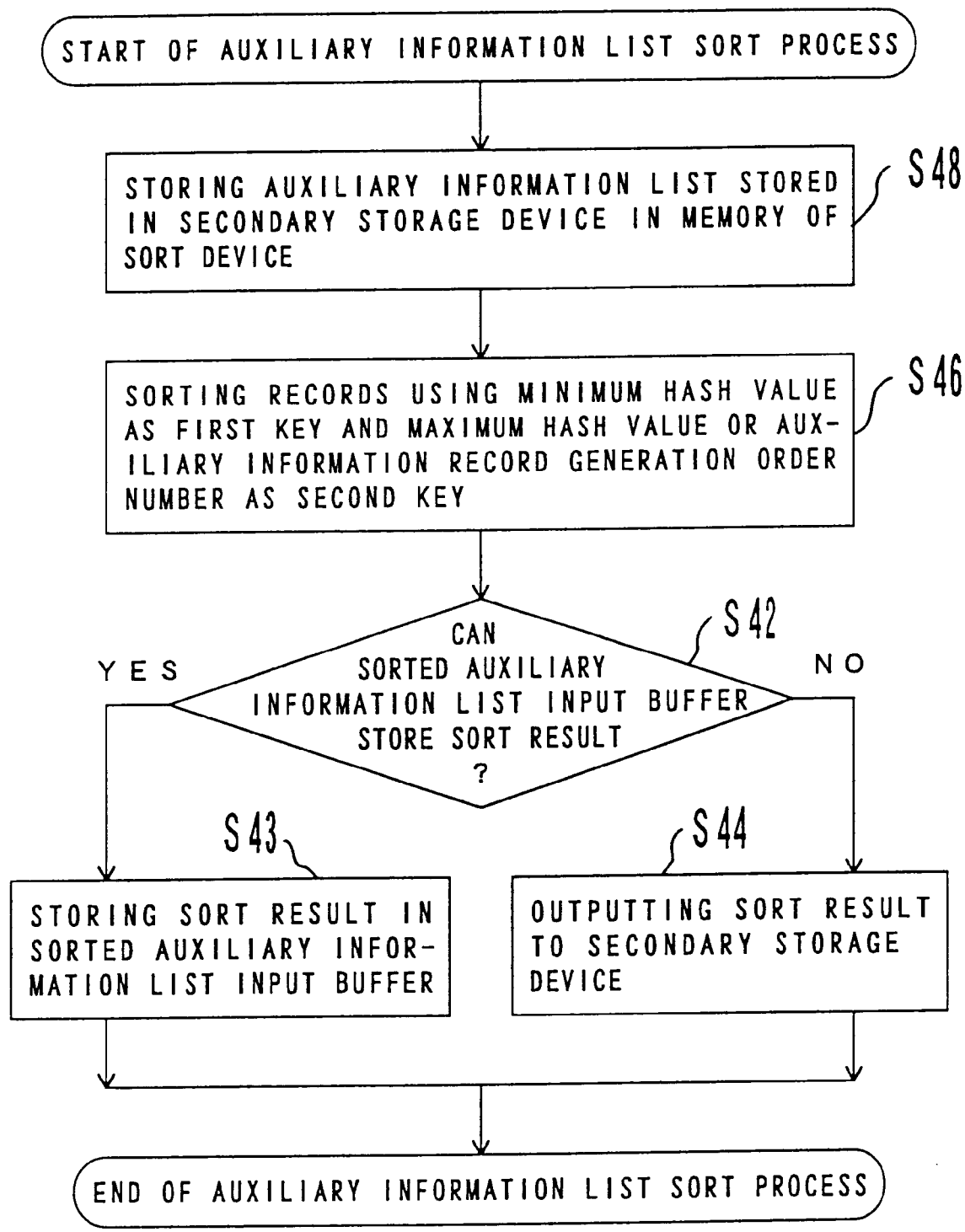
FIG. 15 is a flowchart showing the auxiliary information list sort process (fourth method)

FIG. 15 is a flowchart showing the process (fourth process) of sorting data in an auxiliary information list. FIG. 15 shows that a stable sort is not ensured, an auxiliary information list has been output to a secondary storage device, and all the output auxiliary information list can be stored in the memory available by an auxiliary information list sort device. In this case, as shown in FIG. 14, after the auxiliary information list is loaded in the memory in step S48, a sorting operation is performed in step S46 as shown in FIG. 13, and the processes in steps S42 through S44 are performed, thereby terminating the entire process.

Figure 16:
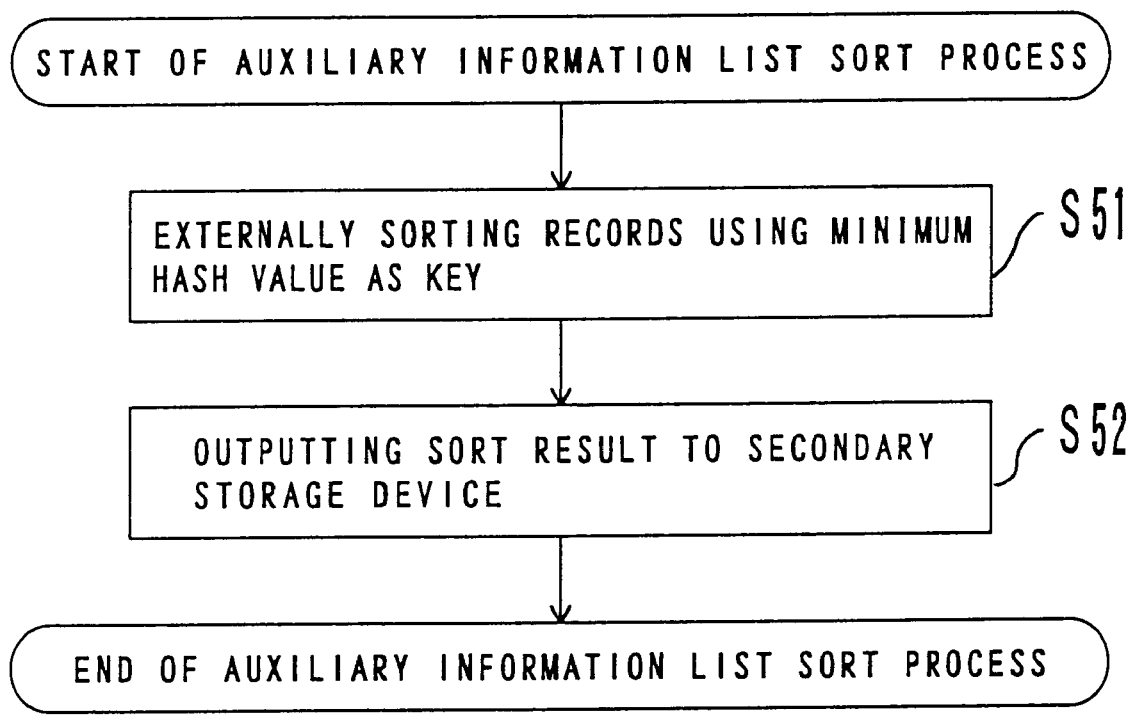
FIG. 16 is a flowchart showing the auxiliary information list sort process (fifth method)

FIG. 16 is a flowchart showing the process (fifth process) of sorting data in an auxiliary information list. FIG. 16 shows that a stable sort is ensured, an auxiliary information list has been output to a secondary storage device, and the output auxiliary information list cannot be completely stored in the memory available by an auxiliary information list sort device. In this case, an external sorting operation is performed using a minimum hash function value as a key in step S51. In step S52, the sort result is output to a secondary storage device, thereby terminating the entire process. In this case, since an auxiliary information list is so large that an external sorting operation is required, the determination in step S42 shown in FIG. 12 cannot be made as to whether or not the auxiliary information list input buffer can store the sort result. In step S52, the sort result is immediately output to the secondary storage device.

Figure 17:
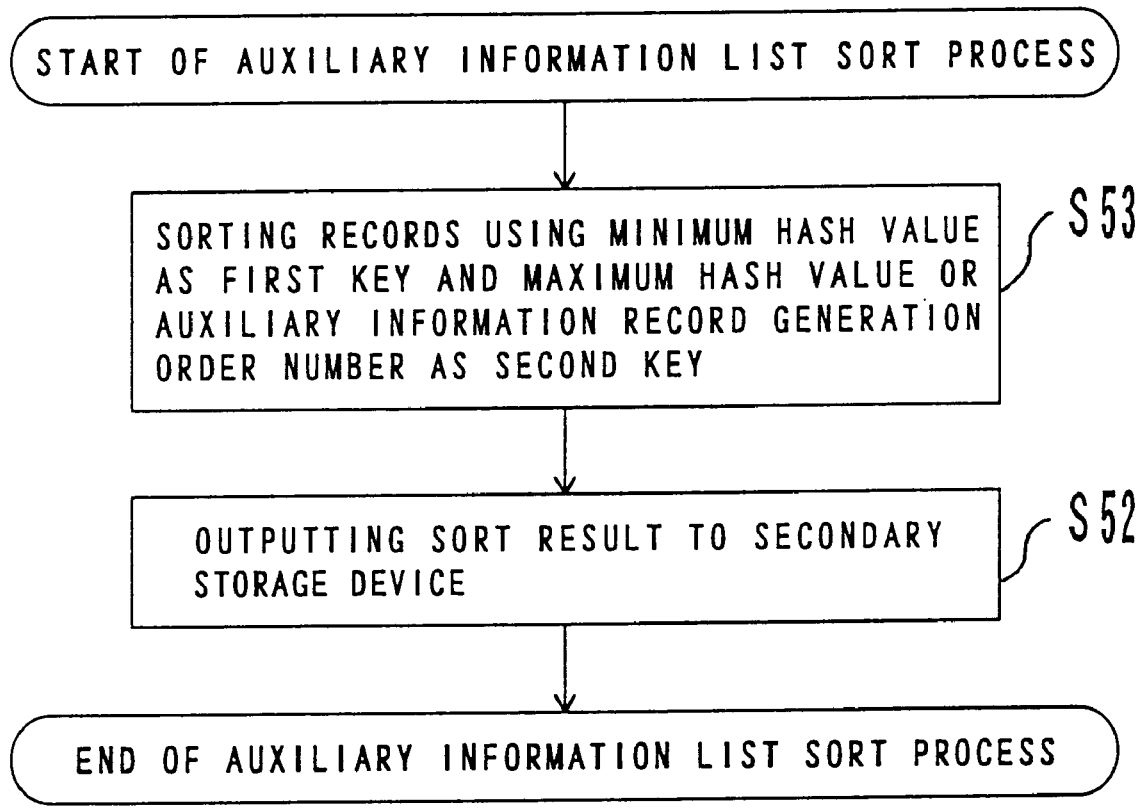
FIG. 17 is a flowchart showing the auxiliary information list sort process (sixth method)

FIG. 17 is a flowchart showing the process (sixth process) of sorting data in an auxiliary information list. This process is different from the process shown in FIG. 16 only in that a stable sort is not ensured. In this case, an external sort is performed using a minimum hash function value as the first key and a maximum hash function value or an auxiliary information record generation order number as the second key in step S53, and the sort result is output to a secondary storage device in step S52. Thus, the entire process terminates.

Figure 18:
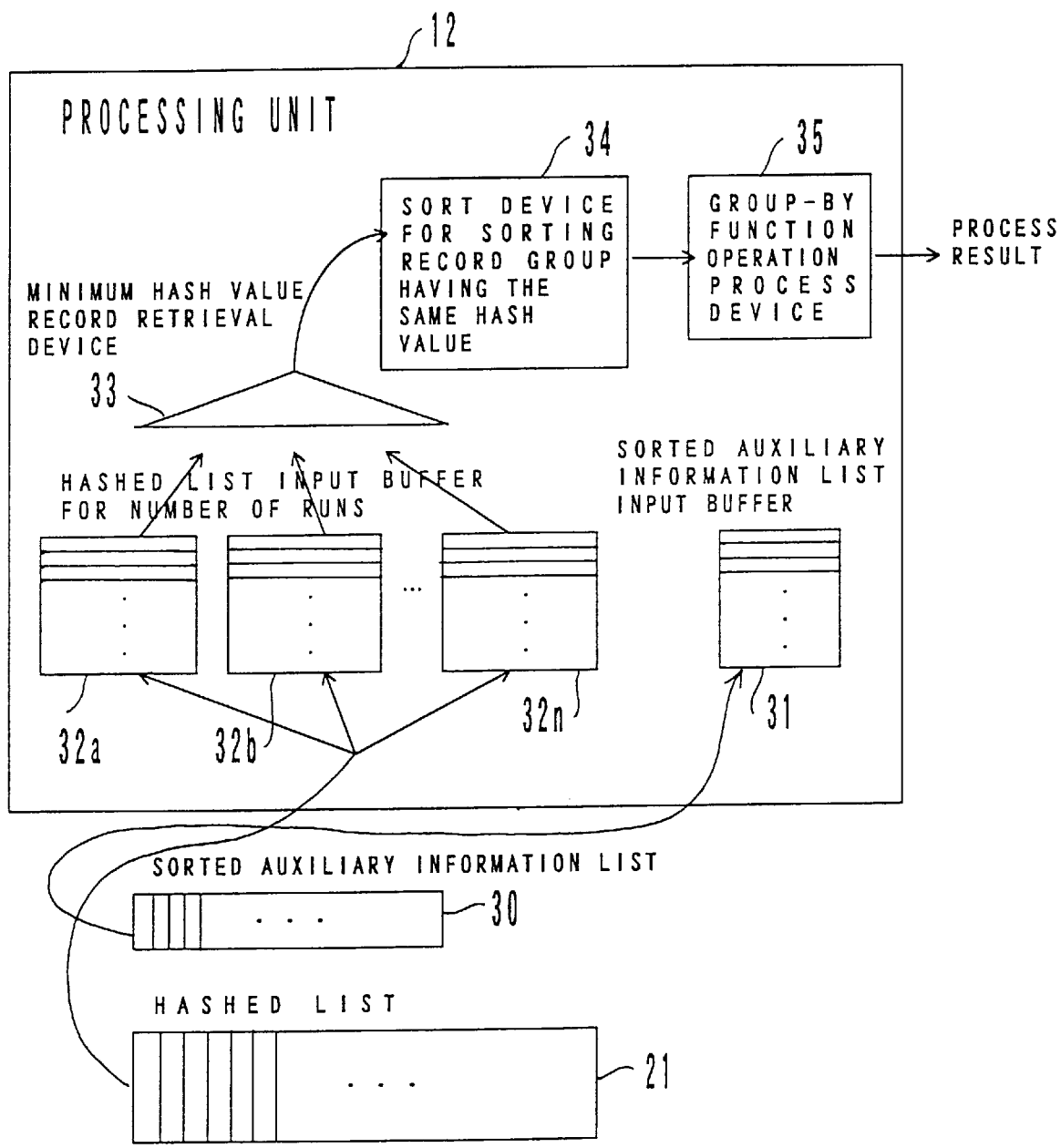
FIG. 18 shows the entire group-by function process according to the first and second embodiments of the group-by processing system.

The process of sorting an auxiliary information list is performed as described above. Described below is the latter half process of the first and the second embodiments, that is, a group-by operation based on a result of a hash process. Since the last half of the process, that is, a group-by operation, is a part of the group-by processing system according to the present invention, it is hereinafter referred to as a group-by function process. FIG. 18 shows the outline of the group-by function process. In FIG. 18, the processing unit 12 contains a sorted auxiliary information list input buffer 31, and hashed list input buffers 32$a$, 32$b$, ..., and 32$n$ for the number of runs. An auxiliary information list 30 obtained as a sort result using any flowchart in FIGS. 12 through 17 is read to the sorted auxiliary information list input buffer 31. The contents of the hashed list 21 are read to any of the hashed list input buffers 32$a$ through 32$n$, and a final process result is output using a minimum hash function value record retrieval device 33, a sort device 34 for a group of records having the same hash function value, and a group-by function operation process device 35.

Figure 19:
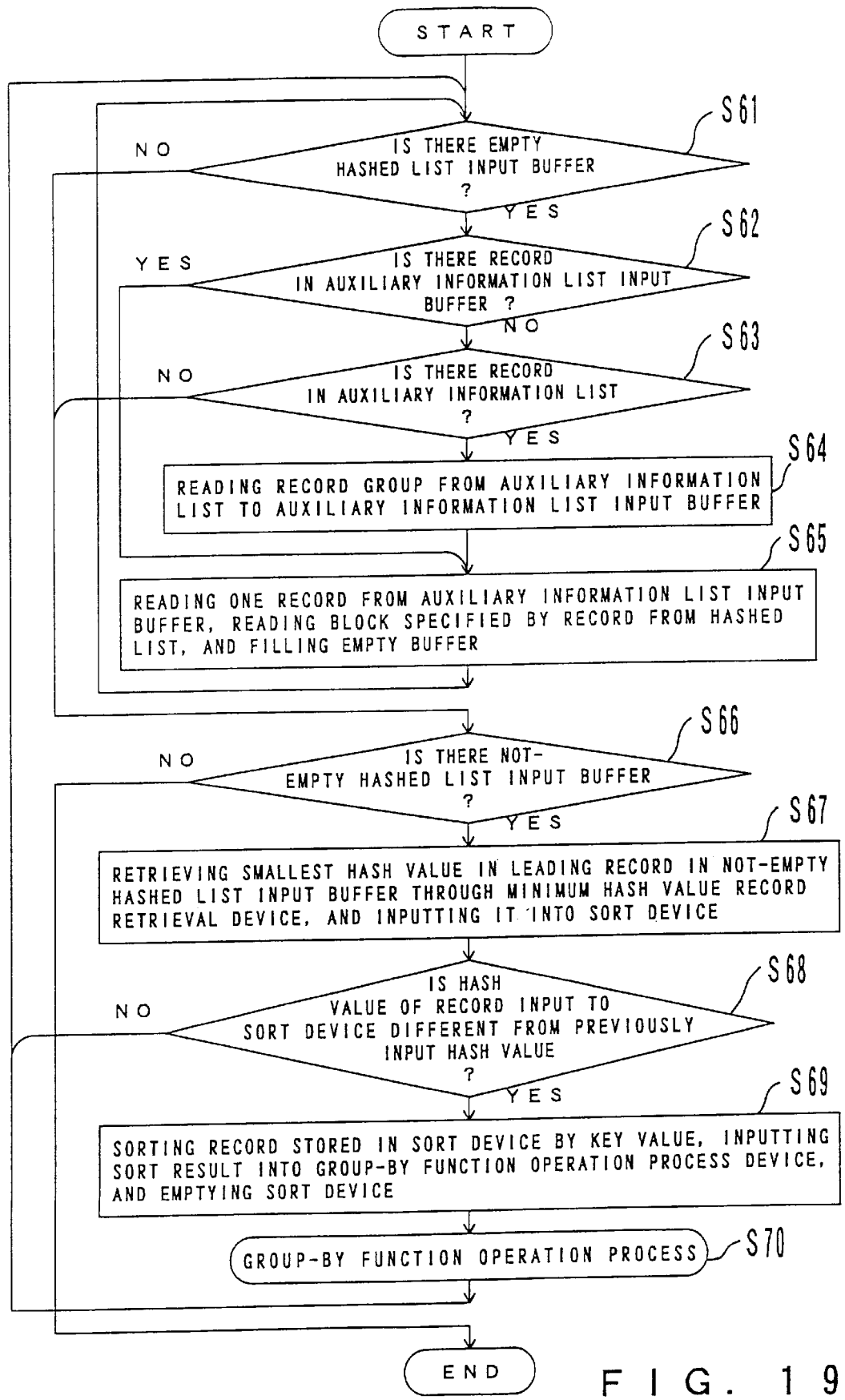
FIG. 19 is a flowchart showing the entire group-by function process according to the first and second embodiments of the group-by processing system.

FIG. 19 is a flowchart showing the group-by function process according to the first and second embodiments of the group-by processing system. When the process starts as shown in FIG. 19, it is determined in step S61 whether or not any of the hashed list input buffers 32$a$ through 32$n$ is empty. If yes, it is determined in step S62 whether or not a record is stored in the sorted auxiliary information list input buffer 31. If there is no record stored in the sorted auxiliary information list input buffer 31, then it is determined in step S63 whether or not a record is stored in the sorted auxiliary information list 30. If yes, a group of records are read from the auxiliary information list 30 to the auxiliary information list input buffer 31 in step S64.

In step S65, one record is read from the auxiliary information list input buffer 31, and the block specified by the record is read from the hashed list 21 and stored in any empty buffer in the hashed list input buffers 32$a$ through 32$n$. Then, the processes in and after step S61 are repeated.

If there is a record in the auxiliary information list input buffer in step S62, then the processes in steps S63 and S64 are not performed, and control is passed to the process in step S65. Then, the processes in and after step S61 are repeated.

If it is determined in step S61 that there are no empty buffers among the hashed list input buffers, or if it is determined in step S63 that there are no records in the auxiliary information list 30, then it is determined in step S66 whether or not there are not-empty hashed list input buffers. If yes, a record which is the smallest hash function value among the leading records in the not-empty hashed list input buffers is retrieved by the minimum hash function value record retrieval device 33 in step S67, and the record is provided for the sort device 34 for sorting a group of records having the same hash function value. Then, in step S68, it is determined whether or not the hash function value of the record input to the sort device 34 is different from the hash function value of the previously input record. If the values are not different from each other, the processes in and after step S61 are repeated.

If the hash function values are different from each other, all records having the same hash function value have been retrieved. Therefore, the records stored in the sort device 34 are sorted using a key value in step S69, and the sorted records are output to the group-by function operation process device 35, and the sort device 34 has no records. The group-by function operation process described by referring to FIG. 20 is performed in step S70. Then, the processes in and after step S61 are repeated. When it is determined in step S66 that there are no not-empty hashed list input buffers, the process terminates.

FIG. 20 is a flowchart showing the process in step S70 shown in FIG. 19, that is, the group-by function operation process. When FIG. 20 is compared with FIG. 166 showing an example of the conventional technology, the contents of the processes in steps S71 through S80 are actually the same as those in steps S223 through S232 in FIG. 166, and the group-by function operation process is basically the same as the example of the conventional technology.

Figure 21:
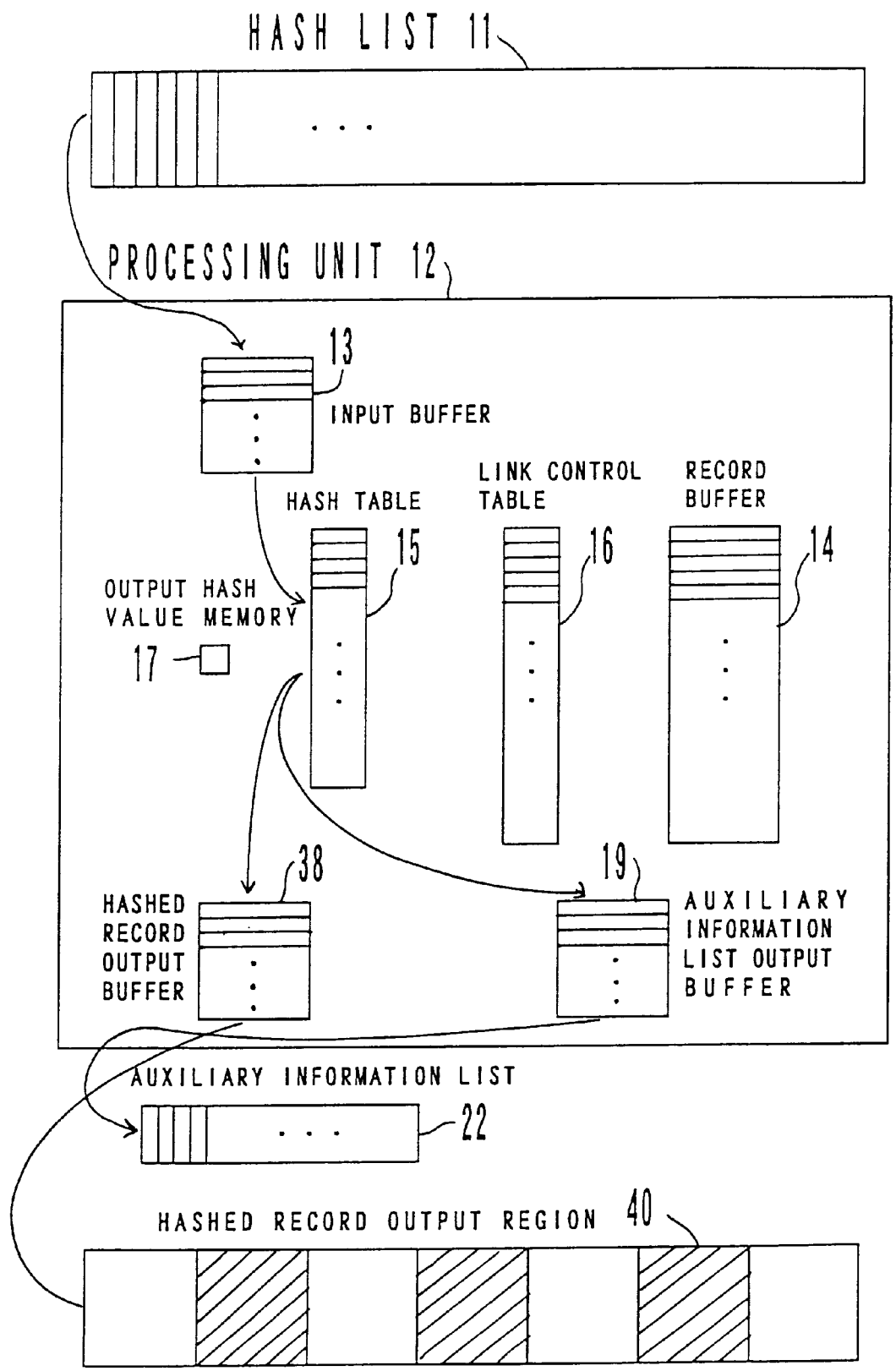
FIG. 21 shows the hash process according to the third embodiment of the group-by processing system.

Described below is the third embodiment of the group-by processing system according to the present invention. FIG. 21 shows the hash process according to the third embodiment. When the process shown in FIG. 21 is compared with the hash process according to the first embodiment shown in FIG. 3, a hashed record output buffer 38 replaces the hashed list output buffer 18, and a hashed record output region 40 replaces the hashed list 21 in the secondary storage device. That is, according to the third embodiment, when the contents of the hashed record output buffer 38 are output to the secondary storage device, data can be written to non-sequential regions in the secondary storage area, unlike the first and second embodiments, instead of sequentially writing data in sequential regions such as the hashed list 21, etc. This third embodiment is effective when there are many empty regions in the secondary storage area and each empty regions is not enough size for storing all hashed records. Even if data is non-sequentially written to the secondary storage device, the size of written data can be large because the contents of the hashed record output buffer 38 are output and the size of the hashed record output buffer can be large, and this writing method is close to the performance attained by writing data to sequential regions.

The process flowchart according to the third embodiment is similar to the flowcharts in FIGS. 4 through 7. However, the contents of the output buffer output process are different from those shown in FIG. 7, and the process is shown in FIG. 22.

Figure 22:
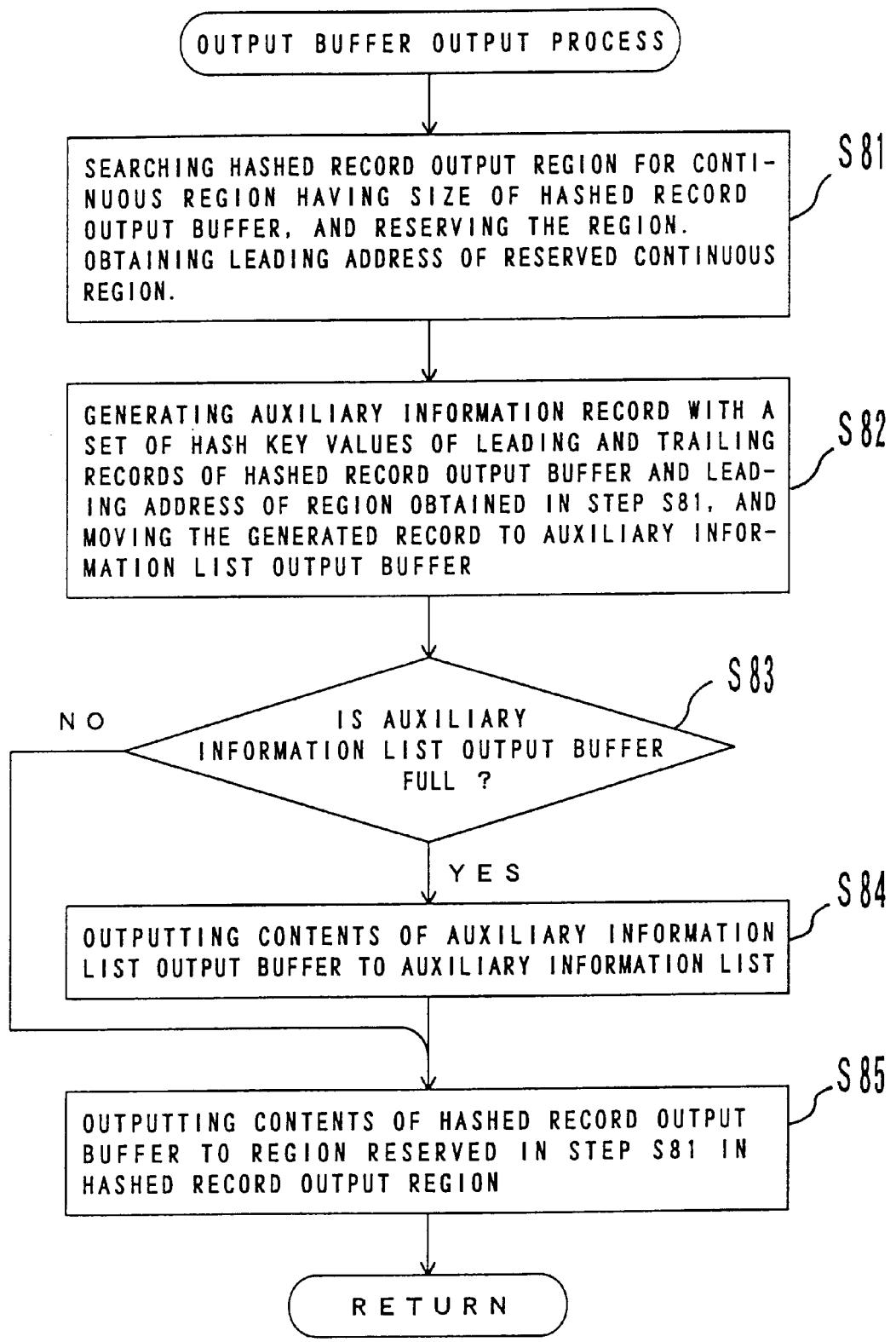
FIG. 22 shows a flowchart showing the output buffer output process according to the third embodiment of the group-by processing system.

When the process starts as shown in FIG. 22, sequential regions having the size of the hashed record output buffer 38 are searched for in the hashed record output region 40 in FIG. 21 in step S81, the regions are reserved, and the leading address of the reserved sequential regions is obtained. In step S82, an auxiliary information record is generated with a set of the hash function values corresponding to the first record and the last record in the hashed record output buffer 38, that is, the minimum hash function value and the maximum hash function value in the hashed record output buffer 38, and the leading address of the area obtained in step S81. Then, the generated record is stored in the auxiliary information list output buffer 19. In steps S83 and S84, the processes similar to those in steps S32 and S33 shown in FIG. 7 are performed, and the contents of the hashed record output buffer 38 are output to the regions reserved in step S81 in the hashed record output region 40 in step S85. Then, control is returned to the starting point.

Figure 23:
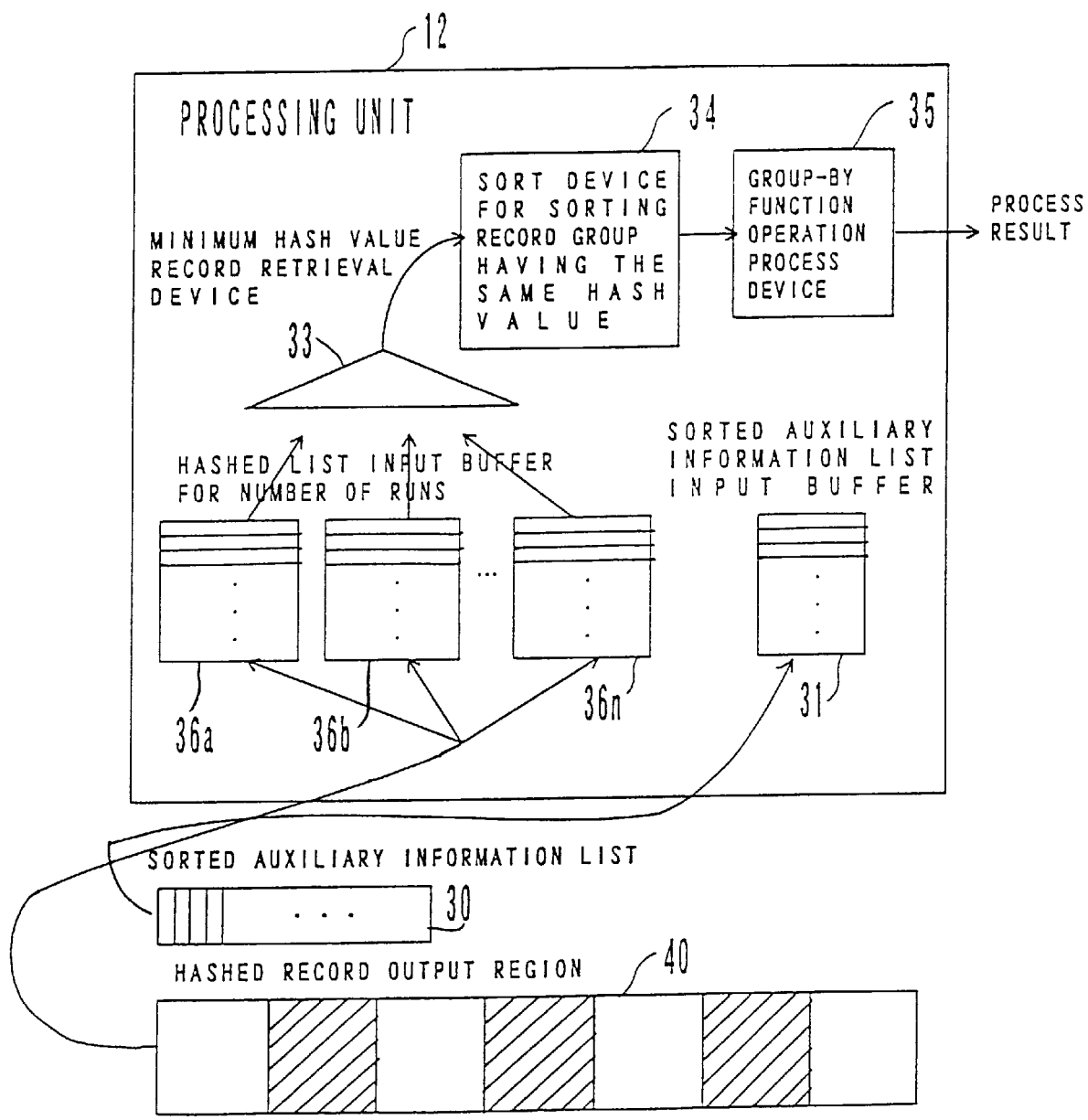
FIG. 23 shows the entire group-by function process according to the third embodiment of the group-by processing system.

FIG. 23 shows the last half of the process according to the third embodiment, that is, the entire group-by function process. When it is compared with the group-by function process according to the first and second embodiment shown in FIG. 18, the hashed record output region 40 replaces the hashed list 21 in the secondary storage device, and hashed record input buffers 36a through 36n replace the hashed list input buffers 32a through 32n for the number of runs in the processing unit 12.

Figure 24:
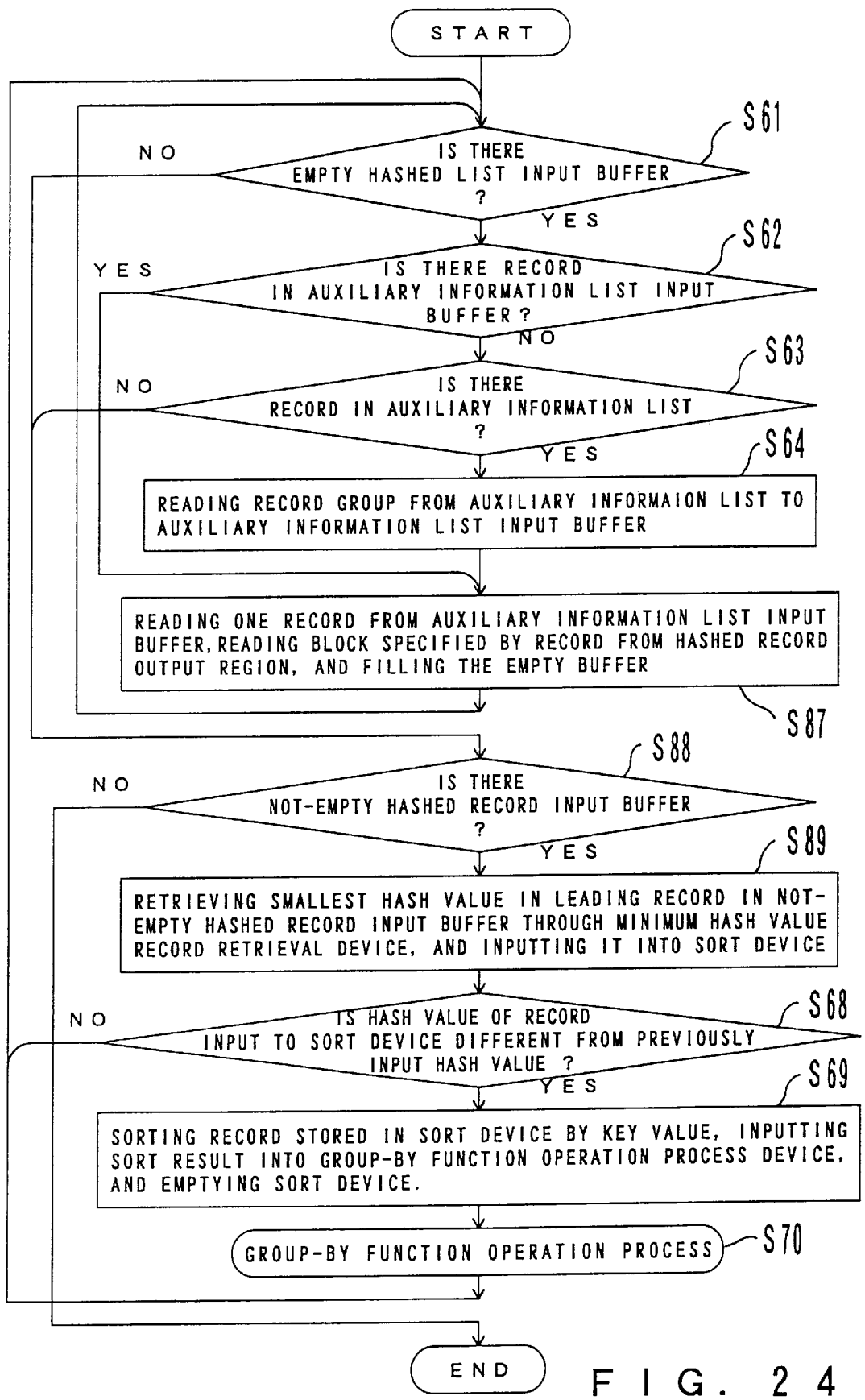
FIG. 24 is a flowchart showing the entire group-by function process according to the third embodiment of the group-by processing system.

FIG. 24 is a flowchart showing the entire group-by function process according to the third embodiment of the present invention. When it is compared with FIG. 19 showing the first and second embodiments of the present invention, the term 'hashed record input buffer' replaces the term 'hashed list input buffer', and the term 'hashed record output region' replaces the term 'hashed list'.

FIG. 25 shows the hash process according to the fourth embodiment of the group-by processing system. According to the fourth embodiment, unlike the first through third embodiments, a run information memory 23 and a run number memory 24 replace the auxiliary information list in the processing unit 12. Run information in a secondary storage device includes a storage address of the first record in a run, that is, the starting address (starting block number), and the storage address of the last record in the run, that is, the end address (end block number) of the run. As in FIG. 3 showing the first embodiment, the hashed list 21 in the secondary storage device refers to sequential regions, and the process is performed by a sequential write and a sequential read to and from the regions, thereby realizing a high speed process.

According to the fourth embodiment of the present invention, the run information replaces the auxiliary information list. Another method of performing the hash process is almost the same as the method according to the first embodiment. The process flowchart is also similar to the flowcharts according to the first embodiment shown in FIGS. 4 through 7. The flowchart corresponding to the process shown in FIG. 4 is the same as the flowchart according to the first embodiment, and the explanation is omitted here.

Figure 26:
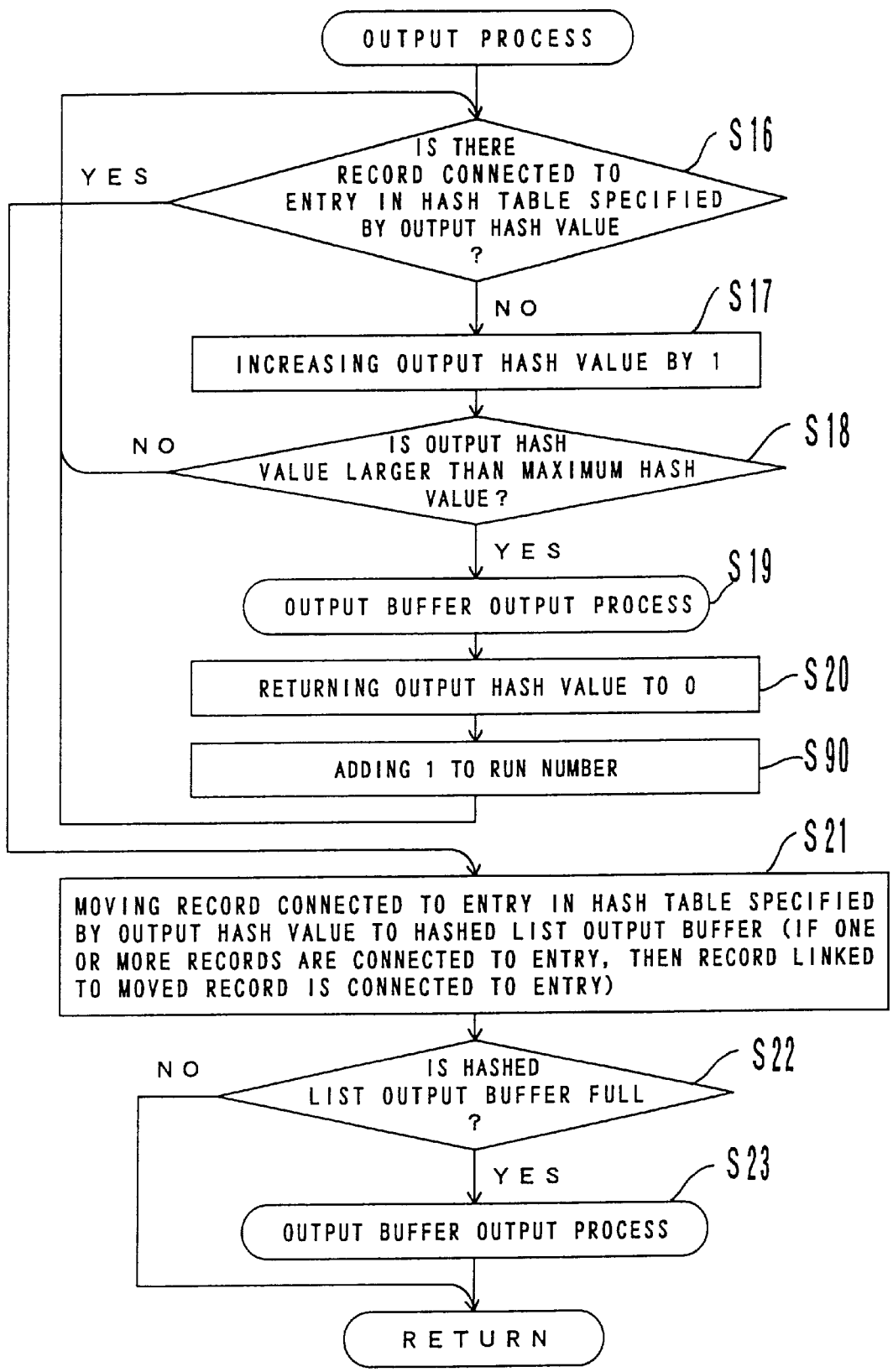
FIG. 26 is a flowchart showing the output process in the hash process according to the fourth embodiment of the group-by processing system.
Figure 27:
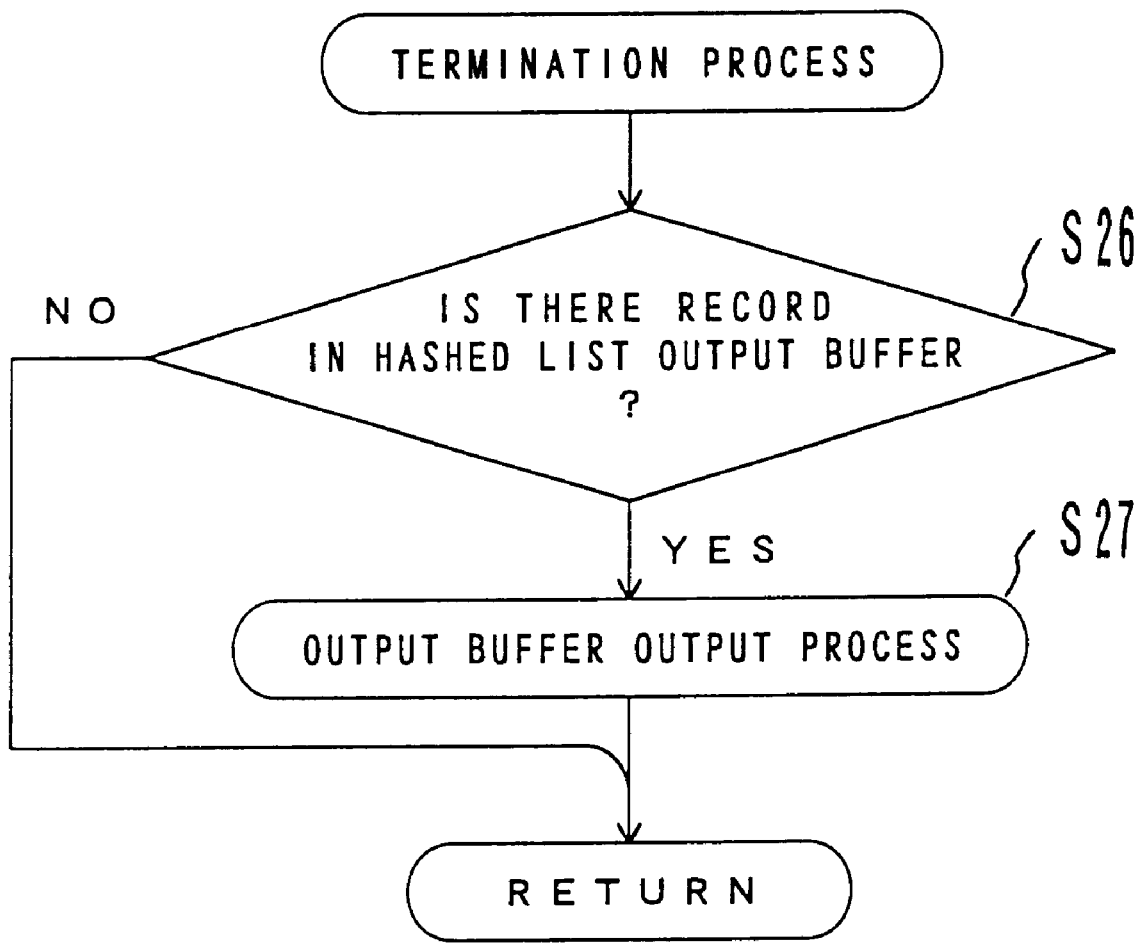
FIG. 27 is a flowchart showing the termination process in the hash process according to the fourth embodiment of the group-by processing system.
Figure 28:
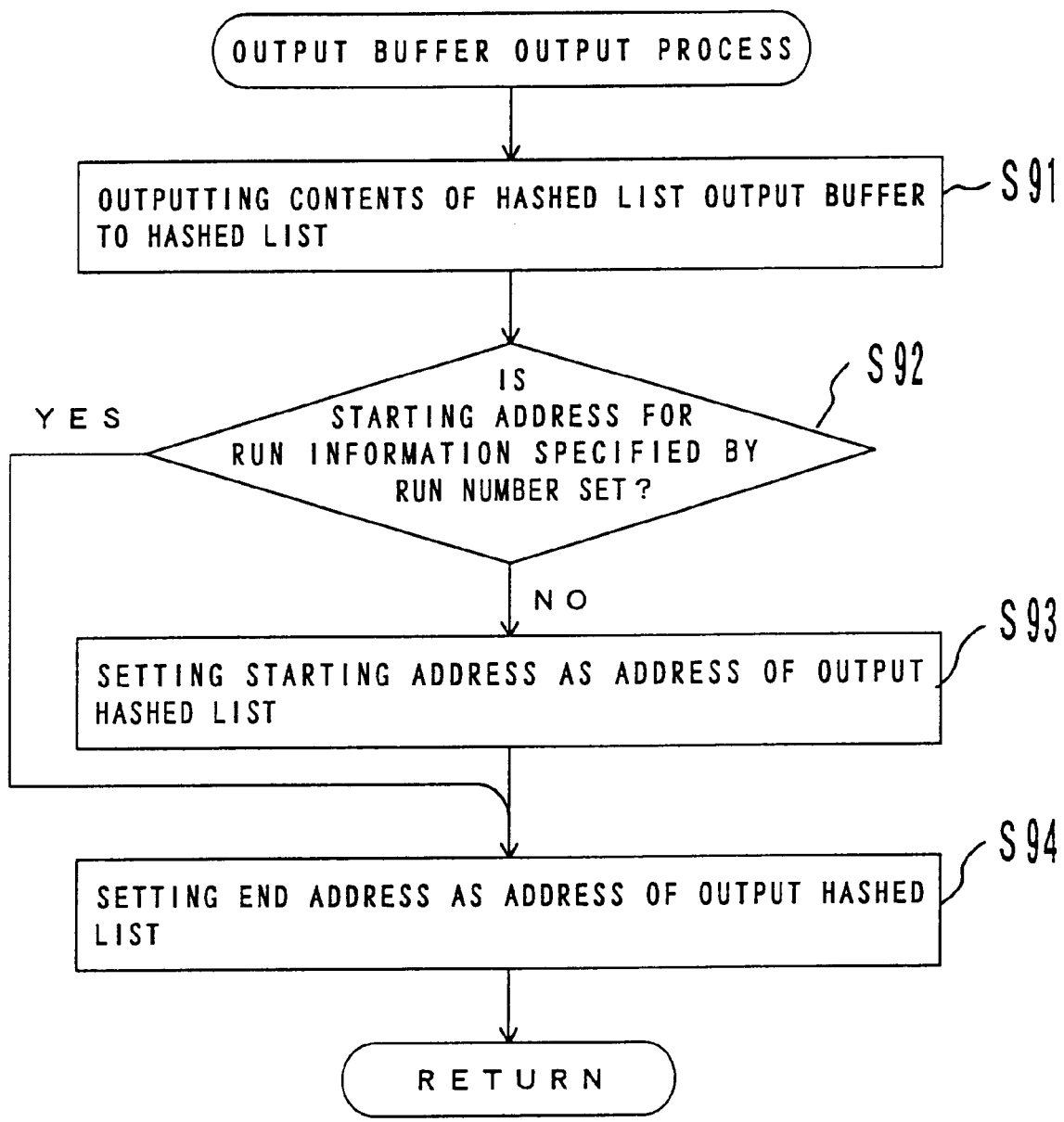
FIG. 28 is a flowchart of the output buffer output process shown in FIGS. 26 and 27.

In using the run information, the fourth embodiment is partially different from the first embodiment in the output process shown in FIG. 5, the terminating process shown in FIG. 6, and the output buffer output process in FIG. 7. FIGS. 26 through 28 are flowcharts showing the processes according to the fourth embodiment. FIG. 26 is a flowchart showing the output process. When it is compared with the process shown in FIG. 5, it is different in that the process in step S90 is added and the run number stored in the run number memory 24 is incremented when the output hash function value is returned to 0 in step S20, that is, when one run terminates.

FIG. 27 is a flowchart showing the terminating process according to the fourth embodiment of the present invention. When it is compared with FIG. 6, it is different in that the processes in steps S28 and S29 are not required because no auxiliary information is used.

FIG. 28 is a flowchart showing the output buffer output process according to the fourth embodiment of the present invention. According to the flowchart, no auxiliary information list is used, and a process quite different from the process according to the first embodiment shown in FIG. 7 is performed. In step S91, after the contents of the hashed list output buffer 18 have been output to the hashed list 21, it is determined in step S92 whether or not a starting address of run information specified by a run number is set. If it is not set, an address (block number) of the record output as a part of a hashed list in the secondary storage device is set as a starting address of run information in step S93. If it is determined that the starting address has already been set, the process in step S93 is skipped. Then, in step S94, the address (block number) of an output record in the secondary storage device is set as the end address, and control is returned to the starting point.

The processes in steps S92 through S94 shown in FIG. 28 are described by referring to the hash process shown in FIGS. 8A through 8O as a practical example. Assume that the hash process has been performed on a group of records to be processed in the group-by operation shown in FIG. 8A, and the process has proceeded to the process shown in FIG. 8H. The run information is represented in the form of a starting block number and an end block number. Assume that the run number as the initial state before starting the process is 1, and the run information is 'not set, not set'. In the state of FIG. 8H, the record '3, 3, 1' is output to the block 0 as shown in FIG. 9. This output process is performed in step S91 shown in FIG. 28.

It is determined in step S92 whether or not a starting address has been set. In this example, it has not been set yet, and a starting block number is set in the run information in step S93. The run information indicates '0, not set'. Then, the run information indicates '0, 0' in step S94.

Assume that the hash process has proceeded to the process in FIG. 8K, the record '4, 2, 5' is output to the block 1 in step S91. Since it is determined in step S92 that the starting address of the run information corresponding to the run number 1 is set, the end address of the run information is updated in step S94 without performing the process in step S93. Thus, the run information of the run number 1 is '0, 1'.

Assuming that the hash process further proceeds to the process shown in FIG. 8M, the record '2, 5' is output to the block 2 in step S91. Since it is determined that the starting address of the run information corresponding to the run number 1 is set, the end address of the run information is updated in step S94 without performing the process in step S93. Thus, the run information of the run number 1 is '0, 2'.

The record has been output for the run having the run number 1, the process in step S90 is performed after the process in step S20 shown in FIG. 26, and the run number is incremented to 2. The run information for the run number 2 is 'not set, not set' at this point.

Assuming that the hash process further proceeds to the process shown in FIG. 8O, the record '3, 1' is output to the block 3 in step S91. Since the starting address of the run information is not set, the run information is '3, not set' in step S93, and '3, 3' in step S94. Thus, the run information '0, 2' and '3, 3' are finally obtained.

In the fourth embodiment of the present invention, as with the second embodiment relative to the first embodiment, the storage area of the hashed list 21 as sequential regions in a secondary storage device can be replaced with non-sequential record storage areas, that is, the hashed record output region 40 shown in FIG. 21. The processes in this case are almost the same as those shown in FIGS. 26 through 28 according to the third embodiment, but a part of the output process shown in FIG. 26 is changed.

FIG. 29 is a flowchart of an output process when non-sequential regions in a secondary storage device are used as hashed record output regions according to the fourth embodiment of the group-by processing system. When FIG. 29 is compared with FIG. 26, it is different in that the run number is incremented in step S90, sequential regions for storing a new run are searched for in the hashed record output region in step S96 before starting the output of records for a new run, and then the processes in and after step S16 are performed.

When sequential regions for storing a new run are searched for, the length of the new run is normally uncertain. When it can be assumed that the key values of the records to be hashed are random so that the hash function values are random, the length of the run can be estimated double the length of the capacity of the record buffer 14. However, the length is not limited to the double the length of the capacity, and the length is uncertain. But, for example, as shown in FIG. 3 showing the first embodiment of the present invention, it is not always hard to clearly determine the length of the sequential regions for storing the hashed list 21 in the secondary storage device. Therefore, it is not so difficult to search for sequential regions for storing a new run practically.

Figure 30:
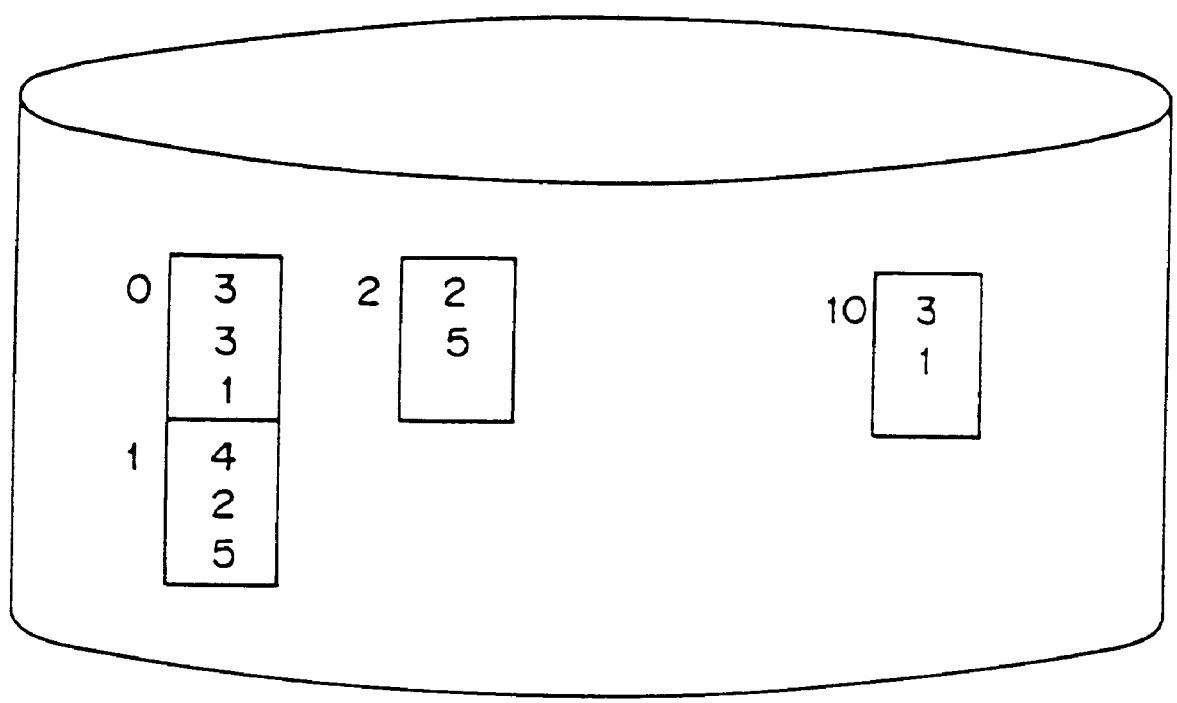
FIG. 30 shows an example of an output result when the hashed record output region is non-sequential in the fourth embodiment of the group-by processing system.

FIG. 30 shows the output result when a result of the hash process is output to non-sequential regions like the hashed record output region 40 shown in FIG. 21, not to the hashed list 21 shown in FIG. 25, that is, in a sequential region format. In this case, the hashed records output are partly sequential, and all hashed records can be output to one sequential regions. That is, data is sequentially written in a run and another run can be stored in a separate region.

FIG. 30 shows an output result of a hashed record to a secondary storage device when a hash process is performed as shown in FIGS. 8A through 8O. The run having the run number 1 is stored in the sequential regions from the block number 0 to the block number 2 whereas the run having the run number 2 is stored in the sequential regions having the block number 10 only. Therefore, the run information is '0, 2' and '10, 10' When this process is compared with the hash process shown in FIG. 25, the hashed records are not completely written sequentially to the secondary storage device, but sequentially written in a run. Therefore, a high speed process can be performed, and the performance is effective though the length of sequential regions available in a secondary storage are not so long.

Figure 31:
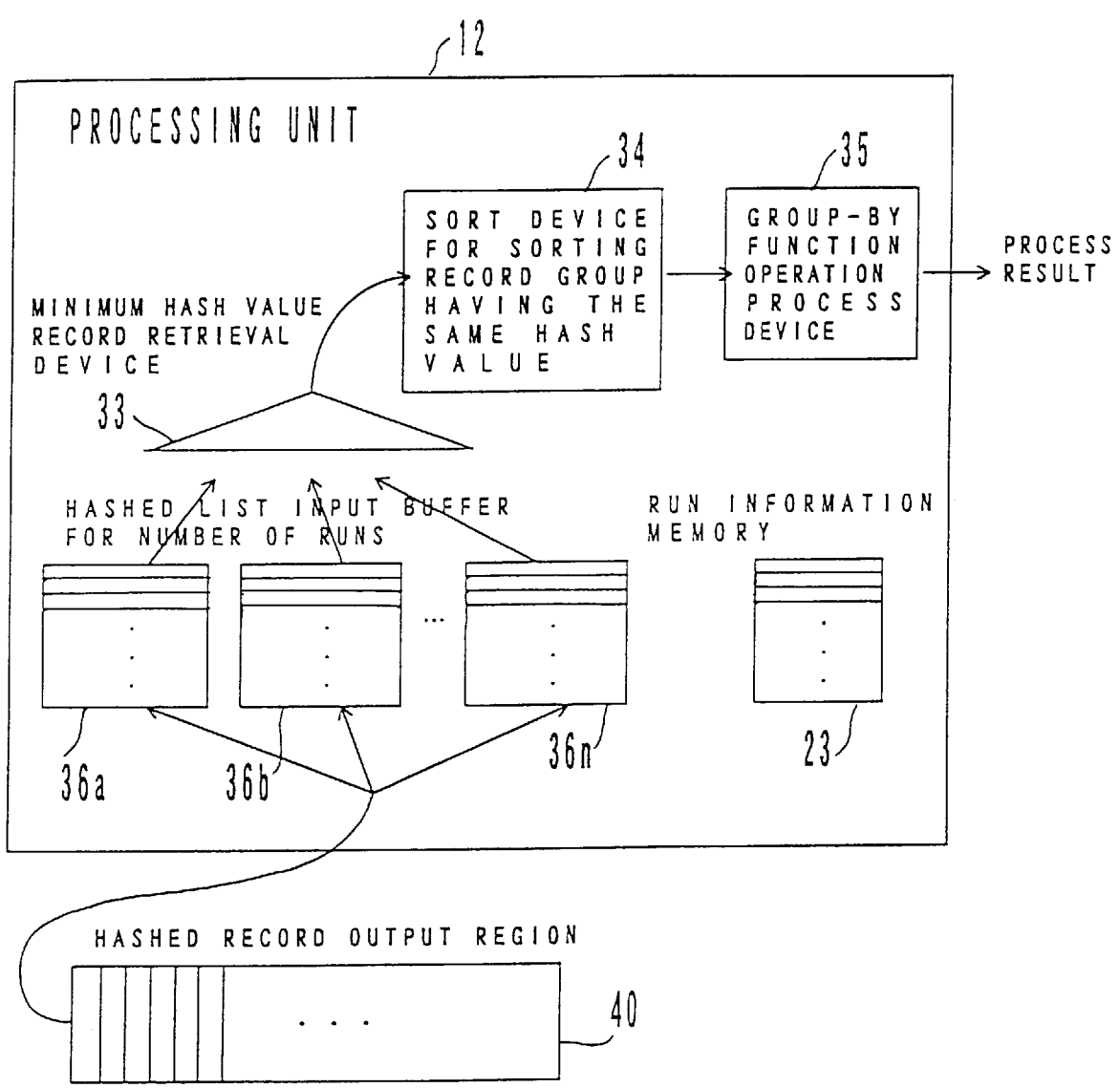
FIG. 31 shows the entire group-by function process according to the fourth embodiment of the group-by processing system.

FIG. 31 shows the latter half of the process according to the fourth embodiment, that is, the entire group-by function process. When FIG. 31 is compared with FIG. 23 showing the third embodiment of the present invention, it is different in that the run information memory 23 replaces the sorted auxiliary information list input buffer 31. Although the hashed record output region 40 appears to be sequential regions, the regions can be either sequential or non-sequential according to the fourth embodiment, and FIG. 31 shows both cases.

Figure 32:
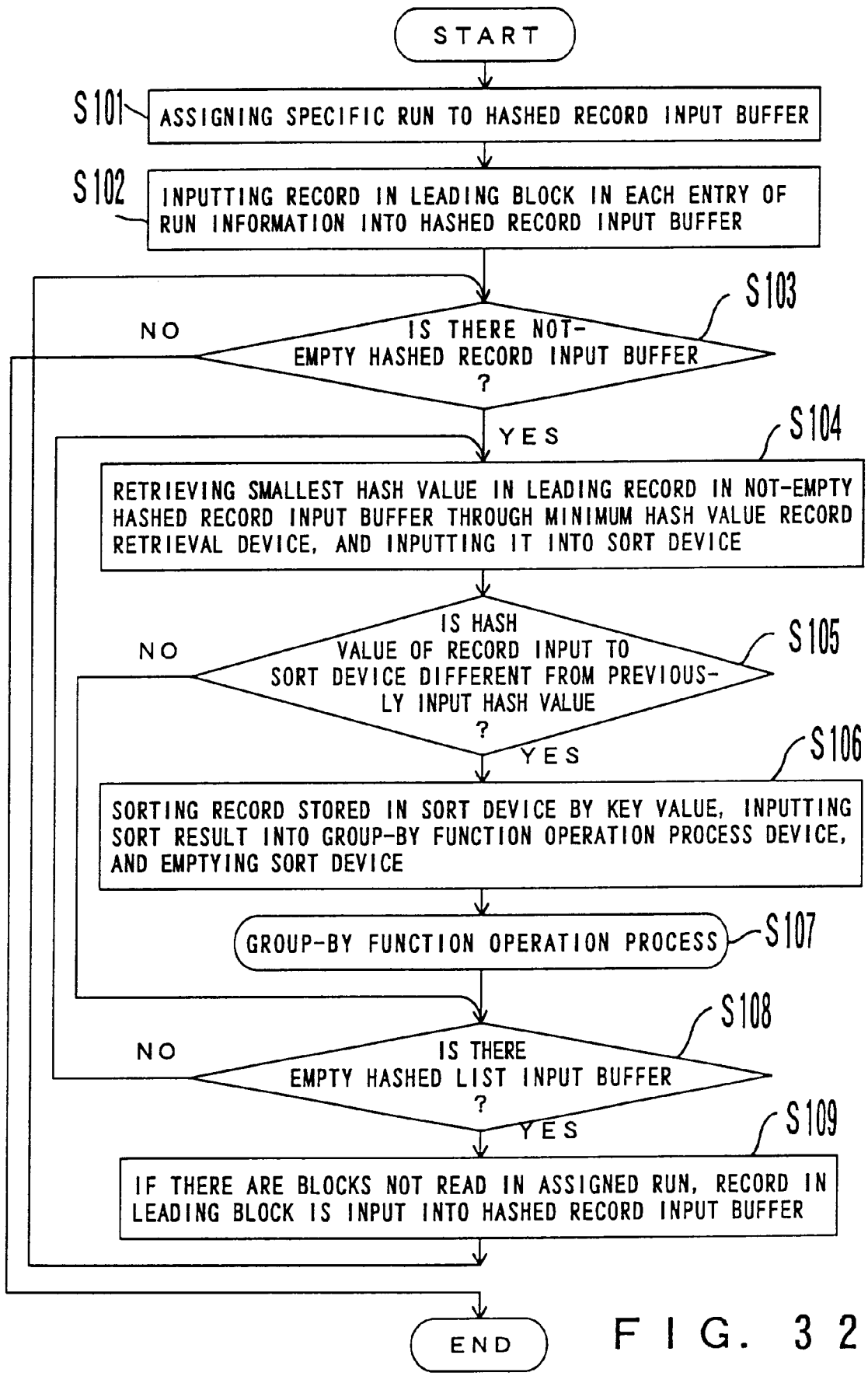
FIG. 32 is a flowchart showing the entire group-by function process according to the fourth embodiment of the group-by processing system.

FIG. 32 is a flowchart showing the entire group-by function process according to the fourth embodiment of the present invention. When the process starts in FIG. 32, runs are assigned in step S101 in such a way that they correspond one to one to the hashed record input buffers 36a through 36n shown in FIG. 31. In step S102, the records in each of the leading blocks in each entry of the run information are stored in each hashed record input buffer, and then the processes in steps S103 through S109 are repeated.

It is determined in step S103 whether or not there are any not-empty hashed record input buffer. If yes, the minimum hash function value record retrieval device 33 retrieves a record having the smallest hash function value from the leading records in the not-empty hashed record input buffers in step S104, and inputs it to the sort device 34. It is determined in step S105 whether or not the hash function value of the input record is different from that of the previous record. If the hash function values are different from each other, the records stored in the sort device 34 are sorted by key, the result is input into the group-by function operation process device 35, and the sort device 34 is emptied in step S106. In step S107, the group-by function operation process is performed.

Then, it is determined in step S108 whether or not there is an empty hashed list input buffer. If there is an empty hashed list input buffer and if there are blocks not read in a run assigned to the input buffer, then the leading block among them is stored in the hashed record input buffer in step S109, and the processes in and after step S103 are repeated.

If it is determined in step S105 that the two hash function values are equal to each other, the processes in steps S106 and S107 are not performed, and control is passed to the process in step S108. When it is determined in step S103 that not-empty hashed record input buffers do not exist, the process terminates.

Since the group-by function operation process in step S107 is the same as that shown in FIG. 20 corresponding to the first embodiment of the present invention, the explanation about the process is omitted here.

As described above, according to the fourth embodiment of the group-by processing system, the hash record input buffers are provided and the number of these buffers is the number of runs, and the process is performed in such a way that each hashed record input buffer stores only a block in specific run corresponding one to one to a hashed record input buffer. The process is performed with records in a block in each run sequentially stored according to run information. A sequence of requests to read data from a secondary storage device, that is, the sequence of requests, each of which is that the data is read from a hashed record output area and stored in hashed record input buffer, may not specify sequential region, but the size of an area for each read request can be relatively large. Therefore, a process can be performed with the similar performance obtained for a sequence of requests to read data from sequential region.

FIG. 33 shows the hash process according to the fifth embodiment of the group-by processing system. According to the fifth embodiment, as in the fourth embodiment, run information is used instead of an auxiliary information list. In the fifth embodiment, each of the separate regions as a hashed record output region 41 in a secondary storage device is not large enough to store all the records in a run. Therefore, link information is used to output the hashed records to non-sequential regions.

Figure 34:
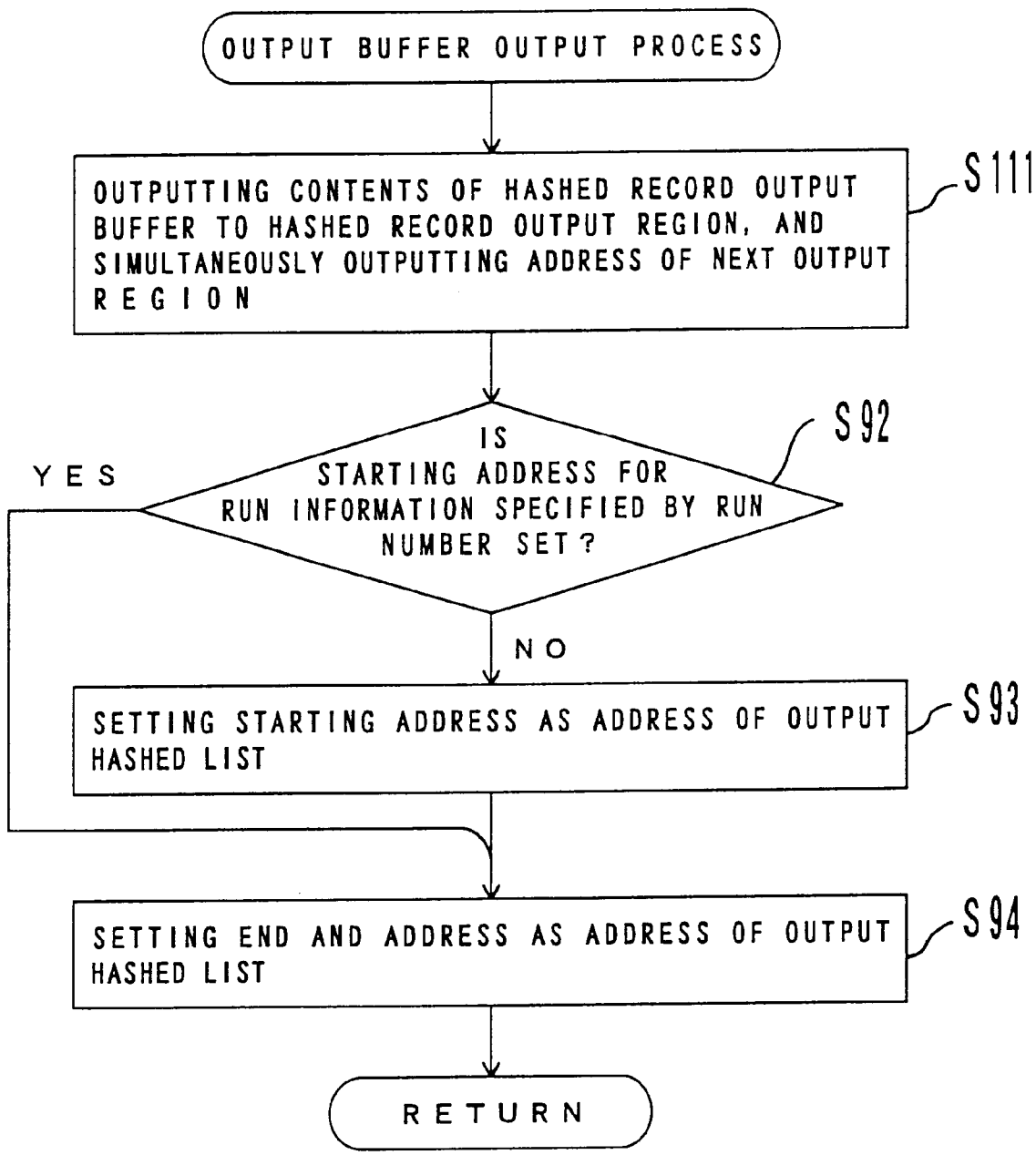
FIG. 34 is a flowchart showing the output buffer output process in the hash process according to the fifth embodiment of the group-by processing system.

The flowchart showing the hash process according to the fifth embodiment of the group-by processing system is almost the same as the flowchart shown in FIGS. 26 through 28 corresponding to the fourth embodiment, but different in a part of the output buffer output process. FIG. 34 is a flowchart of the process. When FIG. 34 is compared with FIG. 28 showing the fourth embodiment, it is different in that, when the contents of the output buffer in step S111 corresponding to step S91 are output to the hashed record output region, the address of a region to which the subsequent records are output is output as well.

FIG. 35 shows the last half of the process according to the fifth embodiment of the group-by processing system, that is, the entire group-by function process. When FIG. 35 is compared with FIG. 31 according to the fourth embodiment, it is different in that the hashed record output regions 41 are non-sequential regions and each region stores the address of a region for storing the subsequent records.

Figure 36:
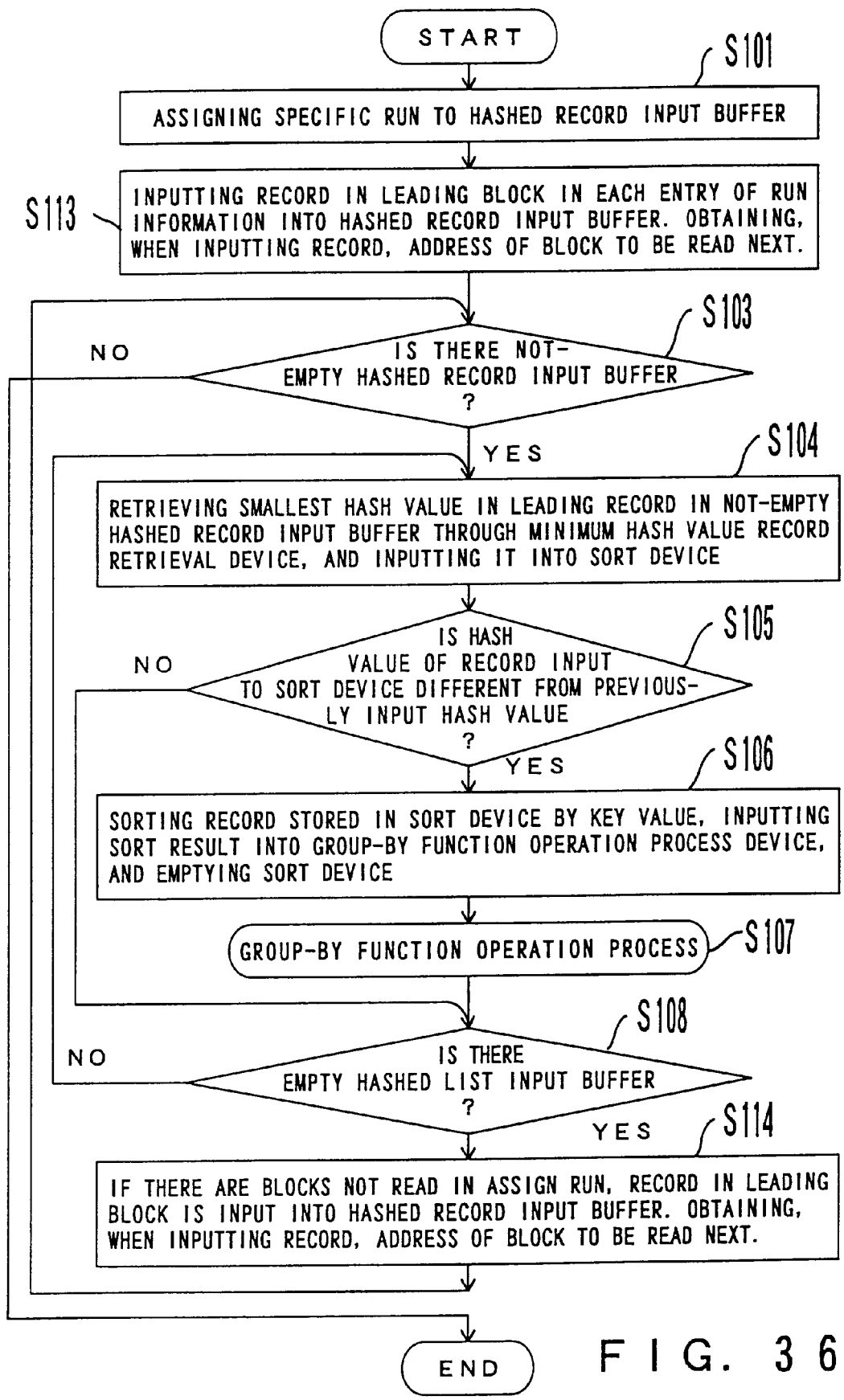
FIG. 36 is a flowchart showing the entire group-by function process according to the fifth embodiment of the group-by processing system.

FIG. 36 is a flowchart showing the entire group-by function process according to the fifth embodiment of the present invention. When FIG. 36 is compared with FIG. 32 according to the fourth embodiment, it is different in that, when the records in each leading block in each entry of the run information are stored in each hashed record input buffer in step S113 corresponding to step S102, the address of a block which will be read next is simultaneously obtained, and when a new block read in step S114 corresponding to step S109 is stored in the hashed record input buffer, the address of a block which will be read next is simultaneously obtained.

Described above are the embodiments of the group-by processing system according to the present invention. Described below further in detail is the group-by processing system according to the present invention using a group of records as a practical group target list.

FIG. 37 shows the entire group-by processing system according to the present invention. FIG. 37 almost corresponds to the above described first embodiment.

In FIG. 37, the processing unit 12 comprises, in addition to the components shown in FIG. 18, a hash process device 50; an auxiliary information list sort device 51; and a count process device 52 as a practical example of the group-by function operation process device 35 shown in FIG. 18. A secondary storage device 53 stores a hash list 54 to be processed in a group-by function process after a hash process; the hashed list 21 for storing a hashed list as a result of the hash process; the auxiliary information list 22 for storing an auxiliary information list; and a region 30 for storing an auxiliary information list obtained as a result of sorting records in the auxiliary information list.

Figure 38:
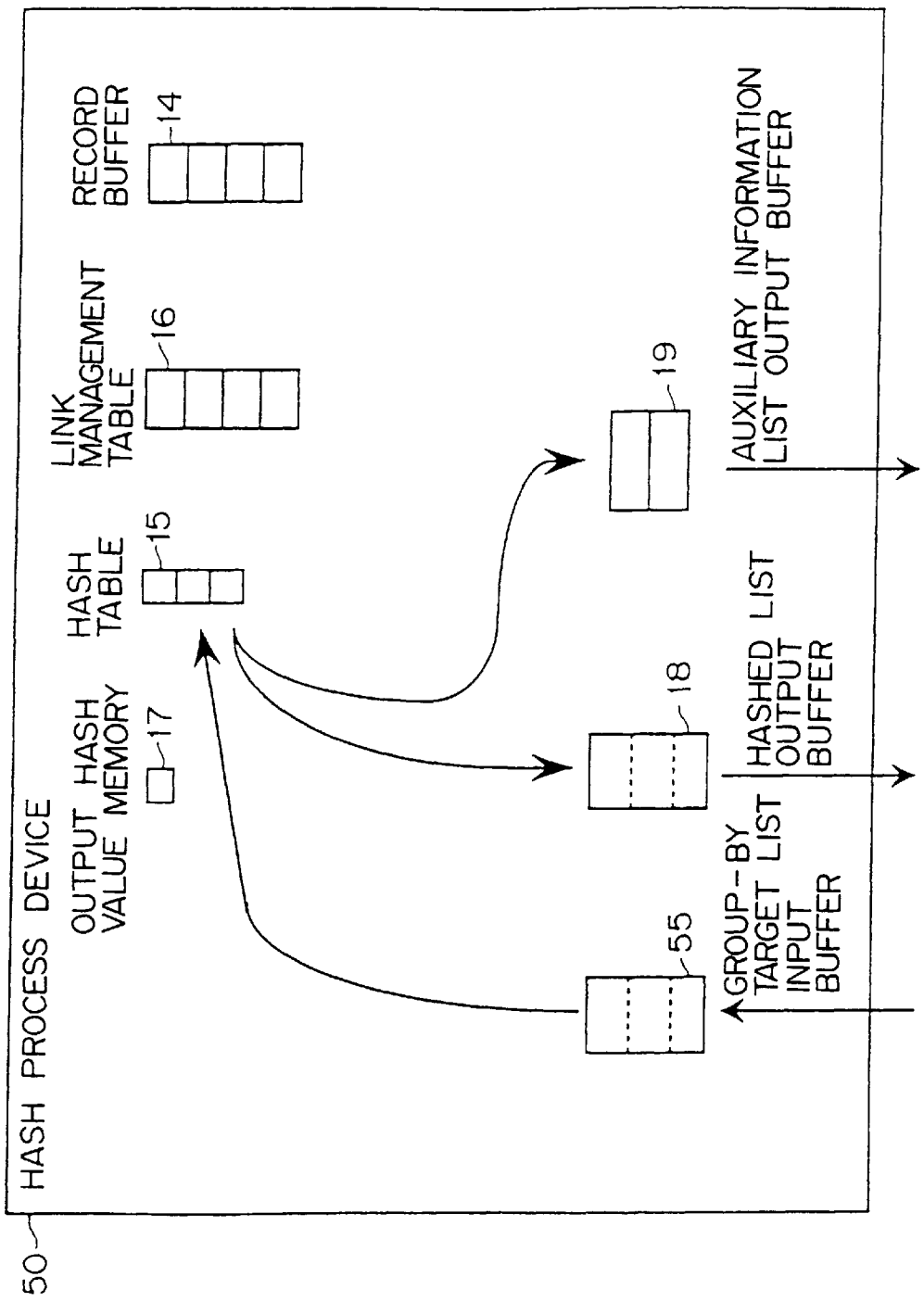
FIG. 38 shows the configuration of the hash process device shown in FIG. 37.

FIG. 38 shows the configuration of the hash process device 50 shown in FIG. 37. The configuration is different from that shown in FIG. 3. The hash list input buffer 55 is similar function as the input buffer 13 and the hash list input buffer 55 replaces the input buffer 13.

Assume that practical data in the hash list is provided as a list formed by the following 30 records, each of which is formed only by key.

5,3,3,4,2,1,2,3,5,1,2,3,3,2,1,1,5,5,4,1,4,2,3,3,2,5 ,1,1,3,3

As a hash function for use in a hash process for the data in the hash list, mod 3 of a key value is used. That is, the key value is divided by 3, and the value of the remainder of the division is the hash function value. The number of entries in the hash table 15 is three. Assuming that three records are stored in the hash list input buffer 55 and the hashed list output buffer 18, and four records are stored in the record buffer 14. Thus, the number of entries in the link control table 16 is four.

The following hashed list is obtained as a result of a hash process.

3,3,1,4,2,5,2,2,5,3,3,3,1,1,1,4,1,4,2,5,5,2,5,2,3,3 ,3,3,1,1

Simultaneously, the following auxiliary information list is obtained.

[10,0,1][11,1,2][12,2,2][13,0,0][14,1,1][15,1,1][16,2,2] [17,2,2][18,0,0][19,0,1]

In this example, the following three strings sorted by a hash function value are contained in the hashed list.

3,3,1,4,2,5,2,2,5
3,3,3,1,1,1,4,1,4,2,5,5,2,5,2
3,3,3,3,1,1

Since there are three strings, the number of runs is three. When the records are replaced with corresponding hash function values, the following strings are obtained.

Figure 39:
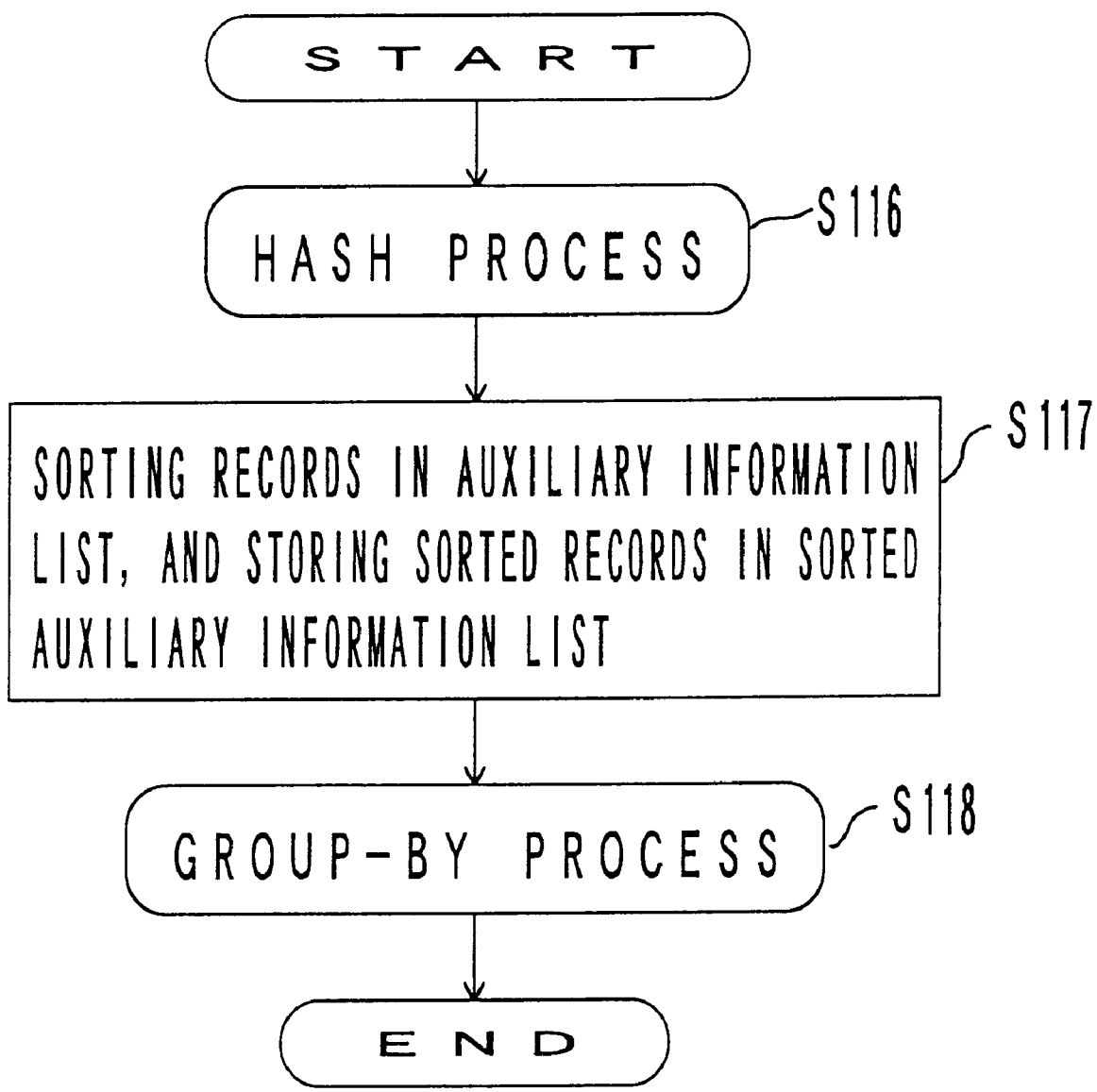
FIG. 39 is a flowchart showing the entire process of the group-by processing system according to the present invention using a practical example.

0,0,1,1,2,2,2,2,2
0,0,0,1,1,1,1,1,1,2,2,2,2,2,2
0,0,0,0,1,1,

FIG. 39 is a flowchart showing the group-by operation for processing such practical data. When the process starts in FIG. 39, a hash process is performed in step S116, the records in an auxiliary information list are sorted in step S117, the result is stored in the sorted auxiliary information list 30, and a group-by operation is performed in step S118, thereby terminating the entire process.

Figure 40:
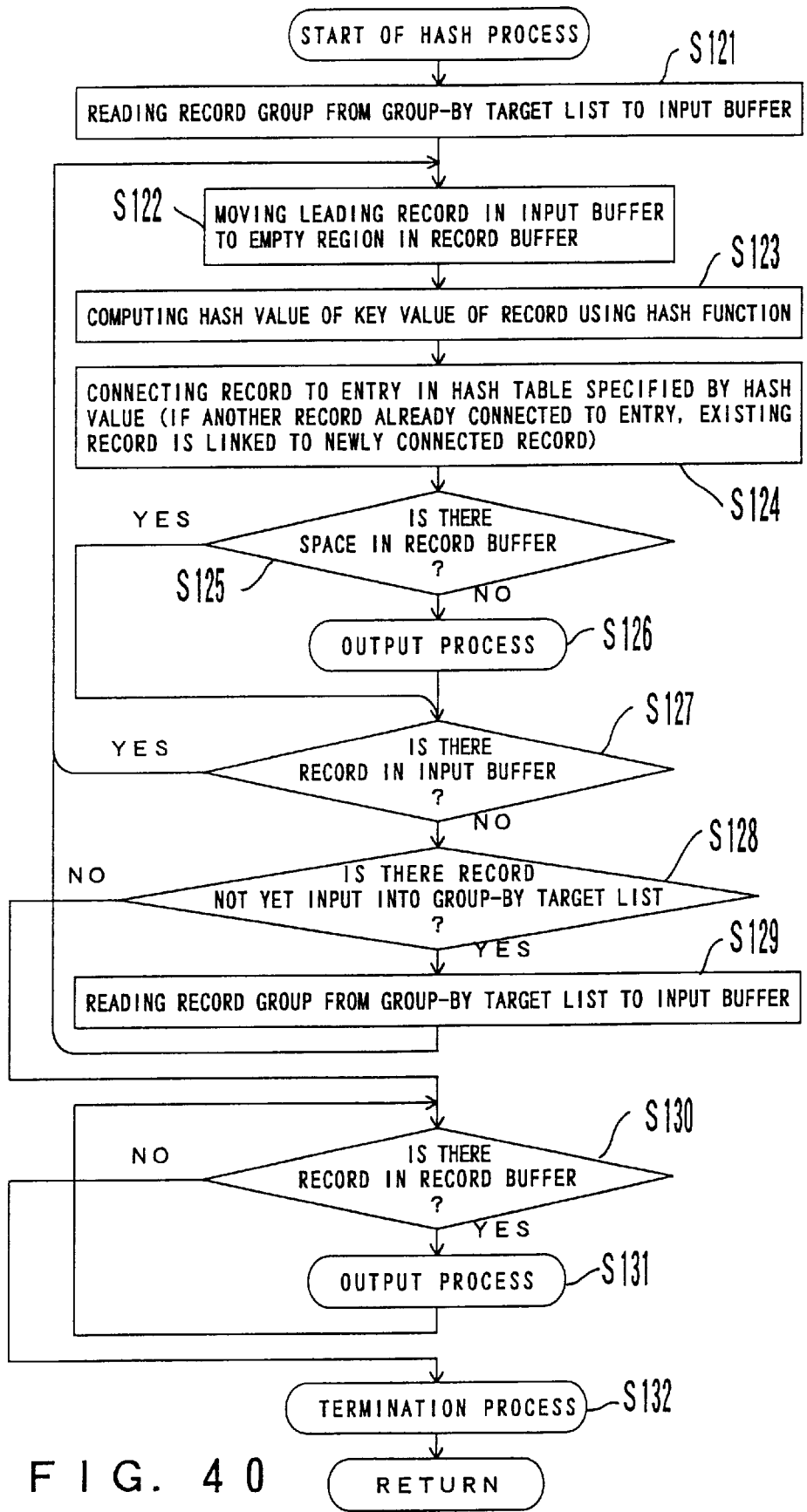
FIG. 40 is a flowchart showing the hash process using practical data.
Figure 41:
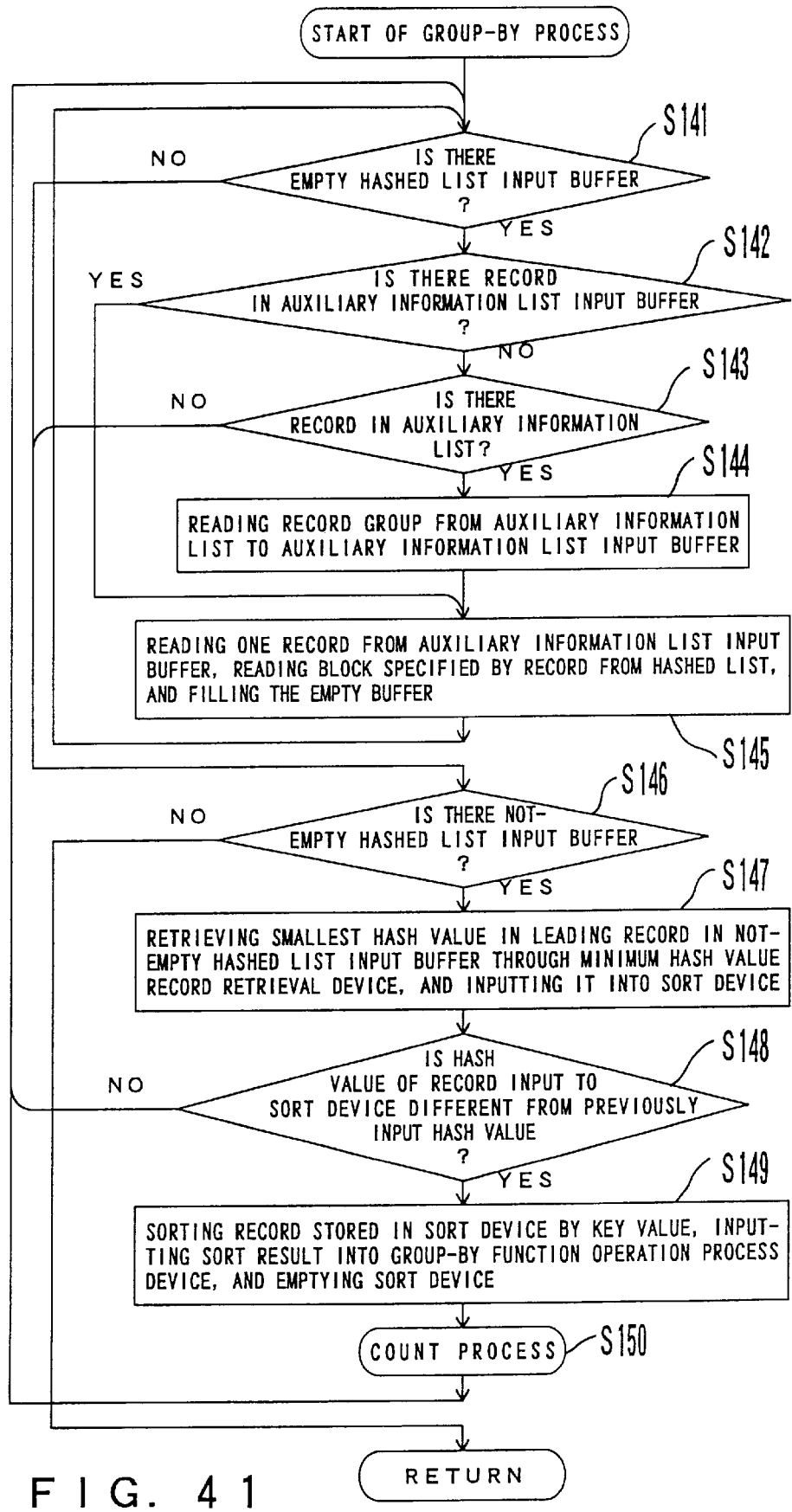
FIG. 41 is a flowchart showing the entire group-by process using practical data.

FIGS. 40 through 42 are flowcharts showing a hash process and a group-by operation. FIG. 40 is a flowchart showing a hash process. When FIG. 40 is compared with FIG. 4 showing the first embodiment of the present invention, it is different in that, for example, the hash list in step S1 shown in FIG. 4 is replaced with the term 'group-by target list' in step S121.

FIG. 41 is a flowchart showing the entire group-by operation. When it is compared with FIG. 19 corresponding to the first and second embodiments, it is different in that the group-by function process in step S70 is replaced with the count process in step S150.

FIG. 42 is a flowchart showing the count process in step S150 shown in FIG. 41. When it is compared with FIG. 20 corresponding to the first and second embodiments, it is different in that the initialization of a function in step S72 is replaced with the initialization of the counter to 0 in step S152, a function operation performed on a record read in step S73 is replaced with the increment of the count value of the counter in step S153, and a specific process is not performed on the function termination process in steps S77 and S79.

Figure 43:
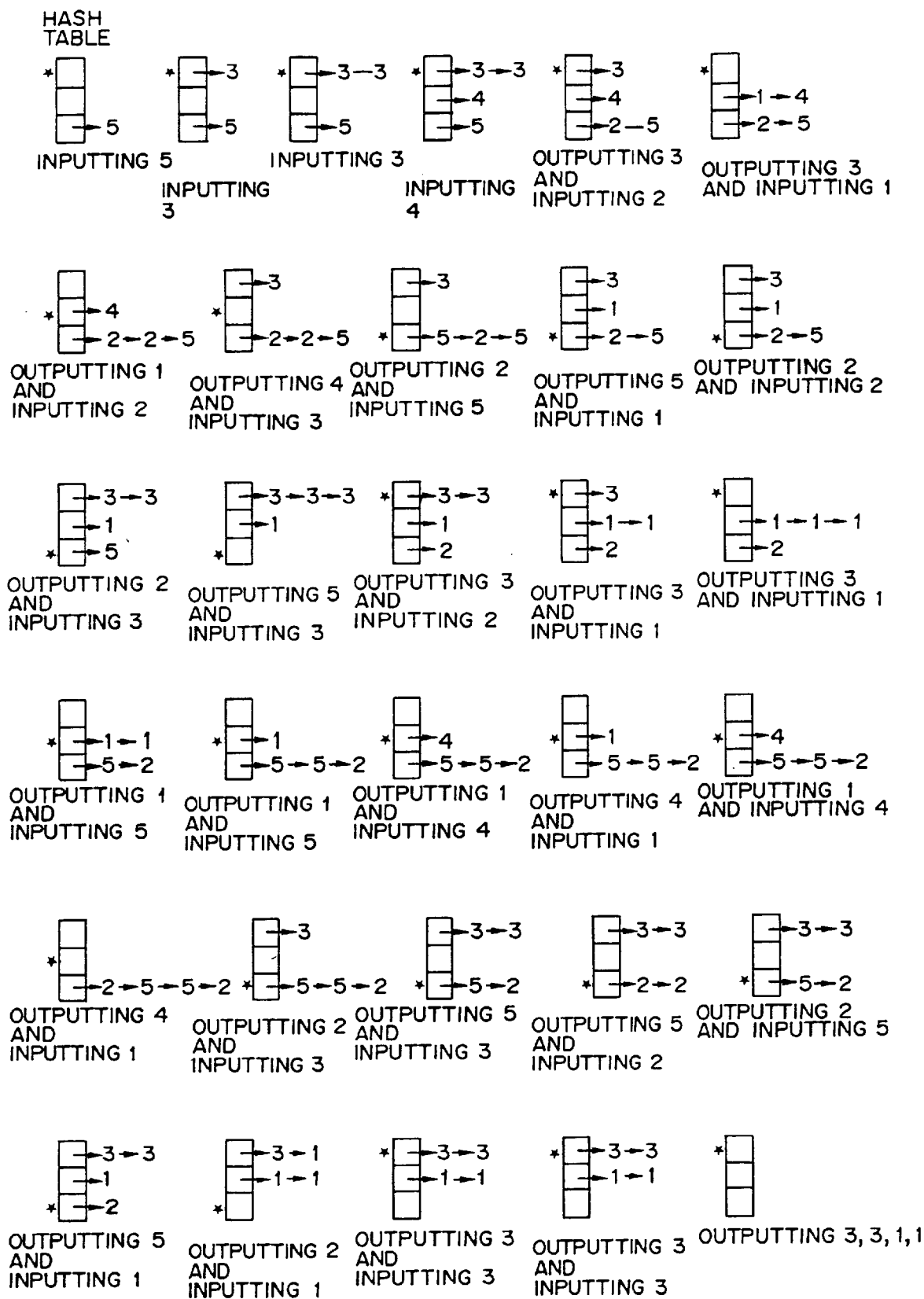
FIG. 43 shows the proceedings of the hash process using practical data.

FIG. 43 shows the proceedings of the hash process. The meanings of the process are almost the same as those of the process shown in FIG. 8, and FIG. 43 shows the proceedings of the hash process for the input of the group-by target list described by referring to FIG. 37.

After the hash process as the first half process terminates, records in an auxiliary information list obtained in the hash process are sorted. The following data can be obtained as the sorted auxiliary information list 30 by performing the sorting operation using the starting hash function value, which is the second value in each record, as the first key, and using the end hash function value, which is the third value of each record, as the second key.

[13,0,0][18,0,0,][1,0,1][19,0,1][14,1,1][15,1,1][1 1,1,2] [12,2,2][16,2,2][17,2,2]

Figure 44:
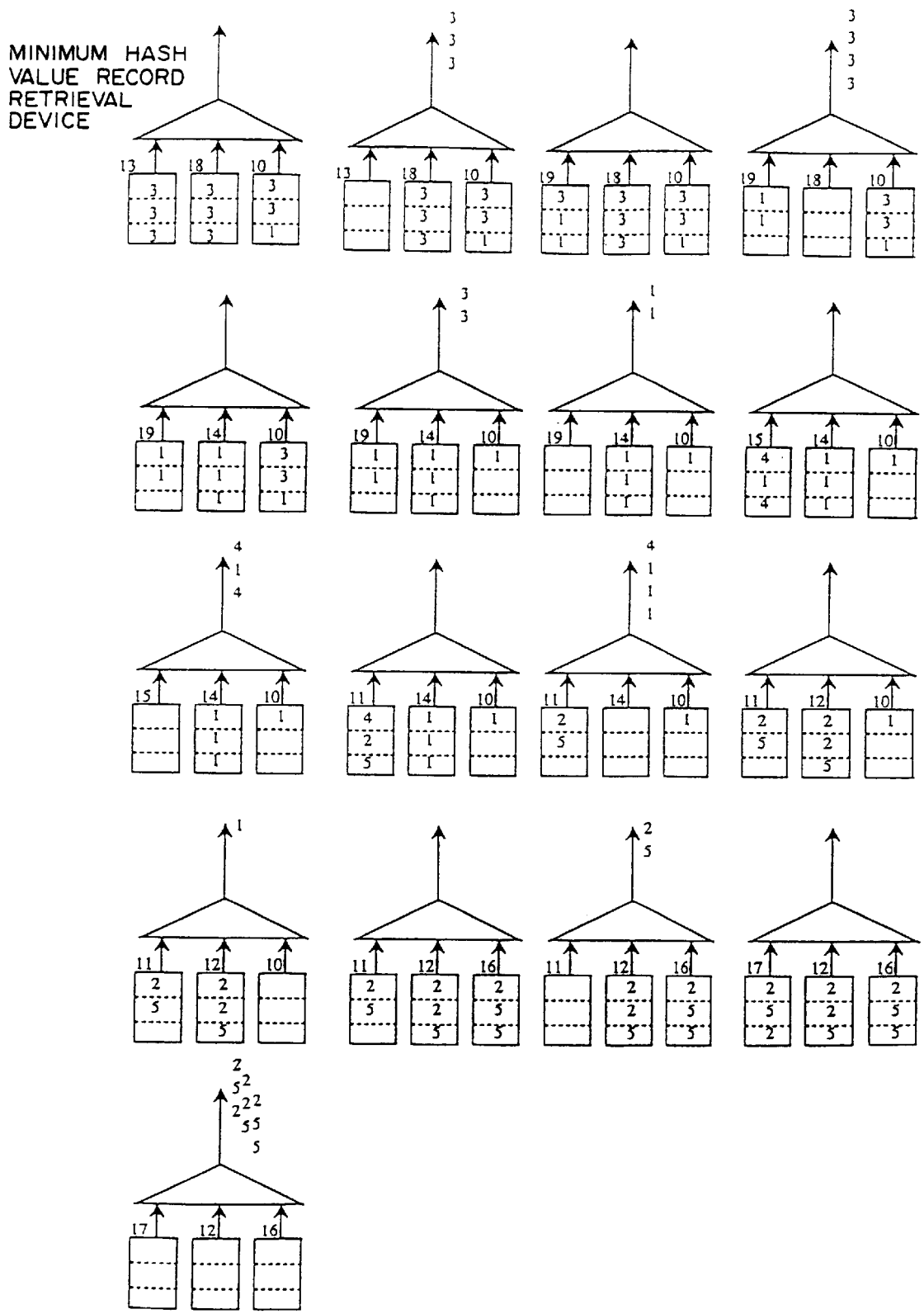
FIG. 44 shows the proceedings of the process of retrieving the minimum hash function value record corresponding to the first embodiment of the group-by processing system using practical data.

A group-by function process can be performed using the sorted auxiliary information list 30 and the hashed list 21. Since the number of runs in the hashed list is three, the number of the hashed list input buffers 32a through 32n is three. FIG. 44 shows the proceedings of the process performed by the minimum hash function value record retrieval device 33.

There are various ways to select one record from the records having the minimum hash function value. In this example, when there are the records having the minimum hash function value at the head of three input buffers in FIG. 44, the record in the leftmost input buffer is retrieved. The second figure from the leftmost on top in FIG. 44 shows that there is an empty buffer because three records have been retrieved one by one from the block 13. The right figure shows that the records in the block which is number 19 are stored in the leftmost empty input buffer. The rightmost figure in the top in FIG. 44 shows that only leading record in the leftmost input buffer is retrieved. By continuing such processes, the process result by the minimum hash function value retrieval device 33 can be obtained as follows.

3,3,3,3,3,3,3,3,3,1,1,4,1,4,4,1,1,1,1,2,5,2,5,2,2,2 ,5,2,5,5

The result indicates sequential records having the same hash function value. The hash function value for each record is represented by the following string.

0,0,0,0,0,0,0,0,0,1,1,1,1,1,1,1,1,1,1,2,2,2,2,2,2,2,2 ,2,2,2,2

The result is provided for the sort device 34. First, nine records (3,3,3,3,3,3,3,3,3) having the hash function value of 0 are sorted. Then, ten records (1,1,4,1,4,4,1,1,1,1) having the hash function value of 1 are sorted. Finally, eleven records (2,5,2,5,2,2,2,5,2,5,5) having the hash function value of 2 are sorted. As a result, a record string provided for the count process device 52 is represented as follows.

3,3,3,3,3,3,3,3,3,1,1,1,1,1,1,4,4,4,2,2,2,2,2,2,5 ,5,5,5,5

Since the count process device 52 increments a count value when the value of an input record key is not changed, the output of the count process device 52 is represented as follows.

[3,9][1,7][4,3][2,6][5,5]

Described below is the group-by operation on practical data corresponding to the above described fourth embodiment. The group-by target data is the same as that described above, and the hash function, the number of entries of the hash table 15, the record buffer 14, the group-by target list input buffer 55, and the number of records stored in the hashed list output buffer 18 are the same as those described above. A hashed list obtained as a result of a hash process is the same as a result of the hash process. Run information obtained instead of an auxiliary information list is represented as follows corresponding to the contents of the auxiliary information list 22 shown in FIG. 37.

(10,12) (13,17) (18,19)

The run information indicates that the first run is stored in the sequential regions having the block numbers 10 through 12, the second run is stored in the sequential regions having the block numbers 13 through 17, and the third run is stored in the sequential regions having the block numbers 18 and 19. The records of three strings sorted by a hash function value are obtained in a hashed list. These strings are the same as those described above.

Figure 45:
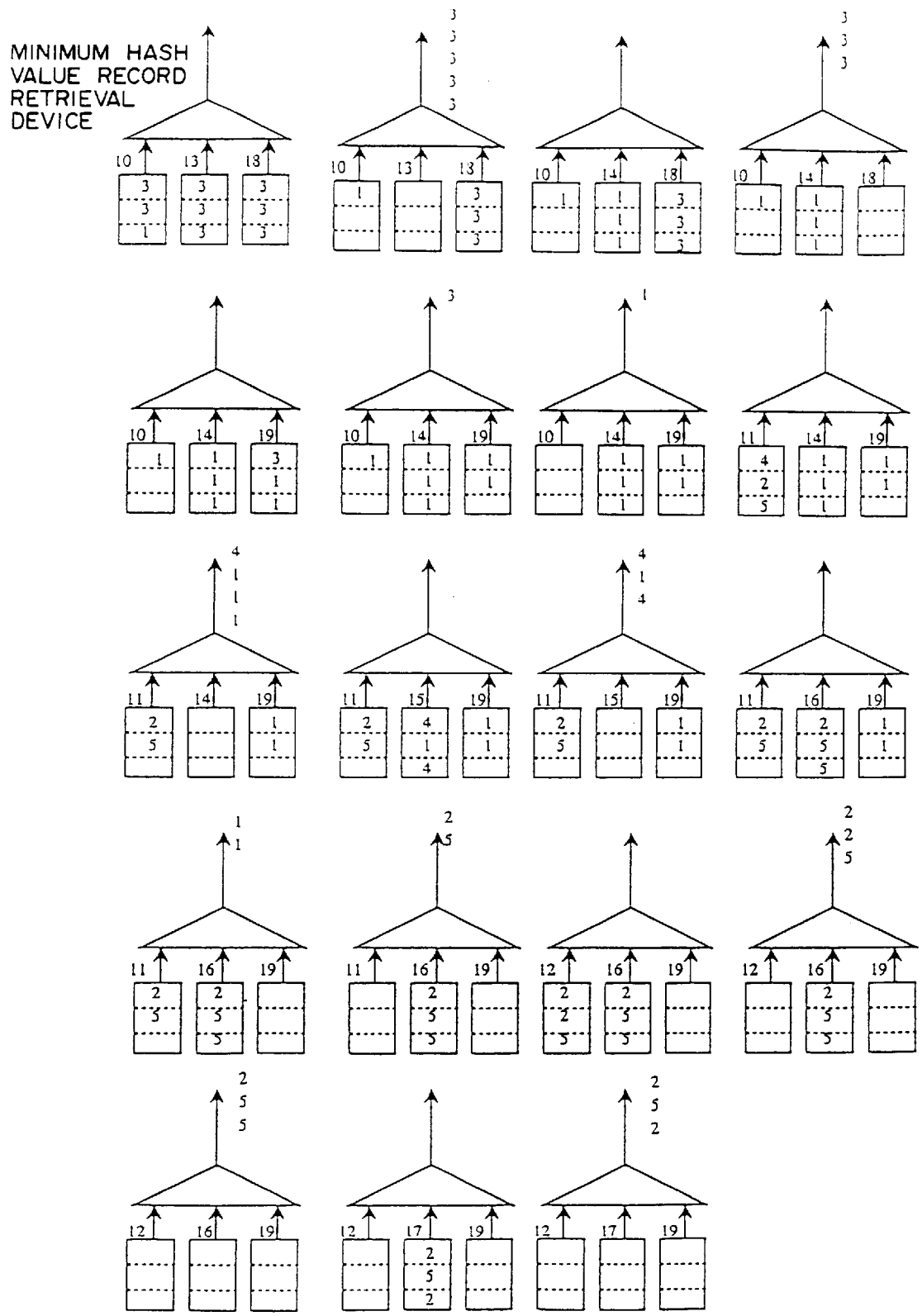
FIG. 45 shows the proceedings of the process of retrieving the minimum hash function value record corresponding to the fourth embodiment of the group-by processing system using practical data.

Described below is the last half of the process according to the fourth embodiment, that is, the group-by function process. FIG. 45 shows the proceedings of the process performed by the minimum hash function value record retrieval device 33. In this example, the hashed list input buffers are sequentially assigned from left to right to the first, second, and third runs. However, the hashed list input buffers can be optionally assigned as long as they correspond one to one to the runs. The retrieval result of the minimum hash function value record is represented as follows.

3,3,3,3,3,3,3,3,3,1,4,1,1,1,4,1,4,1,1,2,5,2,2,5,2,5 ,5,2,5,2,

When the record string is provided for the sort device 34 for sorting a group of records having the same hash function value, nine records (3,3,3,3,3,3,3,3,3) having the hash function value of 0 are first sorted, and then ten records (1,4,1, 1,1,4,1,4,1,1) having the hash function value of 1 are sorted. Finally, eleven records (2,5,2,2,5,2,5,5,2,5,2) having the hash function value of 2 are sorted. As a result, the record string provided for the count process device 52 and its output are the same as those described above.

Described above is the embodiment of the group-by processing system according to the present invention. Described below is an embodiment of the system of counting the combination of related data using the above described group-by processing system.

Figure 46:
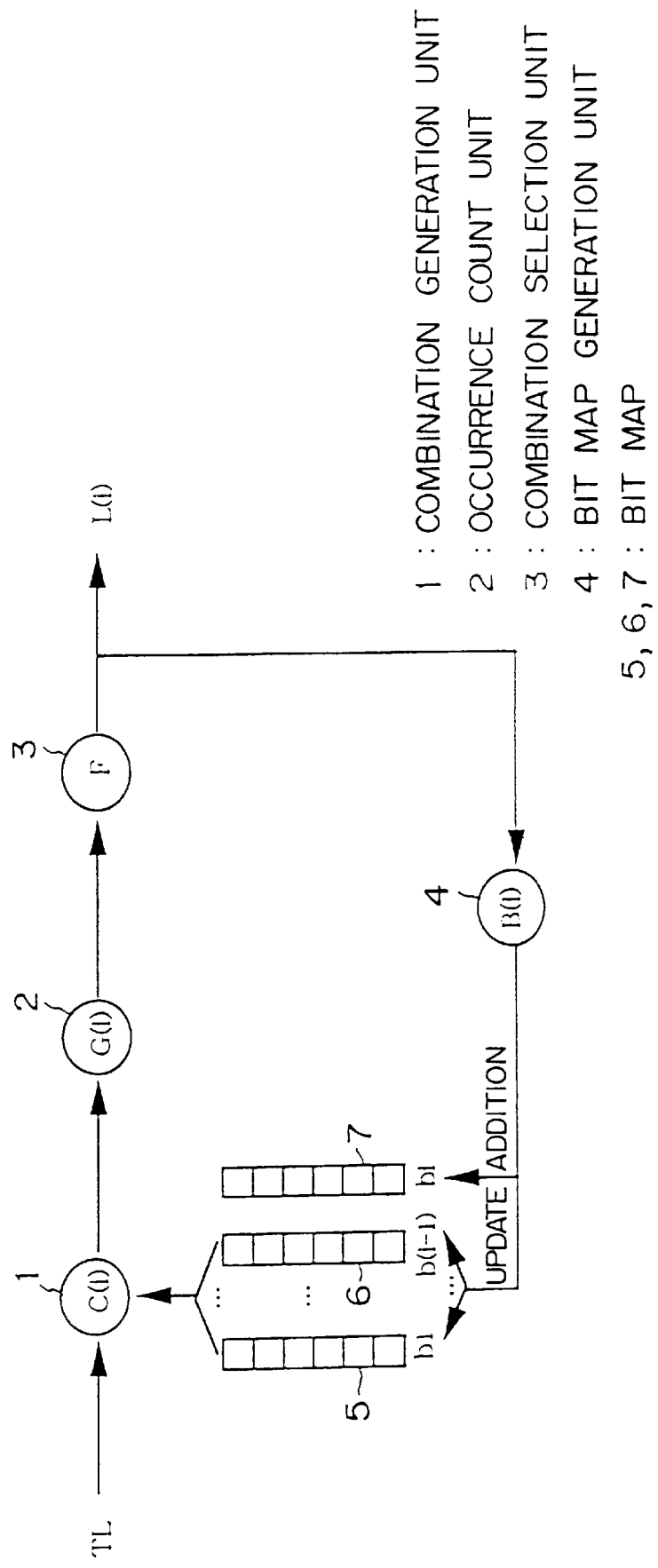
FIG. 46 shows the configuration according to the embodiment of the data combination count system of the present invention.

FIG. 46 shows the configuration of an embodiment of the system of counting combinations according to the present invention. In FIG. 46, the system comprises a combination generation unit C(i) 1 for generating a combination of i items considered to be associated to each other; an occurrence count unit G(i) 2 for counting the number of occurrences of a combination of i items in the transactions in a group-by process; a combination selection unit F 3 for selecting, as an element of a large i-itemset L(i), a combination when its occurrence count value is, for example, within a specified range; and a bit map generation unit B(i) 4 for updating from a large i-itemset L(i), the bit maps b1 5 through b(i−1) 6 that were used for pruning in the combination generation unit C(i) 1, and for adding a bit map bi 7 that is going to be used for pruning in the combination generation unit C(i+1).

Each unit shown in FIG. 46 performs the following processes.

C(i)

When i=1, each item [item] contained in a transaction is transmitted one by one to G(i).

When i>=2, a combination of i items [item 1, item 2, ... , item i] that are contained in the same transaction and is not pruned by bit map filters b1, b2, ... , and b(i−1) is transmitted to G(i). Filters b1, b2, ... , and b(i−1) correspond to the b1, ... , and b(i−1) shown in FIG. 46, and the details are described later.

G(i)

A record containing i items [item 1, item 2, ... , item i] is received. A group-by process described later is performed using the entire record as a key.

The number of records contained in each group is computed, and the number is added to the records.

F

The output of G(i) is received, and the record whose number of occurrences satisfies a given condition is output as a large i-itemset L(i) [item 1, ... , item i, number of occurrences].

B(i)

The output of F [item 1, ... , item i, number of occurrences] is received. The bit position in the bit map filter bj (1<=j<=i), computed by applying Hj (combination of j items) for each combination of j items from [item 1, ... , item i], is set to '1'. At this time, since b1, ... , b(i−1) already exist, they are updated. Since bi does not exist, it is newly generated and updated.

Figure 47:
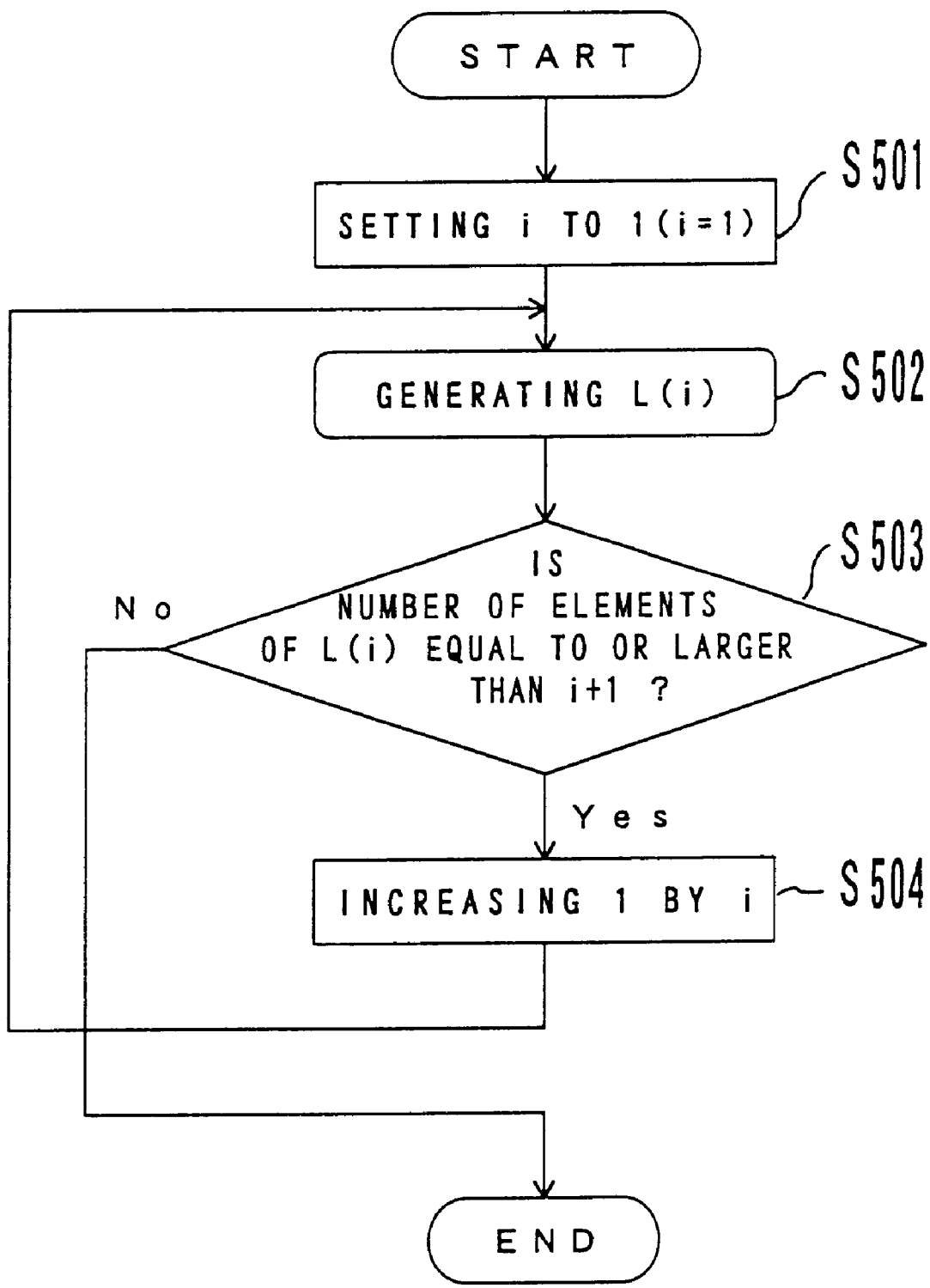
FIG. 47 is a flowchart showing the entire process of the data combination count system of the present invention.

FIG. 47 is a flowchart showing the entire system for counting the combinations according to the present invention. When the process starts as shown in FIG. 47, the number of items i in a combination is set to '1' in step S501, and then L(i) (L(1) in this example) is generated in step S502. L(1) is the large 1-itemset.

Then, in step S503 it is checked whether or not the number of combinations in L(i) is equal to or larger than i+1. For the case i=1, it is determined whether or not the number of combinations in the large 1-itemset L(1) is two or more. In the case it is equal or larger, the value i is increased by 1 in step S504, and the processes in and after step S502 are repeated.

That is, a large 2-itemset L(2) is generated in S502 as a set of combinations of two items whose number of occurrences is in a specified range. Then, the processes in and after step S503 are performed. When it is determined in step S503 that the number of combinations contained in the large i-itemset L(i) is not equal to or larger than i+1, the process terminates.

Figure 48:
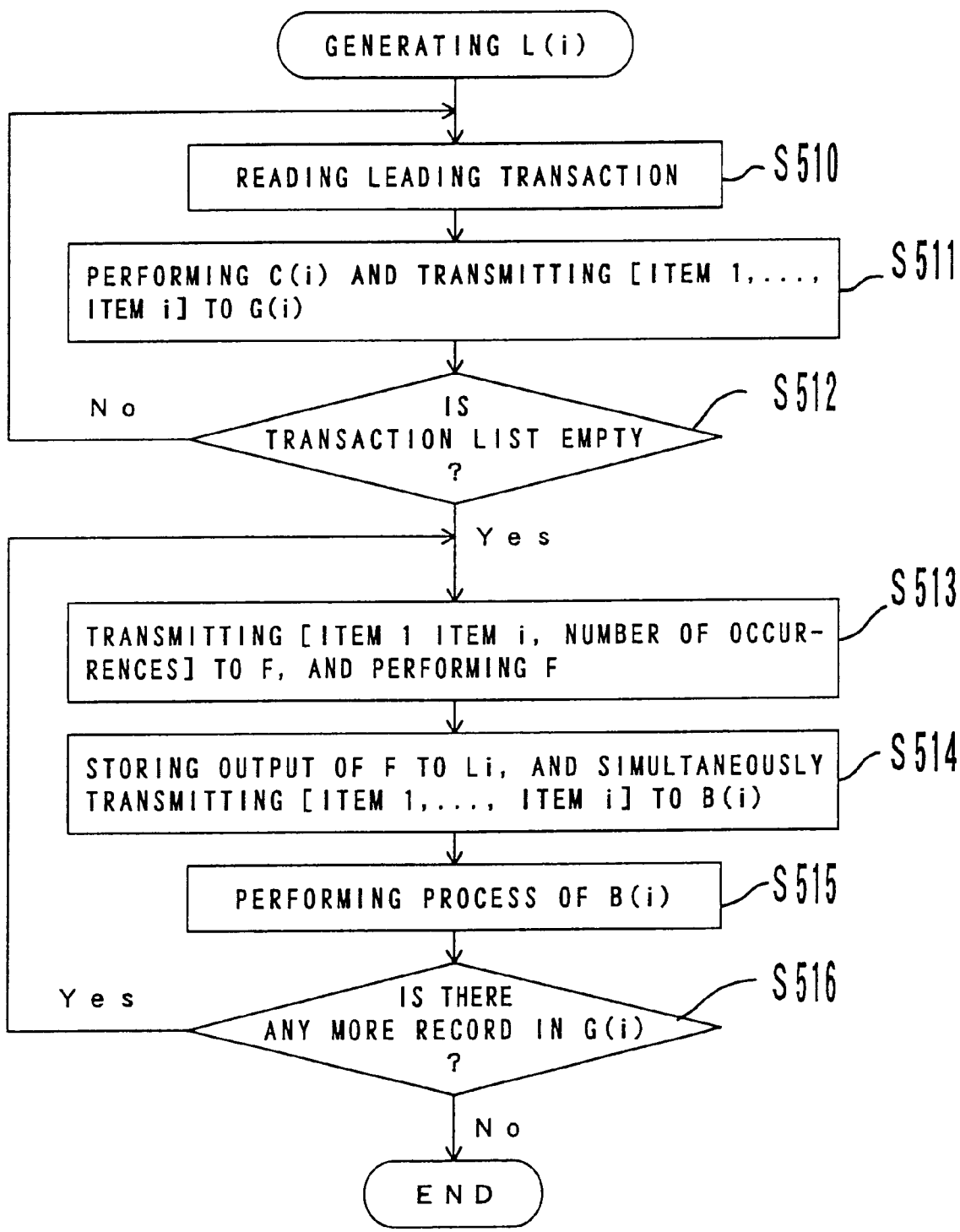
FIG. 48 is a flowchart showing the large itemset generation process.

FIG. 48 is a flowchart showing the process of generating a large i-itemset L(i). When the process starts as shown in FIG. 48, the leading transaction in the transaction list TL is read in step S510. In step S511, combinations of i items are generated and transmitted to the occurrence count unit G(i). In step S512, it is determined whether or not the transaction list TL is empty. If there is any transaction still to be processed, the processes in and after step S510 are repeated, and combinations are generated and are transmitted to G(i).

If it is determined in step S512 that the transaction list TL has become empty, the count unit G(i) transmits the combinations of i items and their number of occurrences in the transactions to the combination selection unit F to perform a combination selection. Then, in step S514, the combination selection result is stored as a large i-itemset L(i), and simultaneously transmitted to the bit map generation unit B(i). In step S515, a bit map generation process is performed. In step S516, it is determined whether or not the count unit G(i) still contains a record. If yes, the processes in and after step S513 are repeated. If not, the process terminates.

The combination count system according to the present invention is described below with an illustrative example. In this example, a transaction list TL contains the following four transactions T1 through T4.

T1=[1,2,4] T2=[2,3,6]
T3=[1,4,5,6] T4=[1,2,4,5]

Assume that the items in each transaction are sorted in ascending order. In this example, the minimum support value is 50%, that is, a combination of items has to appear in at least two of the total four transactions in order to be selected as a large itemset in the combination selection unit F.

First, the generation of the items whose number of occurrences satisfy the minimum support value is described. FIGS. 49 through 52 show the process of generating the individual items and counting their number of occurrences for each of the four transactions in TL.

Figure 49:
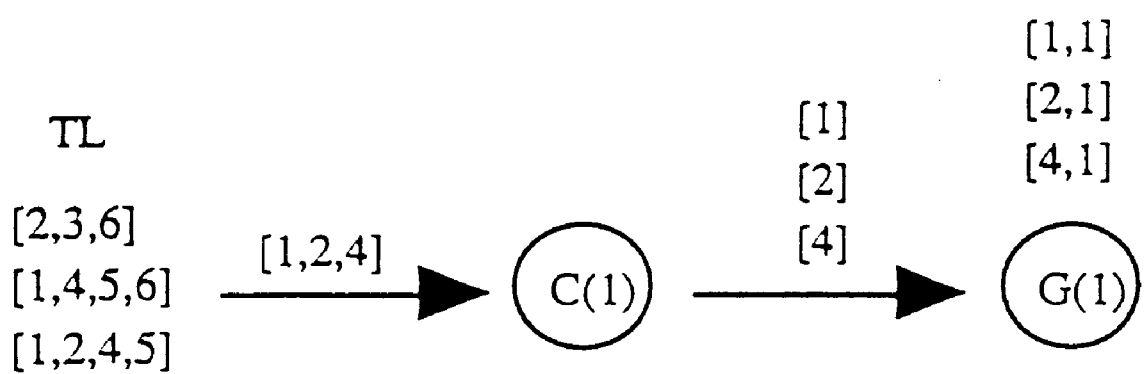
FIG. 49 is a chart (1) showing the generation process C(1) and the count process G(1) of individual items.

First, a transaction T1 [1,2,4] is read as shown in FIG. 49, and is input to C(1). In C(1), each of the items contained in the transaction, that is, [1], [2], and [4] are input into the occurrence count unit G(1). In G(1), the number of occurrences of the items [1], [2], and [4] is computed, and the items and their number of occurrences form the result in the format of [item, number of occurrences] as [1,1], [2,1], and [4,1].

Figure 50:
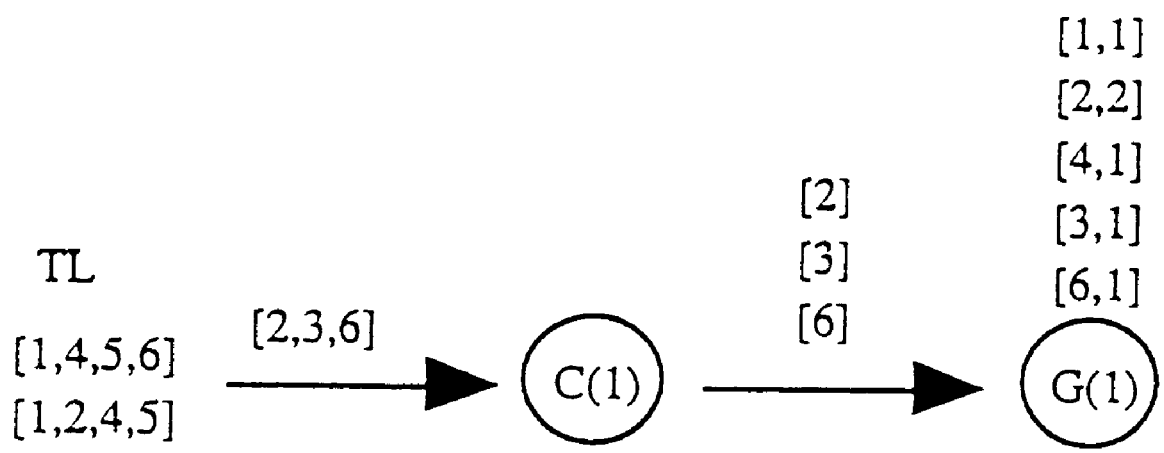
FIG. 50 is a chart (2) showing the generation process C(1) and the count process G(1) of individual items.
Figure 51:
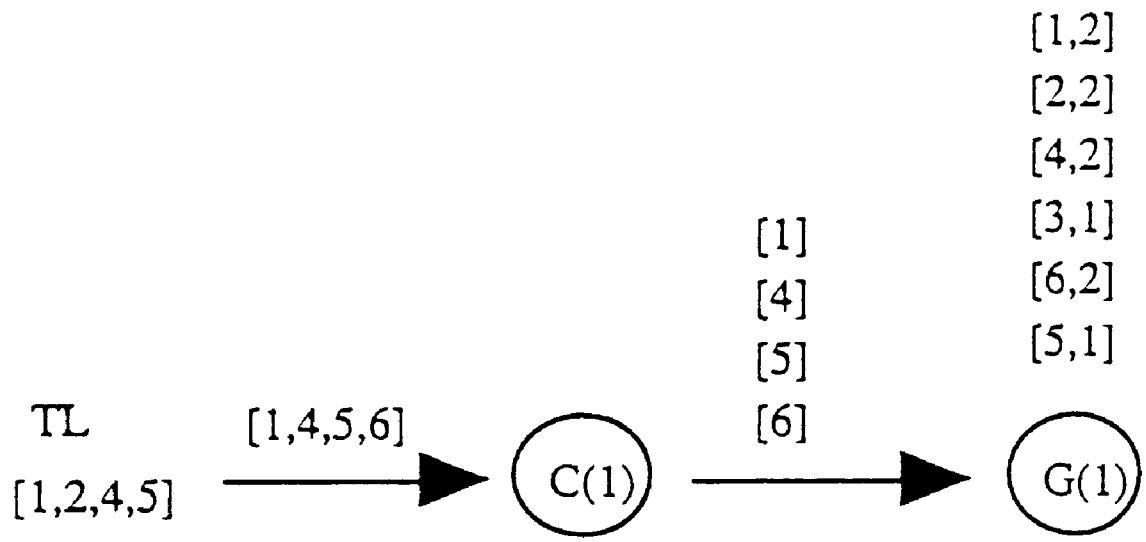
FIG. 51 is a chart (3) showing the generation process C(1) and the count process G(1) of individual items.

In FIG. 50, the three items [2], [3], and [6] are input into G(1) for the subsequent transaction T2=[2,3,6]. In G(1), each of the input items is counted. Since the item [2] is input from both T1 and T2, it results in [2,2] in the form of [item, number of occurrences].

Figure 52:
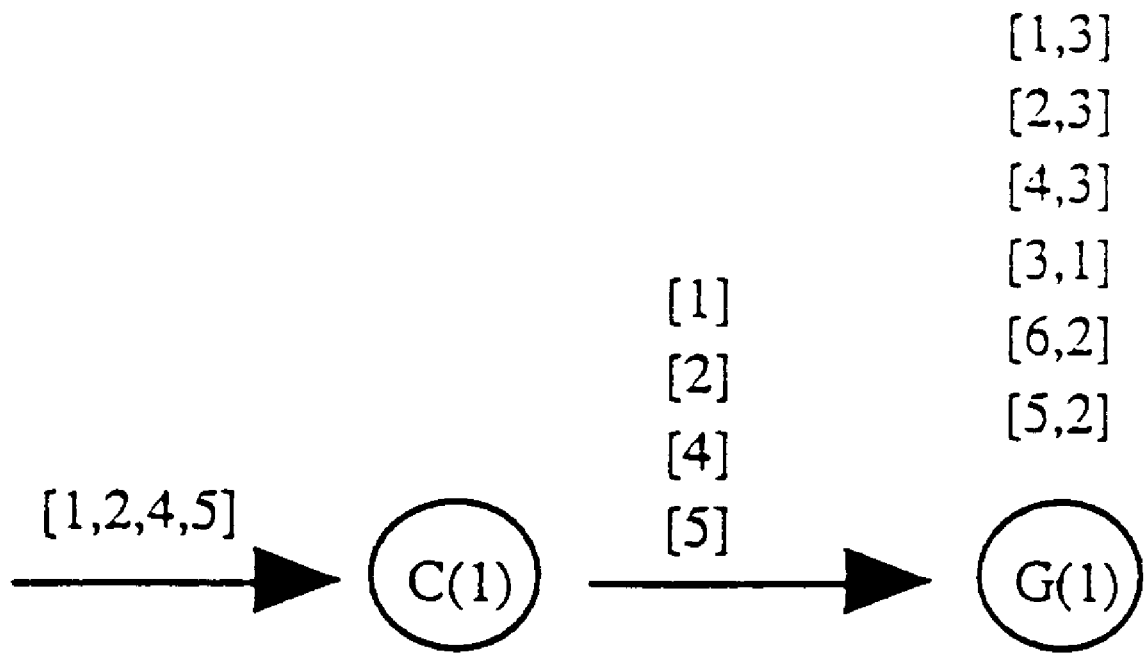
FIG. 52 is a chart (4) showing the generation process C(1) and the count process G(1) of individual items.

Similarly, for all transactions, each item is input from C(1) to G(1), and G(1) counts the item. After processing the transactions up to T4, as shown in FIG. 52, the set of [item, number of occurrences] in G(1) is composed of [1,3], [2,3], [4,3], [3,1], [6,2], [5,2].

Figure 53:
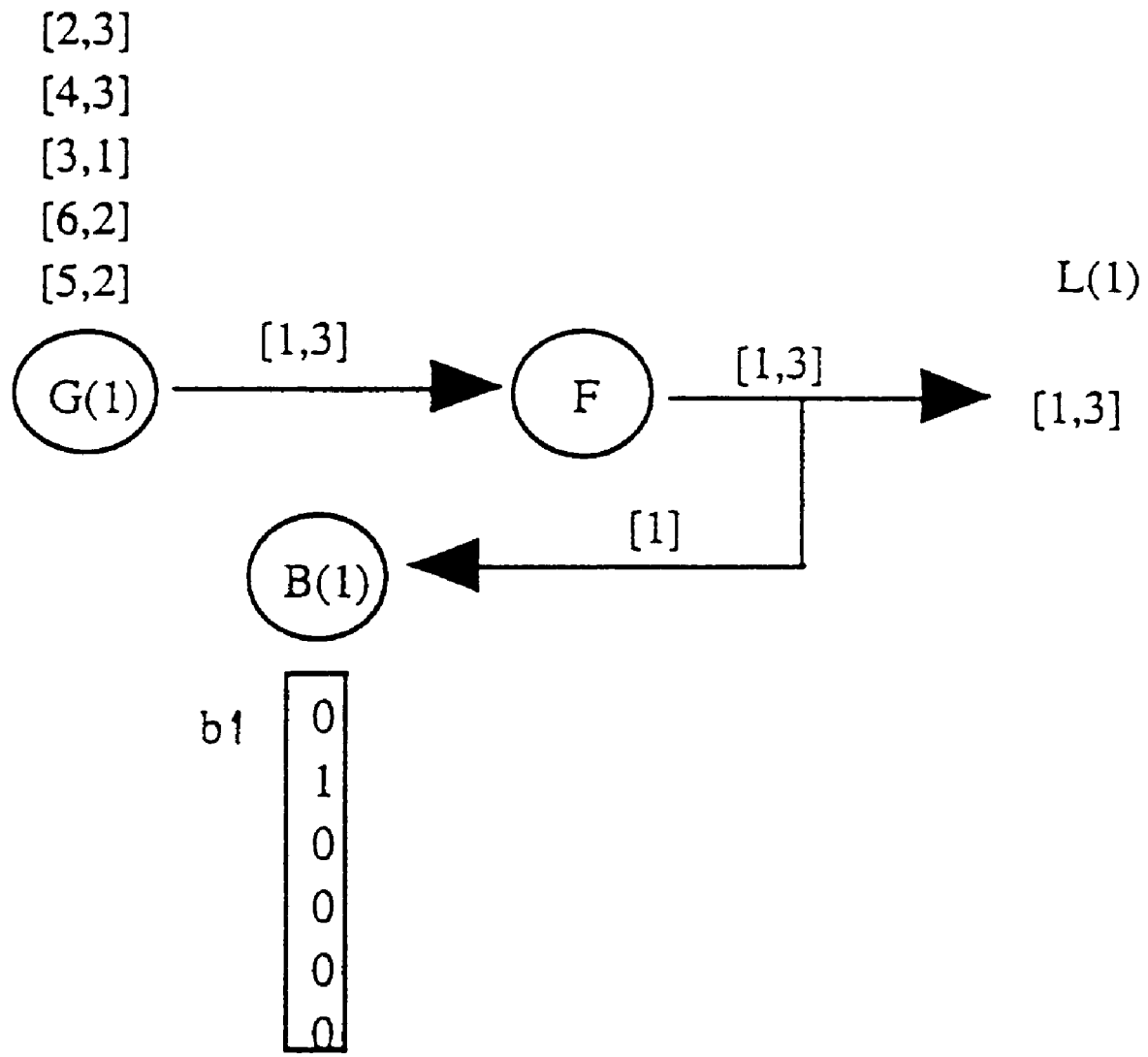
FIG. 53 is a chart (1) showing the selection of the large 1-itemset L(1)

When the items in all transactions are counted in G(1), the [item, number of occurrences] whose number of occurrences satisfies the given minimum value of support is selected in F. FIGS. 53 through 58 show the process. In FIG. 53, since the number of occurrences 3 in [1,3] satisfies the minimum value of 50%, [1,3] is entered in the large 1-itemset L(1). Simultaneously, B(1) sets the position corresponding to item [1] in bit map b1. In this example, bit map b1 is composed of 6 entries and the bit position (0 through 5) corresponding to the item is obtained by the following hash function H1.

H1 (item)=item mod 6

In this example, the number of bits in the bit map is the same as the number of unique items in the transaction. However, if the available memory space is not large enough to maintain such a one to one correspondence between bit position and item, a bit map with a smaller number of entries can be used. The initial value of all bits of the bit map is '0'. When a hash function is applied to item [1], H1(1)=1 mod 6=1. Therefore, the second bit of b1 from the top is set to '1'.

Figure 54:
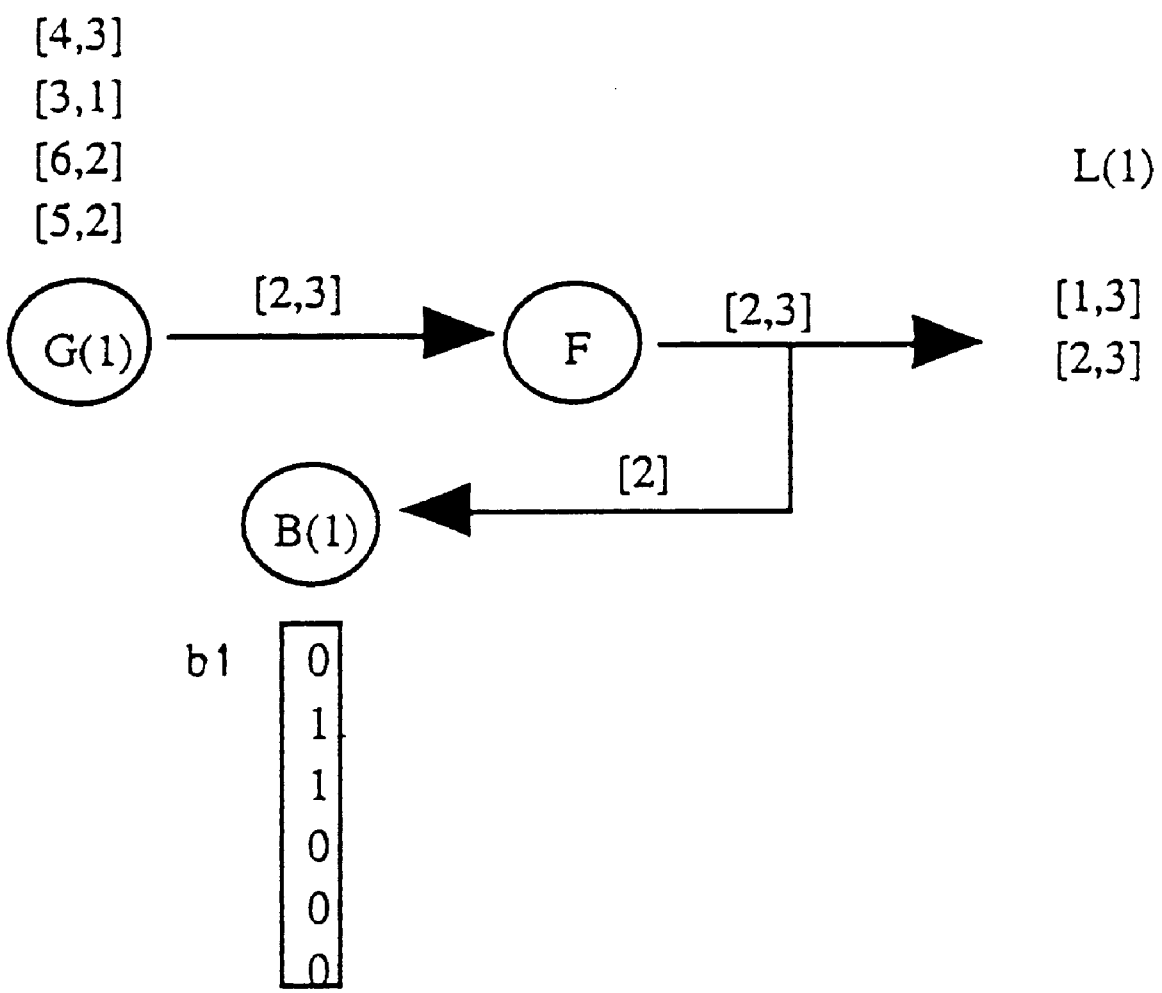
FIG. 54 is a chart (2) showing the selection of the large 1-itemset L(1)

Next, in FIG. 54, [2,3] is input into F and since the number of occurrences 3 of item [2] satisfies the minimum value of 50%, it is entered in the large 1-itemset L(1). Simultaneously, H1(2)=2 mod 6=2, and B(1) sets the third bit of the bit map b1 to '1'.

Figure 55:
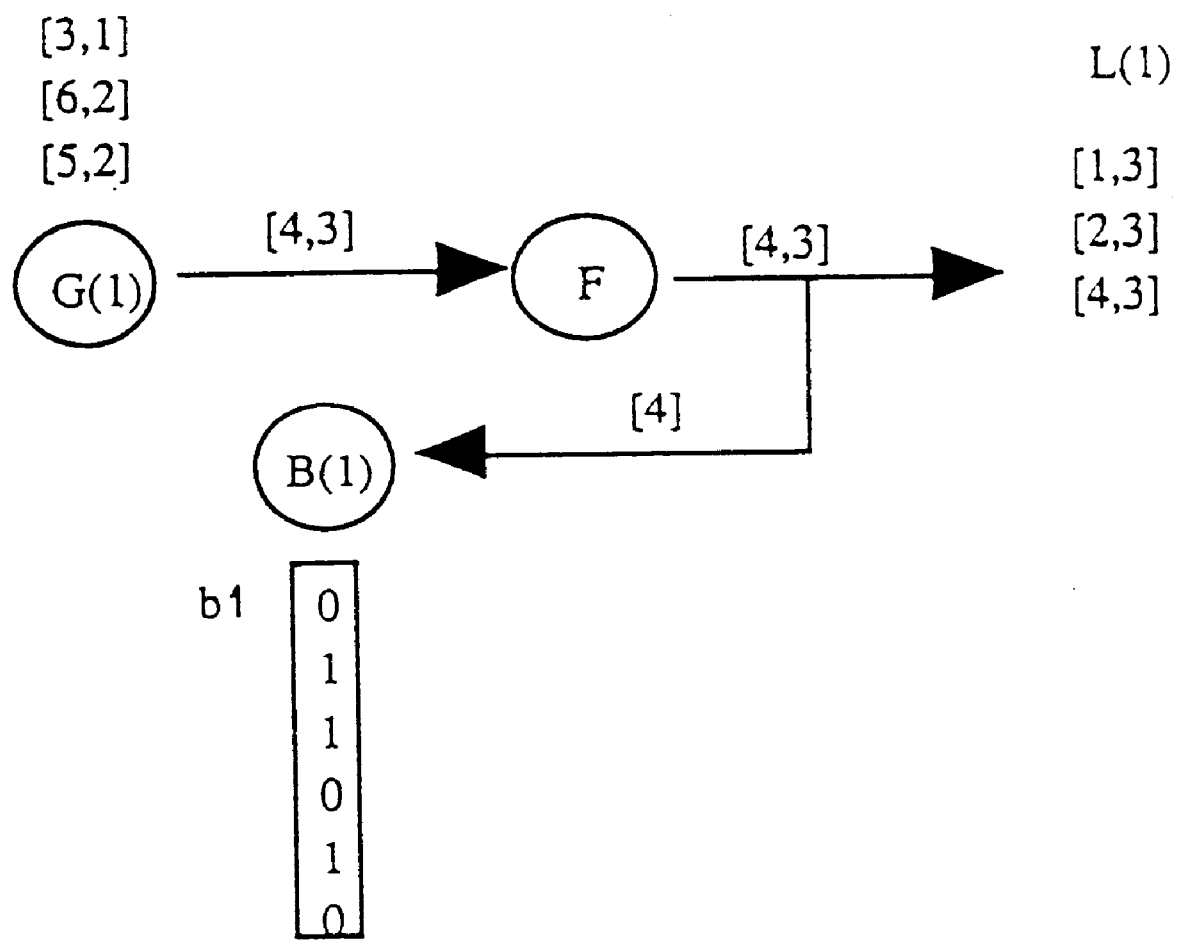
FIG. 55 is a chart (3) showing the selection of the large 1-itemset L(1)
Figure 57:
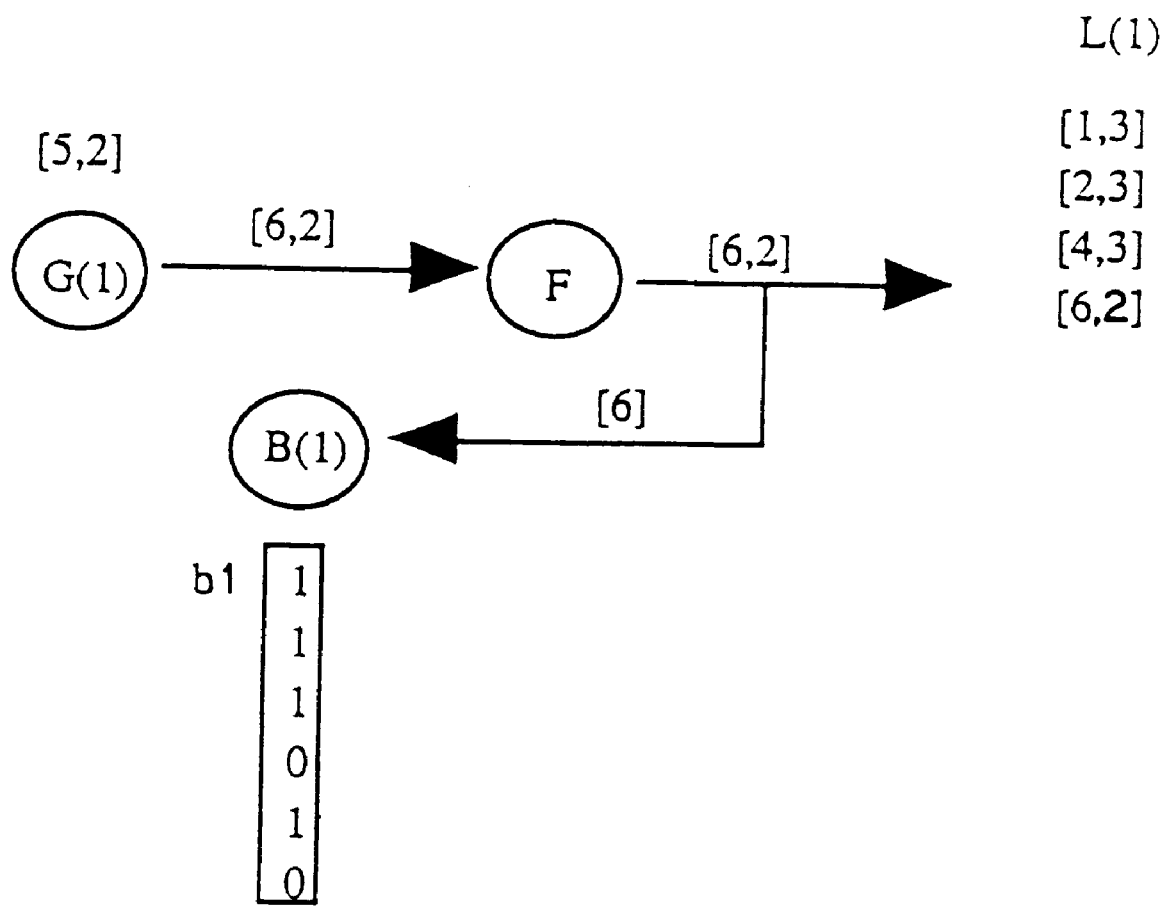
FIG. 57 is a chart (5) showing the selection of the large 1-itemset L(1)
Figure 58:
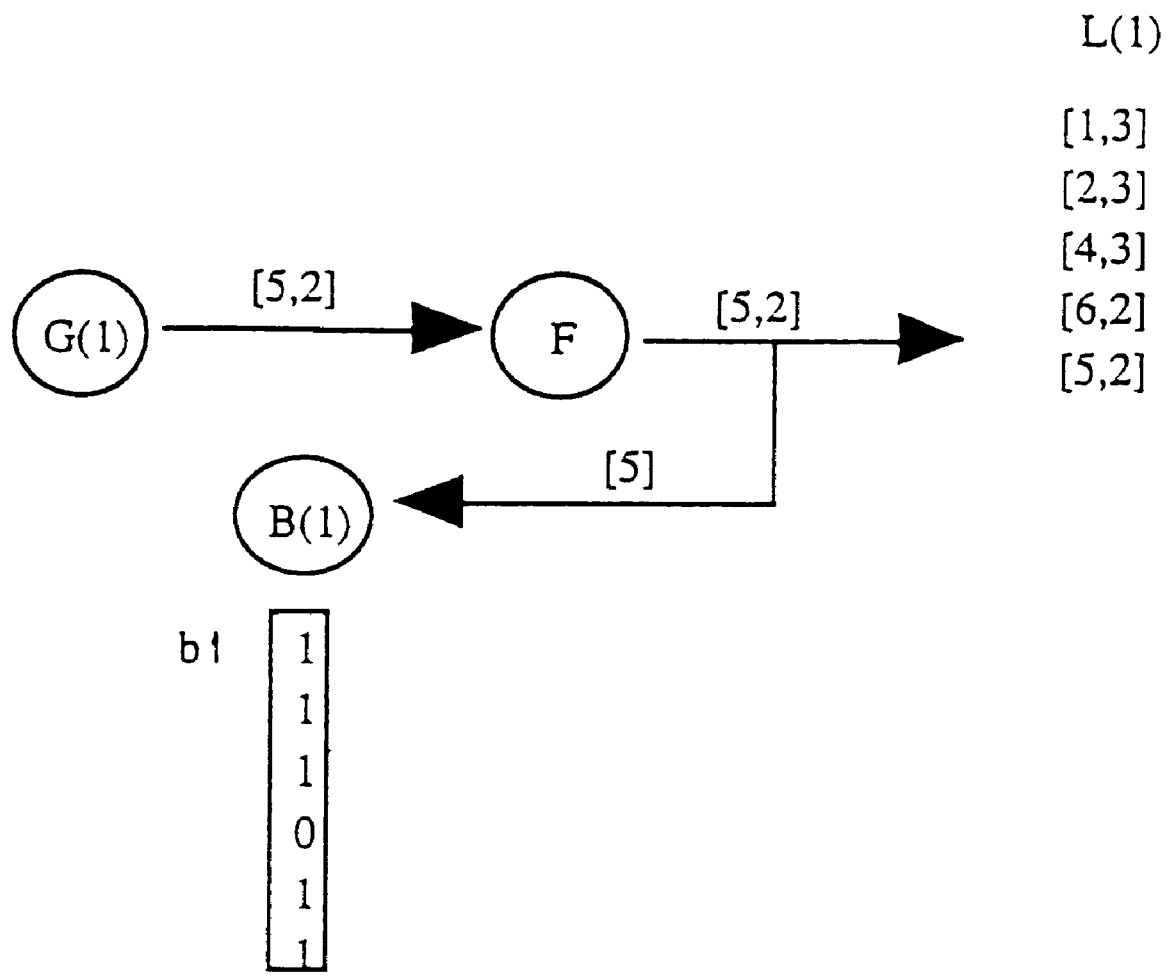
FIG. 58 is a chart (6) showing the selection of the large 1-itemset L(1)

Since the pairs of items and the number of occurrences [4,3], [6,2], and [5,2] satisfy the condition of the minimum value for support in FIGS. 55, 57, and 58, items [4], [6], and [5] and their numbers of occurrences are entered in the large 1-itemset L(1), and simultaneously, '1' is set at the position corresponding to the hash function value in the bit map b1 by B(1).

Figure 56:
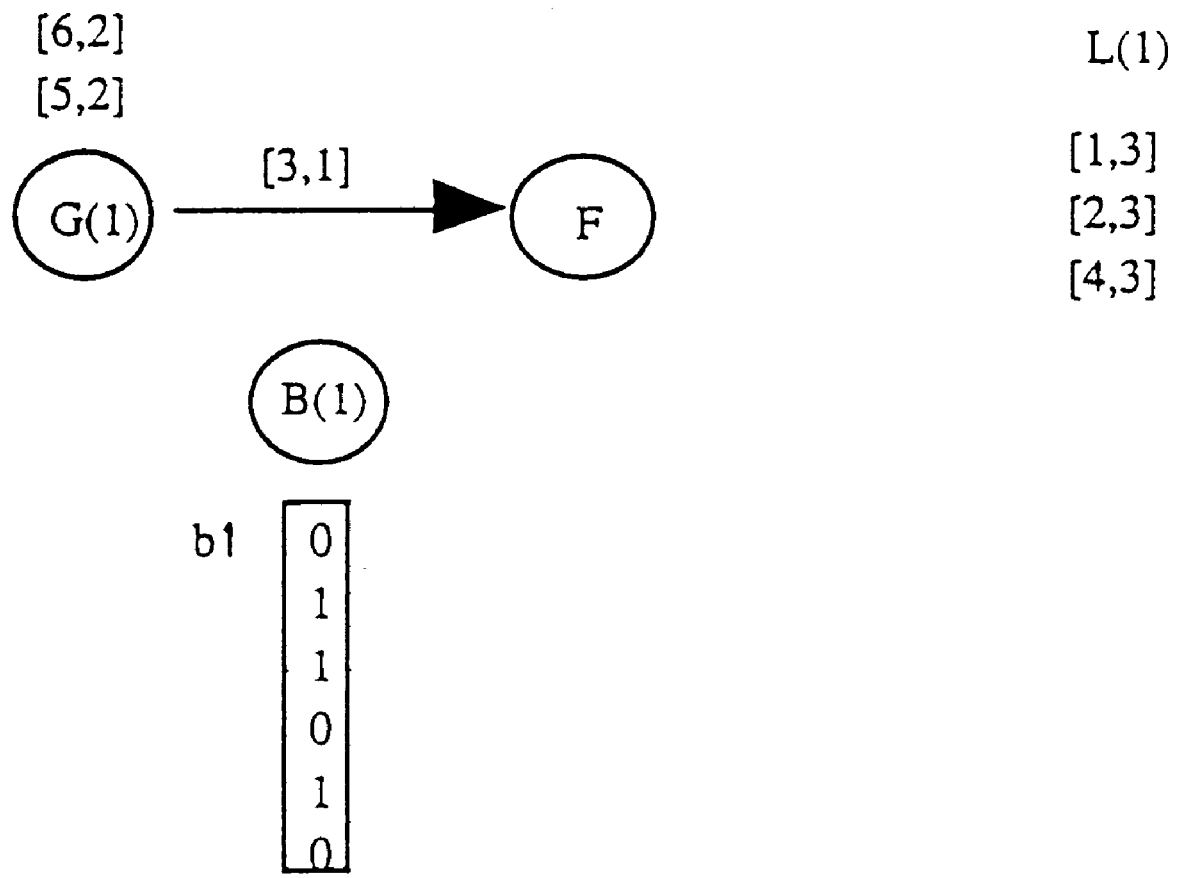
FIG. 56 is a chart (4) showing the selection of the large 1-itemset L(1)

However, as shown in FIG. 56, the number of occurrences in [3,1] is 1 and does not satisfy the condition of the minimum support value. Therefore, [3,1] is neither input to the large 1-itemset L(1) nor to B(1). As shown in FIG. 58, the result of the processing of the first step, that is, the counting of individual items that satisfy the specified minimum support value, is a large 1-itemset L(1)={[1,3], [2,3], [4,3], [6,2], [5,2]} and a bit map b1 {1,1,1,0,1,1}.

Figure 59:
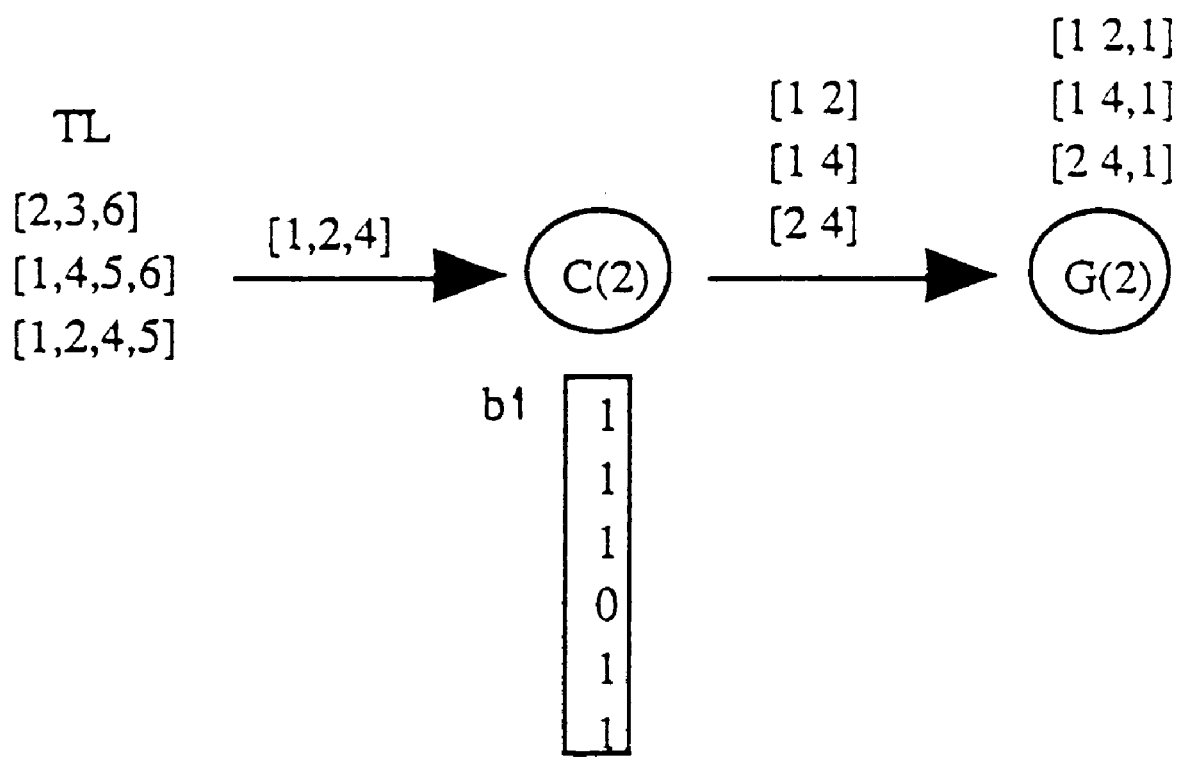
FIG. 59 is a chart (1) showing the processes up to the process G(2) of counting combinations of two items.

Described below is the processing of the second step, that is, counting of combinations of two items which satisfy the given minimum support value. FIGS. 59 through 62 show the processes up to the process of counting a combination of two items. In generating a combination of two items, the bit map b1 generated by B(1) is used. First, the transaction T1=[1,2,4] is read as shown in FIG. 59 and the generation of combinations of two items using the bit map b1 is performed in C(2). Since all the three items [1], [2] and [4] in T1 have their corresponding bits 0, 1 and 3, respectively, set in b1, all the three combinations of two items from those three items [1 2], [1 4], and [2 4] are generated and entered in the count unit G(2). Since each of [1 2], [1 4], and [2 4] is entered once, after the processing of the first transaction T1, G(2) gives [1 2,1], [1 4,1], and [2 4,1] in the format of [item 1 item 2, number of occurrences].

Figure 60:
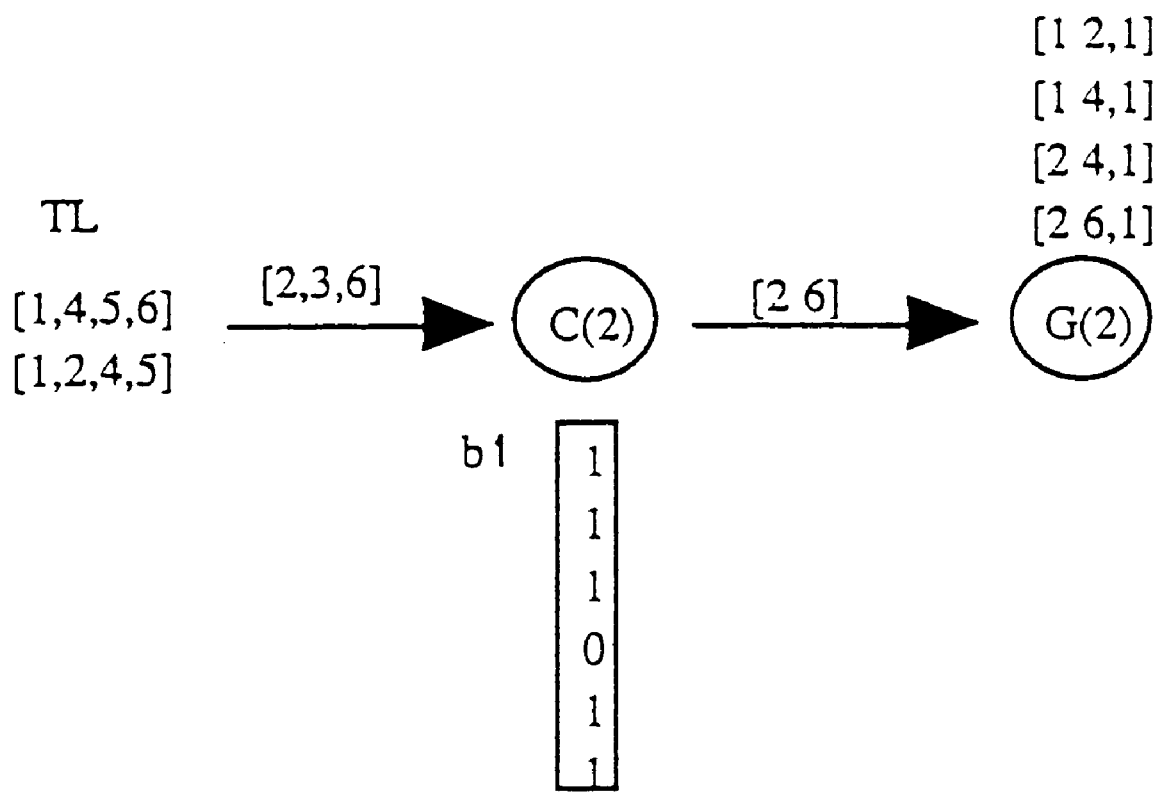
FIG. 60 is a chart (2) showing the processes up to the process G(2) of counting combinations of two items.
Figure 61:
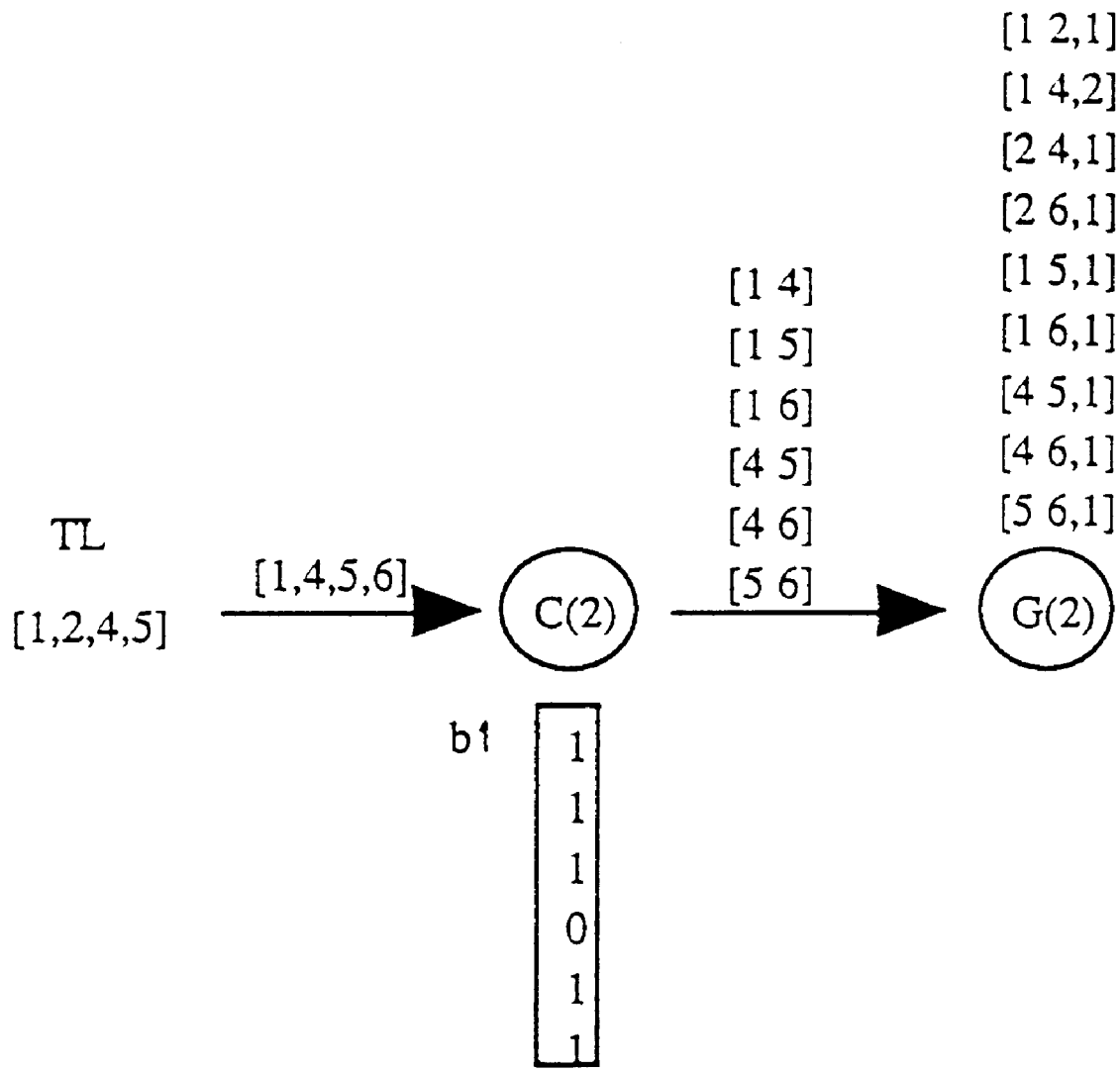
FIG. 61 is a chart (3) showing the processes up to the process G(2) of counting combinations of two items.
Figure 62:
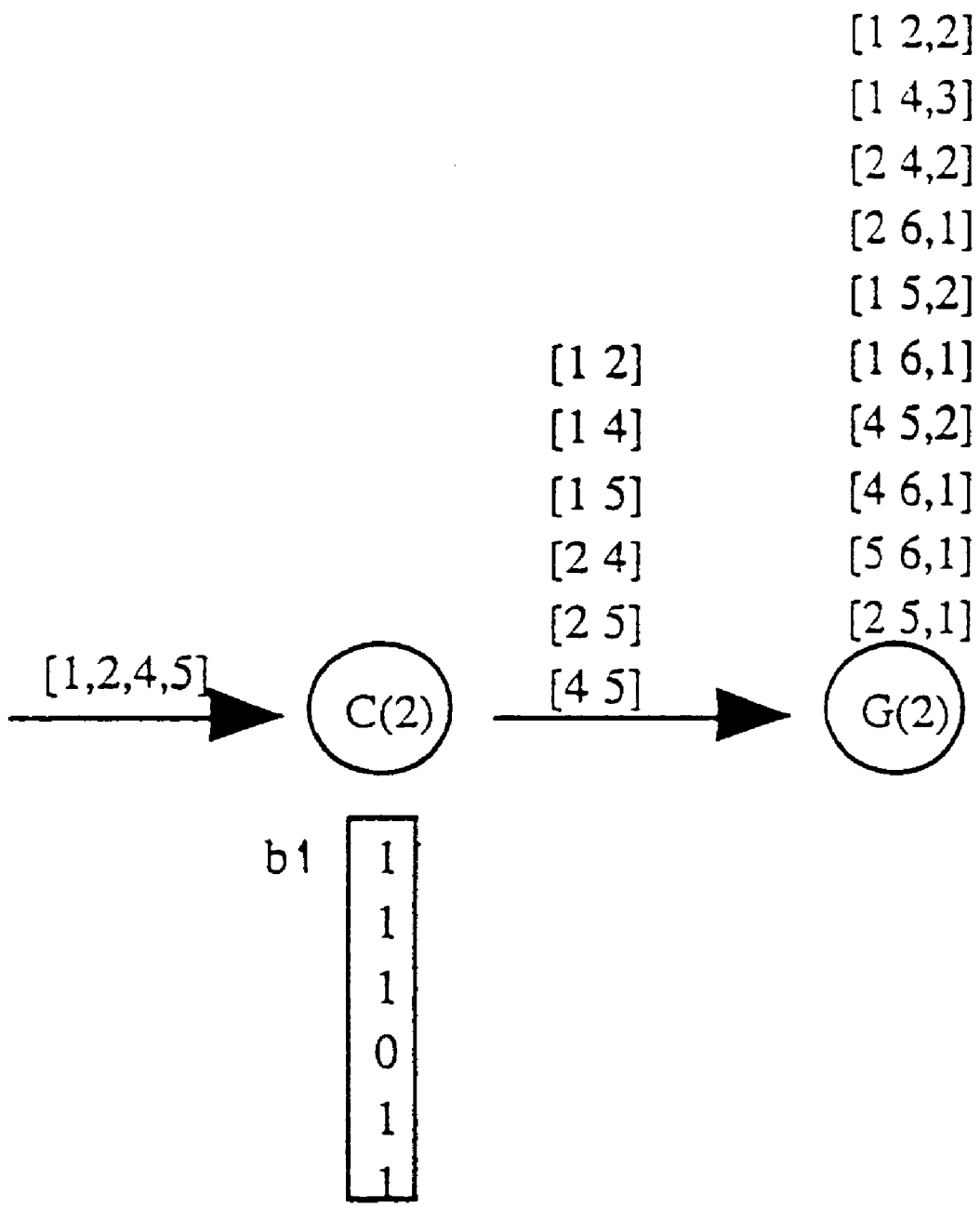
FIG. 62 is a chart (4) showing the processes up to the process G(2) of counting combinations of two items.

Then, as shown in FIG. 60, the second transaction T2=[2,3,6] is input to C(2). By checking whether each of the items [2],[3], [6] have the corresponding bit set to '1' in the bit map b1, it is found that the bit for item [3] is '0'. Thus, since C(2) generates only the combination of items whose corresponding bits are set to '1' in the bitmap b1, only the combination [2 6] is input into G(2). Similar checking and generation of combinations of two items are done for transactions T3 and T4. As all items in T3 and T4 have their corresponding bits set to '1' in b1, for each transaction, all possible combinations of two items are generated and input into G(2), as shown in FIGS. 61 and 62, respectively.

Figure 63:
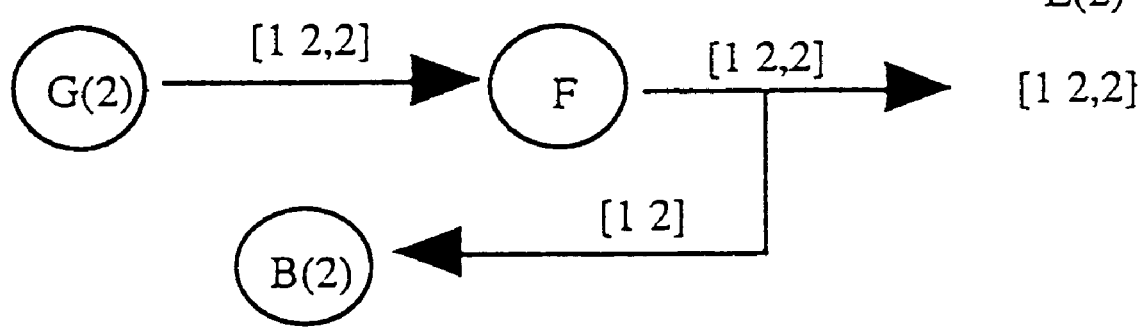
FIG. 63 is a chart (1) showing the selection of the large 2-itemset L(2)
Figure 65:
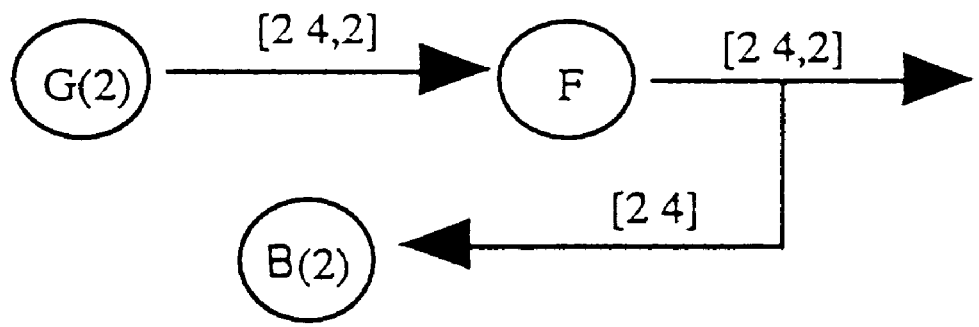
FIG. 65 is a chart (3) showing the selection of the large 2-itemset L(2)
Figure 68:
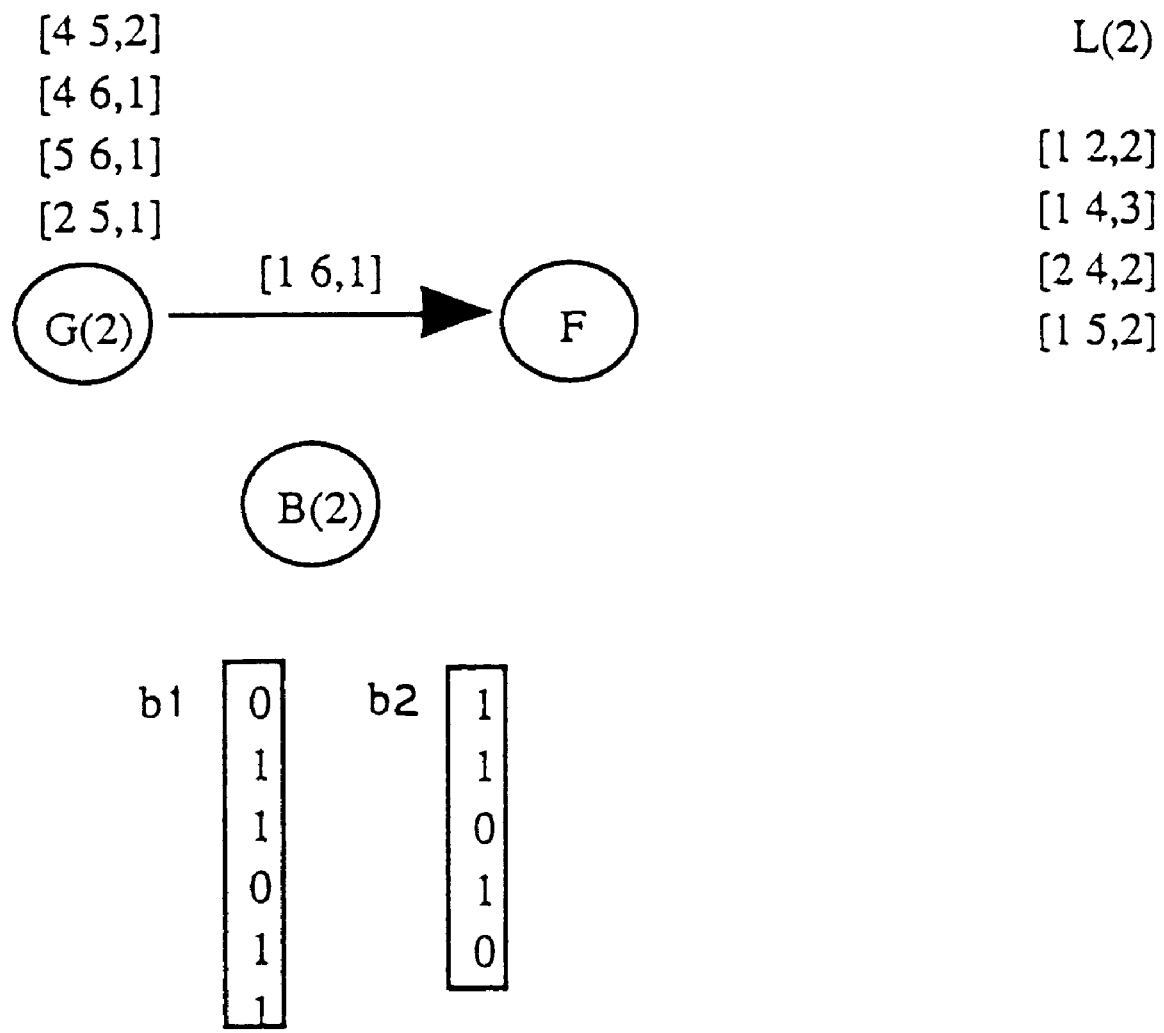
FIG. 68 is a chart (6) showing the selection of the large 2-itemset L(2)
Figure 69:
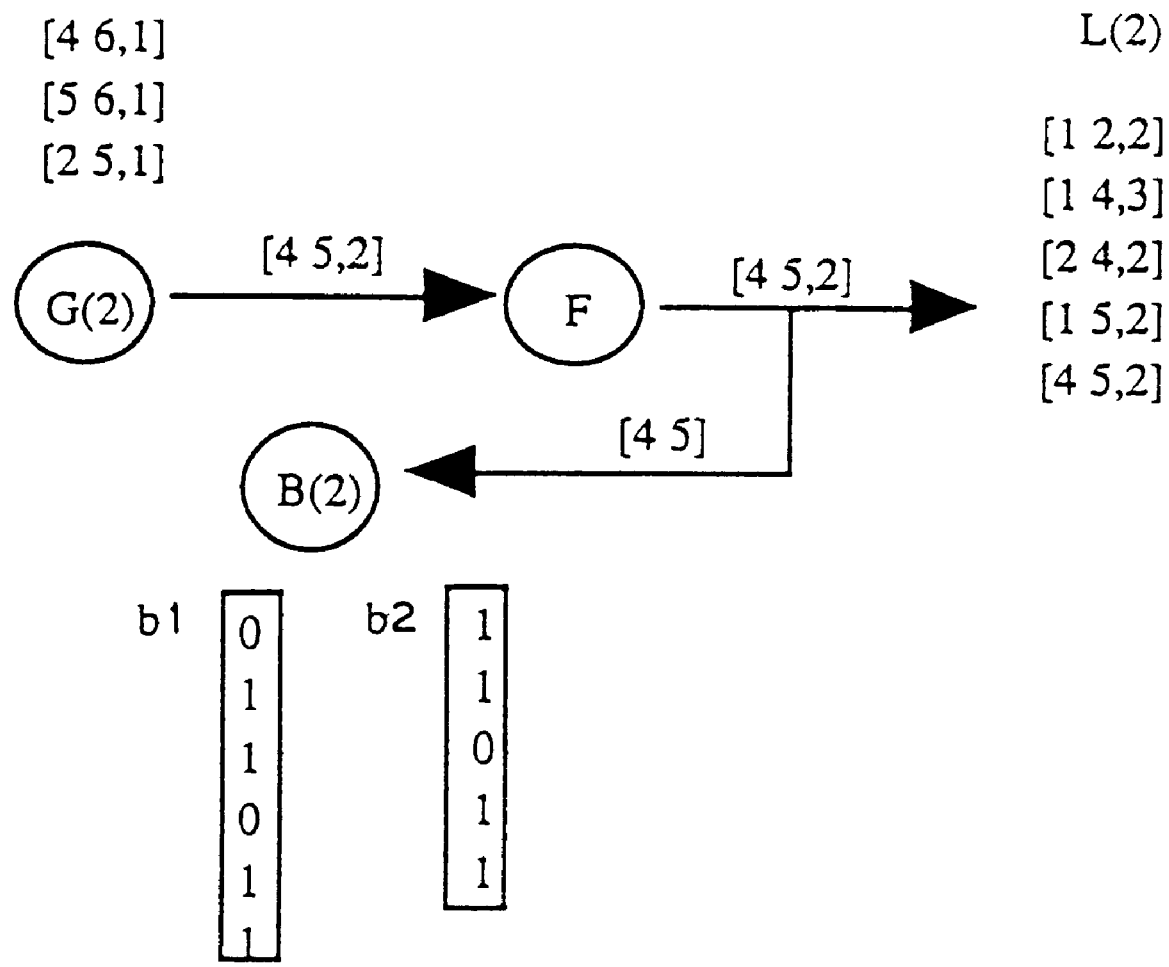
FIG. 69 is a chart (7) showing the selection of the large 2-itemset L(2)
Figure 70:
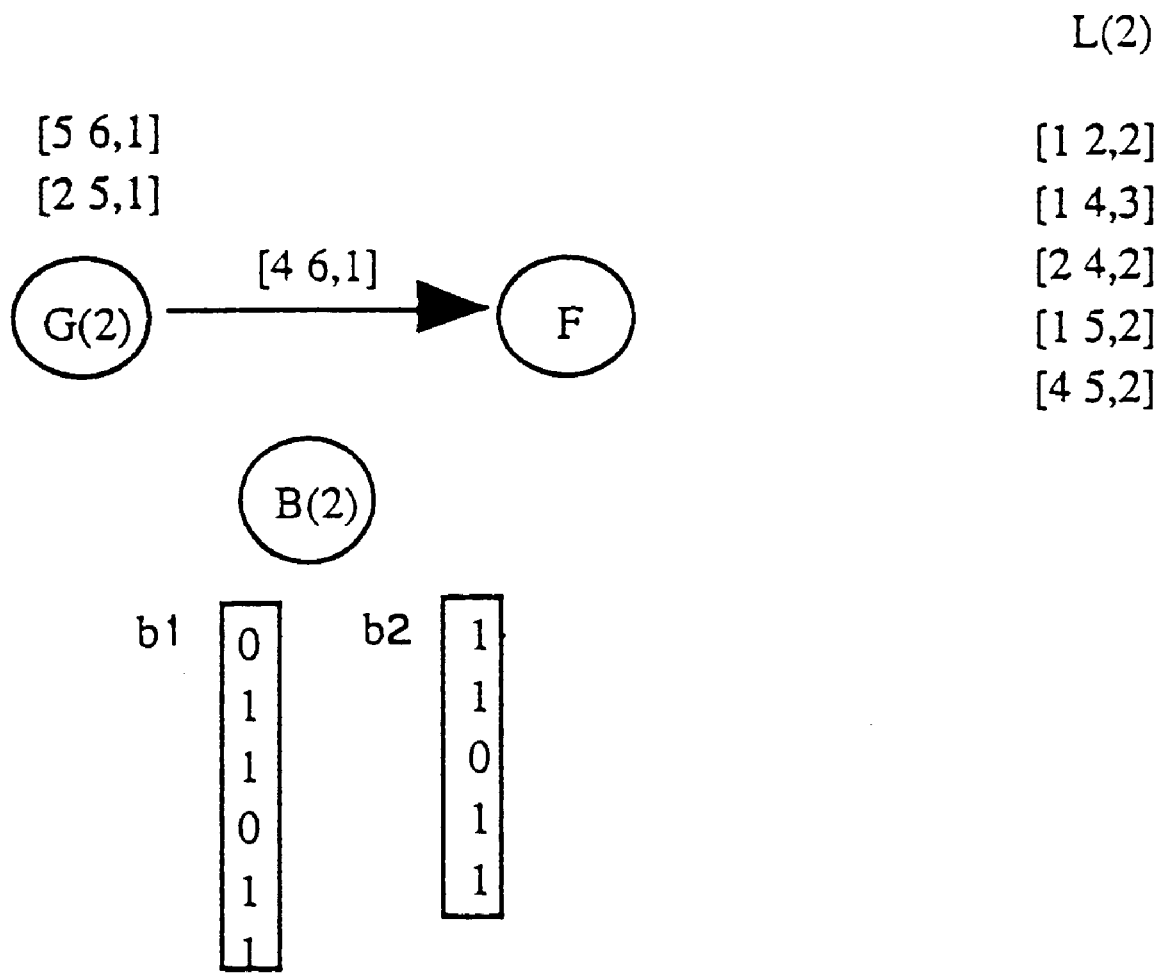
FIG. 70 is a chart (8) showing the selection of the large 2-itemset L(2)
Figure 71:
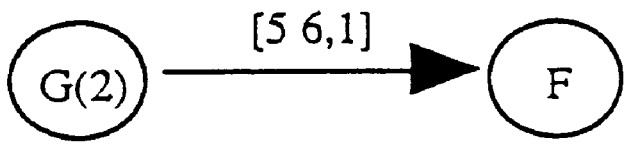
FIG. 71 is a chart (9) showing the selection of the large 2-itemset L(2)

After counting all the combinations of two items generated by C(2) for the four transactions in TL, G(2) outputs [item 1 item 2, number of occurrences] to the combination selection unit F that selects the combinations satisfying the condition of the minimum value of the number of occurrences. The process is shown in FIGS. 63 through 72. In FIG. 63, since the number of occurrences of [1 2,2] satisfies the condition of the minimum support value of 50%, the combination [1 2] and the number of occurrences 2 are entered into the large 2-itemset L(2) and simultaneously [1 2] is input to the bit map generation unit B(2). In this example, a combination of two items is used to update a bit map b1, which sets to '1' the bit positions corresponding to each of the two items in the combinations, and a bit map b2, which sets to '1' the bit position corresponding to the combination of the two items. Thus, for the combination [1 2], the bit positions corresponding to items [1] and [2], which are given as H1(1)=1 mod 6=1, and H1(2)=2 mod 6=2, respectively, are set to '1' in b1. Furthermore, for the bit map b2, which has 5 entries, the bit position corresponding to the combination of two items [item 1 item 2] is computed using the following hash function H2.

H2 (item 1, item 2)=(item 1+item 2) mod 5.

Therefore, for [1 2], the corresponding bit position given by H2(1,2)=3 mod 5=3 is set to '1'.

In this example, bit maps b1, for individual items, and b2, for combinations of two items, are implemented in two different bit vectors. However, one large bit vector could be used to hold information from both the individual items and the combinations of two items.

Figure 72:
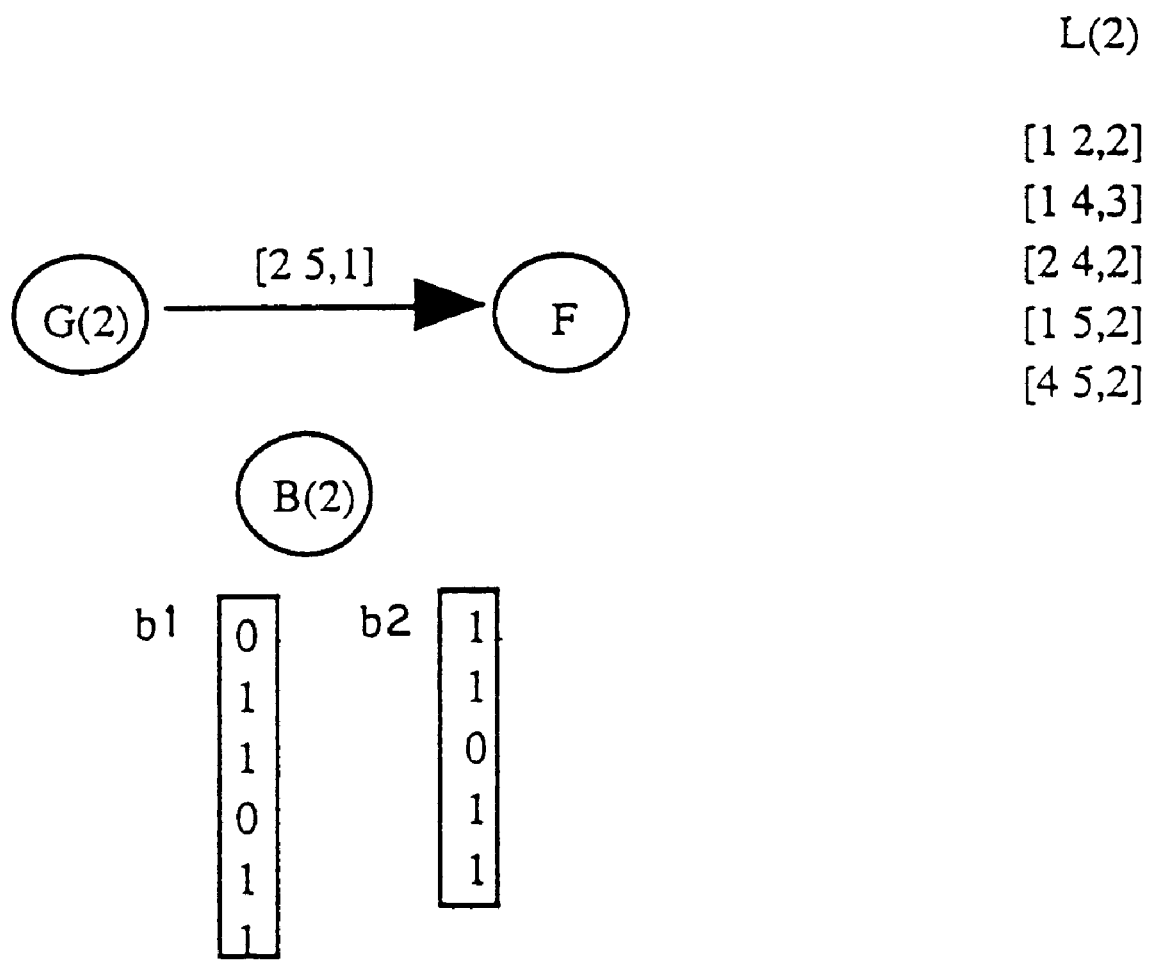
FIG. 72 is a chart (10) showing the selection of the large 2-itemset L(2)

As shown in FIGS. 64, 65, 67, and 69, [1 4,3], [2 4,2], [1 5,2], and [4 5,2] satisfy the minimum value for support. Therefore, these combinations of two items are entered in the large 2-itemset L(2), and the bit maps b1 and b2 are updated by B(2). On the other hand, in FIGS. 66, 68, and 70 through 72, the condition of the minimum value for support is not satisfied. Therefore, no entry is made in the large 2-itemset L(2) and no bit map update is performed by B(2). As a result of the above described process, the combinations of two items in the large 2-itemset L(2) ={[1 2, 2], [1 4,3], [2 4,2], [1 5,2], [4 5,2]}, and the bit maps b1={0,1,1,0,1,1}, and b2={1,1,0,1,1} are generated, as shown in FIG. 72.

Figure 73:
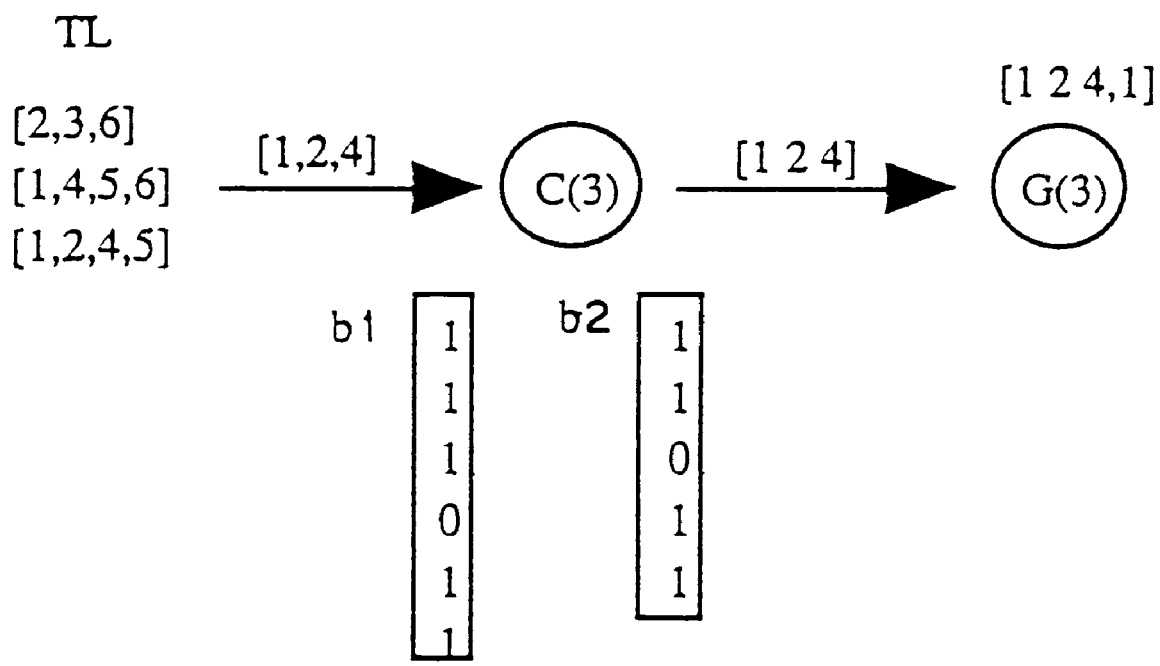
FIG. 73 is a chart (1) showing the processes up to the process G(3) of counting combinations of three items.

Described below is the processing of the third step, that is, counting of combinations of three items which satisfy the given minimum support value. FIGS. 73 through 76 show the processes up to the process of counting a combination of three items. In this example, the bit maps b1 and b2 generated in B(2) are used when a combination of three items is generated in C(3). First, the transaction T1=[1,2,4] is read, and the combinations of three items are generated in C(3) using the bit maps b1 and b2. In this example, first it is verified that the three items [1], [2], and [4] have their corresponding bits set to '1' in b1. Then, it is checked whether or not all the possible combinations of two of those three items [1 2], [1 4], and [2 4] have their corresponding bits set to '1' in the bit map b2. In this case, all the three combinations have their bits set to '1' and thus, the combination of three items [1 2 4] is input into G(3). FIG. 73 shows this process.

Figure 74:
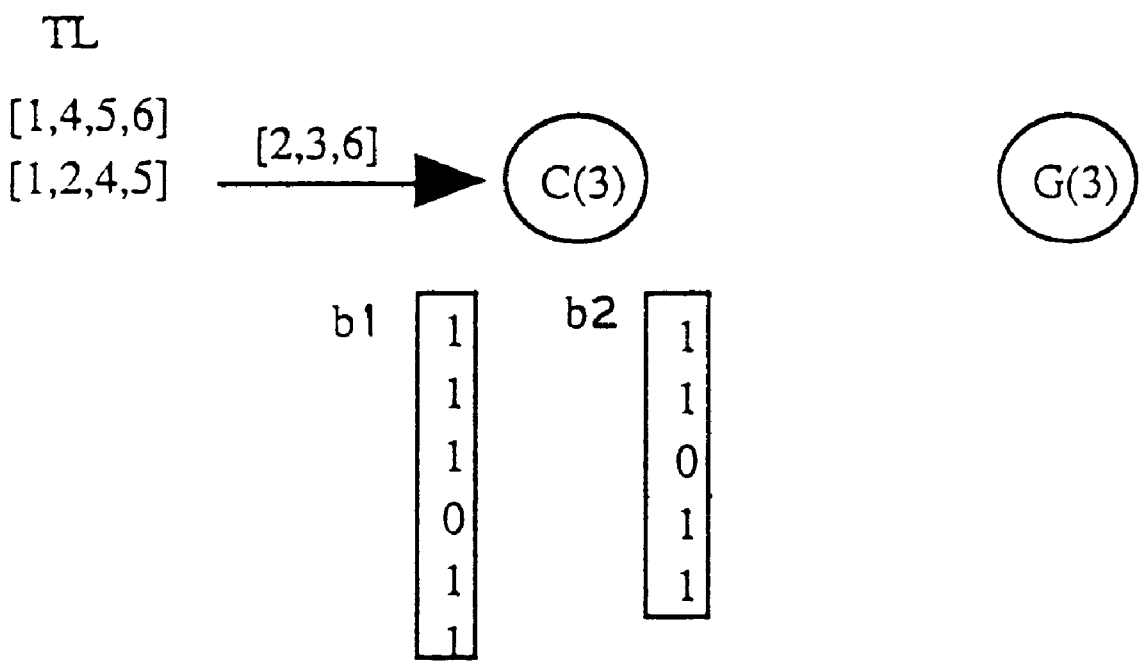
FIG. 74 is a chart (2) showing the processes up to the process G(3) of counting combinations of three items.

As shown in FIG. 74 for the case of T2=[2,3,6], it is verified in C(3) that item [3] has its bit position set to '0' in b1. Therefore, only items [2] and [6] can be used for generating a combination of three items. Thus, no combination is generated in C(3) and no input is made into G(3).

Figure 75:
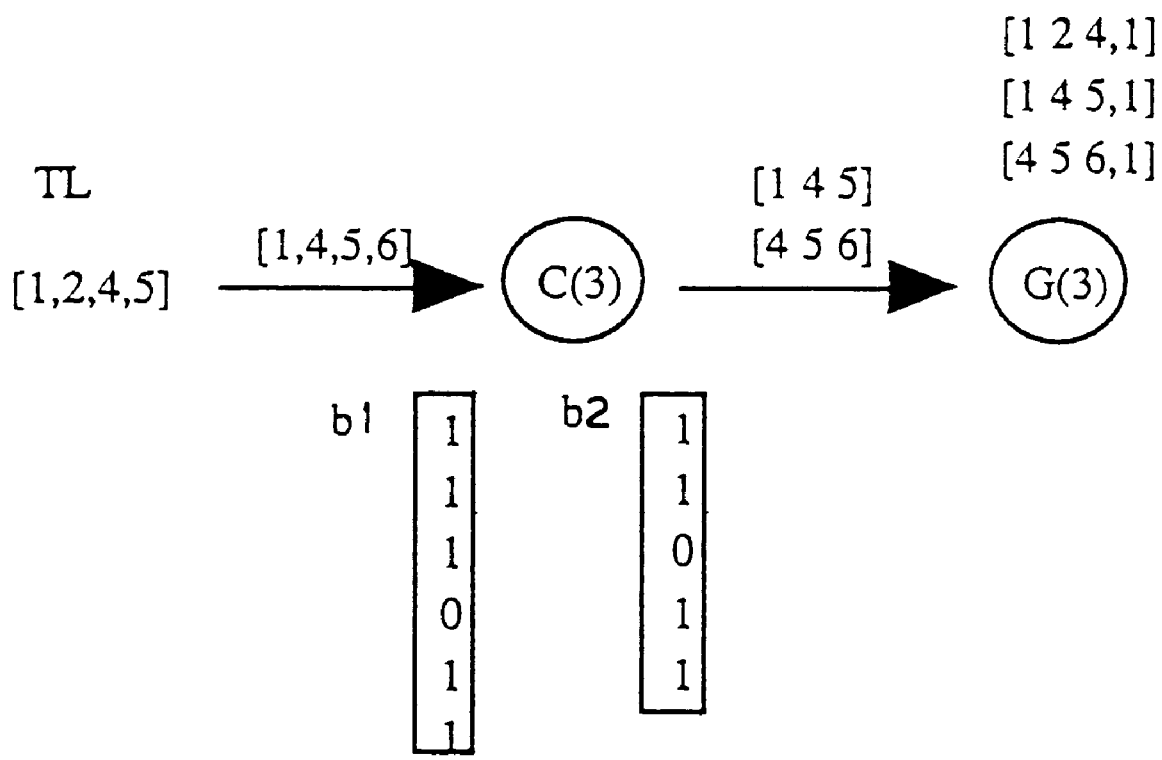
FIG. 75 is a chart (3) showing the processes up to the process G(3) of counting combinations of three items having the length of 3.

When T3=[1,4,5,6], the bits of b1 corresponding to [1], [4], [5], and [6] are set to '1'. Therefore, the combinations of three items [1 4 5], [1 4 6], [1 5 6], and [4 5 6] are analyzed and checked using the bit map b2. In the case of [1 4 5], all possible combinations of two items [1 4], [1 5], and [4 5] have their corresponding bits set to '1' in b2 and thus, [1 4 5] is input into G(3), as shown in FIG. 75.

However, in the case of [1 4 6], the bits of b2 corresponding to [1 4] and [4 6] are set to '1', but the bit for [1 6] is set to '0'. Therefore, [1 4 6] is not input into the G(3). Similarly, since the bits in the b2 corresponding to all combinations of two items in [4 5 6], that is, [4 5], [4 6], and [5 6], are set to '1', [4 5 6] is input to G(3). Finally, since the bit in b2 for [1 6] is set to '0', [1 5 6] is not input into G(3).

Figure 76:
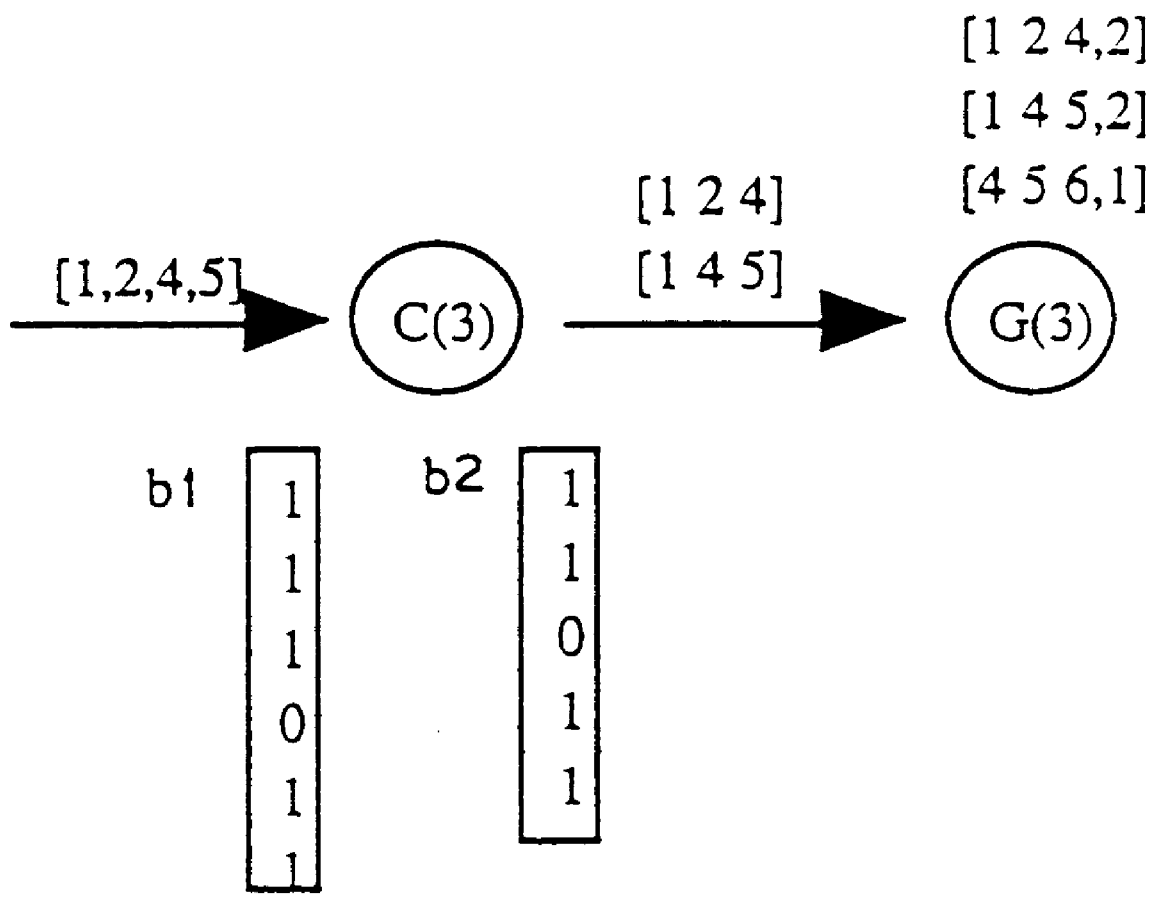
FIG. 76 is a chart (4) showing the processes up to the process G(3) of counting combinations of three items having the length of 3.

As shown in FIG. 76, similar checks in b1 and b2 are made to items in T4=[1,2,4,5], and then the combinations of three items [1 2 4] and [1 4 5] are input to G(3).

In this example, to prevent unnecessary combinations from being generated, all combinations of two items are checked in bit map b2 when a combination of three items is generated. This method is effective for pruning and avoiding unnecessary counting. However, if convenient, only some of the possible combinations of two items can be checked in b2. For example, when a combination of three items is generated, a checking operation on b2 can be performed only for the leading combination of two items. This method may decrease the number of pruned combinations, and may increase the number of unnecessary combinations. Therefore, the process load in G(3) becomes heavier, but the load of the checking operation in C(3) is reduced. The amount of checking that results in the most efficient processing depends on the data, the program implementation, and in the characteristics of the system.

Furthermore, when the available memory capacity is not sufficient, for example, an extreme method of not checking any combination of two items, that is, a method of not generating and using b2 can be followed.

Figure 77:
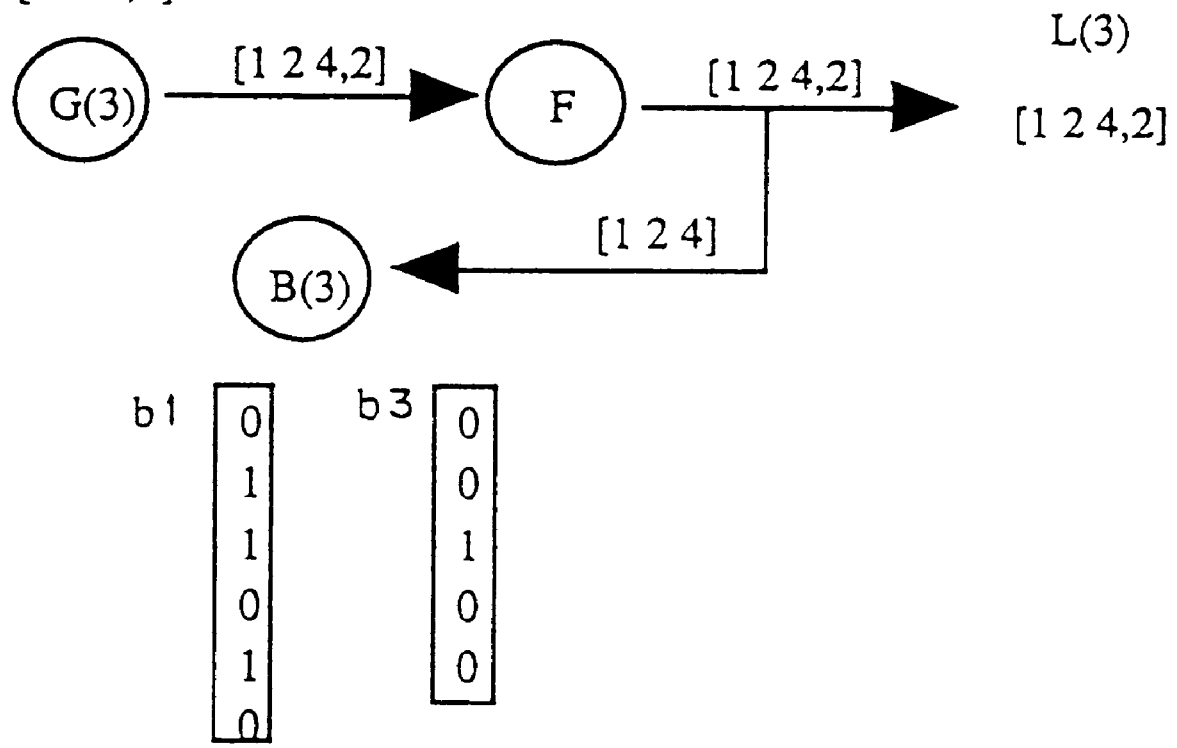
FIG. 77 is a chart (1) showing the selection of the large 3-itemset L(3)
Figure 78:
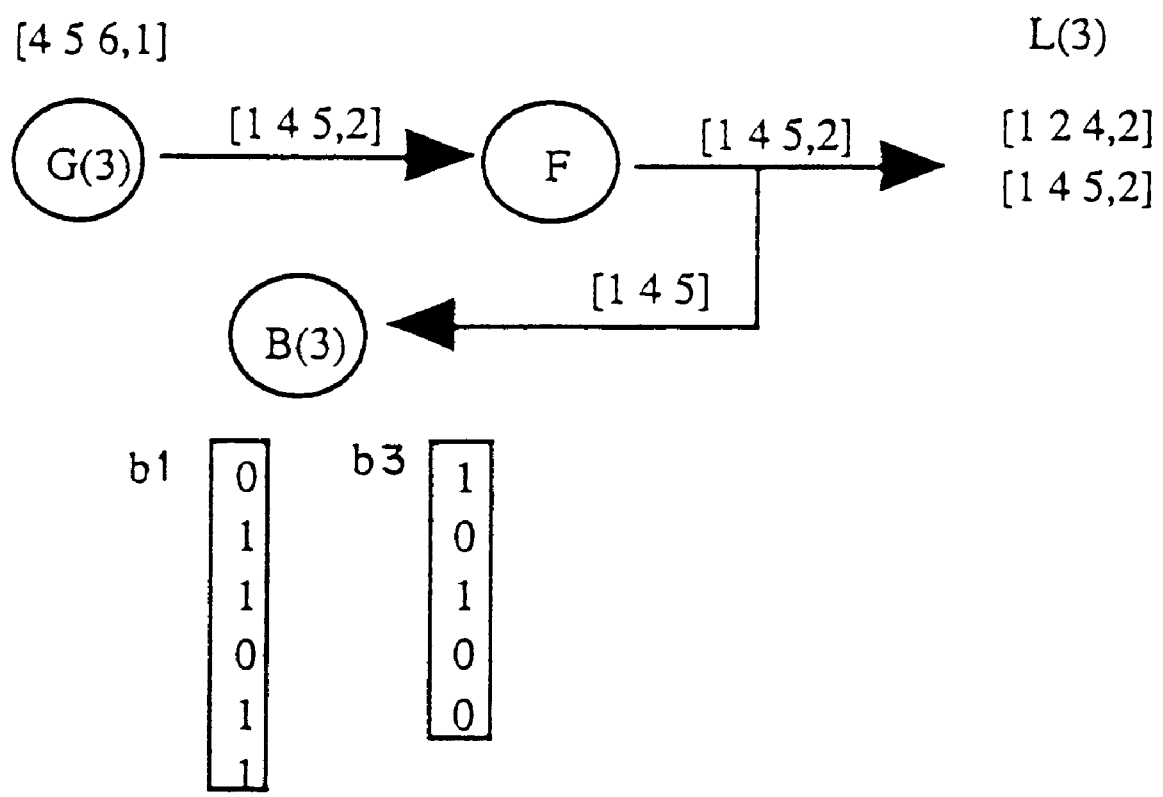
FIG. 78 is a chart (2) showing the selection of the large 3-itemset L(3)
Figure 79:
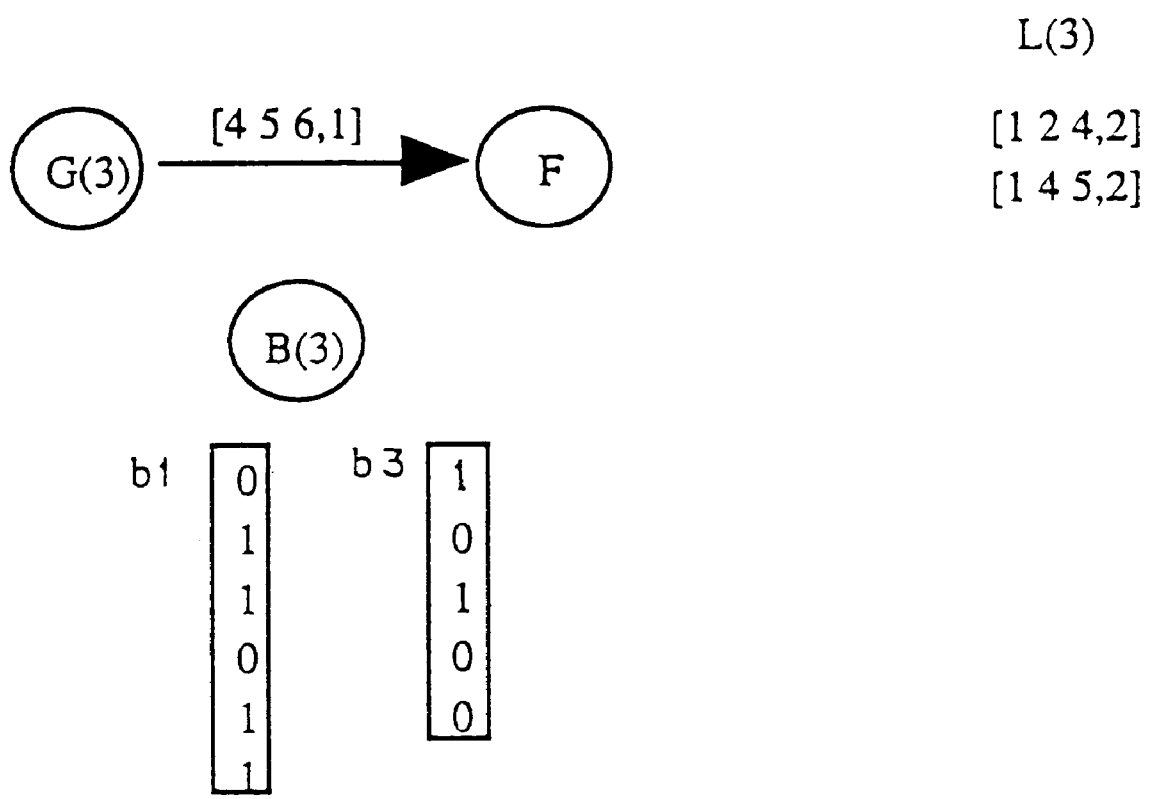
FIG. 79 is a chart (3) showing the selection of the large 3-itemset L(3)

As shown in FIGS. 77 through 79, when the counting of all the combinations of three items is finished in G(3), each of [item1 item2 item3, number of occurrences] is input into F, which selects those combinations whose number of occurrences satisfies the condition of the minimum value for support. In FIG. 77, the number of occurrences of [1 2 4,2] is 2, and satisfies the condition of the minimum value of 50%. Therefore, it is entered in the large 3-itemset L(3). Simultaneously, B(3) sets '1' at the bit positions corresponding to [1], [2], and [4] in the bit map b1. Furthermore, in this example, '1' is also set at the bit position of the bit map b3 corresponding to combinations of three items, which are determined by using the following hash function H3.

H3 (item 1, item 2, item 3) (item 1+item 2+item 3) mod 5.

Thus, for the combination of three items [1 2 4], the corresponding bit position in b3 is given by H3(1,2,4) 7 mod 5=2 and thus, the third bit in b3 is set to '1'. Besides updating bit maps b1 and b3, combinations of two items could be retrieved from [1 2 4] to generate the bit map b2. However, in this example, only b1 and b3 are generated.

As a result of a similar processing in FIGS. 78 and 79, the large 3-itemset L(3)={[1 2 4,2], [1 4 5, 2]}, and the bit maps b1={0,1,1,0,1,1}, and the b3={1,0,1,0,0} are generated.

As shown in FIG. 79, the number of combinations of three items in the large 3-itemset L(3) is two, which is smaller than the termination condition of 4 specified in step S503 shown in FIG. 47. Thus, the process of generating and counting combinations of items terminates, and the association rules can be generated based on the combinations and their number of occurrences output in the large itemsets L(1), L(2) and L(3).

In the above described example, when i>=2, the C(i) generates a combination of i items by checking bit maps b1 and b(i-1). As was observed before, the checking should be done by using only b1, or, if more convenient, a number of bit maps from the (i-2) bit maps b2 through b(i-1). And, they could be implemented by multiple bit vectors or a unique large bit vector. Also, in this example, for each processing step, the original transactions TL are read and input to C(i). However, it is possible to reduce the number of original transactions by removing items which are not subsets of large itemsets found in previous steps. Thus, when i>2, a combination of i items can be generated in C(i) from a group of transactions generated and reduced by the C(i-1), not from the original transactions TL.

Described above is the system of counting combinations of data used in generating association rules. The description above relates to the basic association analysis. An association analysis method can be a hierarchical association analysis and a time-series analysis in addition to a basic association analysis. The present invention can be applicable to these other two methods.

Figure 80:
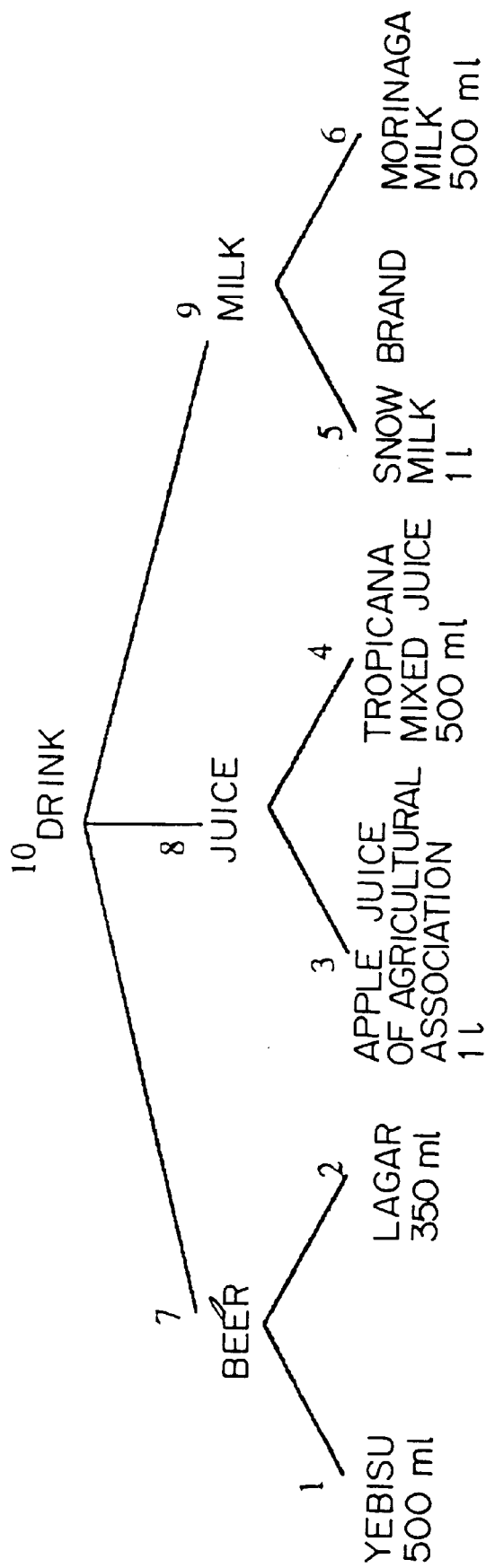
FIG. 80 shows a practical example of the hierarchical structure of data used in the hierarchical association analysis.

First, an illustrative example of the system of counting data combinations in the hierarchical association analysis is described. FIG. 80 shows the hierarchical structure of data used in the example of hierarchical association analysis. In FIG. 80, for example, item 1 is Yebisu 500 ml and item 2 is Lager 350 ml. The parent of items 1 and 2 is beer which is item 7. The parent of beer (item 7), Juice (item 8), and milk (item 9) is drink which is item 10.

The hierarchical association analysis is effective in mining a database containing data having taxonomy, that is, different levels in a classification method. In the above described basic association analysis, for example, the association rule that 'a customer who buys Yebisu beer 500 ml also buys peanuts' can be generated, but a more general rule that 'a customer who buys beer or other drinks also buys peanuts' cannot be generated. That is, a number of more general and important association rules cannot be generated only based on the basic association analysis.

The difference between the hierarchical association analysis and the basic association analysis resides in the combination generation unit C(i) for generating the combination of items. In the basic analysis, only items contained in each transaction form a combination. In the hierarchical analysis, a combination is formed including parent data in the hierarchical structure. However, a combination of an item and its ancestors should not be generated, since it is obvious, for example, that a customer who buys Yebisu 500 ml is buying beer.

If, for example, a customer buys Yebisu 500 ml, Apple Juice from the Agricultural Association and Snow Brand Milk, the transaction T=[1,3,5].

When generating combinations of two items for this transaction, besides the combinations [1 3], [1 5], [3 5] generated in the basic analysis, the hierarchical analysis also generates [1 8], [3 7], [7 8], [1 9], [5 7], [7 9], [3 9], [5 8], [8 9].

However, the combinations [1 7], [1 10], [7 10], [3 8], [3 10], [8 10], [5 9], [5 10], [9 10] are not generated, since they are pairs of an item and its ancestor.

To illustrate the combination count system for the hierarchical association analysis, the following transactions T1 through T4 are used in a transaction list TL.

T1=[2,3,5,6], T2=[1,3,5]
T3=[1,2,4] T4=[5]

The hierarchical data is the same as that illustrated in FIG. 80. The minimum and maximum values for support are 50% and 75%, respectively. Since there are four transactions, the number of occurrences should be 2 or 3 for a combination of items to be a large itemset.

Figure 81:
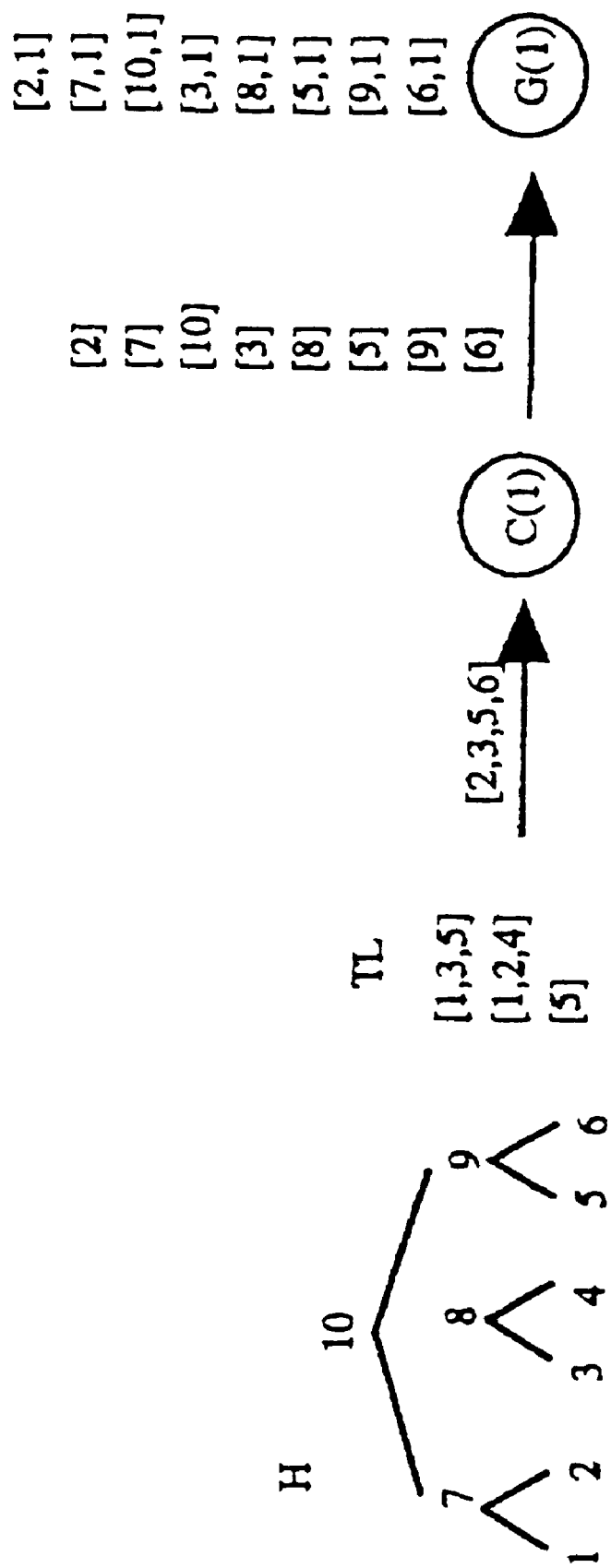
FIG. 81 is a chart (1) showing the processes up to the process G(1) in the hierarchical association analysis.

FIGS. 81 through 84 show the processes up to the counting of individual items in G(1). In FIG. 81, the first transaction T1=[2,3,5,6] is input into the combination generation unit C(1), and individual items are output to the occurrence count unit G(1) including the ancestor items shown in FIG. 80.

Figure 82:
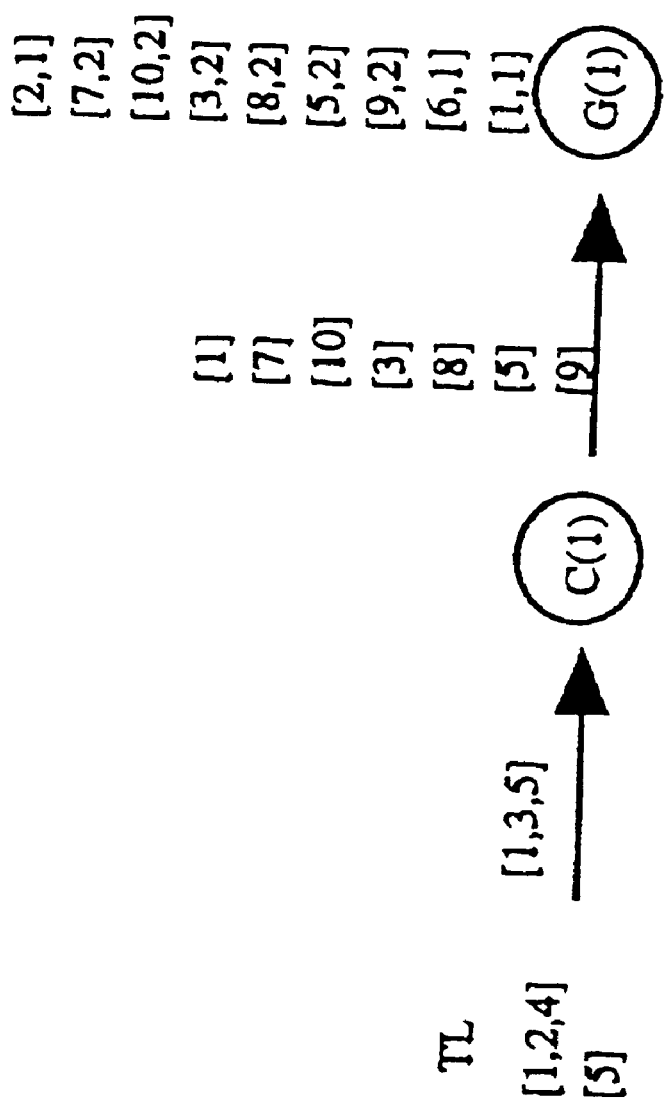
FIG. 82 is a chart (2) showing the processes up to the process G(1) in the hierarchical association analysis.

Similarly, the transaction T2=[1,3,5] in FIG. 82, the transaction T3=[1,2,4] in FIG. 83, and T4 =[5] in FIG. 84 are input to the combination generation unit C(1). Individual items are counted and the result is shown in FIG. 84.

Figure 85:
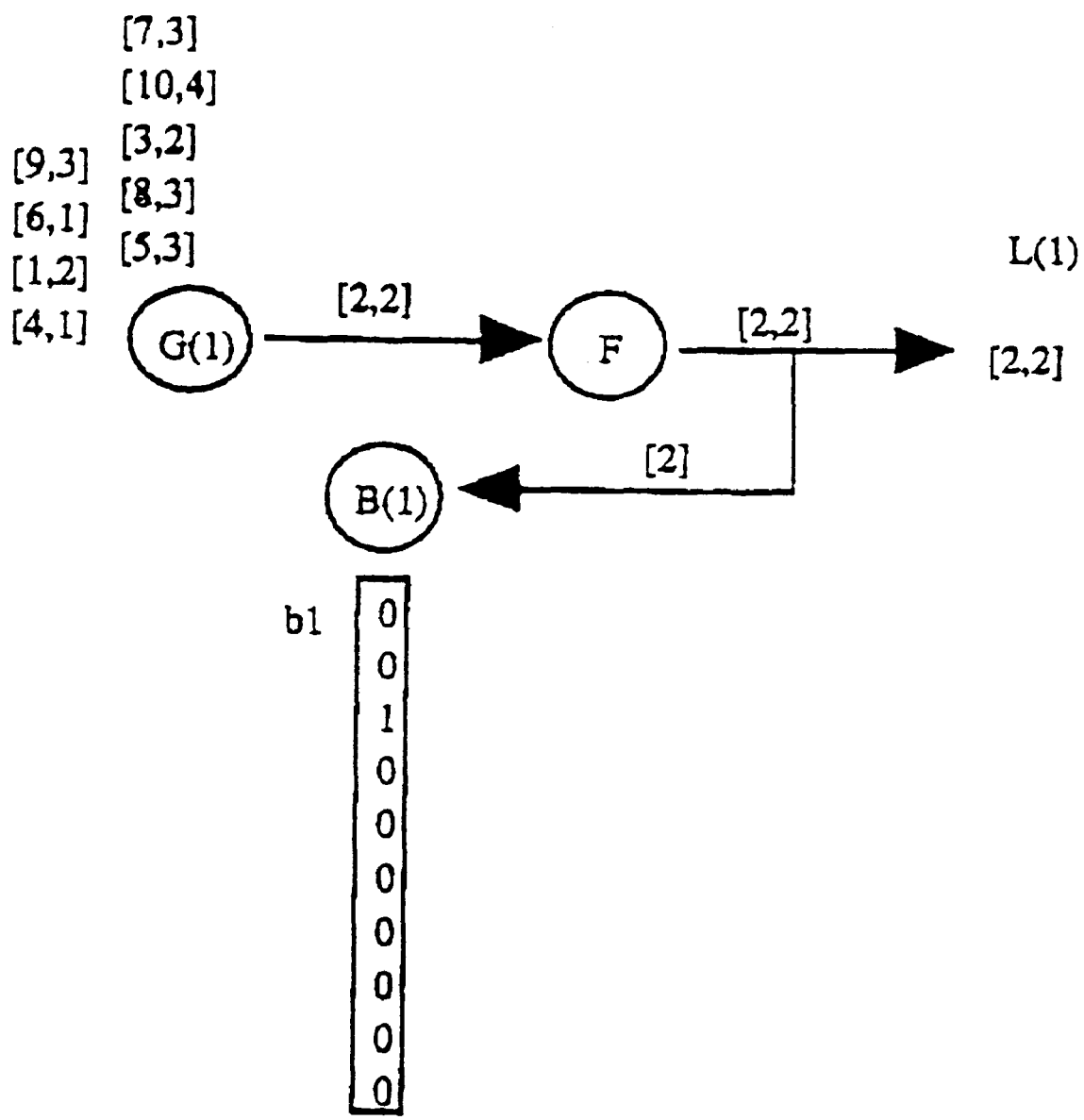
FIG. 85 is a chart (1) showing the selection of L(1) in the hierarchical association analysis.

FIGS. 85 through 95 show the processes of selecting an item, whose number of occurrences is two or three satisfying the value for support, as an element of a large 1-itemset L(1), and generating the bit map b1. In FIG. 85, the initial data [2,2] is input to the combination selection unit F as an item and its number of occurrences, and is output as an element of the large 1-itemset L(1). Simultaneously, item [2] is input into the bit map generation unit B(1), which sets to '1' the bit position in bit map b1 provided by the hash function H1(item)=item mod 10.

Thus, B(1) sets the bit position H1(2) 2 mod 10=2 to '1'.

Figure 86:
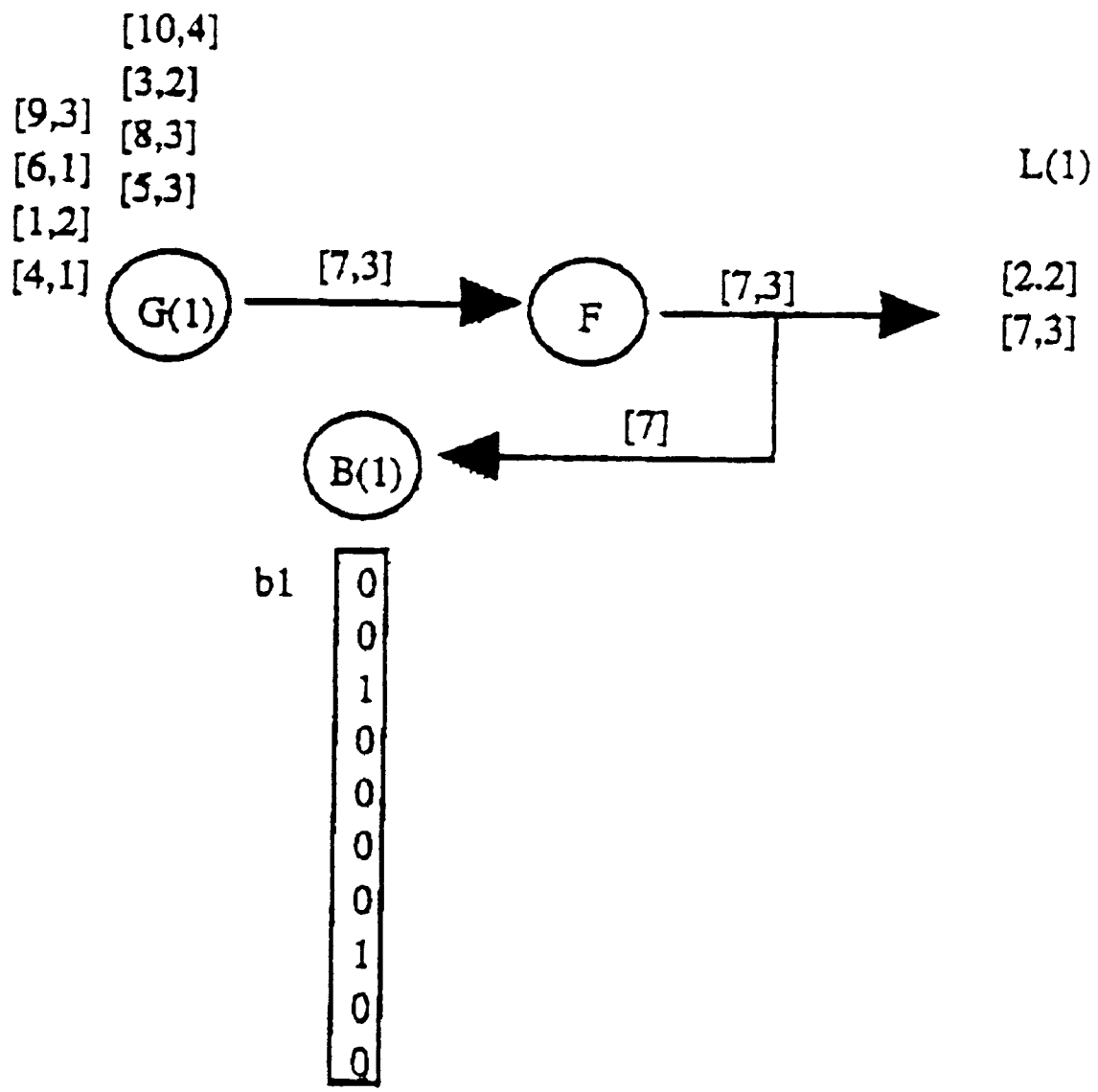
FIG. 86 is a chart (2) showing the selection of L(1) in the hierarchical association analysis.
Figure 88:
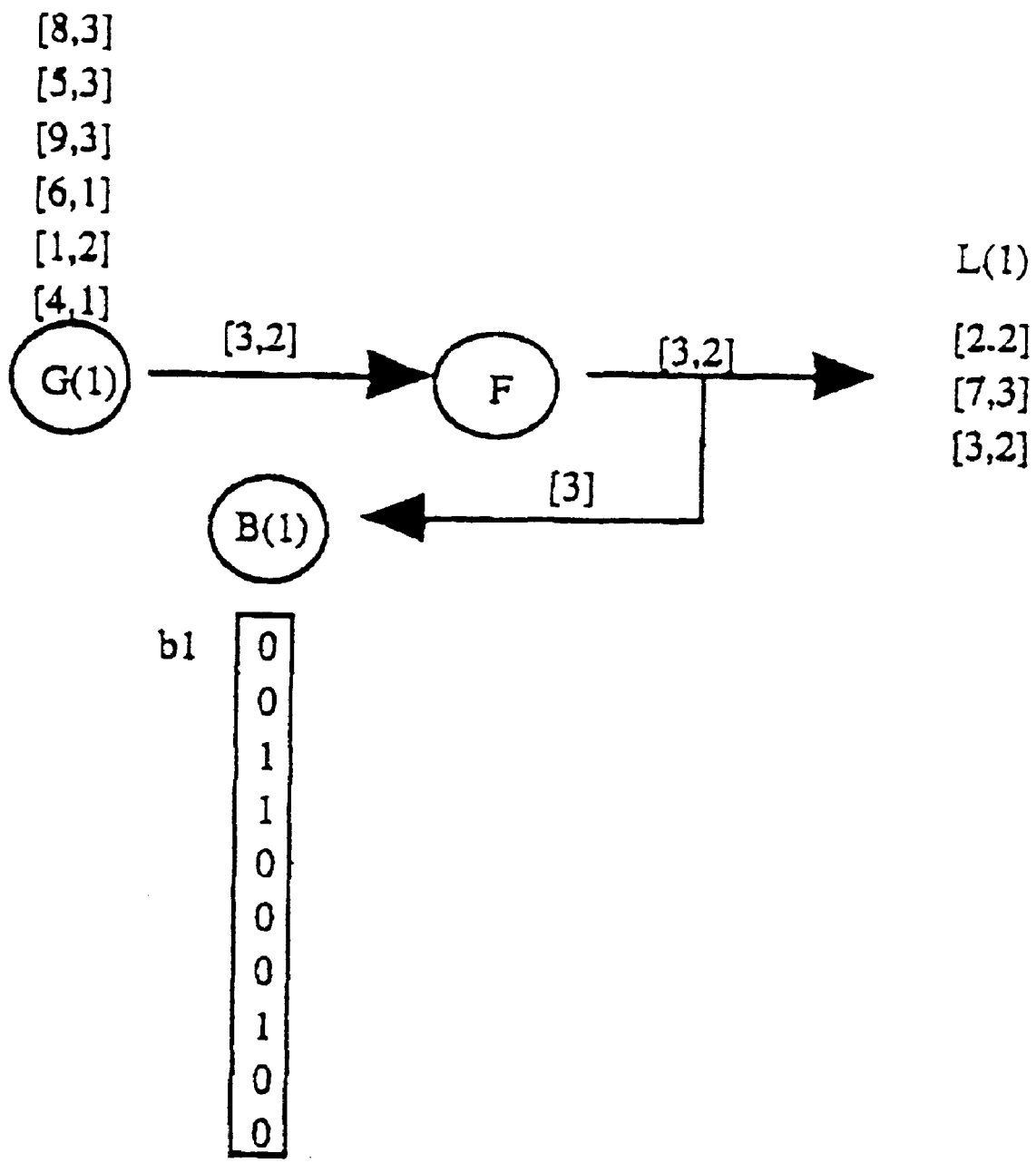
FIG. 88 is a chart (4) showing the selection of L(1) in the hierarchical association analysis.
Figure 89:
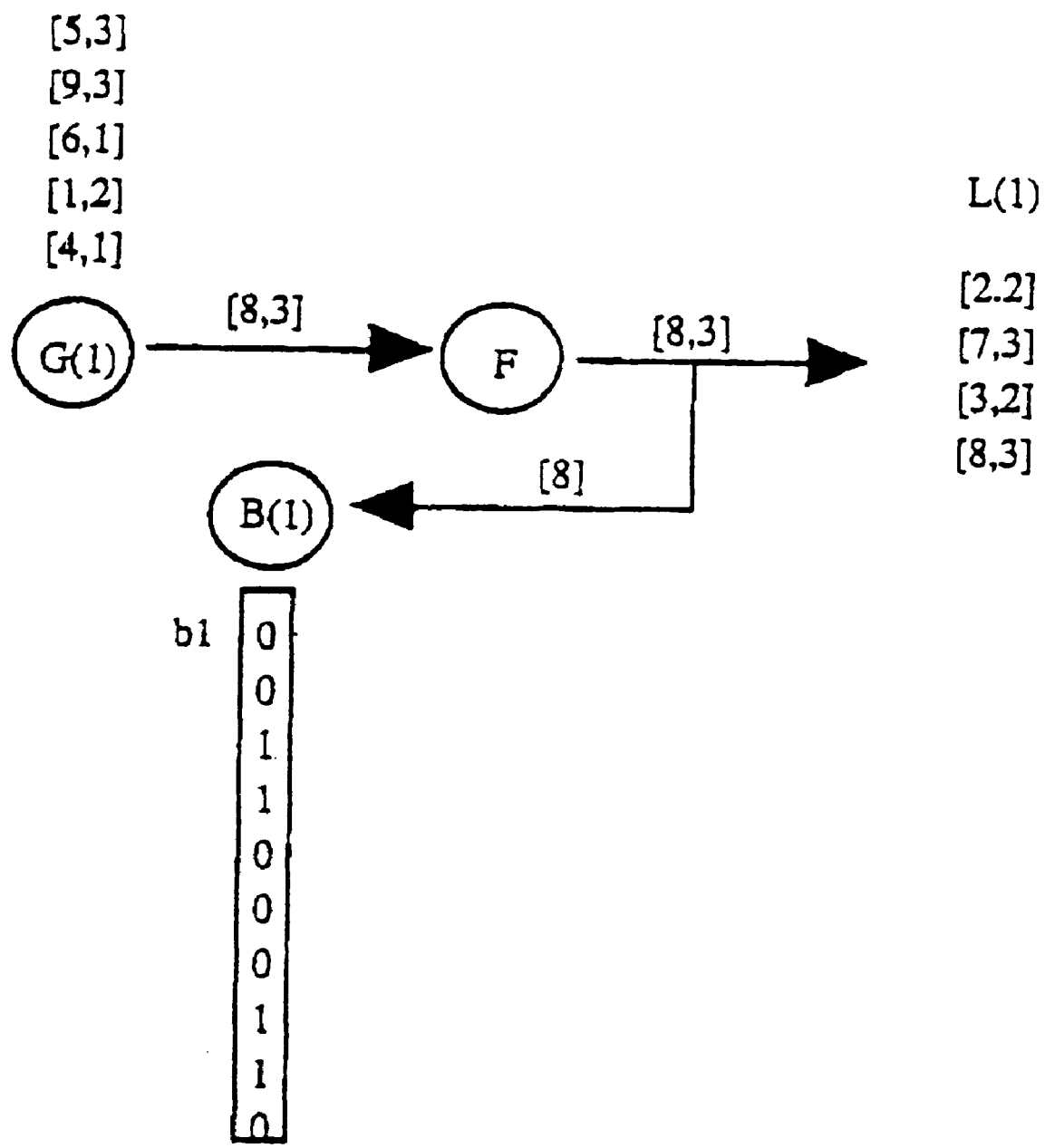
FIG. 89 is a chart (5) showing the selection of L(1) in the hierarchical association analysis.
Figure 90:
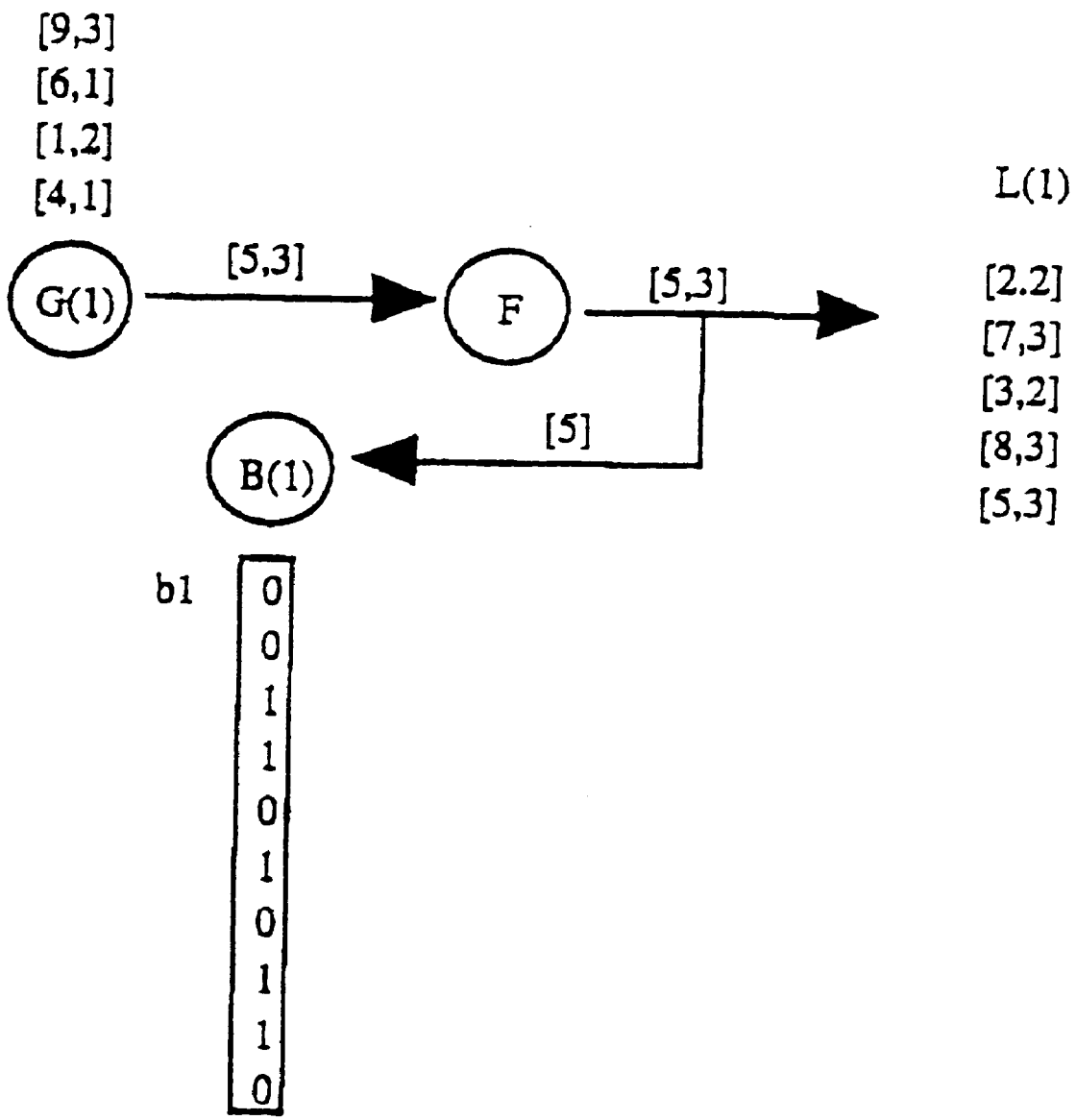
FIG. 90 is a chart (6) showing the selection of L(l) in the hierarchical association analysis.
Figure 91:
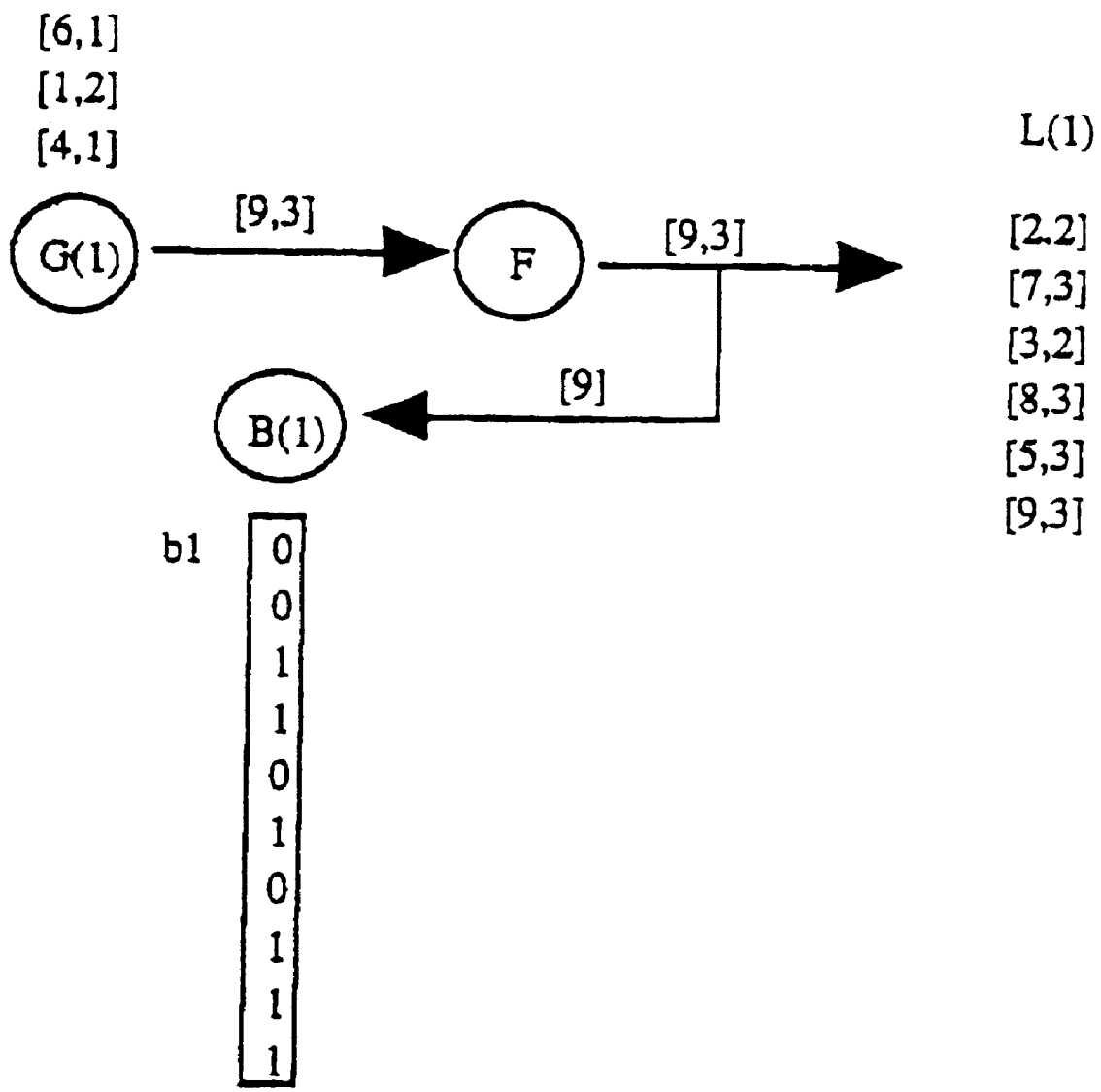
FIG. 91 is a chart (7) showing the selection of L(1) in the hierarchical association analysis.
Figure 93:
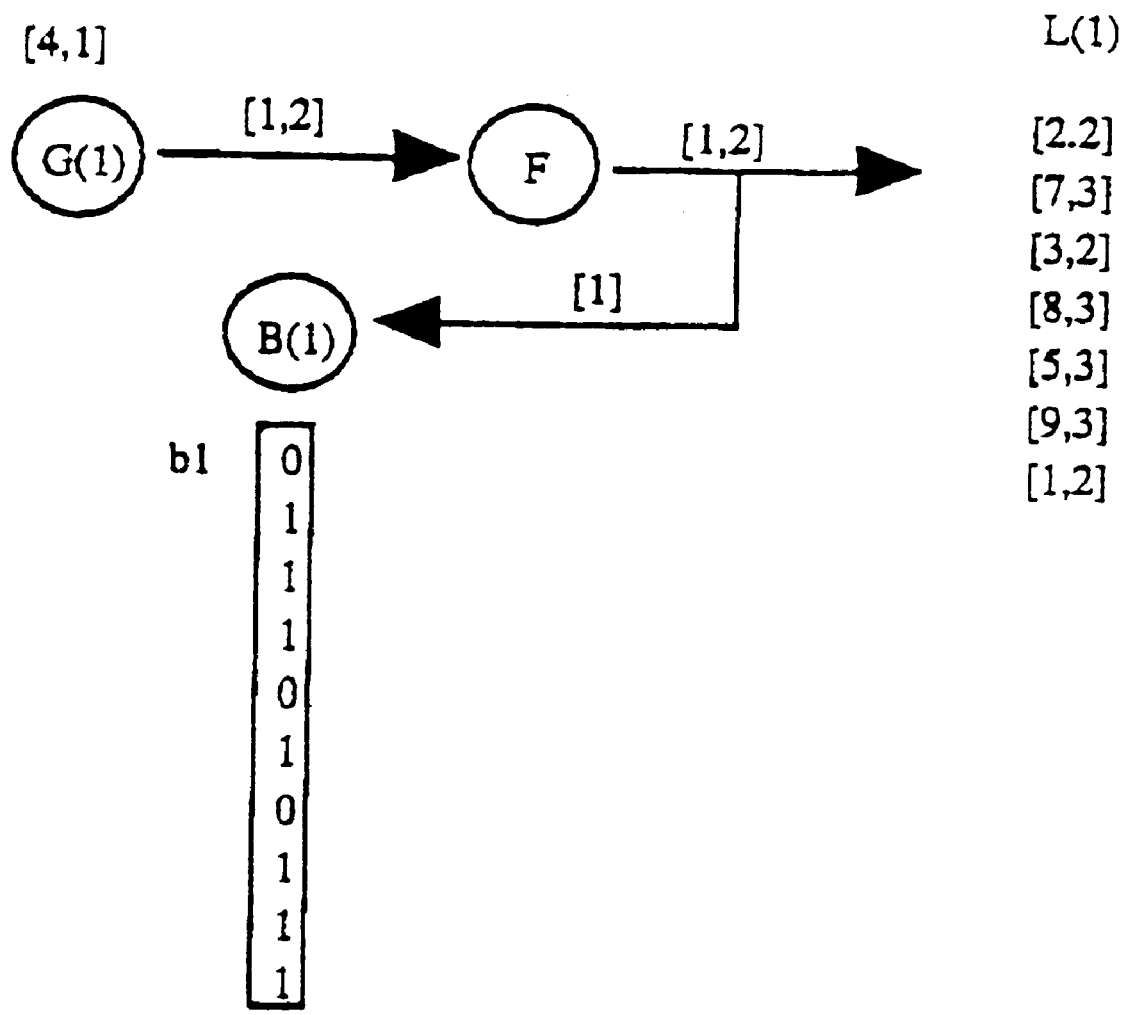
FIG. 93 is a chart (9) showing the selection of L(1) in the hierarchical association analysis.

In an analogous processing, [7,3] in FIG. 86, [3,2] in FIG. 88, [8,3] in FIG. 89, [5,3] in FIG. 90, [9,3] in FIG. 91, and [1,2] in FIG. 93 are selected as elements of the large 1-itemset L(1), and '1' is set at the position specified by the hash function H1 in the bit map b1.

Figure 92:
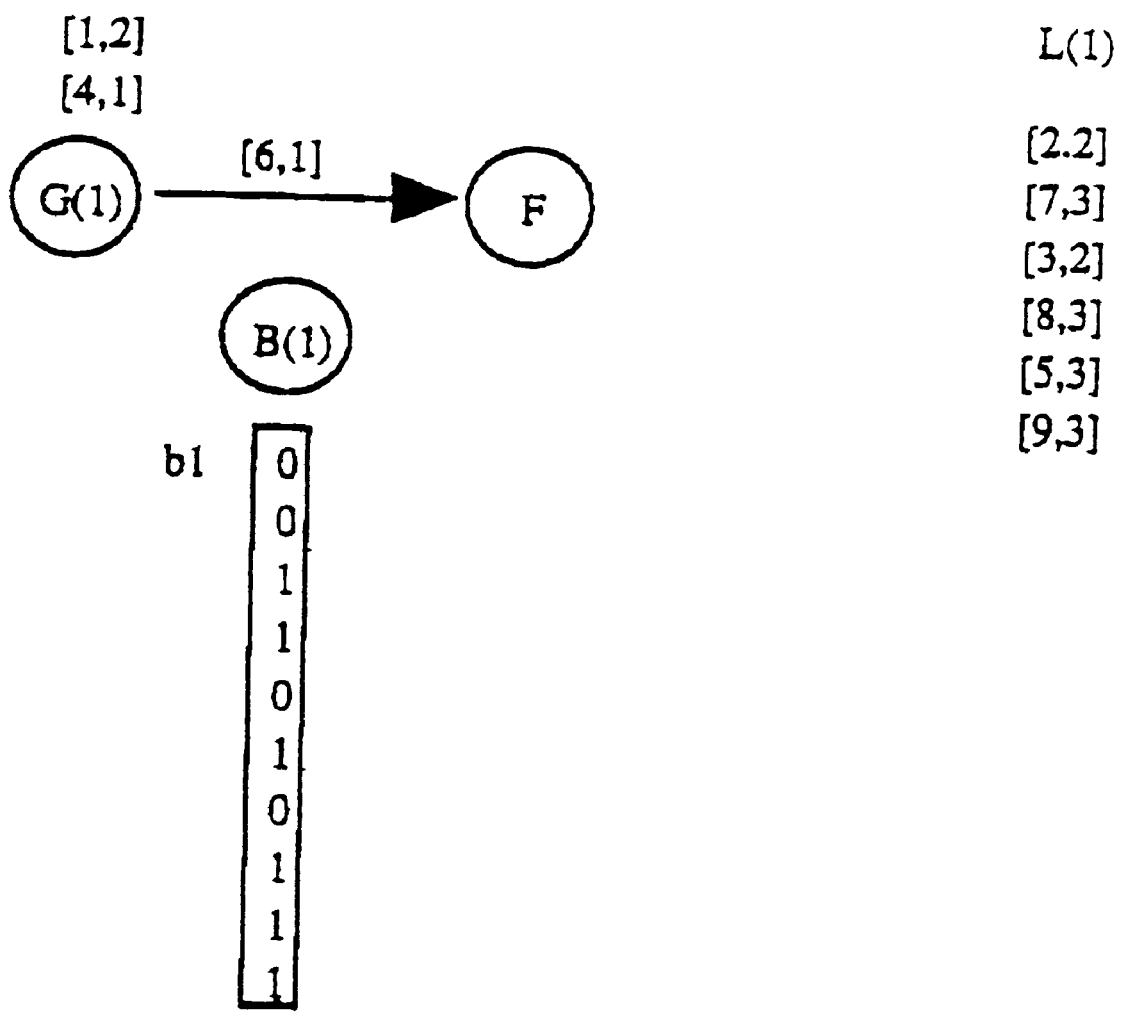
FIG. 92 is a chart (8) showing the selection of L(1) in the hierarchical association analysis.
Figure 94:
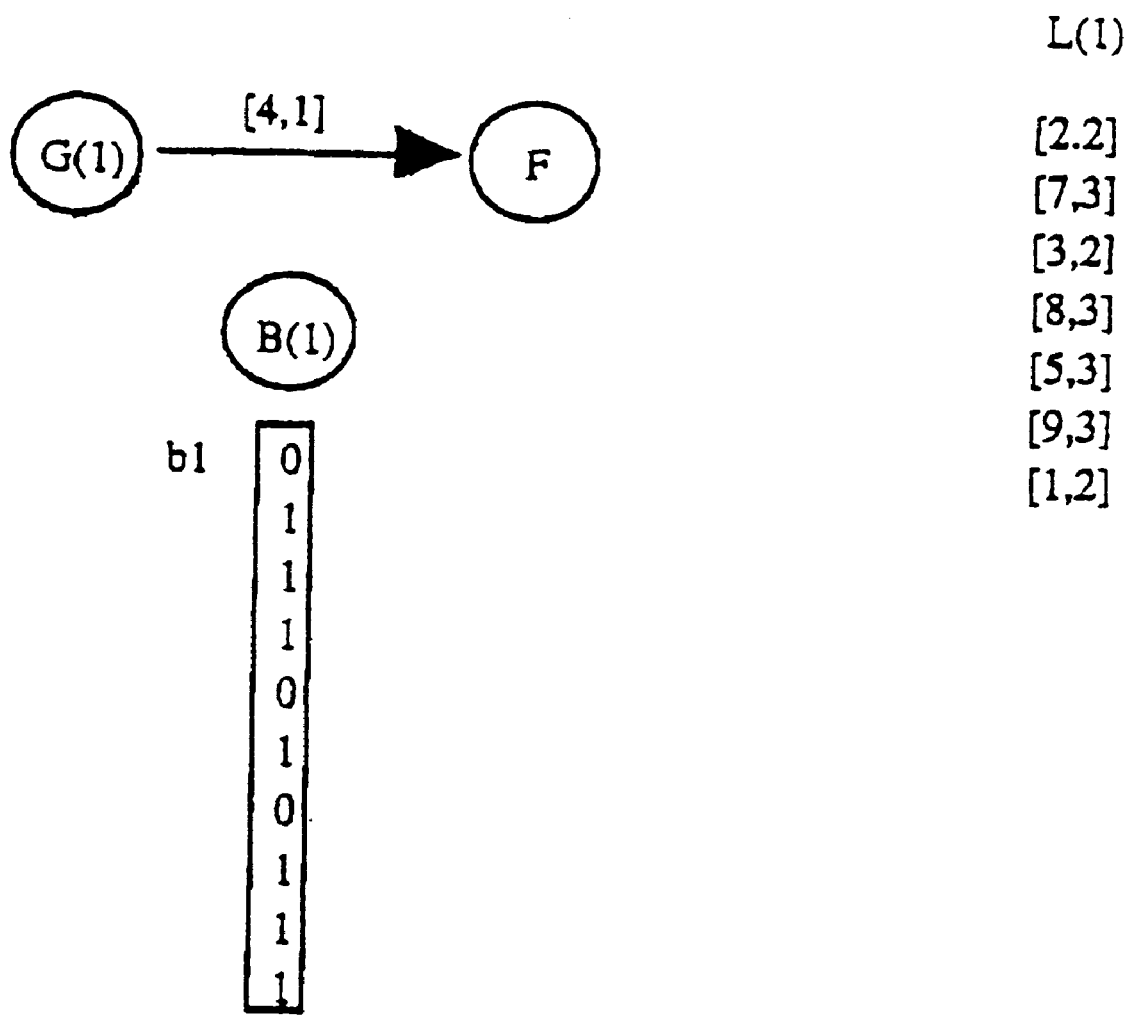
FIG. 94 is a chart (10) showing the selection of L(1) in the hierarchical association analysis.

On the other hand, [10,4] in FIG. 87, [6,1] in FIG. 92, and [4,1] in FIG. 94 are input into the combination selection unit F but, since they do not satisfy the minimum and maximum support value, they are not selected as combinations for the large 1-itemset L(1), and do not cause any update in the bit map b1.

Figure 95:
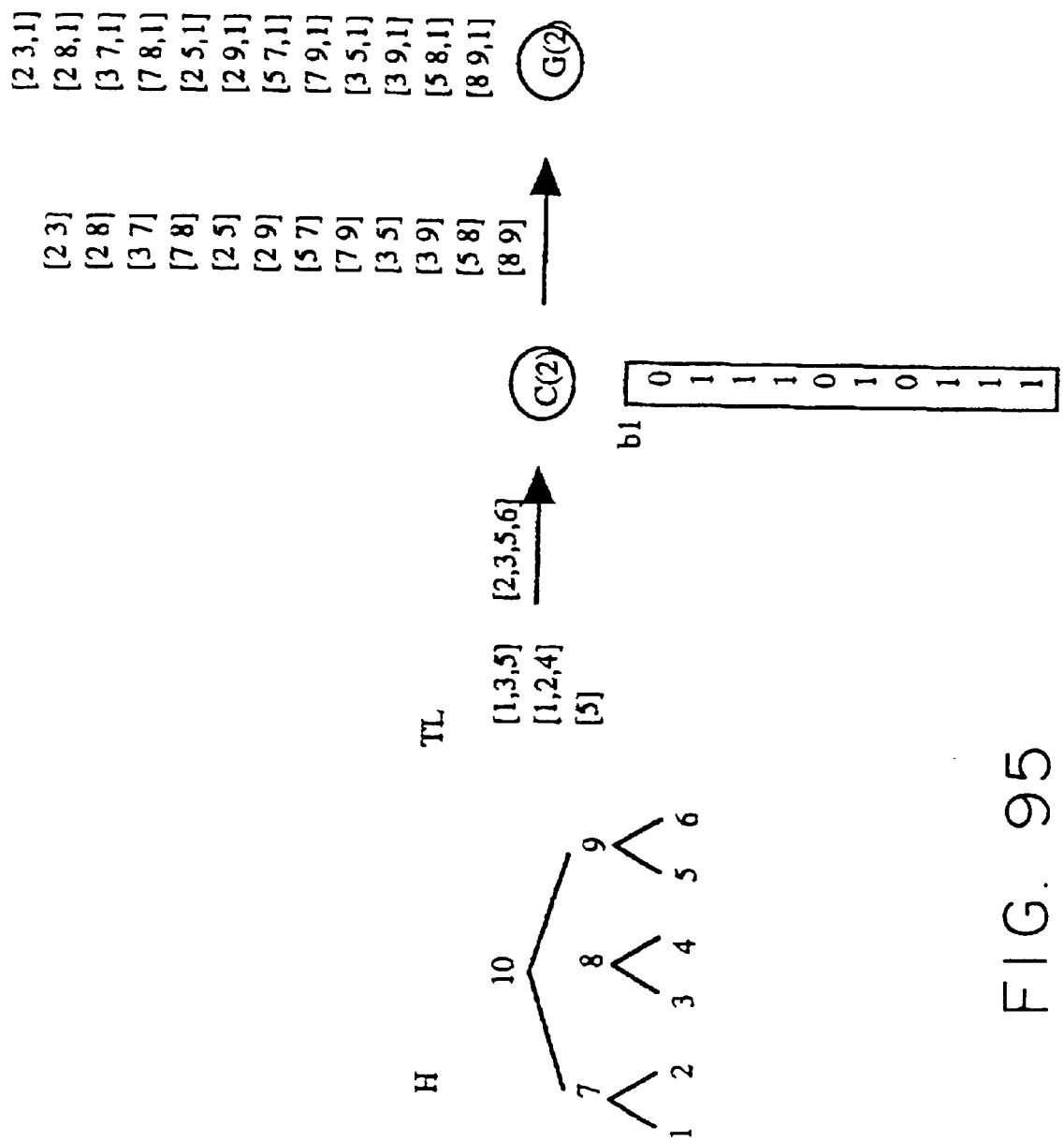
FIG. 95 is a chart (1) showing the processes up to the process G(2) in the hierarchical association analysis.

FIGS. 95 through 98 show the processes up to the counting of combinations of two items performed by G(2). In FIG. 95, the transaction T1=[2,3,5,6] is input into the combination generation unit C(2), and combinations of two items including the ancestors in the hierarchical structure shown in FIG. 80 are output to the occurrence count unit G(2). Thus, the occurrences of combinations of two items are counted.

In this case, when combinations of two items are generated, an item not having '1' at the corresponding position in the bit map b1 generated as shown in FIGS. 85 through 94 is not used. For example, item [10] which is the highest-order parent in the hierarchical structure, does not have '1' at its bit position specified by the hash function H1. Therefore, it is not used when a combination of items is generated.

Figure 96:
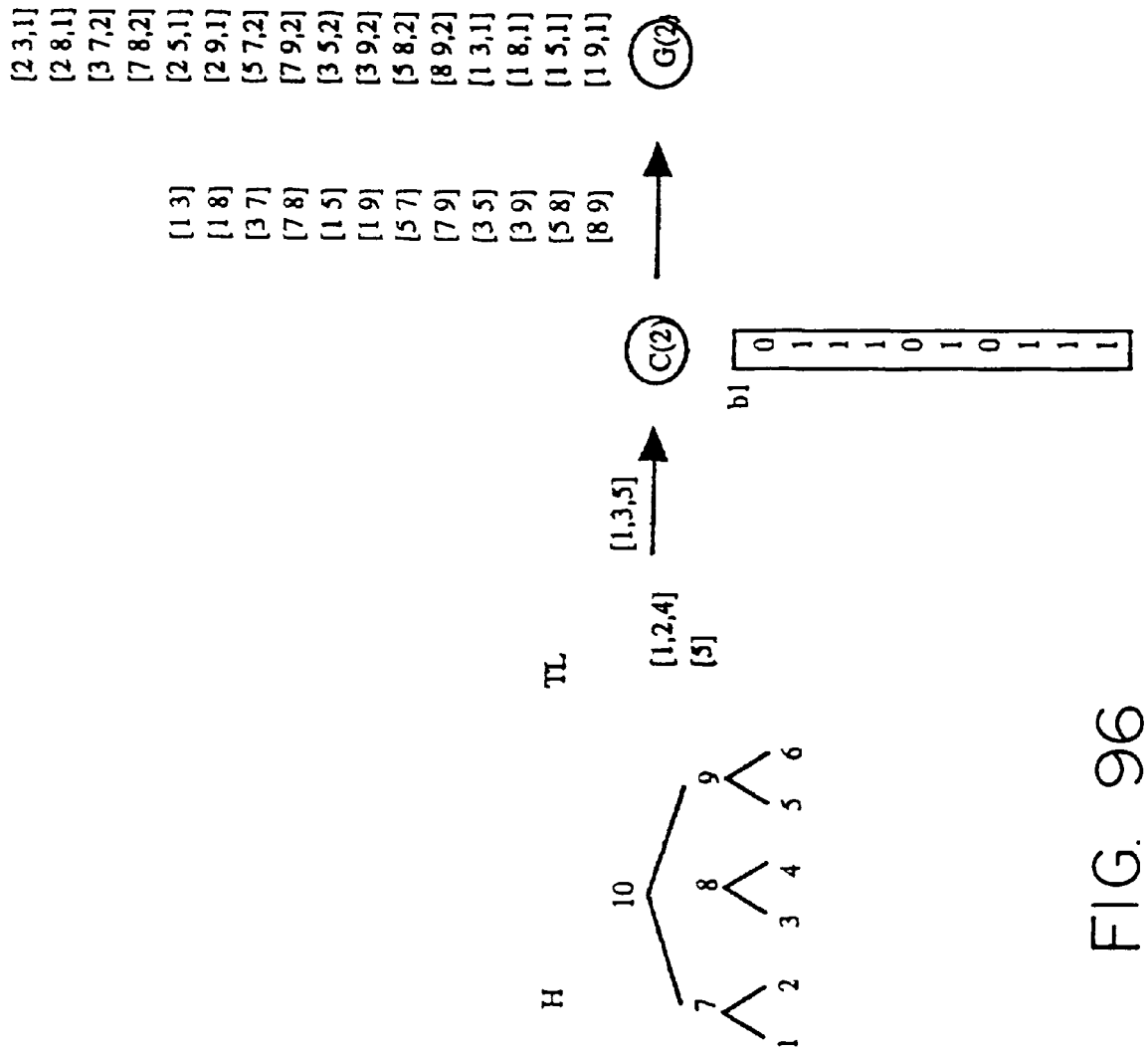
FIG. 96 is a chart (2) showing the processes up to the process G(2) in the hierarchical association analysis.
Figure 97:
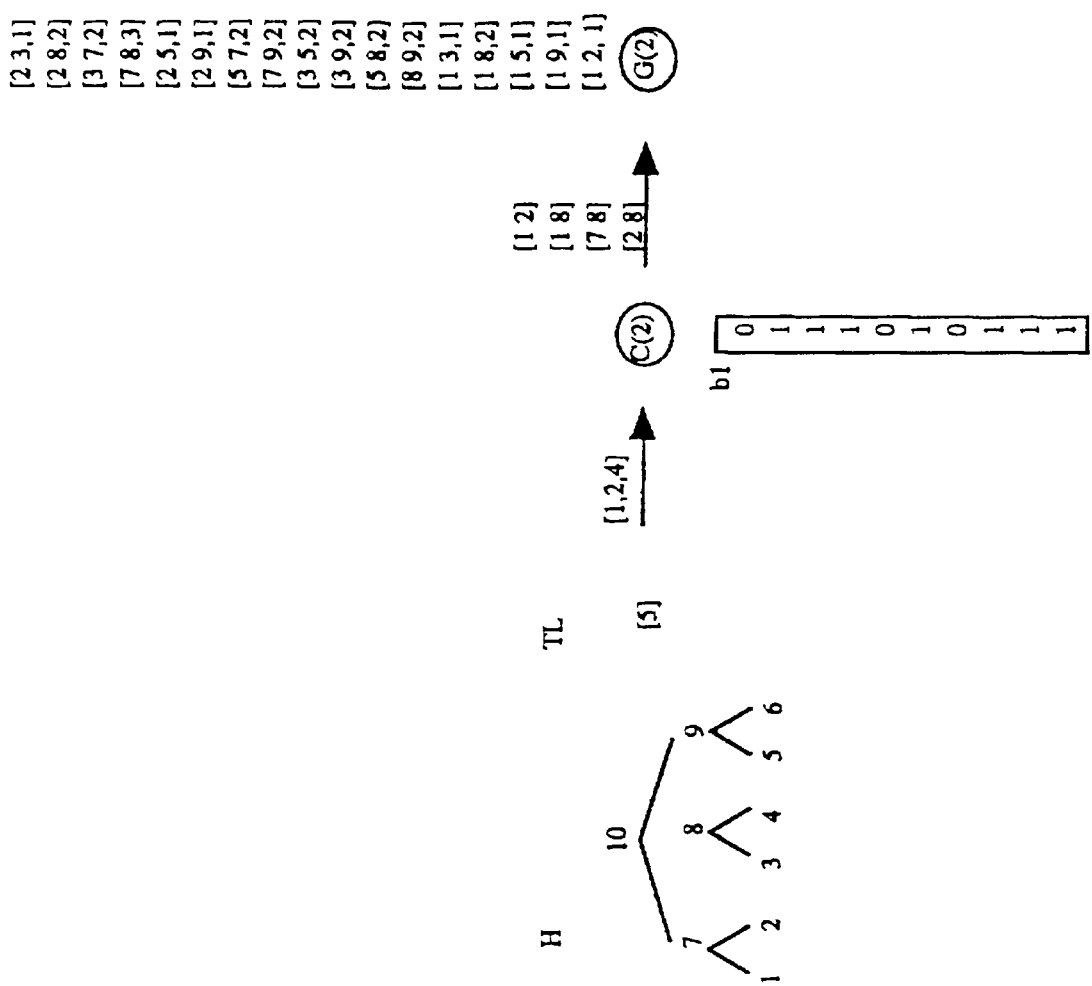
FIG. 97 is a chart (3) showing the processes up to the process G(2) in the hierarchical association analysis.

Analogously, the transaction T2=[1,3,5] in FIG. 96, the transaction T3=[1,2,4] in FIG. 97, and the transaction T4= [5] in FIG. 98 are input into the combination generation unit C(2), and the occurrence count unit G(2) counts the occurrences of generated combinations of two items. FIG. 97 shows an example where an item contained in the transaction is not used in the combination, but its parent item is. Item [4], contained in the transaction T3, is not used when a combination of two items is generated in C(2) because the item does not have '1' at the corresponding bit position. However, its parent item [8] has the corresponding bit set to '1' in b1 and is thus included in the generated combinations of two items. As shown in FIG. 98, since there is only one item in transaction T4, no combination of two items is generated.

Figure 99:
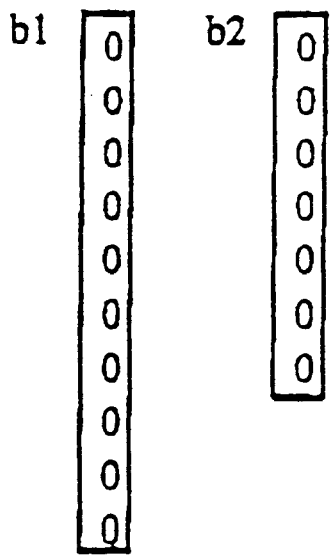
FIG. 99 is a chart (1) showing the selection of L(2) in the hierarchical association analysis.

FIG. 99 through 109 show the processing of selecting a combination of two items satisfying the given support condition as an element of the large 2-itemset L(2). In FIG. 99, [2 3,1] is input into the combination selection unit F as the first combination. Since the number of occurrences 1 does not satisfy the support condition, [2 3,1] is neither selected to be inserted into L(2) nor into B(2).

Figure 100:
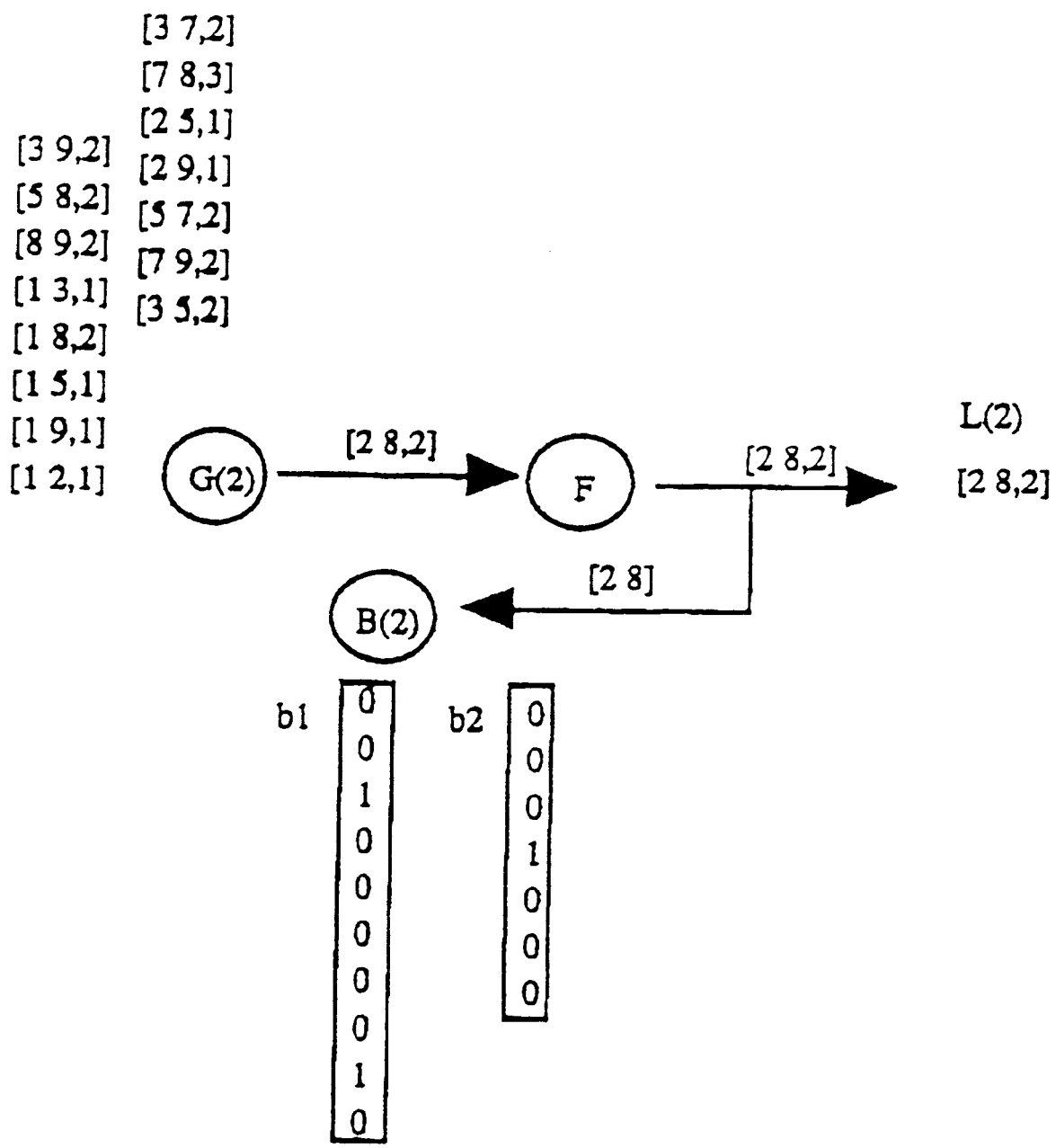
FIG. 100 is a chart (2) showing the selection of L(2) in the hierarchical association analysis.
Figure 101:
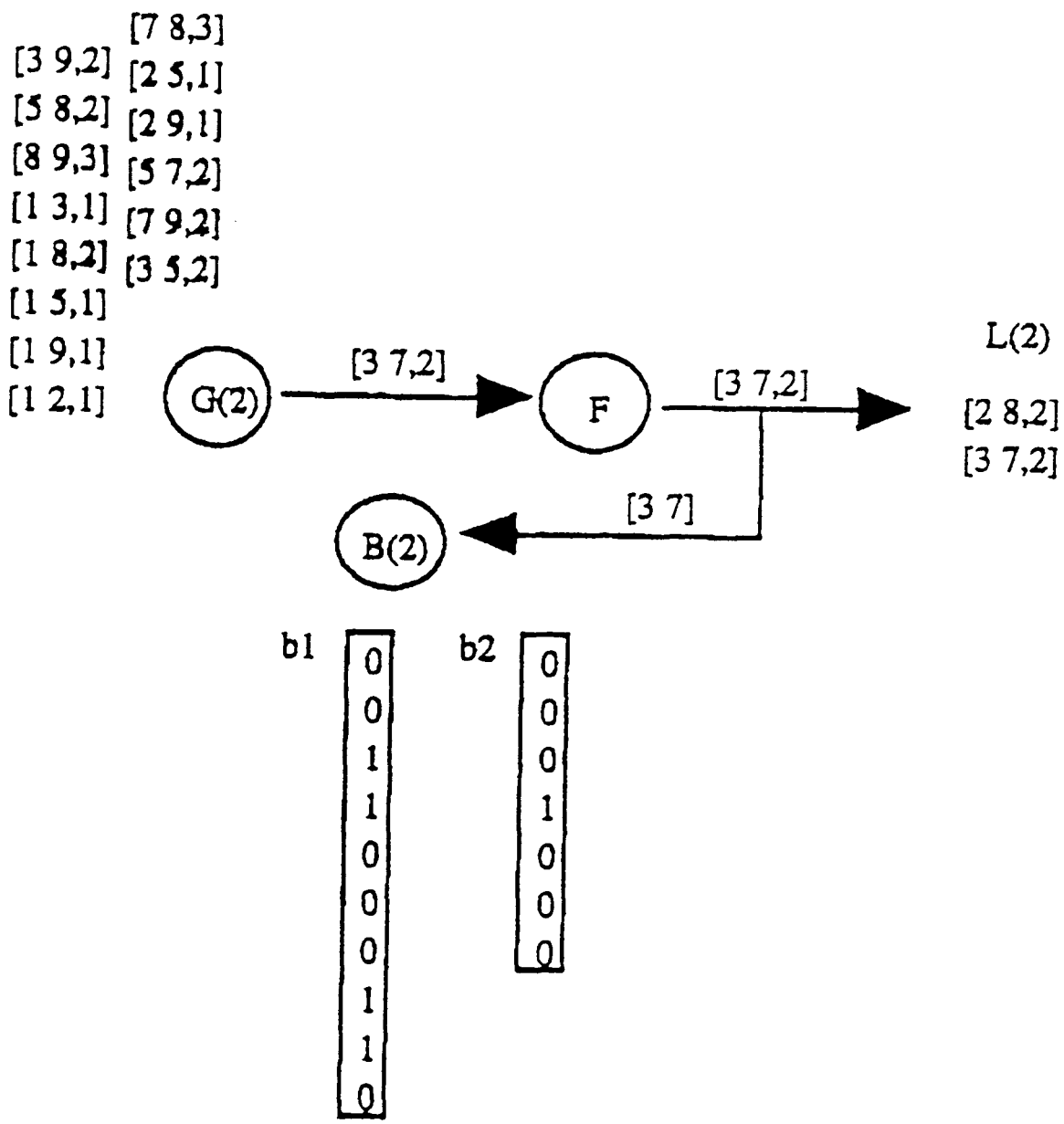
FIG. 101 is a chart (3) showing the selection of L(2) in the hierarchical association analysis.

In FIG. 100, combination [2 8,2] is input into the combination selection unit F. Since the number of occurrences 2 satisfies the support condition, it is selected and inserted as an element of the large 2-itemset L(2), and input to B(2), which sets the bits corresponding to items [2] and [8] in the bit map b1 and the combination of two items [2 8] in the bit map b2. The hash function H1 used in setting the bit map b1 is the same function used in the first processing step and illustrated in FIGS. 85 through 94. On the other hand, the hash function H2 used in setting the bit map b2 is H2(item 1, item 2)=(item 1 +item 2) mod 7.

Thus, as shown in FIG. 100, the bit positions given by H1(2)=2 mod 10=2 and H1(8)=8 mod 10=8 are set to '1' in b1, and the bit position given by H2(2,8)=10 mod 7=3 is set to '1' in b2.

In FIGS. 101, 102, 105, 106, 107, and 108, the combinations of two items that are input into the combination selection unit F are selected as elements of the large 2-itemset L(2). Bits are set at corresponding positions in the bit maps b1 and b2.

Figure 103:
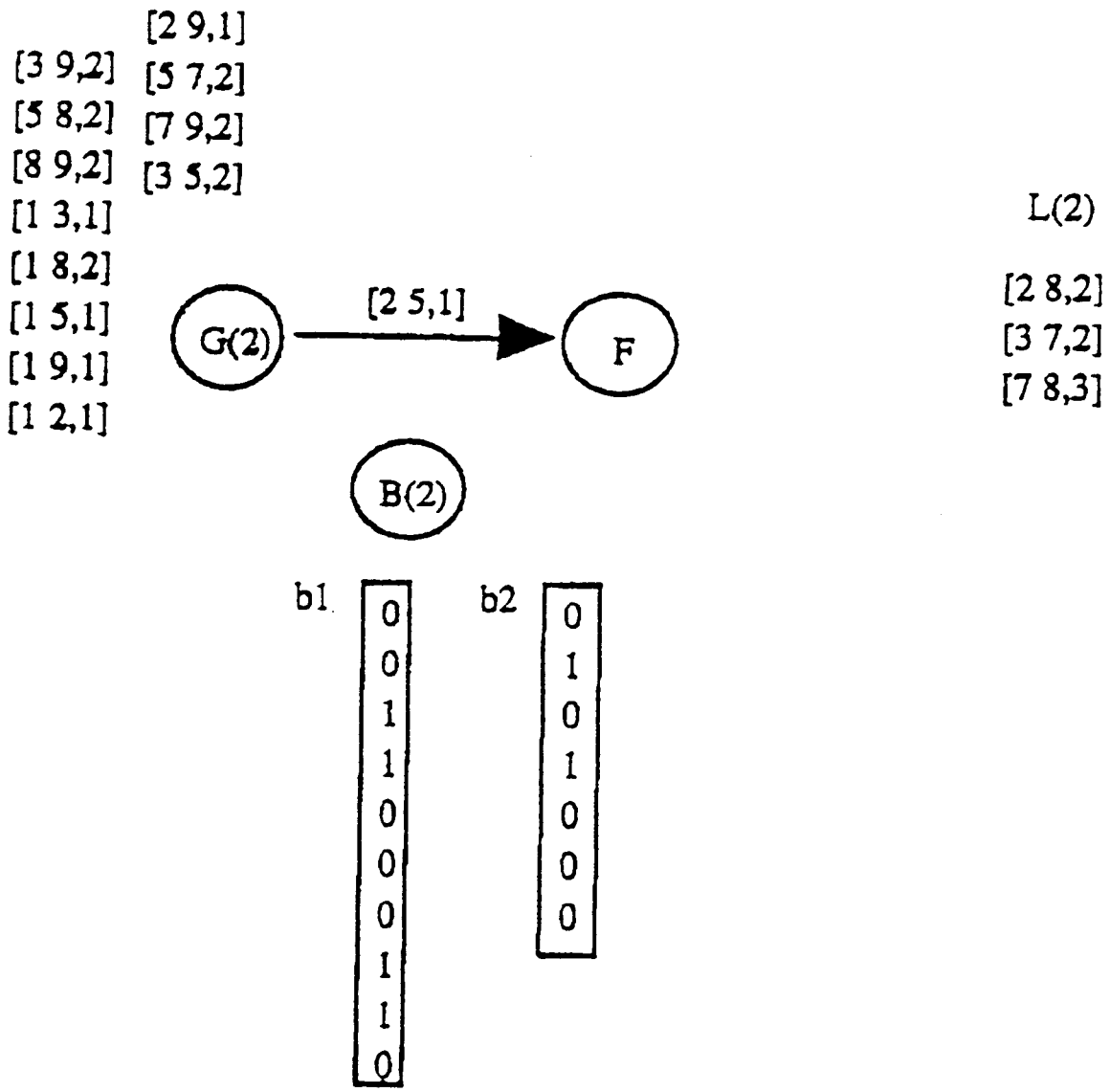
FIG. 103 is a chart (5) showing the selection of L(2) in the hierarchical association analysis.
Figure 104:
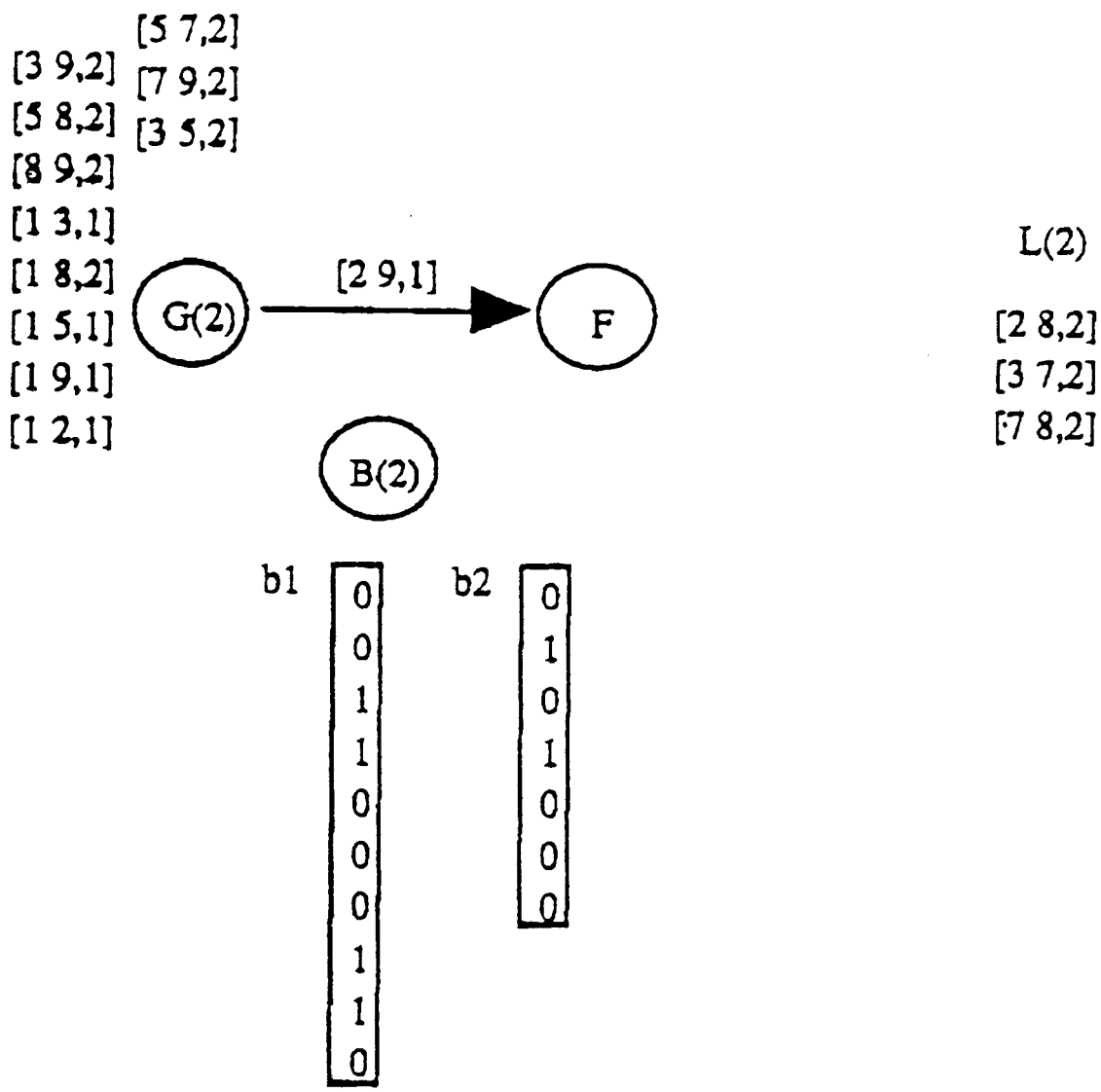
FIG. 104 is a chart (6) showing the selection of L(2) in the hierarchical association analysis.
Figure 105:
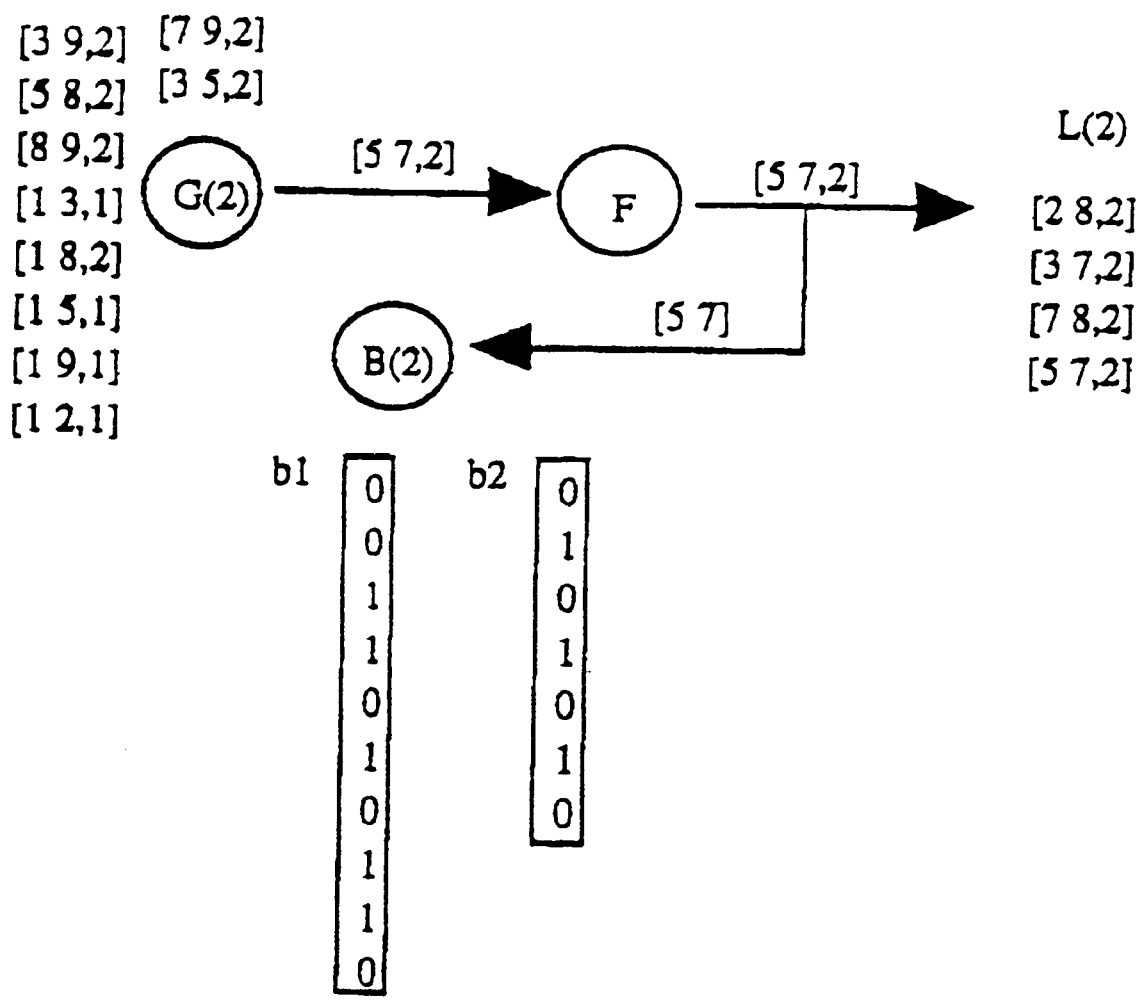
FIG. 105 is a chart (7) showing the selection of L(2) in the hierarchical association analysis.
Figure 106:
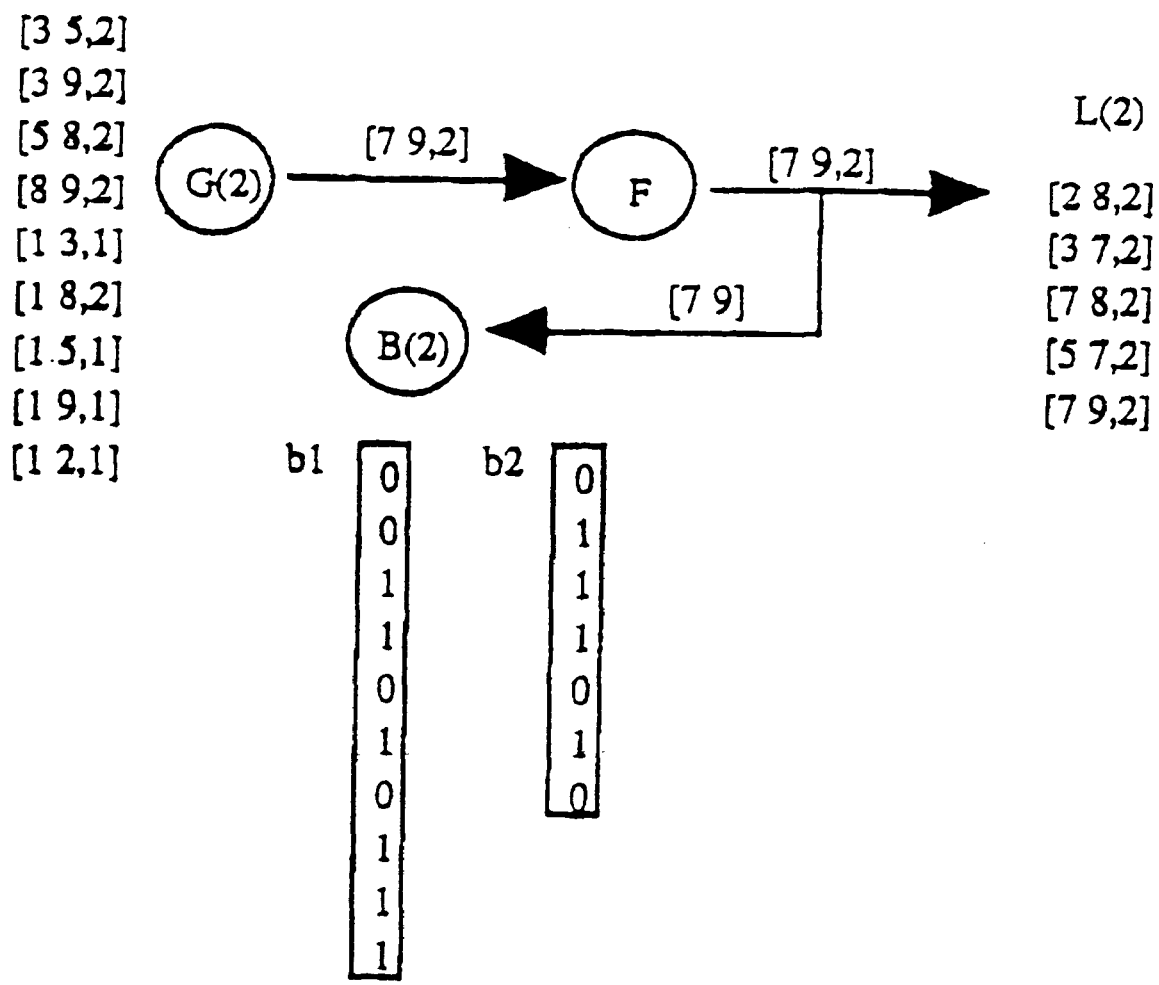
Figure 107:
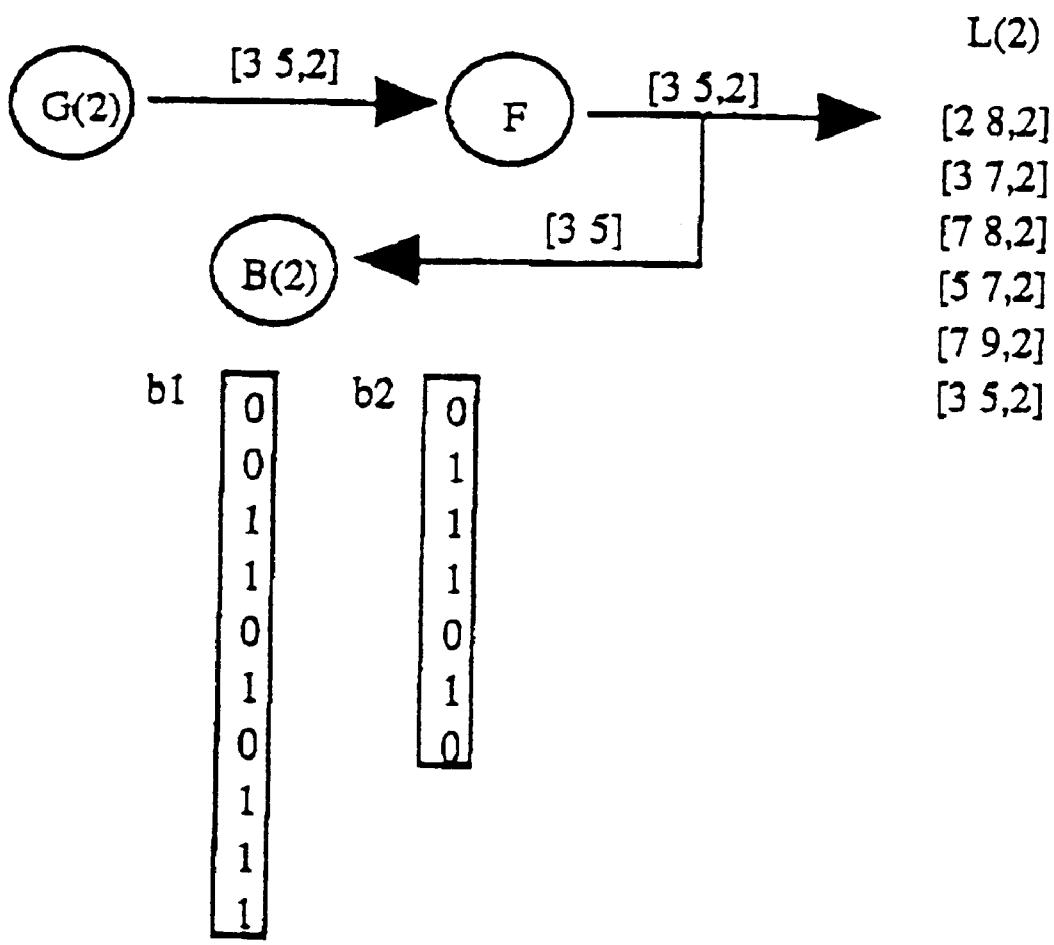
FIG. 107 is a chart (9) showing the selection of L(2) in the hierarchical association analysis.
Figure 108:
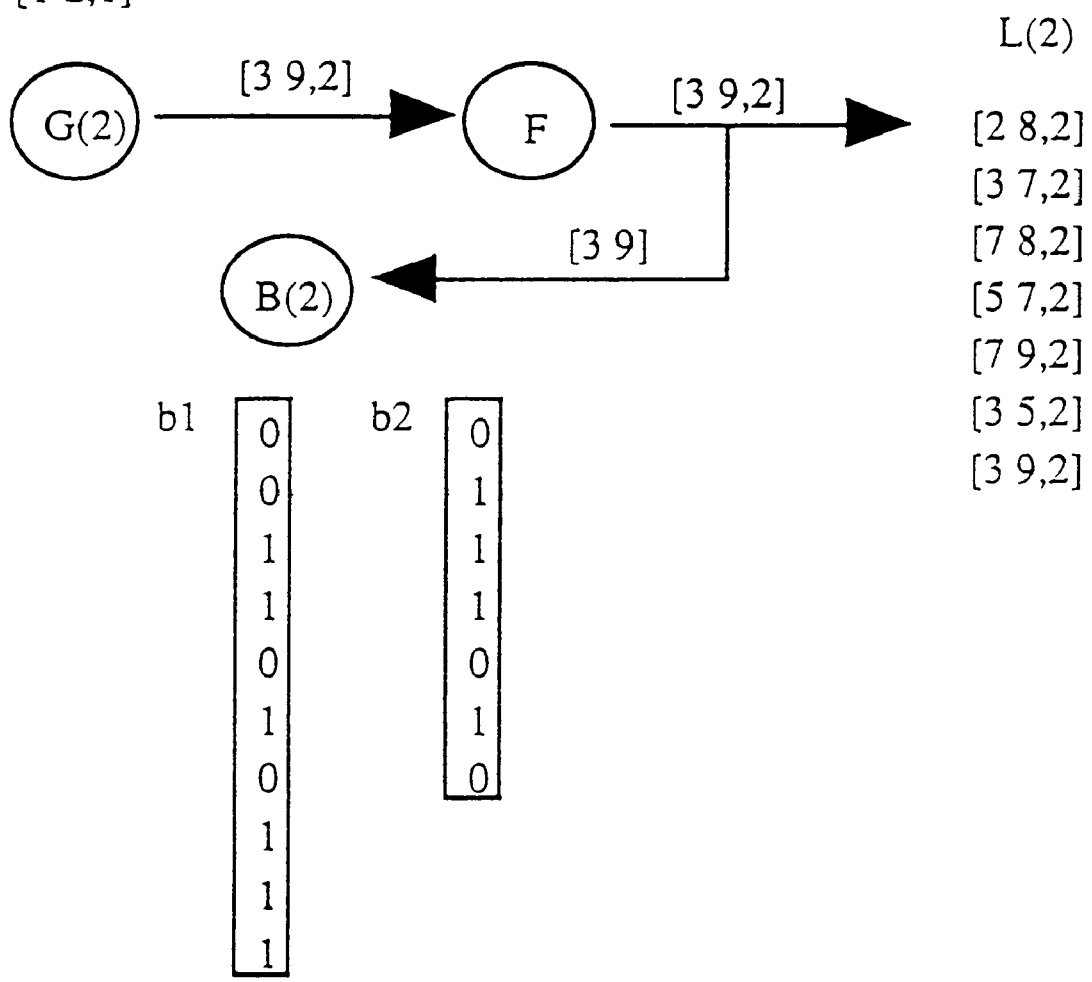
FIG. 108 is a chart (10) showing the selection of L(2) in the hierarchical association analysis.
Figure 109:
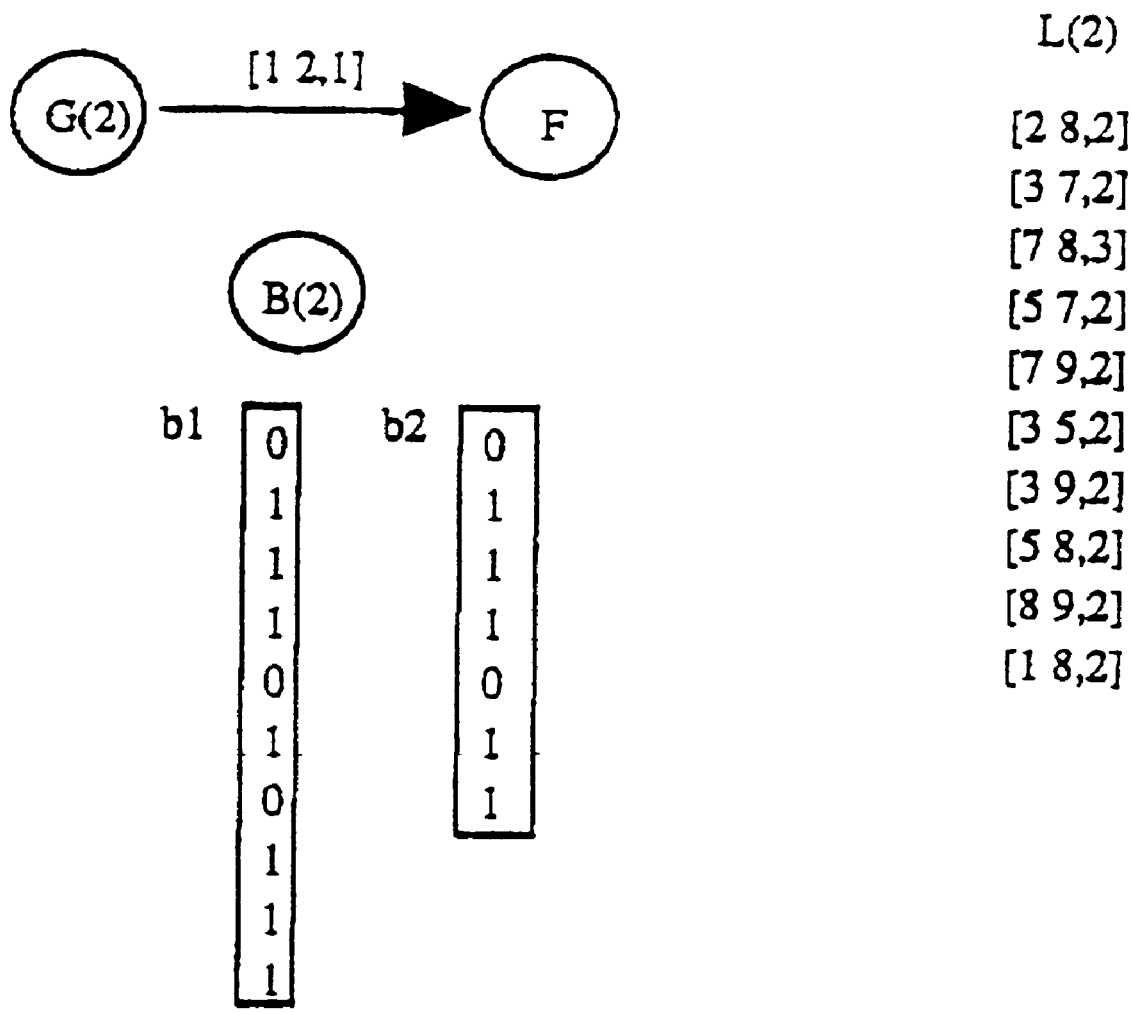
FIG. 109 is a chart (11) showing the selection of L(2) in the hierarchical association analysis.

In FIGS. 103, 104, and 109, the combinations of two items input into the combination selection unit F do not satisfy the support condition. Therefore, they are not selected as elements of the large 2-itemset L(2), and there is no update for bit maps b1 or b2.

The filtering and bit map generation performed for combinations [5 8,2] through [1 9,1] are not shown in any of the FIGS. 99 through 109, but the final large 2-itemset L(2) as well as bit maps b1 and b2 are shown in FIG. 109.

Figure 110:
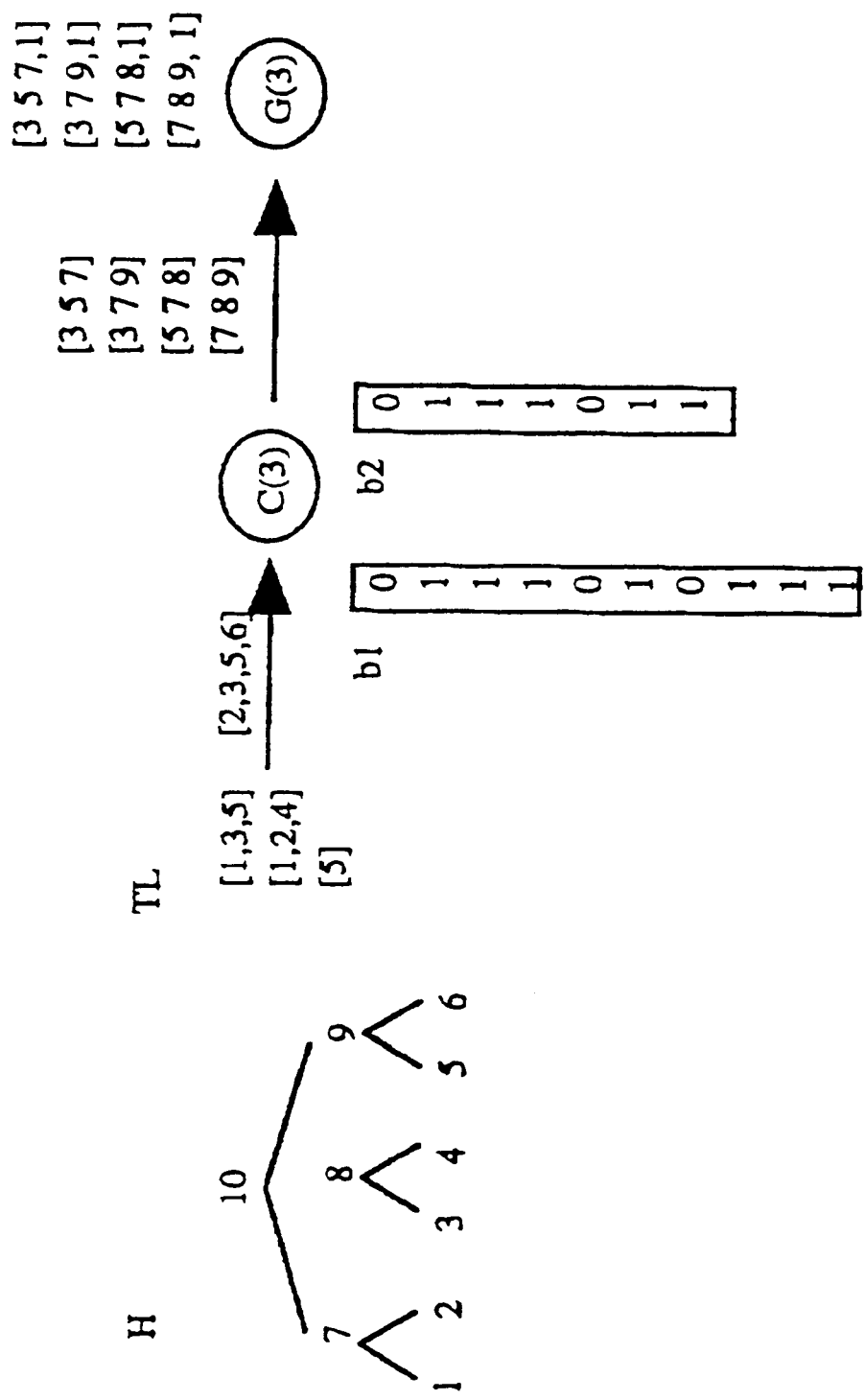
FIG. 110 is a chart (1) showing the processes up to the process G(3) in the hierarchical association analysis.

FIGS. 110 through 113 show the processes up to the process of counting combinations of three items performed by G(3). In FIG. 110, the transaction T1 =[2,3,5,6] is input into the combination generation unit C(3), and combinations of three items are generated including the parents of the items, and the occurrences are counted by G(3). Only combinations of three items, all of whose individual items as well as subsets of 2 items have their corresponding bits set to '1' in bit maps b1 and b2, respectively, are generated by C(3) and counted by G(3).

For example, in FIG. 110, similarly to the description above, item [10] is the highest-order parent in the hierarchical structure but since its bit is not set to '1' in the bit map b1, [10] is not included in any generated combination of three items. Additionally, the combination of three items [2 3 5] is not generated because, although [2], [3], [5] and [2 3], [3 5] have their bits set to '1' in b1 and b2, respectively, [2 5] is set to '0' in b2.

Figure 112:
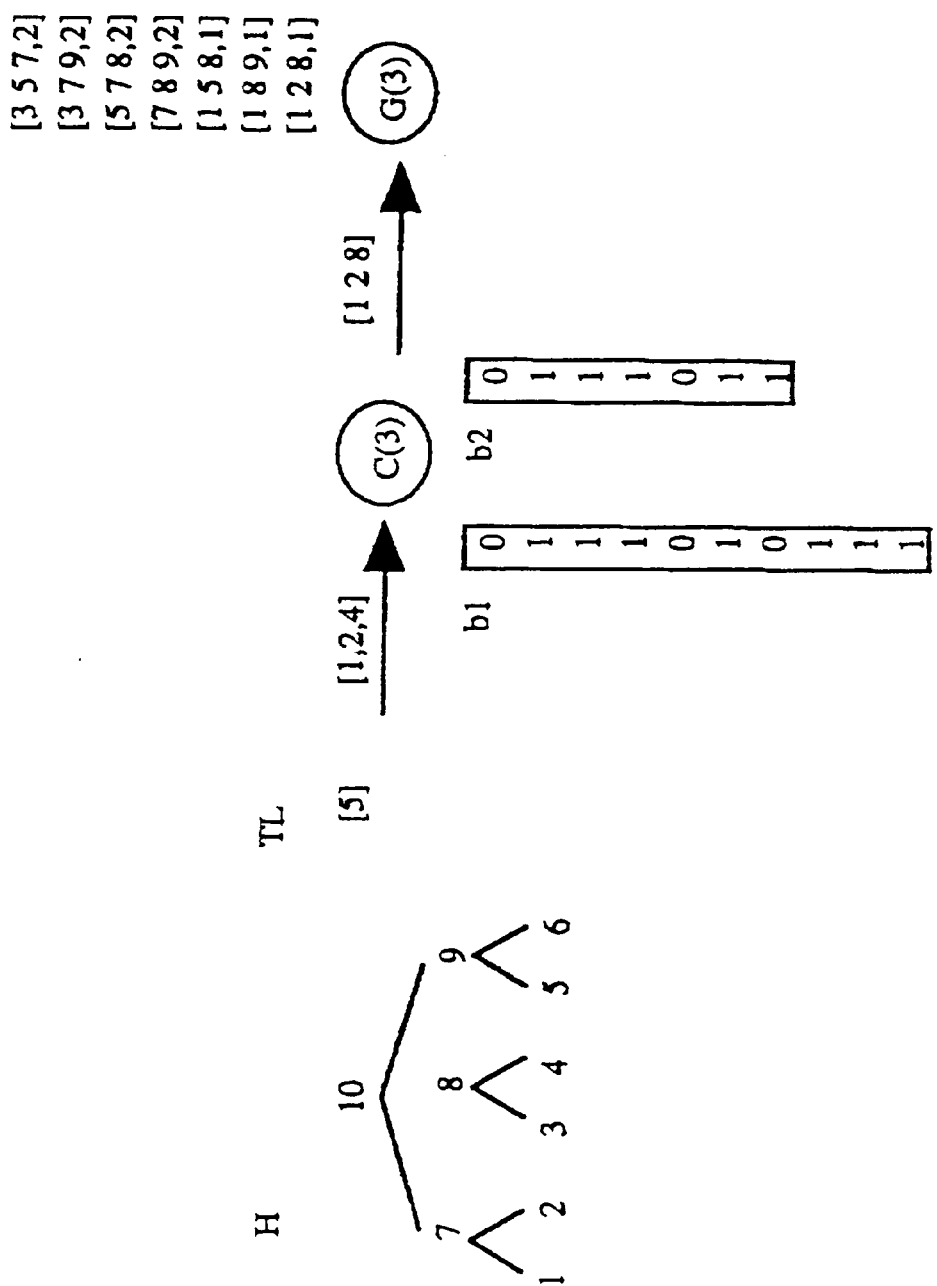
FIG. 112 is a chart (3) showing the processes up to the process G(3) in the hierarchical association analysis.

Similarly, T2=[1,3,5] shown in FIG. 111 and T3 =[1,2,4] shown in FIG. 112 are input into the combination generation unit C(3), and G(3) counts the generated combinations of three items.

Since the number of items contained in transaction T4 is only one, as shown in FIG. 113, no combinations of items are generated. All combinations of three items generated by C(3) and counted by G(3) are shown in FIG. 113.

Figure 114:
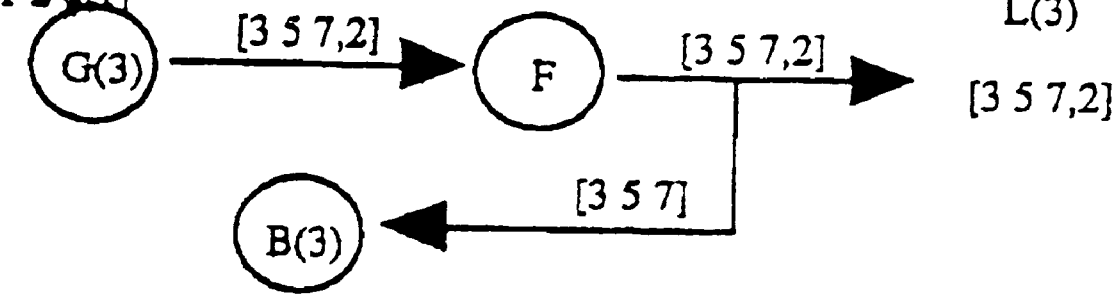
FIG. 114 is a chart (1) showing the selection of L(3) in the hierarchical association analysis.

FIGS. 114 through 119 show the process of selecting combinations of three items which are generated as shown in FIG. 110 through 113 and satisfy the support condition of large 3-itemset L(3). In FIG. 114, the first combination [3 5 7,2] input into the combination selection unit F satisfies the support condition. Therefore, it is selected as an element of the large 3-itemset L(3), and also input into the bit map generation unit B(3) to set the bit maps b1 and b3.

The hash function used in setting the bit map b1 is the same as the one used and illustrated in FIGS. 85 through 94. The hash function H3 used in setting b3 is H3(item 1, item 2, item 3)=(item 1+item 2+item 3) mod 7.

Figure 116:
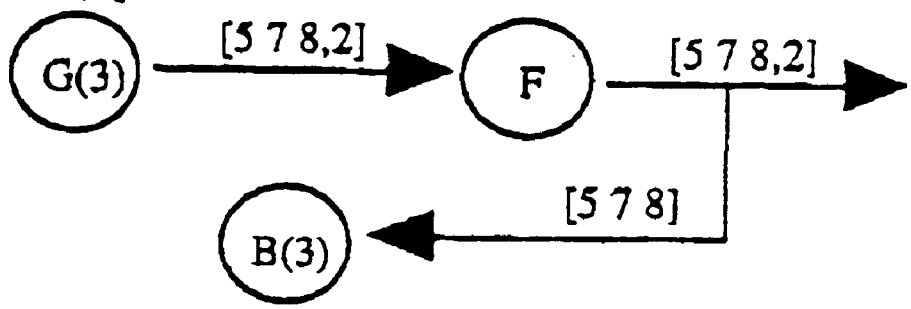
FIG. 116 is a chart (3) showing the selection of L(3) in the hierarchical association analysis.

The combinations of three items [3 7 9,2] in FIG. 115, [5 7 8,2] in FIG. 116, and [7 8 9,2] in FIG. 117 are input into the combination selection unit F. Since these combinations of three items satisfy the support condition, they are selected as elements of the large 3-itemset L(3), and the corresponding subsets have their bits set in bit maps b1 and b3.

Figure 119:
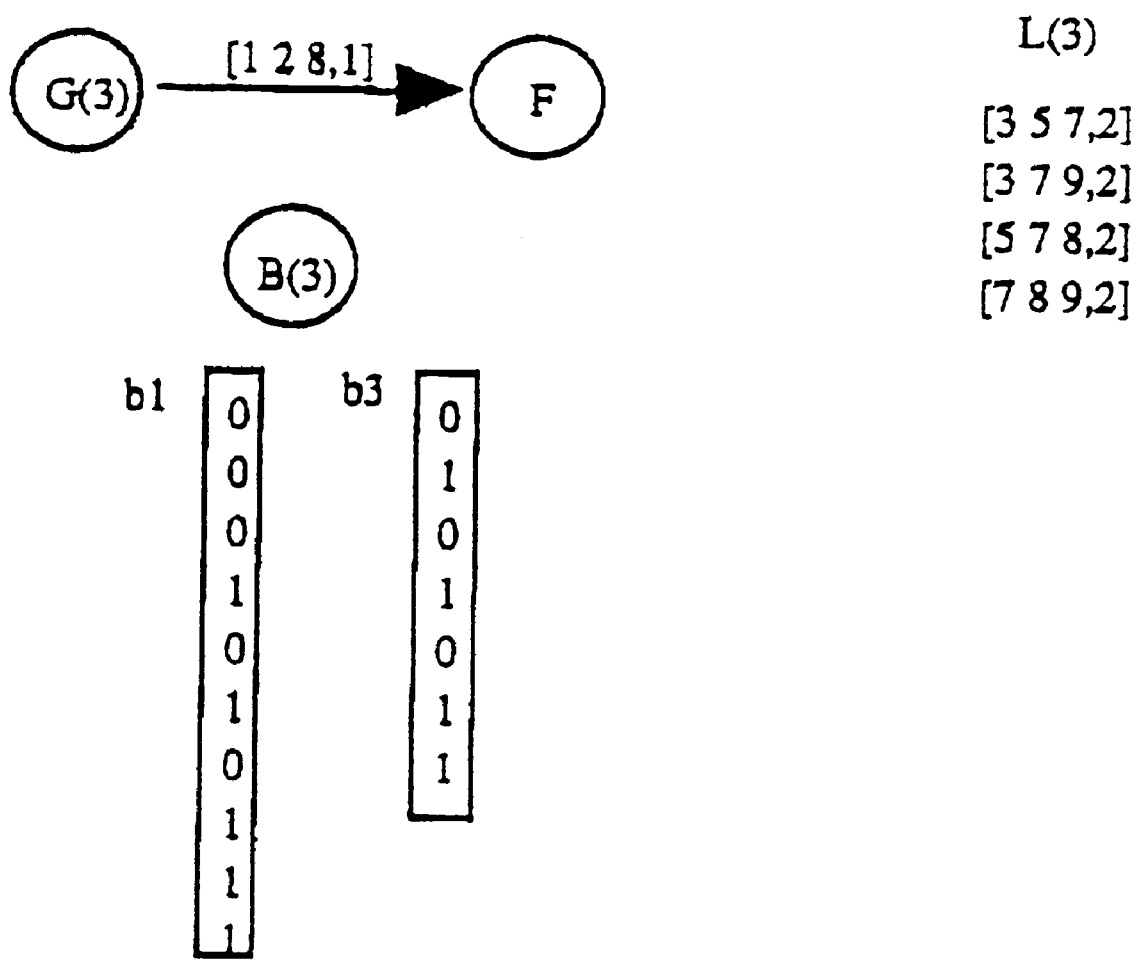
Figure 120:
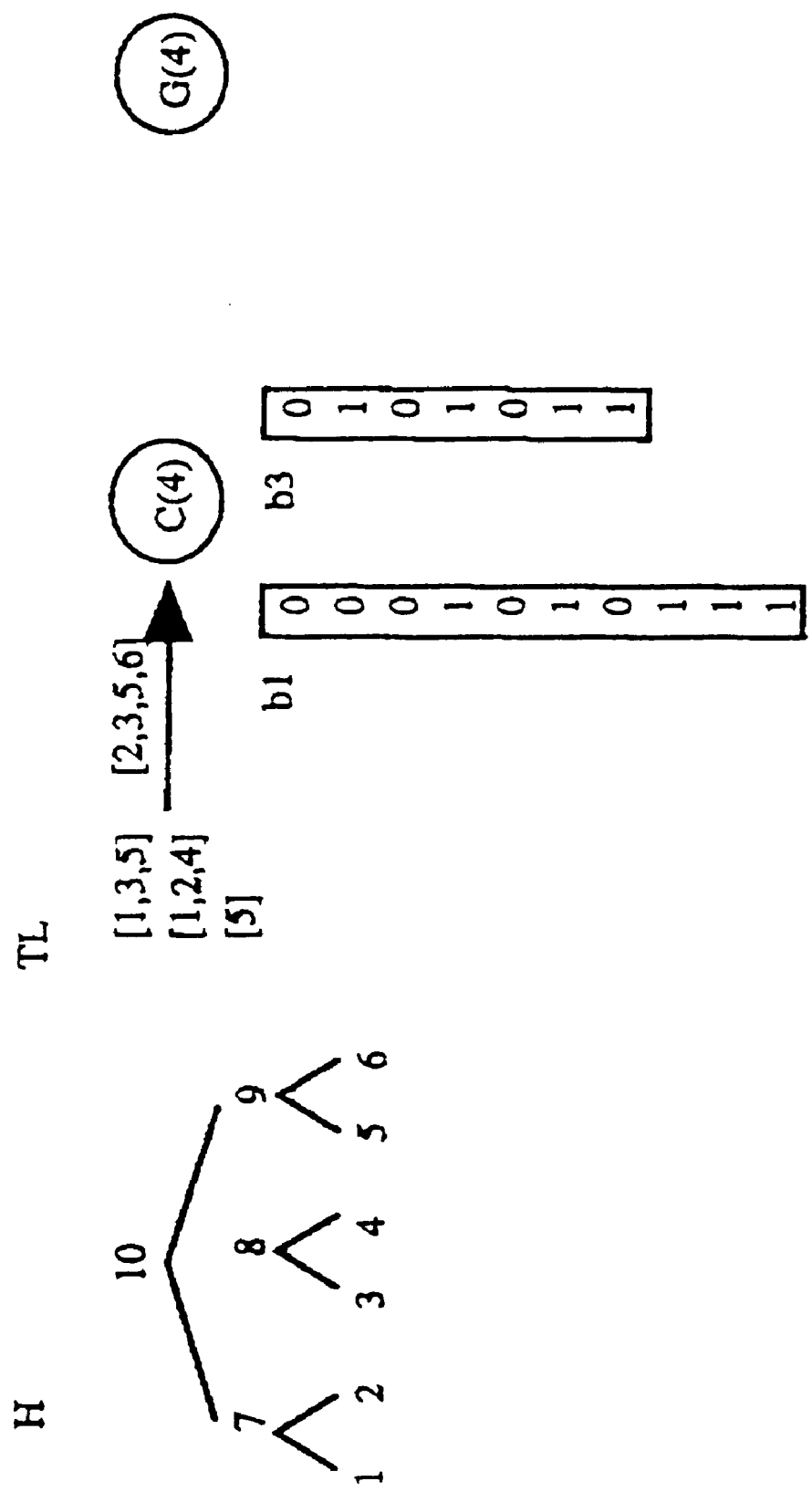
Figure 121:
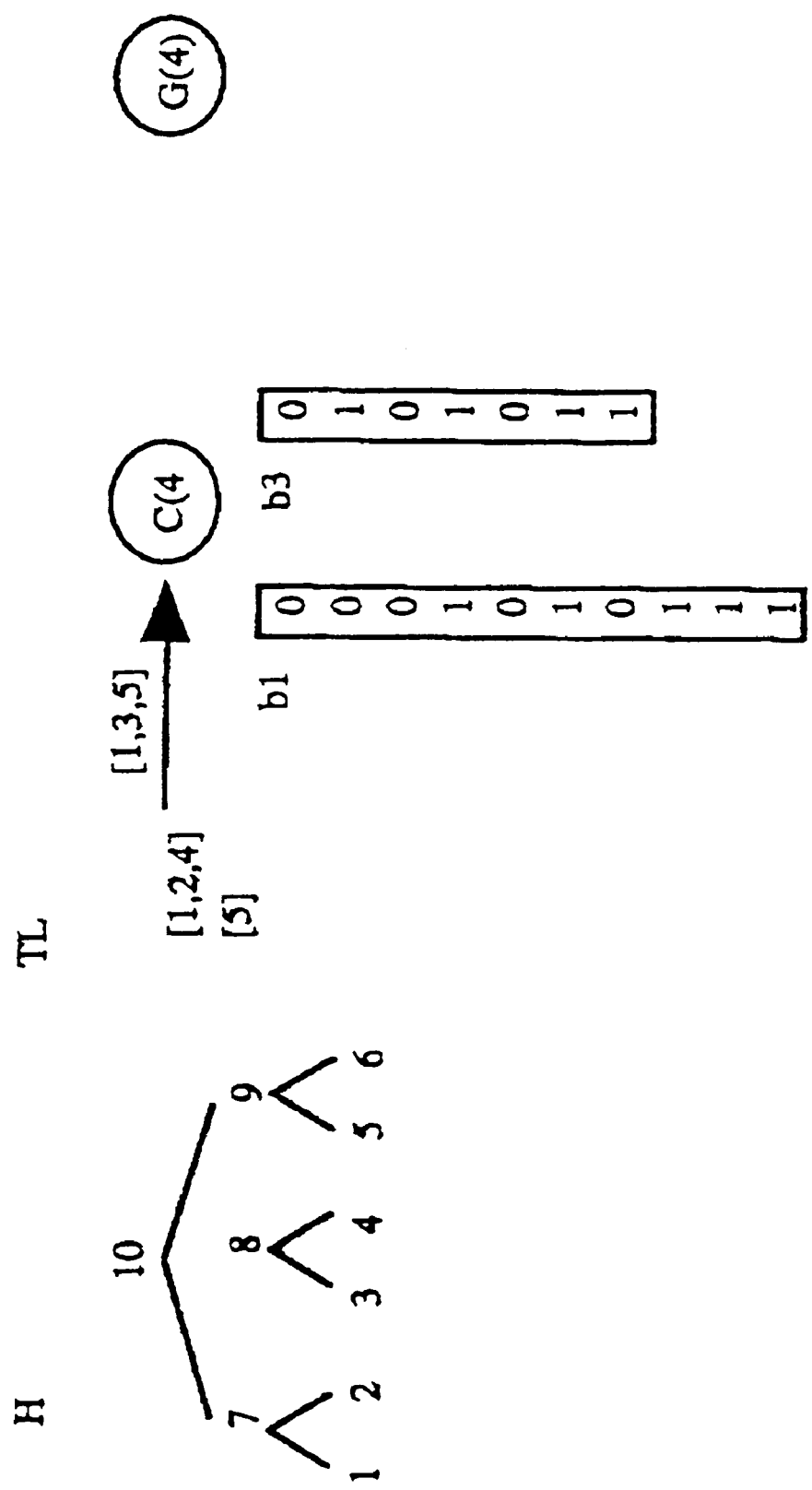
Figure 122:
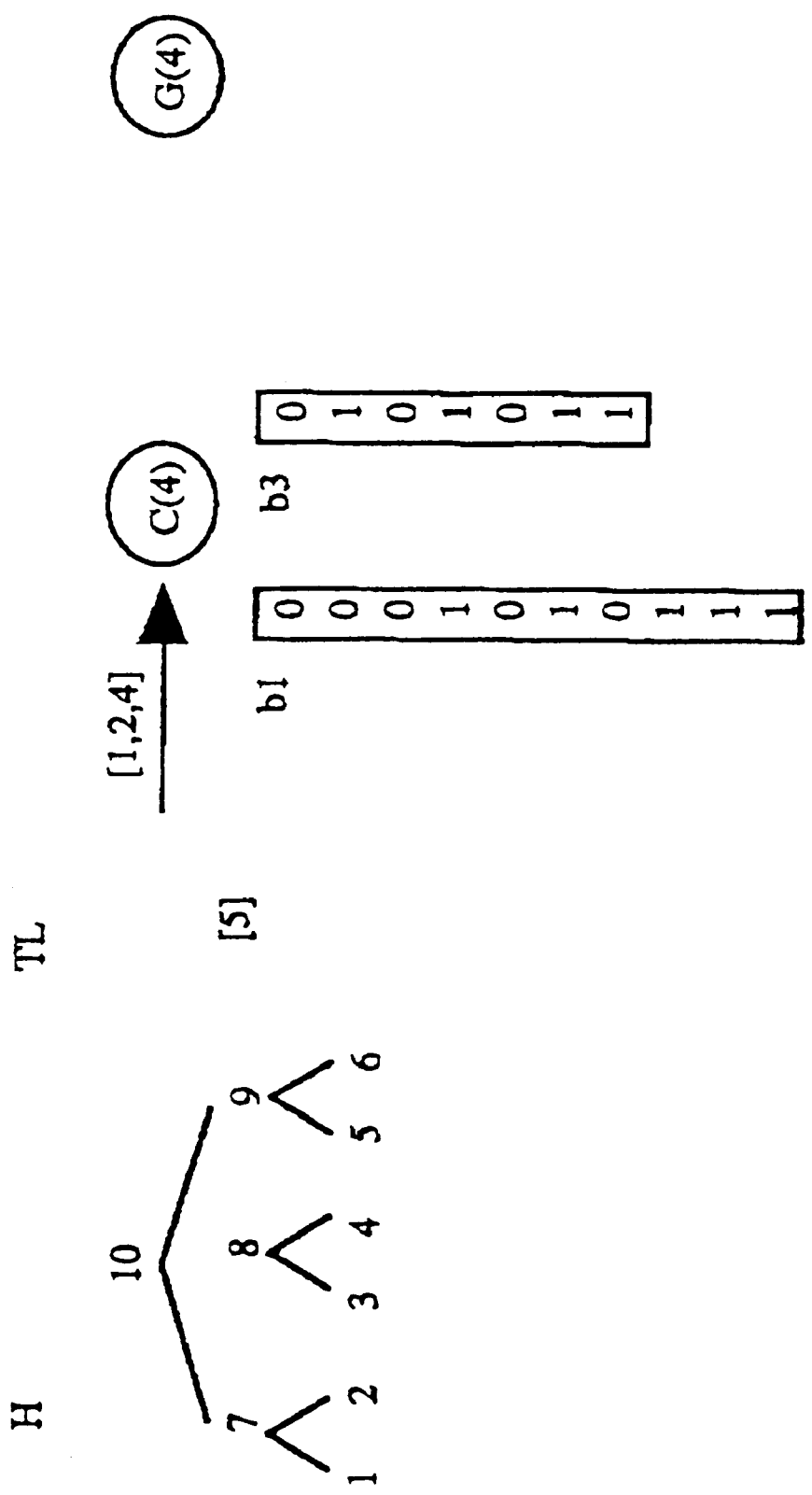
Figure 123:
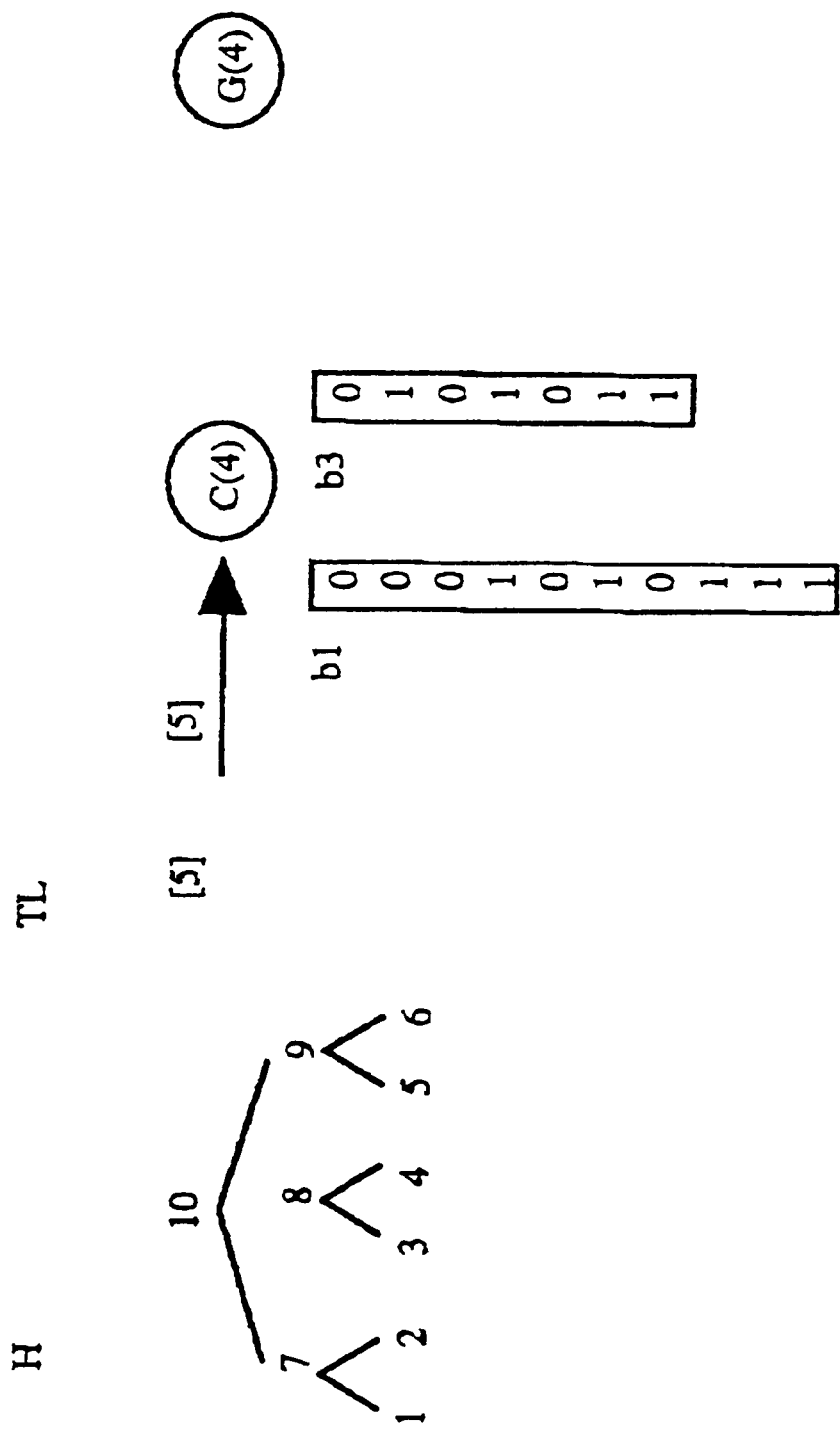
Figure 125:
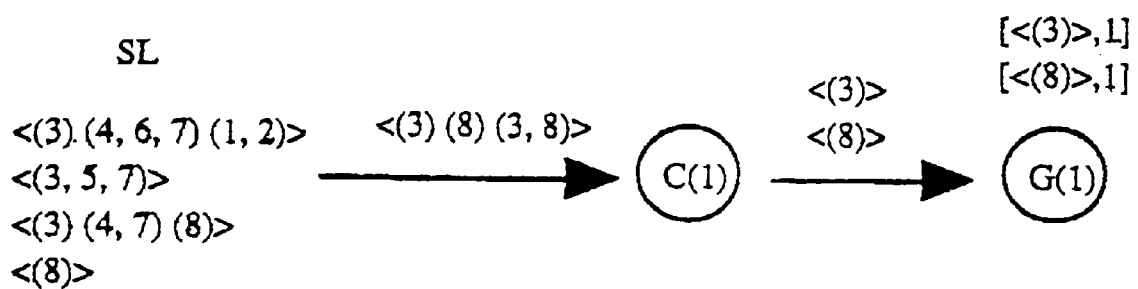
Figure 126:
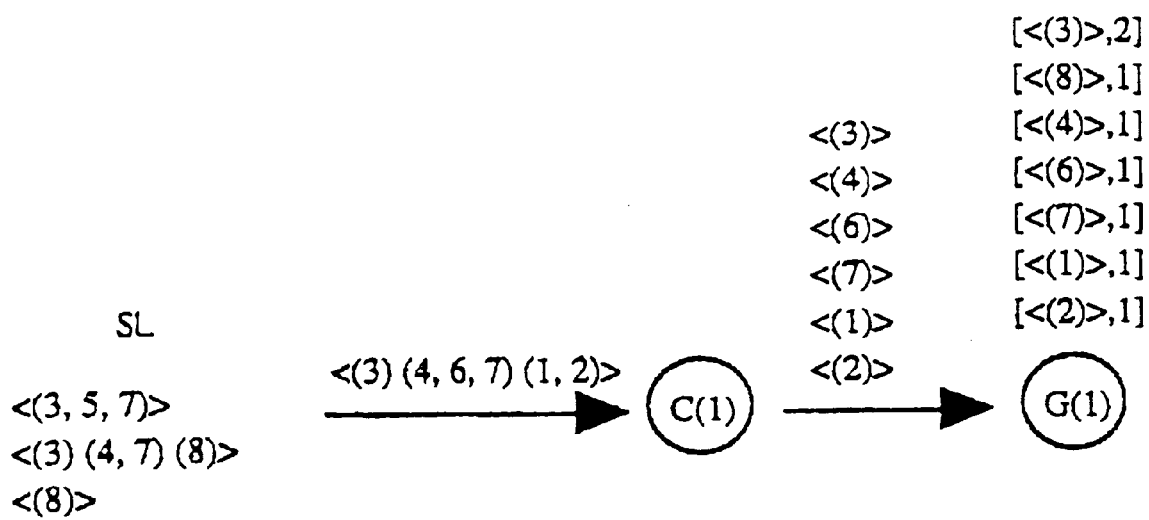
Figure 127:
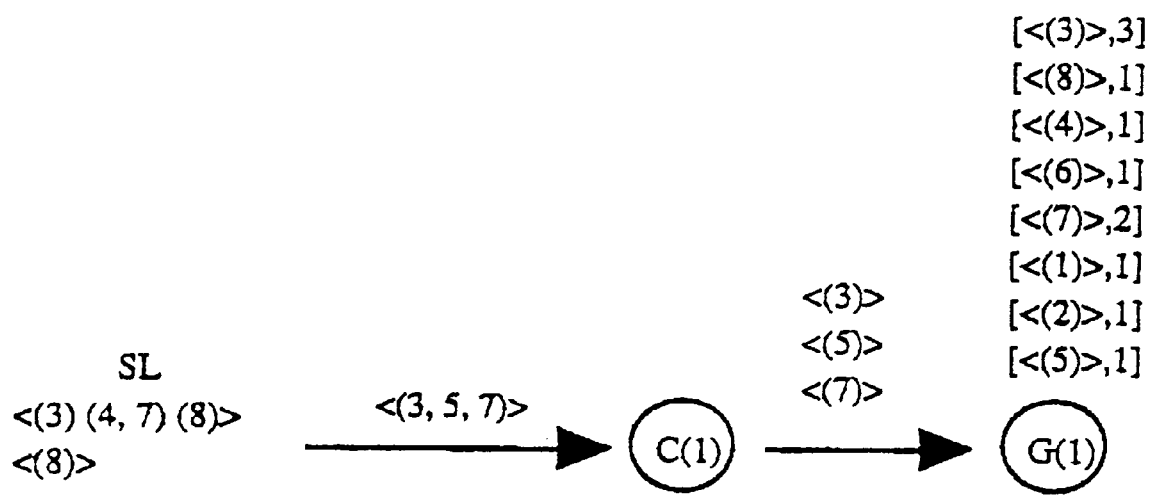
Figure 128:
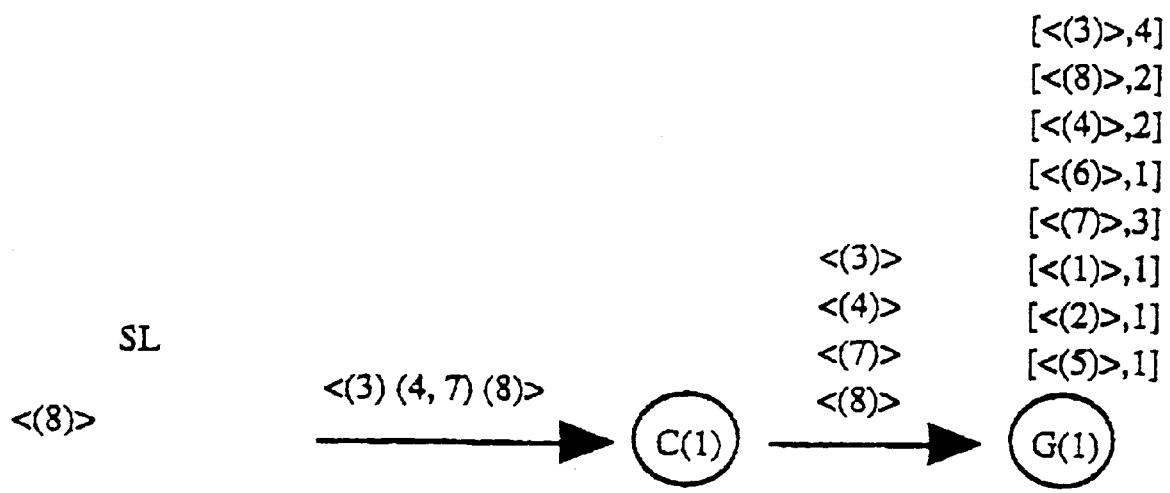

When [1 5 8,1] shown in FIG. 118, [1 2 8,1] shown in FIG. 119, and [1 8 9,1] not shown in the drawings are input, they are not selected as elements of the large 3-itemset L(3), and no bit map updating occurs because none of them satisfies the support condition. The large 3-itemsets L(3) and the bit maps b1 and b3 resultant of the third processing step are shown in FIG. 119.

FIGS. 120 through 123 show the process of generating and counting combinations of four items. Since none of the four transactions generates a combination of four items, there is no need to go to the fifth processing step.

Described below is the application of the present invention to a time-series analysis as a method of association analysis. The time-series analysis is used in analyzing goods purchase patterns of a customer over a period of time. If the probability that a customer purchases a second item within a predetermined period after the customer has purchased a first item can be obtained, a retailer can, for example, manage the inventory more effectively.

FIG. 124 shows a sequence list SL of goods purchase patterns of five customers over a certain period of time. In FIG. 124, the first sequence indicates a time-series purchasing pattern of a customer who, for example, first buys item 3, then buys item 8 the next day, and finally buys both items 3 and 8 a week later.

In the example illustrated in FIG. 124, one element of a sequence corresponds to the above described transaction, that is, a receipt. For example, in the last purchase, items 3 and 8 were bough together and they were recorded in the same receipt. In our notation, the first sequence S1=<(3) (8) (3,8)> is composed of 4 items and 3 elements. The first element contains item 3, the second element contains items 8, and the third element contains both items 3 and 8.

The internal representation of such a sequence is [3,8,3, 8,1,1,0], where the first 4 numbers represent the four items of the sequence, and the last 3 numbers represent the separators between those items. A separator i is 0 when item i and item (i+1) belong to the same element. Otherwise it is 1. As shown in FIG. 124, since the last items 3 and 8 belong to the same third element, their corresponding separator is 0.

In the time-series analysis exemplified below, the minimum value for support is 40%. Since the sequence list SL shown in FIG. 124 is formed by five sequences, the minimum support of 40% means that the number of occurrences of sub-sequences of items has to be at least two to be considered.

Described below are the operations performed by the combination generation unit C(i), the occurrence count unit G(i), the combination selection unit F, and the bit map generation unit B(i). Note that although we will continue to use the term 'combination' for these units, in fact the term 'sub-sequence' would be more appropriate, since in contrast to the basic association analysis where the combinations of two items [1 3] and [3 1] have the same meaning, in the time-series analysis the sub-sequences of two items <(1) (3)> and <(3) (1)> have different meanings and are represented as [1,3,1] and [3,1,1], respectively. Also observe that <(1) (3)> and <(1 3)> are different sub-sequences of 2 items. The first is represented as [1,3,1], and the second as [1,3,0].

C(i)

When i=1, items contained in the same sequence are transmitted one by one to the G(i).

When i>=2, a sub-sequence of i items that are contained in the same sequence, and is not pruned by the bit map filter b1, b2, . . . , b(i–1) is transmitted to G(i).

G(i)

The sub-sequence of i items is received, the group-by process described later is performed, and the number is added and output.

F

The output of G(i) is received. If the number satisfies a given condition, it is output as a large sequence L(i) of i items.

B(i)

The output of F is received. The bit position in the bit map filter bj (1<=j<=i), computed by applying Hj (sub-sequence of j items) for each subset of j items from the sub-sequence of i items, is set to '1'. At this time, since b1, . . . , b(i–1) already exist, they are updated. Since bi does not exist, it is newly generated and updated.

The internal representation of the sub-sequence of j items is:

[item 1, . . . , item j, separator 1, . . . , separator (j–1)], where the separator k (1<=k<=j–1) is 0 when the item k and the item (k+1) belong to the same element, and is 1 when they belong to different elements.

The hash function Hj can be represented by:

Hj (item 1, . . . , item j, separator 1, separator (j–1))=(item 1+, . . . , +item j+separator 1+, . . . +separator (j–1)) mod N. N indicates the number of bits of the bit map.

Figure 129:
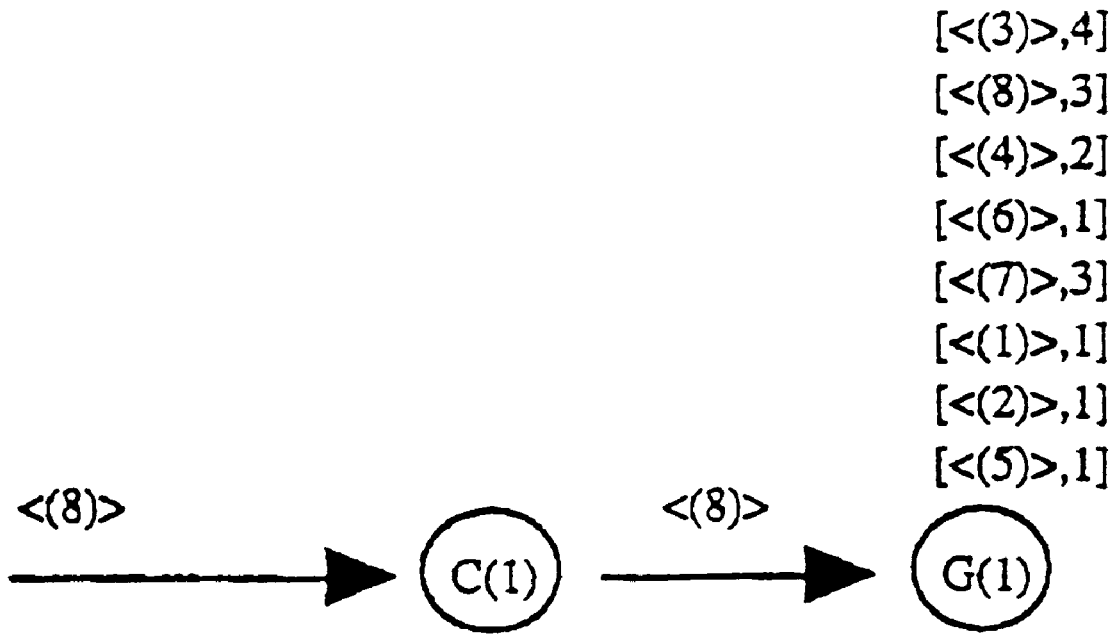

FIGS. 125 through 129 show the processes up to the counting of the occurrences of each item belonging to the sequences in the list SL by G(1). In FIGS. 125 through 129, an item contained in each sequence is counted one by one by G(1). FIG. 129 shows the resultant items and their counts.

FIGS. 130 through 137 show the process of selecting items whose support value is higher than 40%, to generate a large sequence L(1), and simultaneously generate the bit map b1. For example, as shown in FIG. 130, the number of occurrences of item 3 is 4, and satisfies the minimum value for support. Therefore, it is an element of the large sequence L(1). Simultaneously, the item 3 is provided for the bit map generation unit B(1), and thus the corresponding fourth bit is set to '1' in the bit map b1.

In FIGS. 131 through 134, the number of occurrences of the items input into the combination selection unit F satisfies the support value. Therefore, the items are added to the large sequence L(1). However, the number of occurrences of the items shown in FIGS. 135 through 137 is smaller than the minimum support value. Therefore, they are not entered in the large sequence L(1). The final result of the first processing step is shown in FIG. 137.

FIGS. 138 through 142 show the process of counting sub-sequences of two items. In FIG. 138, for S2=<(3) (8) (3,8)>, C(2) generates sub-sequences of two items by using items not removed by filtering through the bit map b1, and the occurrences of the sub-sequences are counted by G(2). Note that the following sub-sequences are different sub-sequences of two items and are thus counted separately.

<(3) (8)>, <(8) (3)>, <(3,8)>

In FIGS. 139 through 142, sub-sequences of two items are similarly counted. For example, in FIG. 139, for S2=<(3) (4,6,7) (1,2)>, items 1, 2, and 6 are filtered through the bit map b1, and thus are not used in generating the sub-sequences <(3) (4)>, <(3) (7)> and <(4,7)>. As shown in FIG. 142, since the last sequence S5=<(8)> contains only one item, no sub-sequences are generated. FIG. 142 shows all the sub-sequences of two items counted by G(2).

FIGS. 143 through 153 show the process of generating a large sequence L(2) containing the sub-sequences of two items generated as shown in FIGS. 138 through 142 that satisfy the support value, and the process of generating the bit maps b1 and b2 by the bit map generation unit B(2). Since the sub-sequences of two items entered in the combination selection unit F satisfy the support value in FIG. 143, they are regarded as elements of the large sequence L(2), and bits are set in the bit maps b1 and b2 using the hash functions H1 and H2 for the two items 3 and 8, and the separator 1.

Since the sub-sequences input in FIGS. 144 through 147 and 151 through 153 do not satisfy the support value, no entries are made in the large sequence L(2) and no bits are set in the bit maps b1 nor b2.

On the other hand, since the sub-sequences input into the combination selection unit F in FIGS. 148 through 150 satisfy the support value, entries are made in the large sequence L(2) and bits are set in the bit maps b1 and b2. FIG. 153 shows the final large sequence L(2) and bit maps b1 and b2.

FIGS. 154 through 158 show the process of counting the sub-sequences of three items by G(3). In FIG. 154, the first sequence is input into the combination generation unit C(3), which after the pruning done by bit maps b1 and b2, generates no sub-sequence.

In FIGS. 155 and 157, only the sub-sequence of three items <(3) (4,7)> is generated by the combination generation unit C(3) and counted by G(3). In FIGS. 156 and 158, no sub-sequences of items are input into G(3).

FIG. 159 shows that the only sub-sequence in the large sequence L(3), resultant from the processing shown in FIGS. 154 through 158, is <(3) (4,7)>, and it is used to set bits in the bit maps b1 and b3. Since the number of elements of the large sequence L(3) is one, the sub-sequence counting process terminates here.

FIG. 160 shows the flow of the process of counting the combinations of items for the basic association analysis according to the present invention using the same transactions used for the exemplification of the conventional technologies shown in FIGS. 168 and 170. As shown in FIG. 160, in our invention, the information on the large itemsets that are used to prune unnecessary combinations to be counted are registered in bit maps. For example, items of L1 have their corresponding bits set to '1' in bit map b1. Thus, when C(2) scans the transactions in TL and generates combinations of two items, it checks b1, and thus avoids the unnecessary generation and counting of combinations [1 4], [2 4], [3 4], [7 9] and [8 10], which would be generated without b1.

The process of generating a bit map is simple, and its size and thus its pruning capability can be adjusted to the available memory capacity. Therefore, the problems found in the conventional technologies such as the processing load being heavy in the join operation shown in FIG. 168, and the size of the hash tree for the candidate itemsets shown in FIG. 170 being larger than the available memory capacity can be solved.

The explanation of the entire process of counting data combinations according to the present invention is completed as described above. Described below is the group-by operation performed by the occurrence count unit G(i).

The group-by processing system according to the present invention is used when counting the combinations of items. Practical examples of the process are described below.

When the occurrences of items of transactions having only an item are counted, the above described group-by processing system can be used as is by regarding an item identification number as a key value of a record. Therefore, a practical example of counting combinations of two items in the transactions having two items is described below. In this group-by processing system, as in the above described first embodiment, a hashed list and an auxiliary information list are generated in a hash process, and then records having the same key value are counted in a group-by function process.

There are the following 16 input records. Each of the records has two item identification numbers, and determines a key in the hash process and the sort process using the item identification numbers.

[1 2] [1 4] [2 4] [2 6] [1 4] [1 5] [1 6] [4 5]
[4 6] [5 6] [1 2] [1 4] [1 5] [2 4] [2 5] [4 5]

Various methods for comparing the keys can be applied, but a dictionary order is adopted in this case. That is, when two records are compared, the first item identification numbers are compared with each other. If the numbers are not equal to each other, it is regarded as the comparison result between the corresponding record keys. If the first item identification numbers are equal to each other, then the second item identification numbers are compared with each other. If the second identification numbers are not equal to each other, it is regarded as the comparison result between the corresponding keys. If the second item identification numbers are equal to each other, then the third identification item numbers are compared with each other. Thus, the process proceeds until the last item identification numbers are compared. If the records are equal with each other from the first to the last item identification numbers, then the keys of the records match each other. For example, when [1 2] is compared with [1 4], the first item identification numbers are equal with each other. However, when the second item identification numbers are compared, the key value of [1 4] is larger than that of [1 2].

An appropriate hash function can be selected. In this example, a remainder obtained by dividing a sum of item identification numbers by 3 is used as an example of the hash function. That is, the hash function value of [1 2] is (1+2) mod 3=0, and the hash function value of [1 4] is (1+4) mod 3=2. $H(R)=(i1+i2+\ldots+ik) \mod 3$ where ik is an item identification number, R is a record including i1, i2, . . . , and ik.

As in the first embodiment of the above described group-by processing system, a hashed list is generated from 16 input records. At this time, the size of the hash table 15 shown in FIG. 3 is 3. The record buffer 14 has a storage areas for four records. The hashed list output buffer 18 can store three records.

FIG. 161 shows the proceedings of the hashed list generating process. FIG. 161 shows the proceedings of inputting records from the input buffer 13 to the record buffer 14 and outputting records from the record buffer 14 to the hashed list output buffer 18. As in the processes shown in FIGS. 8A through 8O, when one record is input and another record having the same hash function value has already been input, the newly input record is pointed to from the hash table, and the already input record is managed according to the link control table.

FIG. 162 is a hashed list obtained as a result of the process shown in FIG. 161. The process shown in FIG. 161 generates a run information containing block number 0 through 2 and a run information containing block number 3 through 5.

An auxiliary information list can be represented by [block number, hash function value of the first record in the block, hash function value of the last record in the block]. Then, the following auxiliary information list can be obtained, and the format of the auxiliary information list may not be changed according to the number of items used as the key.

[0,0,0] [1,1,2] [2,2,2] [3,0,0] [4,0,1] [5,1,1]

For example, the following sorted auxiliary information list can be obtained by sorting the records in the auxiliary information list. The sorting method does not depend on the number of items used as the key.

[0,0,0] [3,0,0] [4,0,1] [5,1,1] [1,1,2] [2,2,2]

According to the sorted auxiliary information list, the group-by function process shown in FIG. 19 is performed. First, FIG. 163A shows the process performed by the minimum hash function value record retrieval device 33 in FIG. 18. In this process, the number of hashed list input buffers is two, that is, the number of runs. The records having the minimum hash function value are retrieved one by one from the records input into the two buffers according to the order in the sorted auxiliary information list 30. The final result is listed as follows.

[2 4] [1 2] [1 5] [4 5] [4 5] [1 5] [2 4] [1 2] [2 5] [1 6] [4 6] [1 4] [2 6] [5 6] [1 4] [1 4]

The process result obtained by the minimum hash function value record retrieval device 33 for each hash function value is as follows.

hash function value 0: [2 4] [1 2] [1 5] [4 5] [4 5] [1 5] [2 4] [1 2]

hash function value 1: [2 5] [1 6] [4 6]

hash function value 2: [1 4] [2 6] [5 6] [1 4] [1 4]

On the records having the same hash function value, the sort process is performed by the sort device 34 shown in FIG. 18, and the result is transmitted to the group-by function operation process device 35. Then, a counting process is performed. In this sort process, the above described dictionary order is adopted. In FIG. 19, the records having the hash function value of 0 are sorted when no more records having the hash function value of 0 can be retrieved, and the records having the hash function value of 1 are sorted when no more records having the hash function value of 1 can be retrieved. The operations are repeated until the last record is processed. An output record is represented by the format of [key value, number of occurrences]. The key value contains, in this example, two item identification numbers.

First, the records having the hash function value of 0 are sorted, and the following sort result is obtained.

[1 2] [1 2] [1 5] [1 5] [2 4] [2 4] [4 5] [4 5]

Then, the sort result is transmitted to the group-by function operation process device 35, and the following result is obtained.

[1 2,2] [1 5,2] [2 4,2] [4 5,2]

Then, the records having the hash function value of 1 are sorted.

[1 6] [2 5] [4 6]

Next, the sort result is transmitted to the group-by function operation process device 35, and the following result is obtained.

[1 6,1] [2 5,1] [4 6,1]

Last, the records having the hash function value of 2 are sorted, and the following sort result is obtained.

[1 4] [1 4] [1 4] [2 6] [5 6]

Then, the sort result is transmitted to the group-by function operation process device 35.

Finally, the following result is obtained.

[1 4,3] [2 6,1] [5 6,1]

As a whole, the following result is obtained.

[2,2] [1 5,2] [2 4,2] [4 5,2] [1 6,1] [2 5,1] [4 6,1] [1 4,3] [2 6,1] [5 6,1]

FIG. 163B shows an example of the hardware configuration of a computer 300 in which the above described group-by processing system is embodied. The computer 300 comprises a CPU 301, a data storage unit 302, memory 303, and a network interface 304, which are all connected by a bus 305. The CPU 301 performs the process of each of the units 106 through 109 shown in FIG. 1A. The CPU 301 controls the process performed by each of the units 100 through 103 shown in FIG. 1B.

The data storage unit 302 normally can be an secondary storage unit such as a hard disk, a floppy disk, an optical disk, etc. The data storage unit 302 stores the hash list 11 of records to be hashed, the hashed list 21 of hashed records, and the auxiliary information list 22. These data are provided to the CPU 301 as necessary for use in the group-by operation. The data storage unit 302 further stores a program for executing the group-by operation, and an OS program.

The memory 303 stores the program for executing the group-by operation, the OS program, etc. loaded from the data storage unit 302. Furthermore, in the area in the input buffer 13, the record buffer 14, etc. as shown in FIG. 3, the memory 303 temporarily stores records which are to be hashed in the data storage unit 302 and are required in the group-by operation. The memory 303 also temporarily stores data which are required in the group-by operation but are not to be hashed.

The network interface 304 is connected to other computers or networks to transmit and receive necessary data and signals, etc.

A bus 305 is a common transmission path through which data, signals, etc. are transmitted and received among the components, for example, to the CPU 301 through the network interface 304. The computer 300 can further comprise a display device, printing device, input device, and other devices as necessary although they are not shown in FIG. 163B.

Described above are the group-by processing system according to the present invention and the embodiments relating to the data combination counting system based on the group-by processing system. However, the embodiments of the present invention are not limited to the above described applications, but can be many other applications within the applicable range of the claims according to the present invention.

As described in detail, a high speed group-by operation can be realized according to the present invention by performing a high speed hash process by sequentially reading and writing data in relatively large block units in order to continuously access a secondary storage device, and by performing the group-by operation based on the result of the hash process. Next, according to the data combination count system according to the present invention, the pruning process can be efficiently performed even if an available memory capacity is small, by using a bit map in order to reduce the memory capacity by pruning unnecessary candidates for combinations of items. Furthermore, the process of counting combinations of items can be performed efficiently by performing a high speed group-by operation in which item sets are counted. The data combination counting system according to the present invention can be applied to the process of generating an association rule as a data mining method. As a result, the efficiency of the data mining method can be largely improved.

What is claimed is:

1. A group-by processing system for performing a group-by operation based on a hash method of transforming records to be hashed stored in a storage device into a referenceable storage form using hash function values, each of which corresponds to a key value of the record, comprising:

record storing means for temporarily storing the records;

pointer storing means for storing pointers to the records in said record storing means at positions, each of which corresponds to a hash function value calculated using the key value of the pointed record;

output means for outputting the records pointed to by the pointers stored in said pointer storing means to said storage device, given the hash function values for storage positions of the pointers; and group-by operation execution means for reading a list of hashed records output to said storage device by said output means, sorting the hashed records in the list according to the key value, and performing the group-by operation on the list of the sorted records.

2. The system according to claim 1, wherein said output means outputs the records output corresponding to the hash function values from said record storing means to said storage device as a set of blocks, and comprises:

auxiliary information storing means for storing auxiliary information for retrieving records in the block according to the hash function value.

3. The system according to claim 2, wherein said group-by operation execution means performs the group-by operation on the records using a sequence of hashed records corresponding to the hash function values and output as a set of blocks by said output means and auxiliary information stored in said auxiliary information storing means.

4. A hash system in a group-by processing system for performing a group-by operation based on a hash method of transforming records to be hashed stored in a storage device into a referenceable storage form using hash function values, each of which corresponds to a key value of the record, comprising:

record storing means for temporarily storing the records;

pointer storing means for storing pointers to the records in said record storing means at positions, each of which corresponds to a hash function value calculated using the key value of the record; and output means for outputting the records pointed to by the pointers stored in said pointer storing means to sequential space or non-sequential space in said storage device, given the hash function values for storage positions of the pointers.

5. The system according to claim 4, wherein said output means outputs the records output corresponding to the hash function values from said record storing means to said storage device as a set of blocks, and comprises:

auxiliary information storing means for storing auxiliary information for retrieving records in the block according to the hash function value.

6. A group-by processing system for performing a group-by operation, comprising: means for transforming records to be hashed stored in a storage device into a referenceable storage form using hash function values, each of which corresponds to a key value of the record; and group-by operation execution means for performing the group-by operation using a sequence of hashed records corresponding to the hash function values stored in sequential space or non-sequential space in said storage device and auxiliary information for retrieving the records in the block according to the hash function value.

7. A group-by processing system for performing a group-by operation based on a hash method of transforming records to be hashed stored in a storage device into a referenceable storage form using hash function values, each of which corresponds to a key value of the record, comprising:

record storing means for temporarily storing the records;

pointer storing means for storing pointers to the records in said record storing means at positions, each of which corresponds to a hash function value calculated using the key value of the pointed record;

output means for outputting the records pointed to by the pointers stored in said pointer storing means to sequential space or non-sequential space in said storage device as a set of blocks, each of which is output to sequential space, given the hash function values for storage positions of the pointers;

auxiliary information storing means for storing auxiliary information for retrieving records in the block according to the hash function value; and group-by operation execution means for performing the group-by operation using a sequence of hashed records output by said output means corresponding to the hash function values and auxiliary information stored in said auxiliary information storing means.

8. A hash system in a group-by processing system for performing a group-by operation based on a hash method of transforming records to be hashed stored in a storage device into a referenceable storage form using hash function values, each of which corresponds to a key value of the record, comprising:

record storing means for temporarily storing the records;

pointer storing means for storing pointers to the records in said record storing means at positions, each of which corresponds to a hash function value calculated using the key value of the pointed record;

output means for outputting the records pointed to by the pointers stored in said pointer storing means to said storage device, given the hash function values for storage positions of the pointers; and run information storing means for storing run information including addresses, each of which points to a record contained in each run created by said output means in said storage device, given the hash function values from a minimum value to a maximum value.

9. The hash system according to claim 8, wherein said output means outputs the records contained in the same run to sequential space in said storage device, and stores the records of different runs to sequential space or non-sequential space in said storage device.

10. A group-by processing system for performing a group-by operation, comprising: means for transforming records to be hashed stored in a storage device into a referenceable storage form using hash function values, each of which corresponds to a key value of the record; and group-by operation execution means for performing the group-by operation using a sequence of hashed records obtained as a result of the hash process in said storage device and run information, obtained as a result of the same hash process, including addresses, each of which points to a record contained in each run created by output means in said storage device, given the hash function values from a minimum value to a maximum value.

11. A group-by processing system for performing a group-by operation based on a hash method of transforming records to be hashed stored in a storage device into a referenceable storage form using hash function values, each of which corresponds to a key value of the record, comprising:

record storing means for temporarily storing the records;

pointer storing means for storing pointers to the records in said record storing means at positions, each of which corresponds to a hash function value calculated using the key value of the record;

output means for outputting the records pointed to by the pointers stored in said pointer storing means to said storage device, given the hash function values for storage positions of the pointers; run information storing means for storing run information including addresses, each of which points to a record contained in each run created by said output means in said storage device, given the hash function values from a minimum value to a maximum value; and group-by operation execution means for performing the group-by process using a sequence of hashed records output by said output means and stored in said storage device and the run information stored in said run information storing means.

12. A group-by processing system for performing a group-by operation based on a hash method of transforming records to be hashed stored in a storage device into a referenceable storage form using hash function values, each of which corresponds to a key value of the record, comprising:

record storing means for temporarily storing the records;

pointer storing means for storing pointers to records in said record storing means at positions, each of which corresponds to a hash function value calculated using the key value of the record;

output means for outputting the records pointed to by pointers stored in said pointer storing means to said storage device, given the hash function values for storage positions of the pointers, outputting the records contained in the same run to sequential space in said storage device, given the hash function values from a minimum value to a maximum value, and outputting the records of different runs to sequential space or non-sequential space in said storage device;

run information storing means for storing run information including addresses, each of which points to a record contained in each run in said storage device; and group-by operation execution means for performing the group-by operation using a sequence of hashed records output by said output means and stored in said storage device and the run information stored in said run information storing means.

13. A hash system in a group-by processing system for performing a group-by operation based on a hash method of transforming records to be hashed stored in a storage device into a referenceable storage form using hash function values, each of which corresponds to a key value of the record, comprising:

record storing means for temporarily storing the records;

pointer storing means for storing pointers to the records in said record storing means at positions, each of which corresponds to a hash function value calculated using the key value of the record;

output means for outputting the records pointed to by the pointers stored in said pointer storing means to sequential space or non-sequential space in said storage device as a set of blocks, and outputting the blocks with connection data between two blocks if the two blocks should be adjacent with each other and if the blocks cannot be output to sequential space in said storage device, given the hash function values for storage positions of the pointers; and run information storing means for storing run information including addresses, each of which points to a record contained in each run created by said output means in said storage device, given the hash function values from a minimum value to a maximum value.

14. A group-by processing system for performing a group-by operation, comprising; means for transforming records to be hashed stored in a storage device into a referenceable storage form using hash function values, each of which corresponds to a key value of the record; and group-by operation execution means for performing the group-by operation using a sequence of hashed records stored in said storage device, run information including addresses, each of which points to a record contained in each run created by output means in said storage device, given the hash function values from a minimum value to a maximum value, and connection data between two blocks which are stored in independent and non-sequential space in said storage device though the blocks should come sequentially.

15. A group-by processing system for performing a group-by operation based on a hash method of transforming records to be hashed stored in a storage device into a referenceable storage form using hash function values, each of which corresponds to a key value of the record, comprising:

record storing means for temporarily storing the records;

pointer storing means for storing pointers to the records in said record storing means at positions, each of which corresponds to a hash function value calculated using the key value of the record;

output means for outputting the records pointed to by the pointers stored in said pointer storing means to sequential space or non-sequential space in said storage device, and outputting the blocks with connection data between two blocks if the two blocks should be adjacent with each other and if the blocks cannot be output to sequential space in said storage device, given the hash function values for storage positions of the pointers;

run information storing means for storing run information including addresses, each of which points to a record contained in each run created by said output means in said storage device, given the hash function values from a minimum value to a maximum value; and group-by operation execution means for performing the group-by operation using a sequence of hashed records output by said output means and stored in said storage device, given the hash function values, the run information stored in said run information storing means, and the connection data between the two blocks.

16. A computer readable storage medium storing a process, for a group-by processing system for performing a group-by operation based on a hash method of transforming records to be hashed stored in a storage device into a referenceable storage form using hash function values, each of which corresponds to a key value of the record, the process comprises the steps of:

temporarily storing the records;

storing pointers to the temporarily stored records at positions, each of which corresponds to a hash function value calculated using the key value of the pointed record;

outputting the records pointed to by the pointers to said storage device, given the hash function values for storage positions of the pointers; and reading a list of hashed records output to said storage device, sorting the hashed records in the list according to the key value, and performing the group-by operation on the list of the sorted records.

17. A computer readable storage medium storing a process, for a group-by processing system for performing a group-by operation based on a hash method of transforming records to be hashed stored in a storage device into a referenceable storage form using hash function values, each of which corresponds to a key value of the record, the process comprises the steps of:

temporarily storing the records;

storing pointers to the temporarily stored records at positions, each of which corresponds to a hash function value calculated using the key value of the pointed record;

outputting the records pointed to by the pointers to sequential space or non-sequential space in said storage device as a set of blocks, each of which is output to sequential space in said storage device;

storing auxiliary information for retrieving records in the block according to the hash function value; and performing the group-by operation using a sequence of hashed records output to said storage device and the auxiliary information.

18. A computer readable storage medium storing a process, for a group-by processing system for performing a group-by operation based on a hash method of transforming records to be hashed stored in a storage device into a referenceable storage form using hash function values, each of which corresponds to a key value of the record, the process comprises the steps of:

temporarily storing the records;

storing pointers to temporarily stored records at positions, each of which corresponds to a hash function value calculated using the key value of the pointed record;

outputting the records pointed to by the pointers in said storage device, given the hash function values for storage positions of the pointers;

storing run information including addresses, each of which points to a record contained in each run created in said storage device, given the hash function values from a minimum value to a maximum value; and performing the group-by operation using a sequence of hashed records stored in said storage device and the run information stored in said run information storing means.

19. A computer readable storage medium storing a process, for a group-by processing system for performing a group-by operation based on a hash method of transforming records to be hashed stored in a storage device into a referenceable storage form using hash function values, each of which corresponds to a key value of the record, the process comprises the steps of:

temporarily storing the records;

storing pointers to the temporarily stored records at positions, each of which corresponds to a hash function value calculated using the key value of the pointed record;

outputting the records pointed to by the pointers to said storage device, given the hash function values for storage positions of the pointers, outputting the records contained in the same run to sequential space in said storage device, given the hash function values from a minimum value to a maximum value, and outputting the records of different runs to sequential space or non-sequential space in said storage device;

storing run information including addresses, each of which points to a record contained in each run in said storage device; and performing the group-by process using a sequence of hashed records output and stored in said storage device and the run information.

20. A computer readable storage medium storing a process, for a group-by processing system for performing a group-by operation based on a hash method of transforming records to be hashed stored in a storage device into a referenceable storage form using hash function values, each of which corresponds to a key value of the record, the process comprises the steps of:

temporarily storing the records;

storing pointers to the temporarily stored records at positions, each of which corresponds to a hash function value calculated using the key value of the record;

outputting the records pointed to by the pointers to said storage device as a set of blocks, each of which is output to sequential space in said storage device, given the hash function values for storage positions of the pointers, and for outputting the blocks with connection data between two blocks if the two blocks should be adjacent with each other and if the blocks cannot be output to sequential space in said storage device;

storing run information including addresses, each of which points to a record contained in each run created in said storage device, given the hash function values from a minimum value to a maximum value; and performing the group-by process using a sequence of hashed records stored in said storage device, the run information, and the connection data between the two blocks.

21. A related data combination count system for obtaining individual items or combinations of two or more items from a plurality of transactions containing one or more items, and determining the number of occurrences of the individual items or the combinations of two or more items which satisfy a given condition of the number of occurrences in the transactions, comprising:

combination generation means for outputting each item in each transaction when the individual item is to be obtained, and for generating every combination of the number of items to be obtained from each transaction and outputting only the combination satisfying a combination generation restriction condition that partial combinations in the combination satisfy the given condition of the number of occurrences, said partial combination comprising the number of items less than the number of items to be obtained, when the combination of two or more items is to be obtained;

occurrence count means for counting occurrences, in all transactions, of the individual item or the combination of two or more items output by said combination generation means;

combination selection means for selecting the individual item or the combination of two or more items which satisfies the given condition of the number of occurrences; and restriction condition generation means for assigning the combination generation restriction condition to said combination generation means according to the individual item or the combination of two or more items selected by said combination selection means.

22. The system according to claim 21, wherein said restriction condition generation means set a combination generation restriction condition by generating a bit map with specified bit value at bit positions, each of which corresponds to the individual item or the combination of two or more items selected by said combination selection means; and said combination generation means generates only the combination of items, in which partial combinations, each of which comprises the number of items less than the number of items to be obtained, correspond to one of the individual items or the combinations of items associated with the bit positions containing the specified bit value in the bit map when said combination generation means generates the combination of two or more items.

23. The system according to claim 22, wherein said restriction condition generation means sets the specified bit value at the bit position in the bit map corresponding to a hash function value for the individual item or the combination of two or more items selected by said combination selection means.

24. The system according to claim 21, wherein said combination generation means outputs, in addition to the items contained in the transactions, a combination of items or an individual item contained in another level in a hierarchical structure of items, excepting ancestor items in the hierarchical structure of items.

25. The system according to claim 21, wherein said combination generation means generates a combination of items from a sequence of items in time-series contained in the transactions with keeping the order of the sequence.

26. The system according to claim 21, wherein said occurrence count means performs a group-by operation to count the occurrences of the items based on a hash process, which transforms records including the individual items or the combination of two or more items stored in a storage device into a referenceable storage form using hash function values, each of which corresponds to a key value of the record; and said system further comprises:

record storing means for temporarily storing the records;

pointer storing means pointers to the records in said record storing means at positions, each of which corresponds to the hash function value calculated using the key value of the pointed record;

output means for outputting the records pointed to by the pointers stored in said pointer storing means to said storage device, given the hash function values for storage positions of the pointers; and group-by operation execution means for reading a list of hashed records output to said storage device by said output means, sorting the hashed records in the list according to the key value, and performing the group-by operation on the list of the sorted records.

27. The system according to claim 26, wherein said output means outputs the records output corresponding to the hash function values from said record storing means to said storage device as a set of blocks, and comprises:

auxiliary information storing means for storing auxiliary information for retrieving records in the block according to the hash function value.

28. The system according to claim 27, wherein said group-by operation execution means performs the group-by process on the records using a sequence of hashed records corresponding to the hash function values and output as a set of blocks by said output means and using auxiliary information stored in said auxiliary information storing means.

29. The system according to claim 21, wherein said occurrence count means performs a group-by operation to count the occurrences of the items based on a hash process, which transforms records including the individual items or the combination of two or more items stored in a storage device into a referenceable storage form using hash function values, each of which corresponds to a key value of the record; and said system further comprises in a hash processing system:

record storing means for temporarily storing the records;

pointer storing means for storing pointers to the records in said record storing means at positions, each of which corresponds to the hash function value calculated using the key value of the record; and output means for outputting the records pointed to by the pointers stored in said pointer storing means to sequential space or non-sequential space in said storage device, given the hash function values for storage positions of the pointers.

30. The system according to claim 29, wherein said output means outputs the records output corresponding to the hash function values from said record storing means to said storage device as a set of blocks, and comprises:

auxiliary information storing means for storing auxiliary information for retrieving records in the block according to the hash function value.

31. The system according to claim 21, wherein said occurrence count means performs a group-by operation to count the occurrences of the items based on a hash process, which transforms records including the individual items or the combination of two or more items stored in a storage device into a referenceable storage form using hash function values, each of which corresponds to a key value of the record; and said system further comprises:

group-by operation execution means for performing the group-by operation using a sequence of hashed records corresponding to the hash function values stored in sequential space or non-sequential space in said storage device and auxiliary information for retrieving the records in the block according to the hash function value.

32. The system according to claim 21, wherein said occurrence count means performs a group-by operation to count the occurrences of the items based on a hash process, which transforms records including the individual items or the combination of two or more items stored in a storage device into a referenceable storage form using hash function values, each of which corresponds to a key value of the record; and said system further comprises:

record storing means for temporarily storing the records;

pointer storing means for storing pointers to the records in said record storing means at positions, each of which corresponds to the hash function value calculated using the key value of the record; and output means for outputting the records pointed to by the pointers stored in said pointer storing means to sequential space or non-sequential space in said storage device as a set of blocks, each of which is output to sequential space, given the hash function values for storage positions of the pointers;

auxiliary information storing means for storing auxiliary information for retrieving records in the block according to the hash function value; and group-by operation execution means for performing the group-by operation using a sequence of hashed records output by said output means corresponding to the hash function values and the auxiliary information stored in said auxiliary information storing means.

33. The system according to claim 21, wherein said occurrence count means performs a group-by operation to count the occurrences of the items based on a hash process, which transforms records including the individual items or the combination of two or more items stored in a storage device into a referenceable storage form using hash function values, each of which corresponds to a key value of the record; and said system further comprises in a hash processing system:

record storing means for temporarily storing the records;

pointer storing means for storing pointers to the records in said record storing means at positions, each of which corresponds to the hash function value calculated using the key value of the pointed record;

output means for outputting the records pointed to by the pointers stored in said pointer storing means to said storage device, given the hash function values for storage positions of the pointers; and run information storing means for storing run information including addresses, each of which points to a record contained in each run created by said output means in said storage device, given the hash function values from a minimum value to a maximum value.

34. The hash system according to claim 33, wherein said output means outputs the records contained in the same run to sequential space in said storage device, and stores the records of different runs to sequential space or non-sequential space in said storage device.

35. The system according to claim 21, wherein said occurrence count means performs a group-by operation to count the occurrences of the items based on a hash process, which transforms records including the individual items or the combination of two or more items stored in a storage device into a referenceable storage form using hash function values, each of which corresponds to a key value of the record; and said system further comprises:

group-by operation execution means for performing the group-by operation using a sequence of hashed records obtained as a result of the same hash process in said storage device and run information, obtained as a result of the same hash process, including addresses, each of which points to a record contained in each run created by output means in said storage device, given the hash function values from a minimum value to a maximum value.

36. The system according to claim 21, wherein said occurrence count means performs a group-by operation to count the occurrences of the items based on a hash process, which transforms records including the individual items or the combination of two or more items stored in a storage device into a referenceable storage form using hash function values, each of which corresponds to a key value of the record; and said system further comprises:

record storing means for temporarily storing the records;

pointer storing means for storing pointers to the records in said record storing means at positions, each of which corresponds to the hash function value calculated using the key value of the record;

output means for outputting the records pointed to by the pointers stored in said pointer storing means to said storage device, given the hash function values for storage positions of the pointers;

run information storing means for storing run information including addresses, each of which points to a record contained in each run created by said output means in said storage device, given the hash function values from a minimum value to a maximum value; and group-by operation execution means for performing the group-by operation using a sequence of hashed records output by said output means and stored in said storage device and the run information stored in said run information storing means.

37. The system according to claim 21, wherein said occurrence count means performs a group-by operation to count the occurrences of the items based on a hash process, which transforms records including the individual items or the combination of two or more items stored in a storage device into a referenceable storage form using hash function values, each of which corresponds to a key value of the record; and said system further comprises:

record storing means for temporarily storing the records;

pointer storing means for storing pointers to records in said record storing means at positions, each of which corresponds to the hash function value calculated using the key value of the record;

output means for outputting the records pointed to by the pointers stored in said pointer storing means to said storage device, given the hash function values for storage positions of the pointers, outputting the records contained in the same run to sequential space in said storage device, given the hash function values from a minimum value to a maximum value, and outputting the records of different runs to sequential space or non-sequential space in said storage device;

run information storing means for storing run information including addresses, each of which points to a record contained in each run in said storage device; and group-by operation execution means for performing the group-by operation using a sequence of hashed records output by said output means and stored in said storage device and the run information stored in said run information storing means.

38. The system according to claim 21, wherein said occurrence count means performs a group-by operation to count the occurrences of the items based on a hash process, which transforms records including the individual items or the combination of two or more items stored in a storage device into a referenceable storage form using hash function values, each of which corresponds to a key value of the record; and said system further comprises in a hash processing system:

record storing means for temporarily storing the records;

pointer storing means for storing pointers to the records in said record storing means at positions, each of which corresponds to the hash function value calculated using the key value of the record;

output means for outputting the records pointed to by the pointers stored in said pointer storing means to sequential space or non-sequential space in said storage device as a set of blocks, and outputting the blocks with connection data between two blocks if the two blocks should be adjacent with each other and if the blocks cannot be output to sequential space in said storage device, given the hash function values for storage positions of the pointers; and run information storing means for storing run information including addresses, each of which points to a record contained in each run created by said output means in said storage device, given the hash function values from a minimum value to a maximum value.

39. The system according to claim 21, wherein said occurrence count means performs a group-by operation to count the occurrences of the items based on a hash process, which transforms records including the individual items or the combination of two or more items stored in a storage device into a referenceable storage form using hash function values, each of which corresponds to a key value of the record; and said system further comprises:

group-by operation execution means for performing the group-by operation using a sequence of hashed records stored in said storage device, run information including addresses, each of which points to a record contained in each run created by output means in said storage device, given the hash function values from a minimum value to a maximum value, and connection data between two blocks which are stored in independent and non-sequential space in said storage device though the blocks should come sequentially.

40. The system according to claim 21, wherein said occurrence count means performs a group-by operation to count the occurrences of the items based on a hash process, which transforms records including the individual items or the combination of two or more items stored in a storage device into a referenceable storage form using hash function values, each of which corresponds to a key value of the record; and said system further comprises:

record storing means for temporarily storing records;

pointer storing means for storing pointers to the records in said record storing means at positions, each of which corresponds to the hash function value calculated using the key value of the record;

output means for outputting the records pointed to by the pointers stored in said pointer storing means to sequential space or non-sequential space in said storage device, and outputting the blocks with connection data between two blocks if the two blocks should be adjacent with each other and if the blocks cannot be output to sequential space in said storage device, given the hash function values for storage positions of the pointers;

run information storing means for storing run information including addresses, each of which points to a record contained in each run created by said output means in said storage device, given the hash function values from a minimum value to a maximum value; and group-by operation execution means for performing the group-by operation using a sequence of hashed records output by said output means and stored in said storage device, given the hash function values, the run information stored in said run information storing means, and the connection data between the two blocks.

41. A computer readable storage medium storing a process, in a related data combination count system for obtaining individual items or combinations of two or more items from a plurality of transactions containing one or more items, and determining the number of occurrences of the individual item or the combination of two or more items which satisfy a given condition of the number of occurrences in the transactions, the process comprises the steps of:

outputting each item in each transaction when the individual item is to be obtained, and generating every combination of the number of items to be obtained from each transaction and outputting only the combination satisfying a combination generation restriction condition that partial combinations in the combination satisfy the given condition of the number of occurrences, said partial combination comprising the number of items less than the number of items to be obtained, when the combination of two or more items is to be obtained;

counting occurrences, in all transactions, of the individual item or the combination of two or more items output by said outputting function;

selecting the individual item or the combination of two or more items which satisfies the given condition of the number of occurrences; and assigning the combination generation restriction condition to said outputting function according to the individual item or the combination of two or more items selected by said selecting function.

42. The storage medium according to claim 41, wherein said step of counting occurrences performs a group-by operation to count the occurrences of the items based on a hash process, which transforms records including the individual items or the combination of two or more items stored in a storage device into a referenceable storage form using hash function values, each of which corresponds to a key value of the record; and said process further comprises the steps of:

temporarily storing the records;

storing pointers to the temporarily stored records at positions, each of which corresponds to the hash function value calculated using the key value of the pointed record;

outputting the records pointed to by the pointers to said storage device, given the hash function values for storage positions of the pointers; and reading a list of hashed records output to said storage device, sorting the hashed records in the list according to the key value, and performing the group-by operation on the list of the sorted records.

43. The storage medium according to claim 41, wherein said step of counting occurrences performs a group-by operation to count the occurrences of the items based on a hash process, which transforms records including the individual items or the combination of two or more items stored in a storage device into a referenceable storage form using hash function values, each of which corresponds to a key value of the record; and said process further comprises the steps of:

temporarily storing the records;

storing pointers to the temporarily stored records at positions, each of which corresponds to the hash function value calculated using the key value of the pointed record; and outputting the records pointed to by the pointers to sequential space or non-sequential space in said storage device as a set of blocks, each of which is output to sequential space in said storage device;

storing auxiliary information for retrieving records in the block according to the hash function value; and performing the group-by operation using a sequence of hashed records output to said storage device and the auxiliary information.

44. The storage medium according to claim 41, wherein said step of counting occurrences performs a group-by operation to count the occurrences of the items based on a hash process, which transforms records including the individual items or the combination of two or more items stored in a storage device into a referenceable storage form using hash function values, each of which corresponds to a key value of the record; and said process further comprises the steps of:

temporarily storing the records;

storing pointers to the temporarily stored records at positions, each of which corresponds to the hash function value calculated using the key value of the pointed record;

outputting the records pointed to by the pointers in said storage device, given the hash function values for storage positions of the pointers;

storing run information including addresses, each of which points to a record contained in each run created in said storage device, given the hash function values from a minimum value to a maximum value; and performing the group-by operation using a sequence of hashed records stored in said storage device and the run information stored in said run information storing means.

45. The storage medium according to claim 41, wherein said step of counting occurrences performs a group-by operation to count the occurrences of the items based on a hash process, which transforms records including the individual items or the combination of two or more items stored in a storage device into a referenceable storage form using hash function values, each of which corresponds to a key value of the record; and said process further comprises the step of:

temporarily storing the records;

storing pointers to the temporarily stored records at positions, each of which corresponds to the hash function value calculated using the key value of the record;

outputting the records pointed to by the pointers to said storage device, given the hash function values for storage positions of the pointers, outputting the records contained in the same run to sequential space in said storage device, given the hash function values from a minimum value to a maximum value, and outputting the records of different runs to sequential space or non-sequential space in said storage device;

storing run information including addresses, each of which points to a record contained in each run in said storage device; and performing the group-by operation using a sequence of hashed records output and stored in said storage device and the run information.

46. The storage medium according to claim 41, wherein said step of counting occurrences performs a group-by operation to count the occurrences of the items based on a hash process, which transforms records including the individual items or the combination of two or more items stored in a storage device into a referenceable storage form using hash function values, each of which corresponds to a key value of the record; and said process further comprises the steps of:

temporarily storing records;

storing pointers to the temporarily stored records at positions, each of which corresponds to the hash function value calculated using the key value of the record;

outputting the records pointed to by the pointers to said storage device as a set of blocks, each of which is output to sequential space in said storage device, given the hash function values for storage positions of the pointers, and for outputting the blocks with connection data between two blocks if the two blocks should be adjacent with each other and if the blocks cannot be output to sequential space in said storage device;

storing run information including addresses, each of which points to a record contained in each run created in said storage device, given the hash function values from a minimum value to a maximum value; and performing the group-by process using a sequence of hashed records stored in said storage device, the run information, and the connection data between the two blocks.

47. A method of counting related data combinations for obtaining individual items or combinations of two or more items from a plurality of transactions containing one or more items, and determining the number of occurrences of the individual items or the combinations of two or more items which satisfy a given condition of the number of occurrences in the transactions, comprising the steps of:

outputting each item in each transaction when the individual item is to be obtained, and generating every combination of the number of items to be obtained from each transaction and outputting only the combination satisfying a combination generation restriction condition that partial combinations in the combination satisfy the given condition of the number of occurrences, said partial combination comprising the number of items less than the number of items to be obtained, when the combination of two or more items is to be obtained;

counting occurrences, in all transactions, of the individual item or the combination of two or more items output by said outputting step;

selecting the individual item or the combination of two or more items which satisfies the given condition of the number of occurrences; and assigning the combination generation restriction condition to said outputting step according to the individual item or the combination of two or more items selected by said selecting step.

48. The method according to claim 47, wherein said assigning step further comprises the step of:

creating, for each number of items to be obtained, a bit map with specified bit value at positions corresponding to the individual items or the combinations of two or more items selected by said selecting step, and said outputting step further comprises the step of:

using at least one bit map for the number of items less than the number of items to be obtained, and determining that the partial combination in the combination corresponds to the individual items or combinations of two or more items associated with the positions with specified bit value in the bit map.

49. The method according to claim 48, wherein each position in the bit map corresponds to a hash function value, calculated using identification numbers for individual items or for the combinations of two or more items.

50. The method according to claim 47, wherein, in addition to the items contained in the transactions, individual items or combinations of two or more items contained in another level in a hierarchical structure of items, excepting ancestor items in the hierarchical structure of items, and the number of occurrences of the individual items or the combinations of two or more items are obtained.

51. The method according to claim 47, wherein individual items or combinations of two or more items satisfying the given condition and the number of occurrences of the individual items or the combinations of two or more items are obtained from a sequence of items in time-series contained in the transactions with keeping the original order of the sequence.

52. A method of counting related data combinations for obtaining individual items or combinations of two or more items from a plurality of transactions containing one or more items, and determining the number of occurrences of the individual items or the combinations of two or more items which satisfy a given condition of the number of occurrences in the transactions, comprising the steps of:

(a) counting individual items in each transaction, and obtaining the number of occurrences of each individual item in all transactions;

(b) selecting individual items having the number of occurrences which meets the given condition, and outputting the individual items and the number of occurrences;

(c) generating a bit map for the individual items with specified bit value set at bit positions, each of which corresponds to one of the output items;

(d) generating combinations of two items, from transactions of two or more items, including only items corresponding to the bit position having the specified bit value in the bit map;

(e) counting the combinations of two items in the transactions of two or more items, and obtaining the number of occurrences of each combination of two items;

(f) selecting the combinations of two items having the number of occurrences which meets the given condition, and outputting the selected combinations of two items and the number of occurrences;

(g) generating a bit map for the combinations of two items with specified bit value set at bit positions, each of which corresponds to one of the selected combination of two items, and updating the bit map for the individual items with specified bit value set at bit positions, each of which corresponds to one of the two items of the selected combination of two items;

(h) generating combinations of three items, from transactions of three or more items, including only one item or combination of two items corresponding to the bit positions having the specified bit value in the previous generated bit maps;

(i) counting the combinations of three items in the transactions of three or more items, and obtaining the number of occurrences of each combination of three items;

(j) selecting the combinations of three items having the number of occurrences which meets the given condition, and outputting the selected combinations of three items and the number of occurrences;

(k) generating a bit map for the combinations of three items with specified bit value set at bit positions, each of which corresponds to one of the selected combination of three items, updating the bit map for the combinations of two items with specified bit value set at bit positions, each of which corresponds to one of the three combinations of two items of the selected combination of three items, and updating the bit map for the individual items with specified bit value set at bit positions, each of which corresponds to one of the three items of the selected combination of three items; and (l) repeating steps (h) through (k) for combinations of four or more items in the same manner.

53. The method according to claim 52, wherein each position in the bit maps corresponds to a hash function value, calculated using identification numbers for individual items or for the combinations of two or more items.

54. The method according to claim 52, wherein, in addition to the items contained in the transactions, individual items or combinations of two or more items contained in another level in a hierarchical structure of items, excepting ancestor items in the hierarchical structure of items, and the number of occurrences of the individual items or the combinations of two or more items are obtained.

55. The method according to claim 52, wherein individual items or combinations of two or more items satisfying the given condition and the number of occurrences of the individual items or the combinations of two or more items are obtained from a sequence of items in time-series contained in the transactions with keeping the original order of the sequence.

* * * * *

UNITED STATES PATENT AND TRADEMARK OFFICE
CERTIFICATE OF CORRECTION

PATENT NO. : 6,226,634 B1
DATED : May 1, 2001
INVENTOR(S) : Kazutaka Ogihara et al.

It is certified that error appears in the above-identified patent and that said Letters Patent is hereby corrected as shown below:

<u>Title page,</u>
Item [56], OTHER PUBLICATIONS, delete the first entry "M. Houtsma, et al., "Oriented Mining for Association Rules in Relational Databases"; pp. 25-33, no date".

<u>Column 49,</u>
Line 13, "run" should begin a new paragraph.

Signed and Sealed this

Eighth Day of January, 2002

Attest:

Attesting Officer

JAMES E. ROGAN
Director of the United States Patent and Trademark Office